(12) United States Patent  
Murata et al.

(10) Patent No.: US 10,802,345 B2  
(45) Date of Patent: Oct. 13, 2020

(54) LIQUID CRYSTAL DISPLAY DEVICE

(71) Applicant: SHARP KABUSHIKI KAISHA, Sakai, Osaka (JP)

(72) Inventors: Mitsuhiro Murata, Sakai (JP); Yosuke Iwata, Sakai (JP); Takuma Tomotoshi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/080,729

(22) PCT Filed: Feb. 21, 2017

(86) PCT No.: PCT/JP2017/006256  
§ 371 (c)(1),  
(2) Date: Aug. 29, 2018

(87) PCT Pub. No.: WO2017/150262  
PCT Pub. Date: Sep. 8, 2017

(65) Prior Publication Data  
US 2019/0094580 A1    Mar. 28, 2019

(30) Foreign Application Priority Data

Feb. 29, 2016  (JP) .................................. 2016-038002  
Sep. 29, 2016  (JP) .................................. 2016-191702  
Sep. 29, 2016  (JP) .................................. 2016-191703

(51) Int. Cl.  
*G02F 1/1337*  (2006.01)  
*G02F 1/1343*  (2006.01)

(52) U.S. Cl.  
CPC .......... *G02F 1/1337* (2013.01); *G02F 1/1343* (2013.01); *G02F 1/133707* (2013.01);  
(Continued)

(58) Field of Classification Search  
CPC ... G02F 2001/134372; G02F 1/134363; G02F 2001/134318; G02F 1/133707  
See application file for complete search history.

(56) References Cited

U.S. PATENT DOCUMENTS

| | | | |
|---|---|---|---|
| 2004/0075791 A1* | 4/2004 | Liu ................... | G02F 1/133555 349/114 |
| 2005/0168674 A1 | 8/2005 | Kubo | |
| 2007/0242205 A1* | 10/2007 | Shimura ........... | G02F 1/134363 349/141 |
| 2011/0069270 A1 | 3/2011 | Shimura et al. | |

(Continued)

FOREIGN PATENT DOCUMENTS

| | | |
|---|---|---|
| JP | 2005-227464 A | 8/2005 |
| JP | 2006-106101 A | 4/2006 |

(Continued)

OTHER PUBLICATIONS

Tanaka, English translation for JP-2006106101-A (Year: 2006).*

*Primary Examiner* — Edmond C Lau  
*Assistant Examiner* — Jonathan Y Jung  
(74) *Attorney, Agent, or Firm* — ScienBiziP, P.C.

(57) ABSTRACT

Disclosed is a horizontal alignment mode liquid crystal display device that can achieve higher definition and improved response speed. The liquid crystal display device includes, in the given order: a first substrate; a liquid crystal layer containing liquid crystal molecules; and a second substrate. The first substrate includes a first electrode, a second electrode positioned closer to the liquid crystal layer than the first electrode is, and an insulating film between the first and second electrodes. The second electrode is provided with an opening having a shape including a longitudinal-shaped portion and a pair of protrusions protruding to opposite sides from the longitudinal-shaped portion. The protrusions are provided at portions excluding both end portions in the longitudinal direction of the longitudinal-shaped portion and are located at corresponding positions. In a no-voltage-applied state, the liquid crystal molecules are (Continued)

aligned parallel to the first substrate, and in a plan view, the longitudinal direction of the longitudinal-shaped portion and an alignment azimuth of the liquid crystal molecules in the no-voltage-applied state are parallel or orthogonal to each other.

27 Claims, 83 Drawing Sheets

(52) U.S. Cl.
CPC ............... *G02F 1/134363* (2013.01); *G02F 2001/133757* (2013.01); *G02F 2001/134318* (2013.01); *G02F 2001/134372* (2013.01)

(56) References Cited

U.S. PATENT DOCUMENTS

| | | | |
|---|---|---|---|
| 2013/0100388 A1* | 4/2013 | Matsushima | ..... G02F 1/134363 349/123 |
| 2014/0192308 A1 | 7/2014 | Furukawa et al. | |
| 2015/0160520 A1 | 6/2015 | Matsushima | |
| 2016/0161811 A1 | 6/2016 | Matsushima | |
| 2017/0131600 A1 | 5/2017 | Matsushima | |

FOREIGN PATENT DOCUMENTS

| | | | |
|---|---|---|---|
| JP | 2006106101 A | * | 4/2006 |
| JP | 2007-286115 A | | 11/2007 |
| JP | 2013-109309 A | | 6/2013 |
| JP | 2015-114493 A | | 6/2015 |
| WO | 2013/021929 A1 | | 2/2013 |

\* cited by examiner

Polarizing plate absorption axis

Polarizing plate absorption axis

Fig. 42
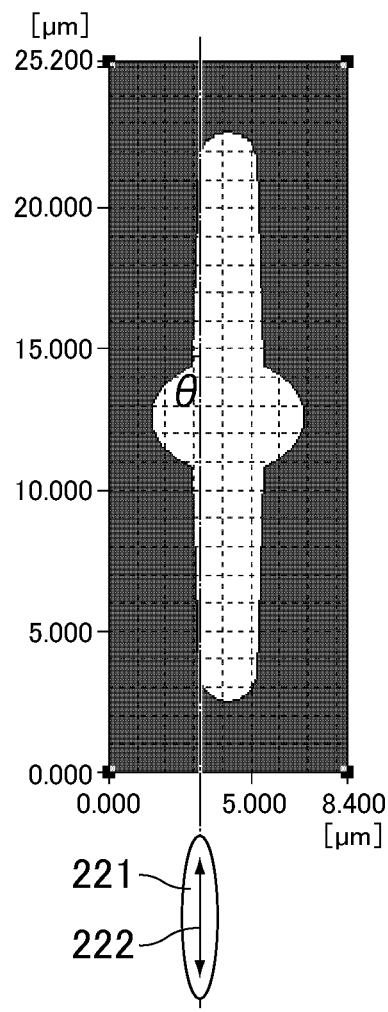
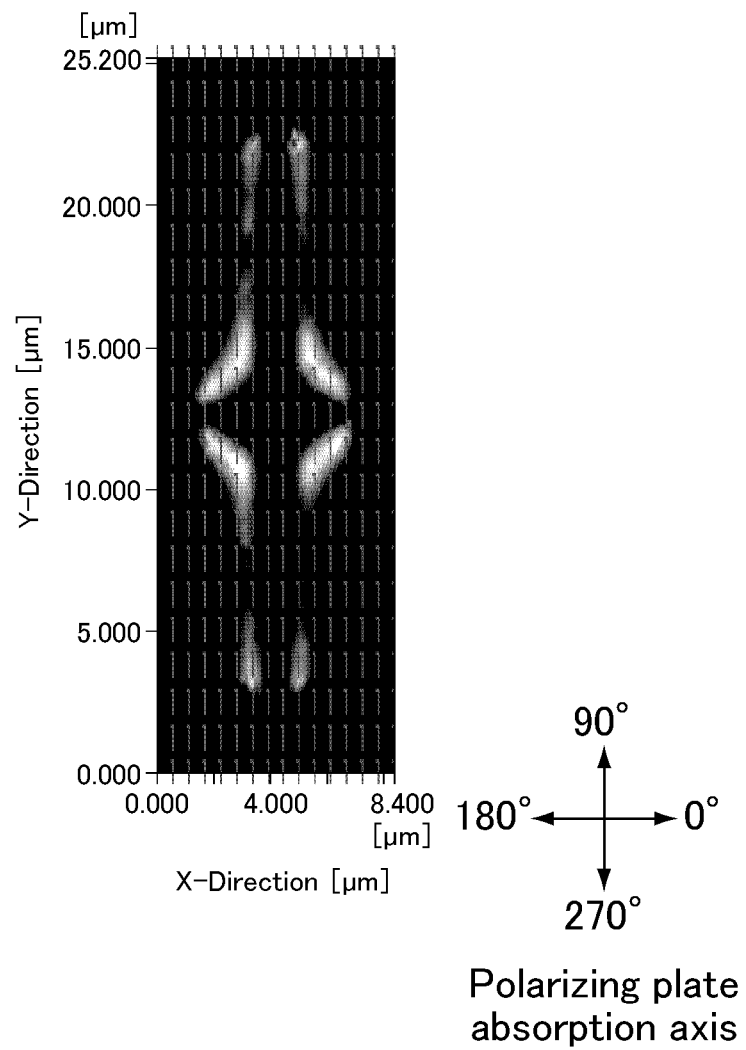
Polarizing plate absorption axis

Fig. 43
(a) 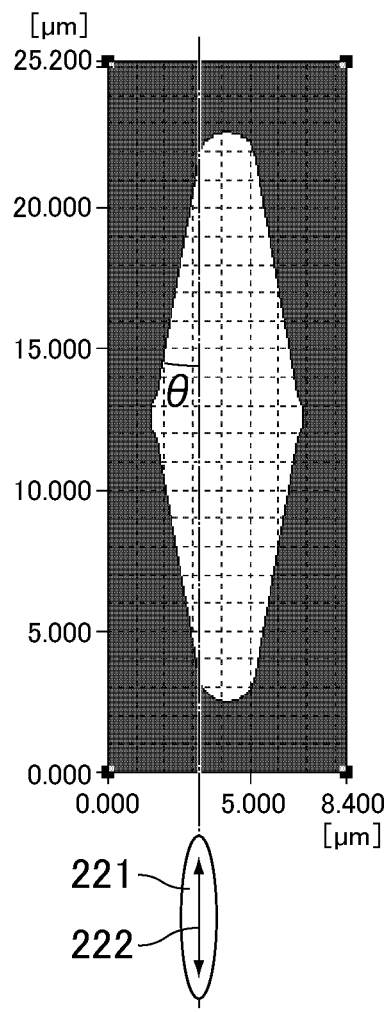
(b) 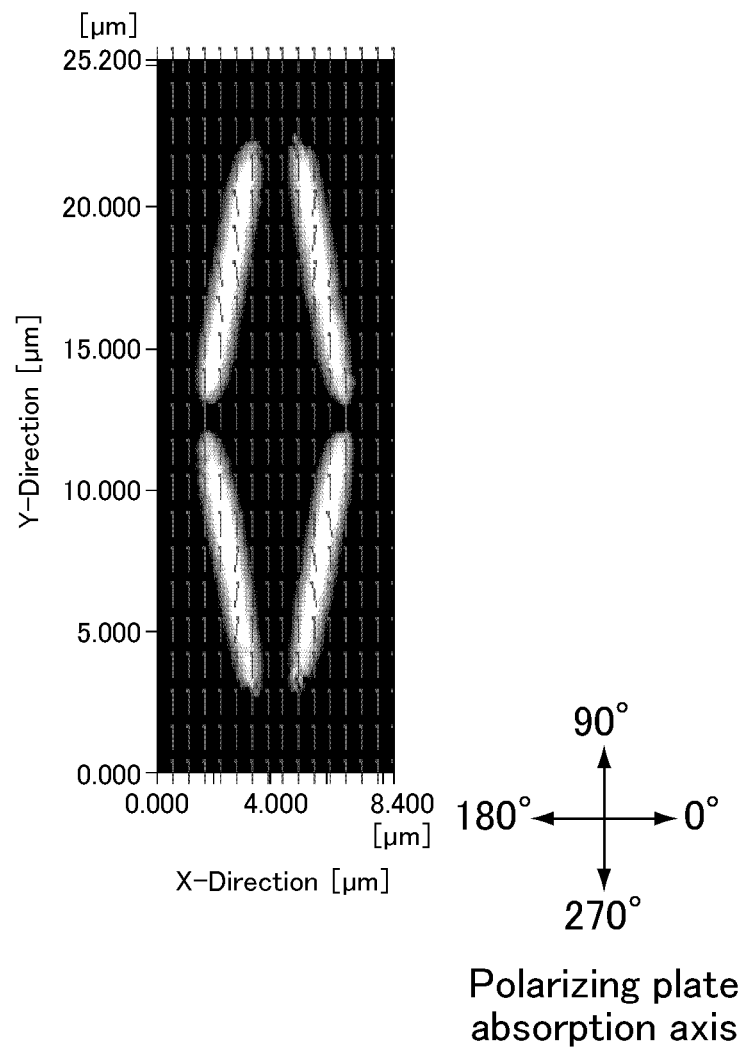
Polarizing plate absorption axis

Fig. 44
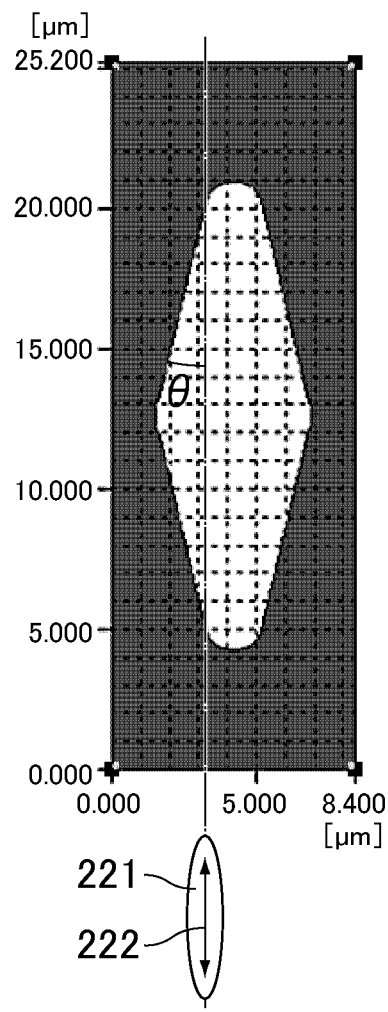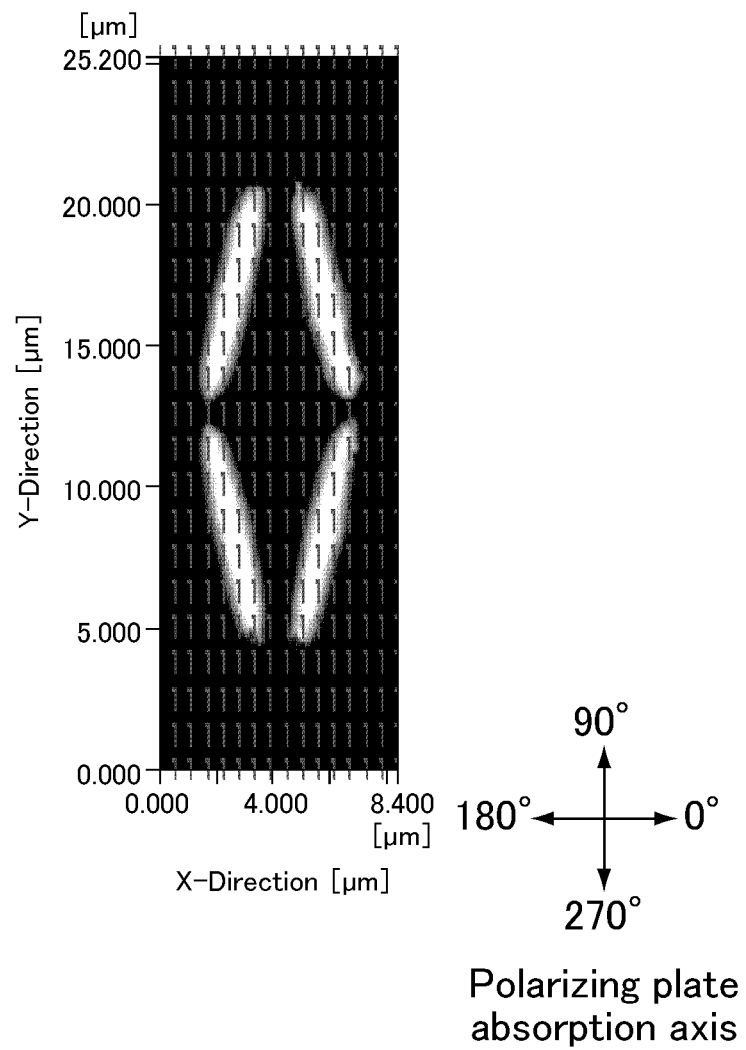

Fig. 45
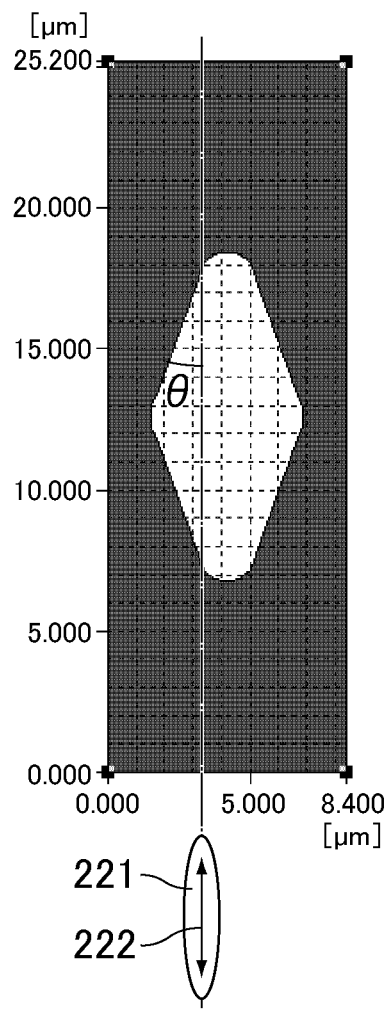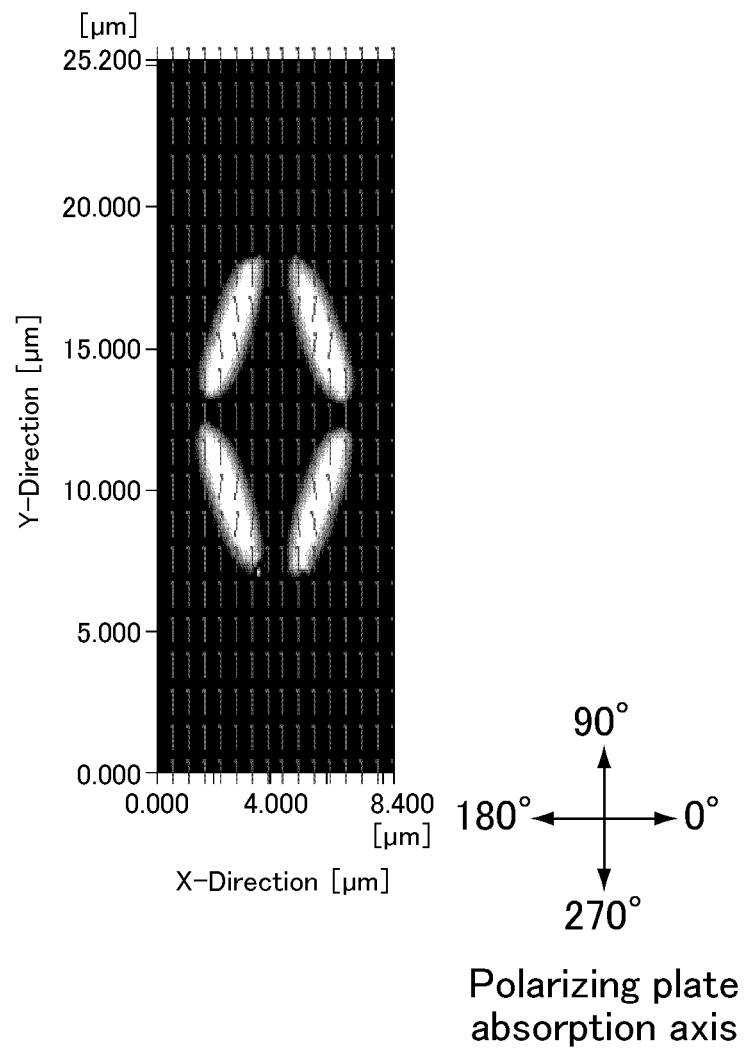
Polarizing plate absorption axis

Fig. 47
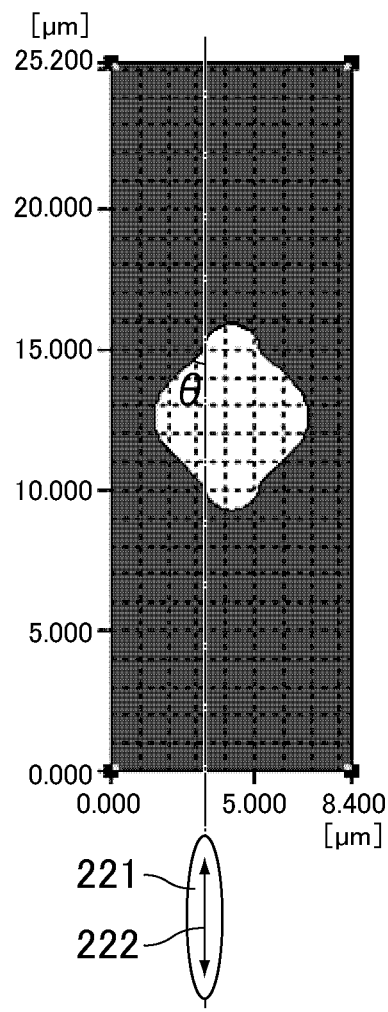 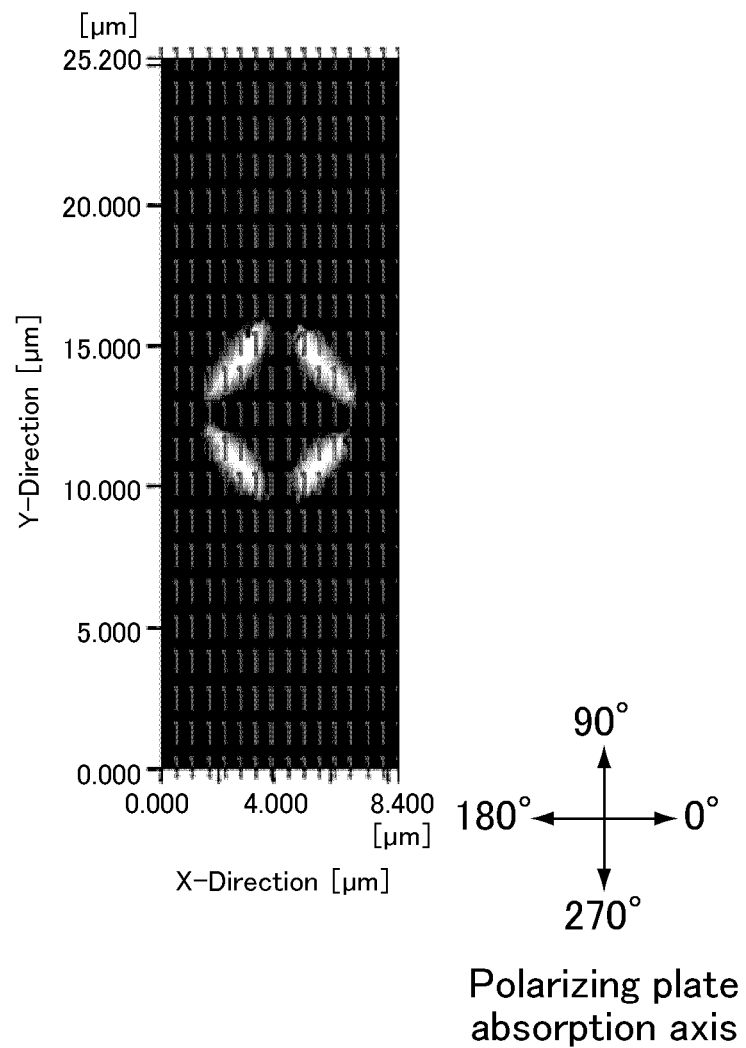

Fig. 48
(a) 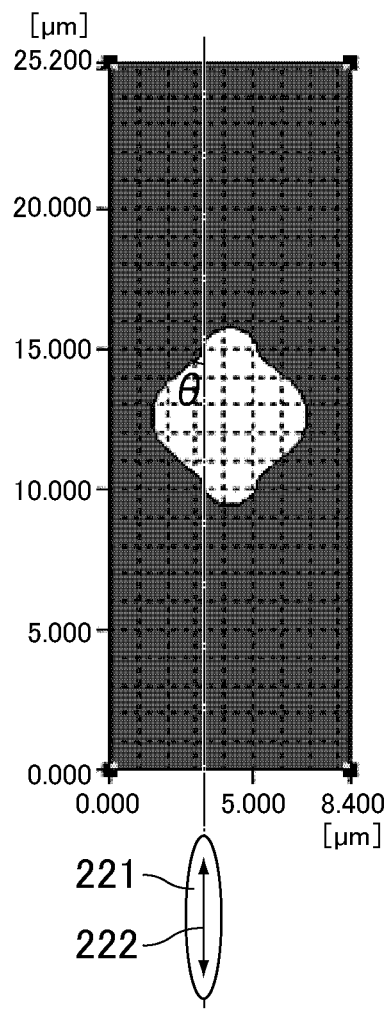
(b) 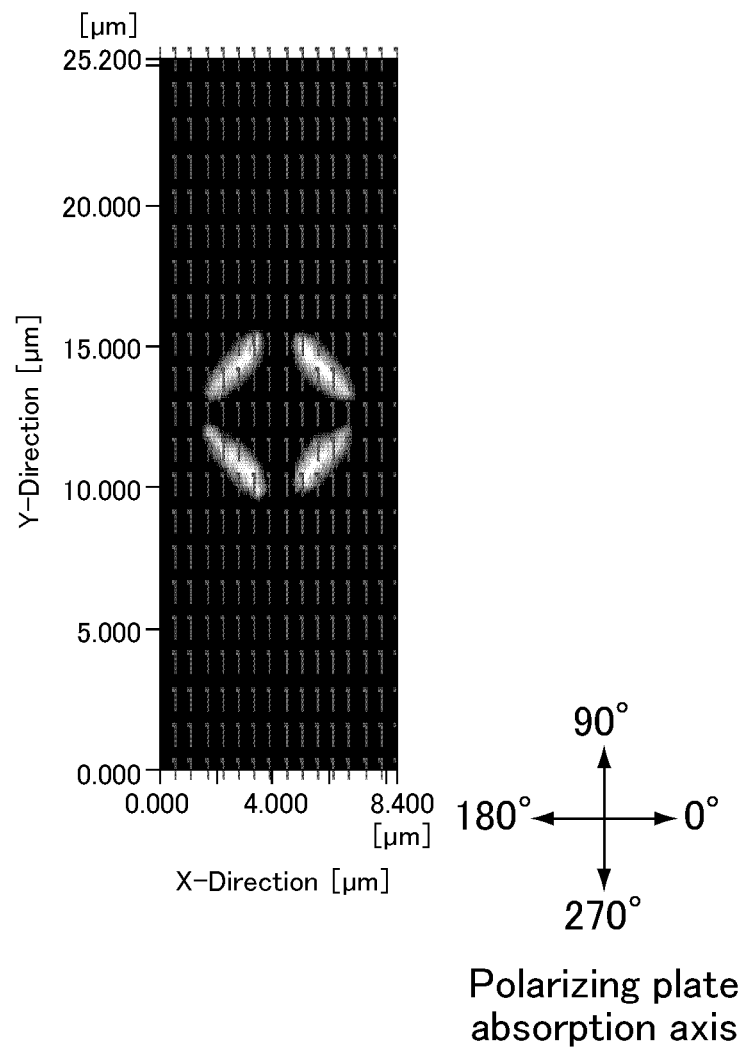
Polarizing plate absorption axis

Fig. 50
(a)
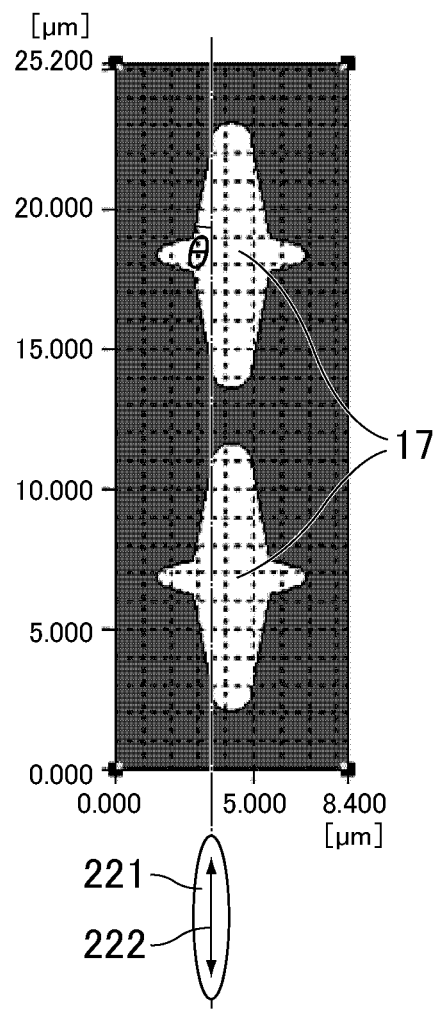
(b)
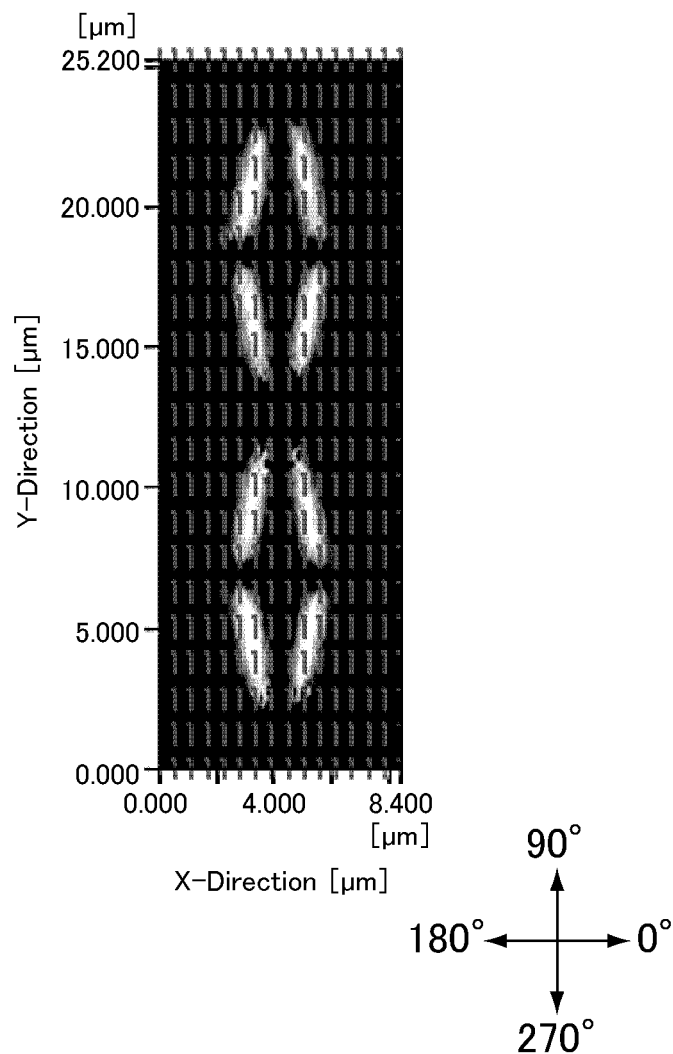
Polarizing plate absorption axis

Fig. 51
(a)
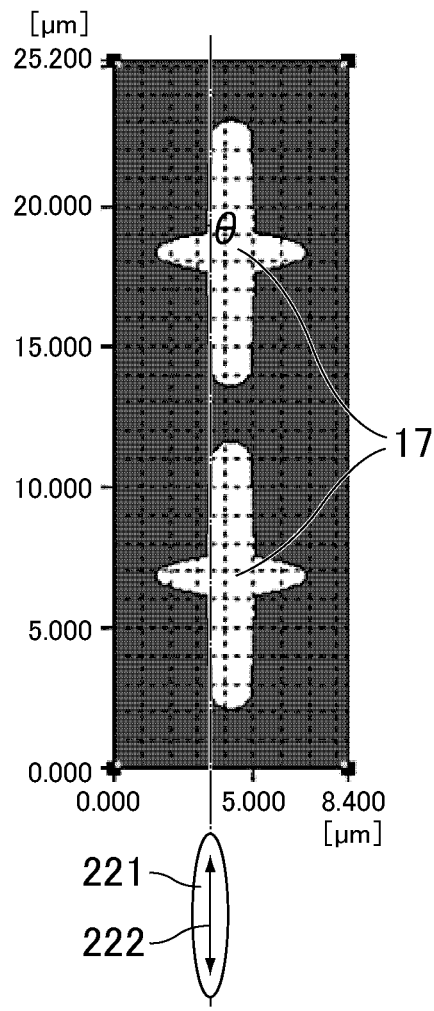
221
222
(b)
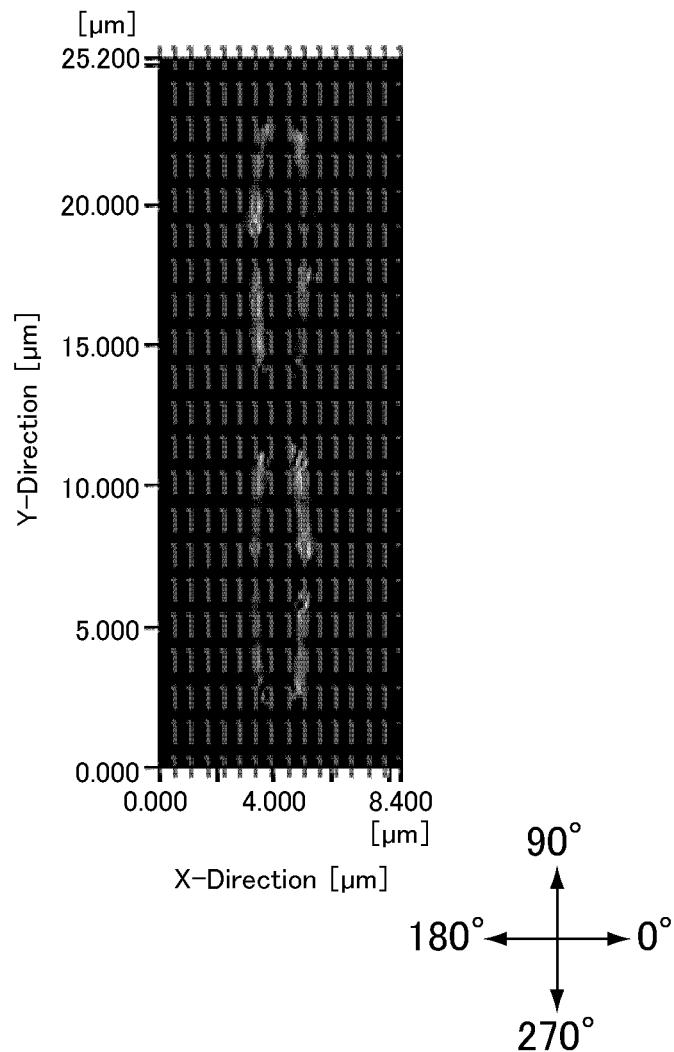
90°
180° ← → 0°
270°
Polarizing plate
absorption axis Fig. 52
(a)
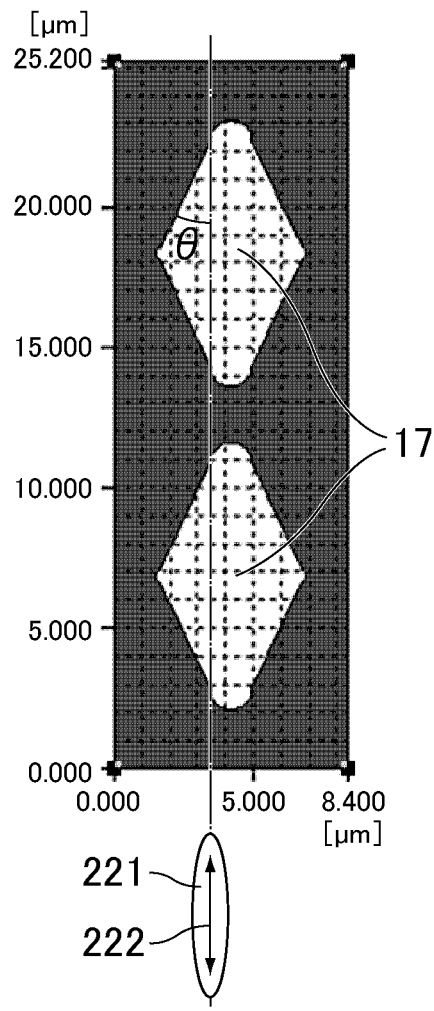
(b)
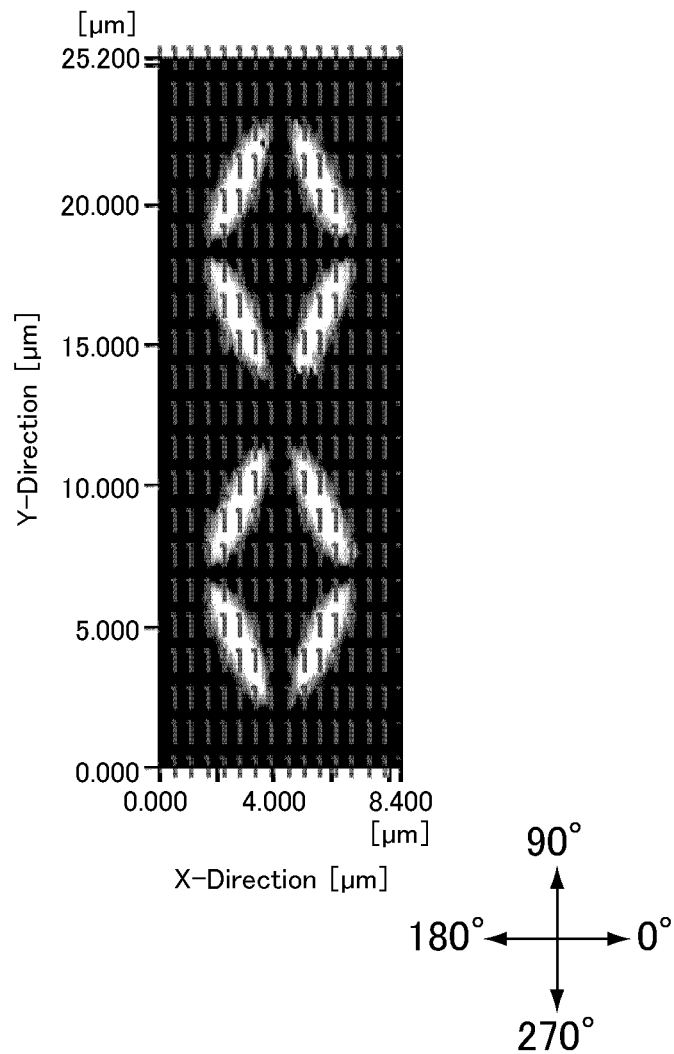
Polarizing plate absorption axis Fig. 53
(a) 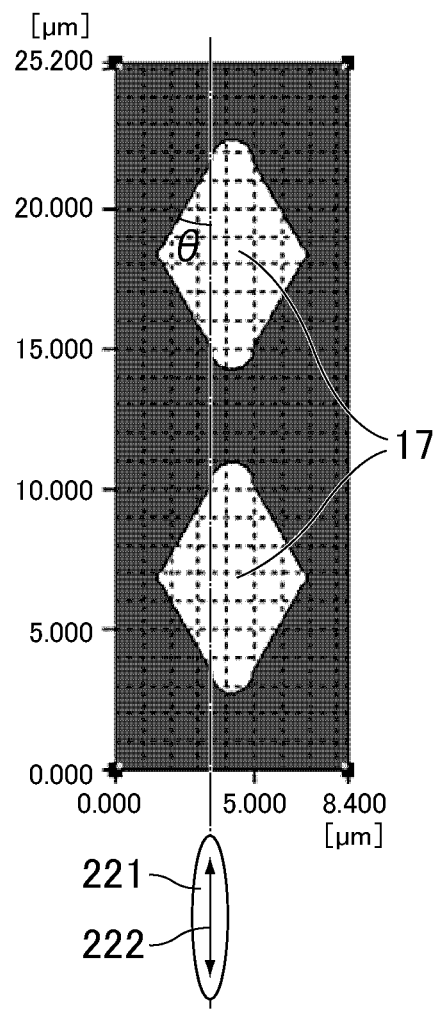
(b) 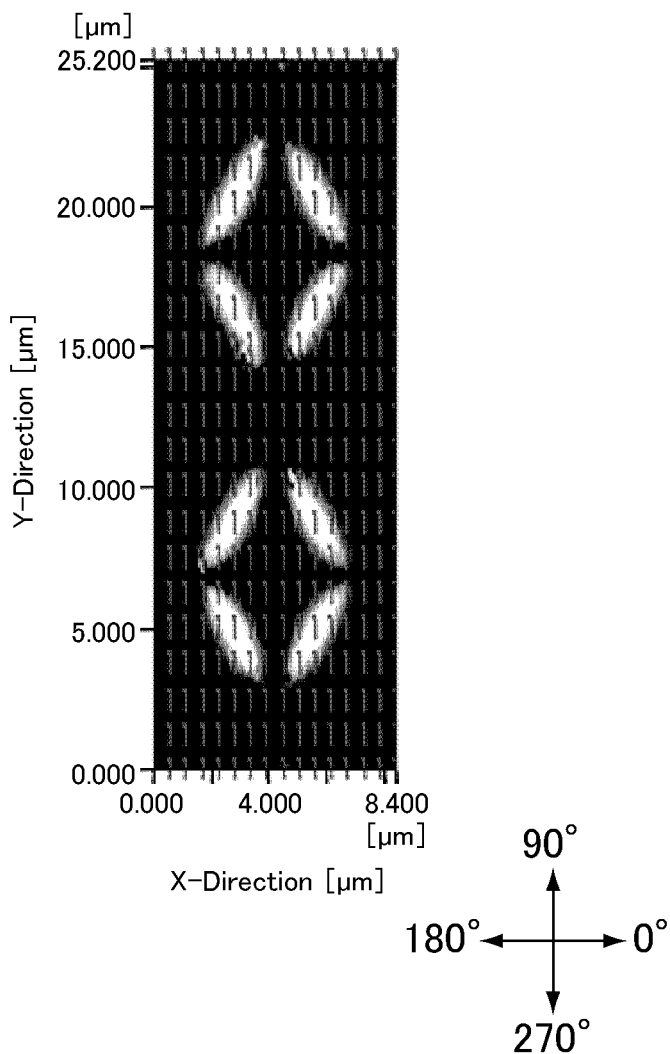
Polarizing plate absorption axis Fig. 54
(a)
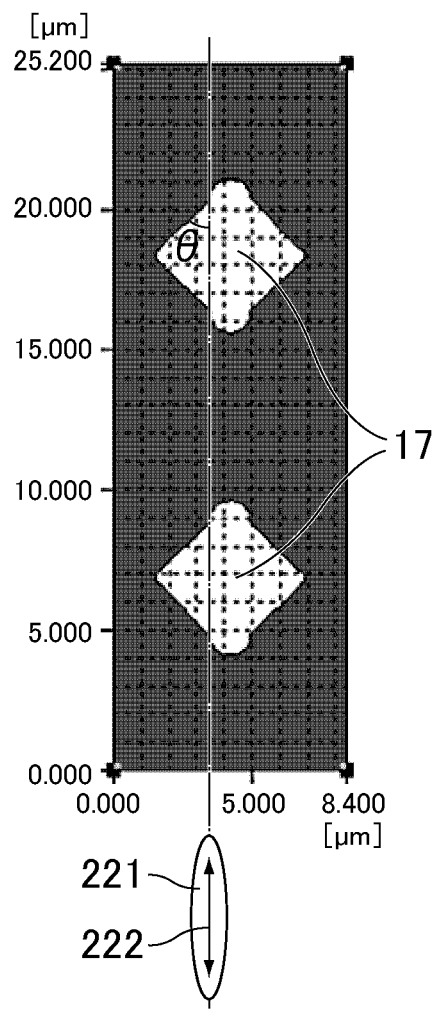
(b)
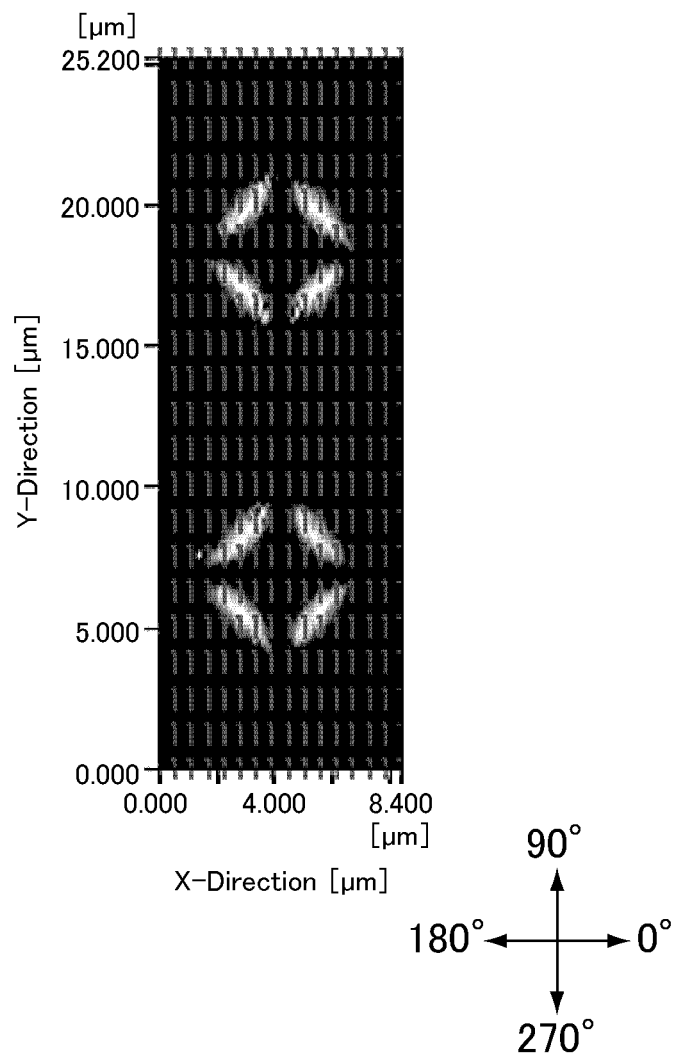
90°
180° ← → 0°
270°
Polarizing plate absorption axis Fig. 56
(a)
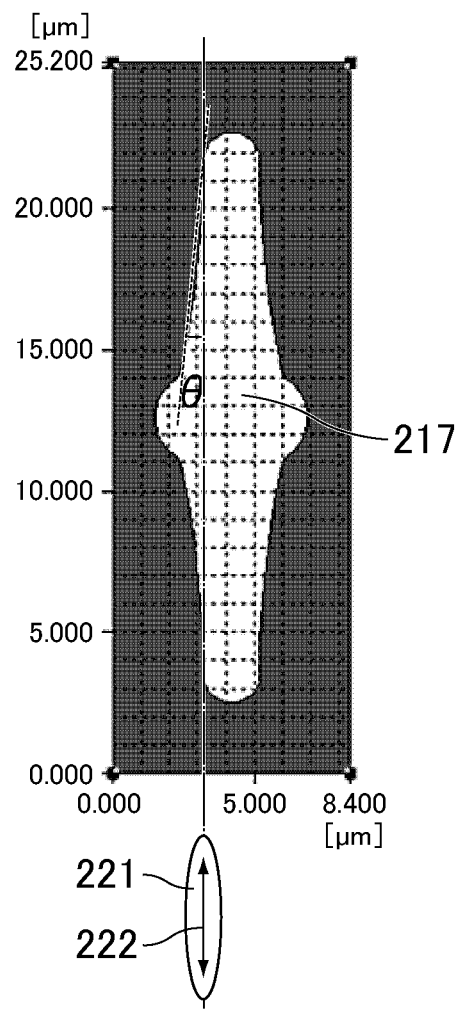
(b)
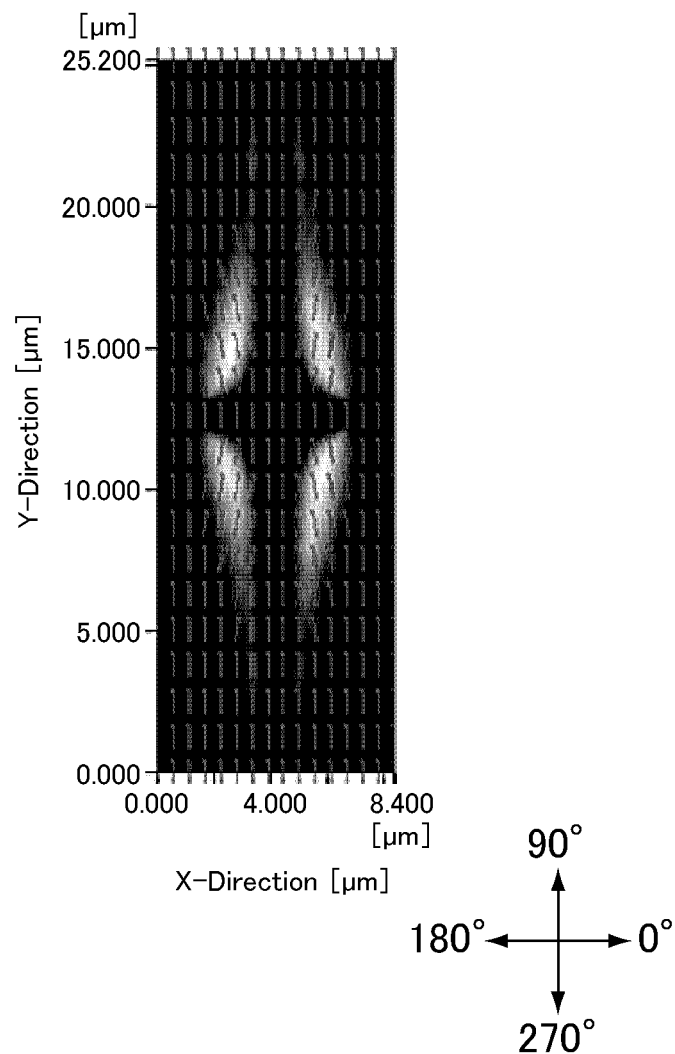
Polarizing plate absorption axis Fig. 57
(a)
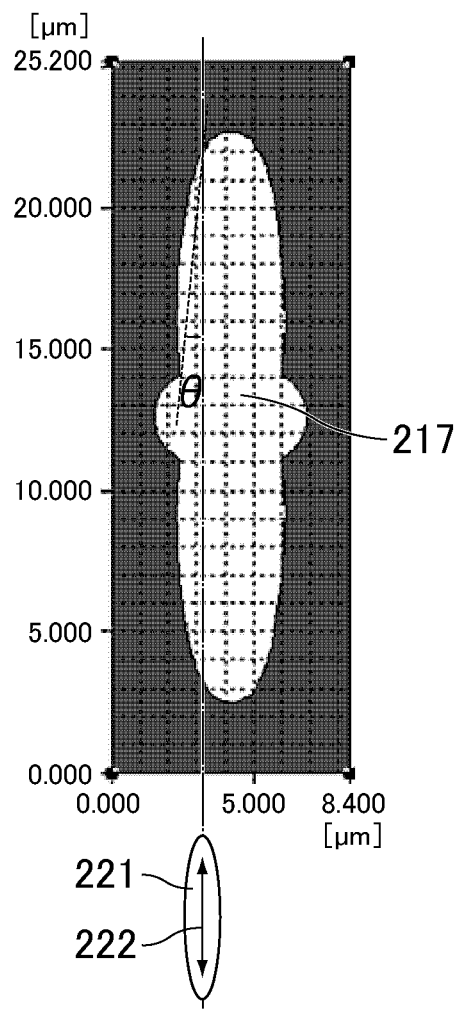
221
222
(b)
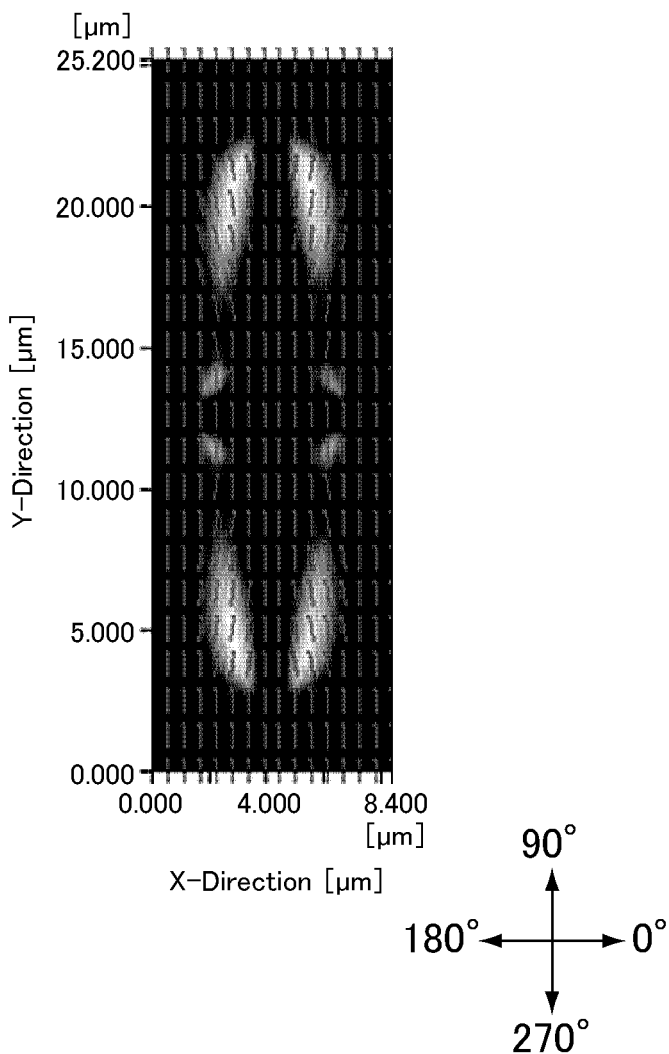
Polarizing plate absorption axis Fig. 58
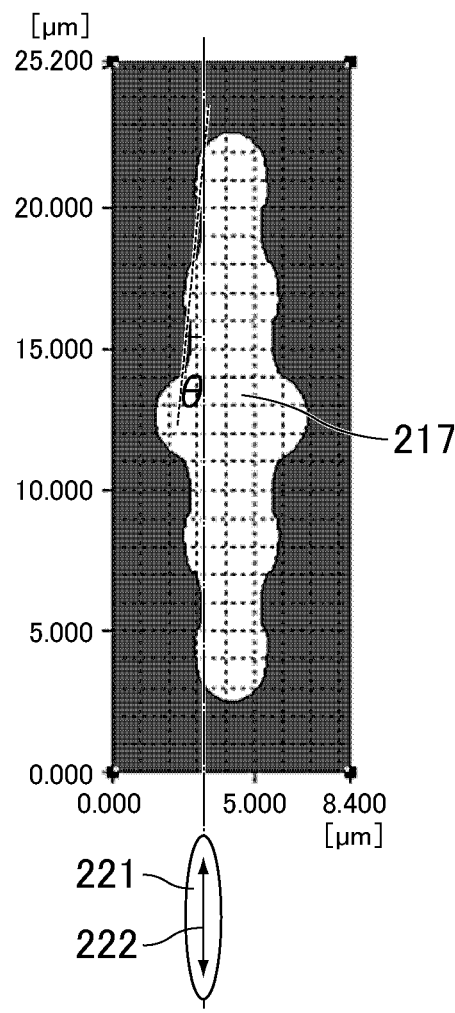
(a)
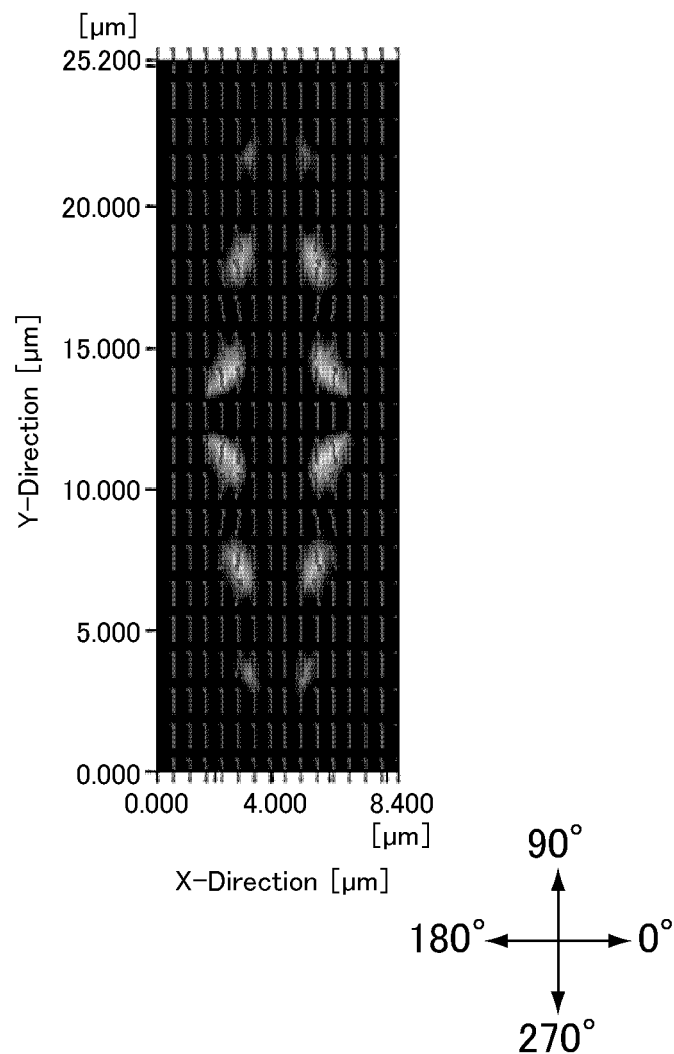
(b)
Polarizing plate absorption axis Polarizing plate absorption axis Fig. 62
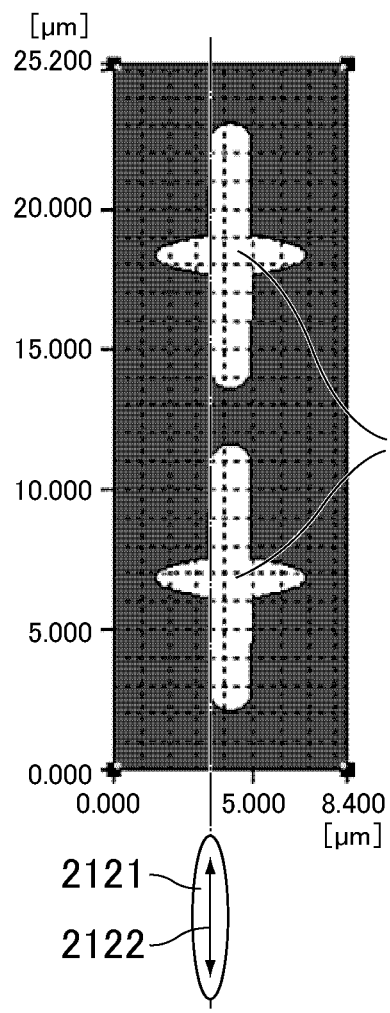
(a)
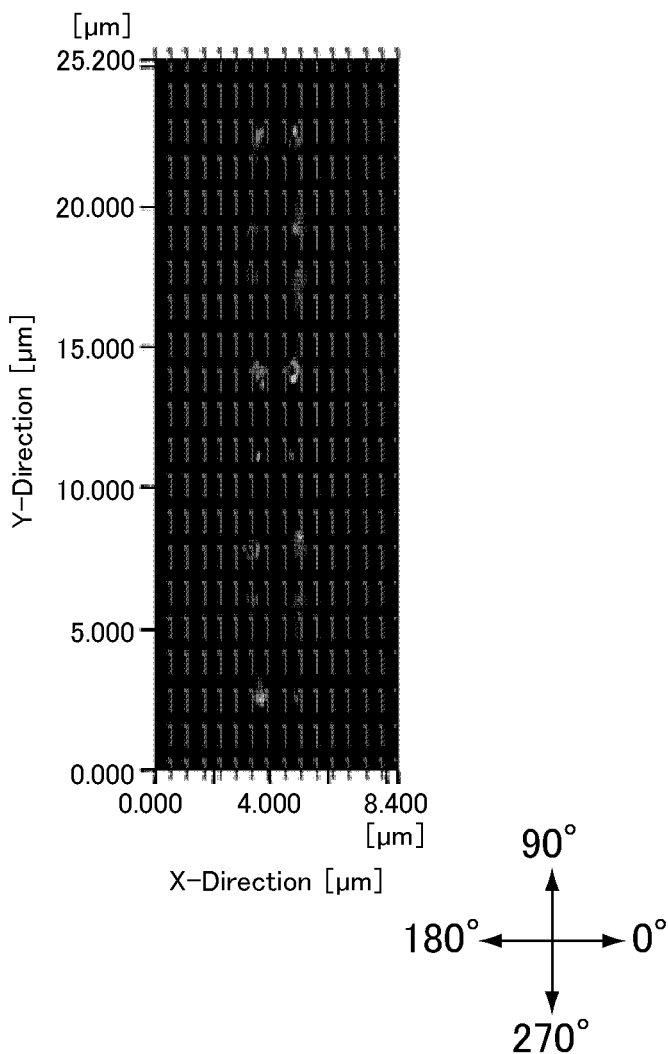
(b)
Polarizing plate absorption axis Fig. 74
Example 3-10
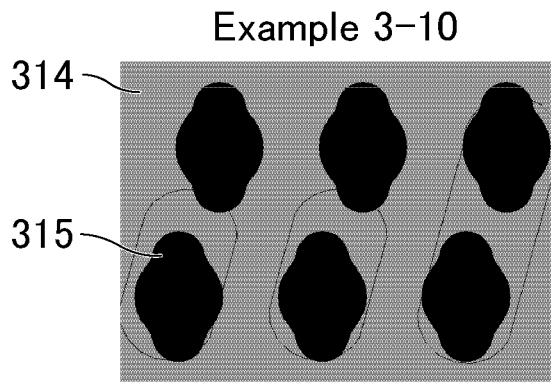
Example 3-11
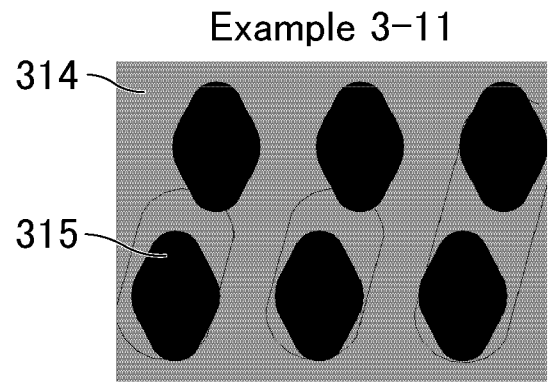
Example 3-12
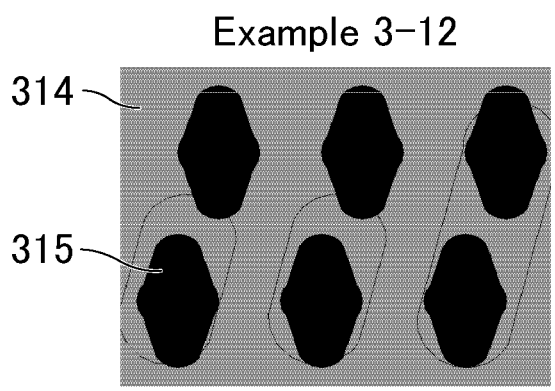
Example 3-13
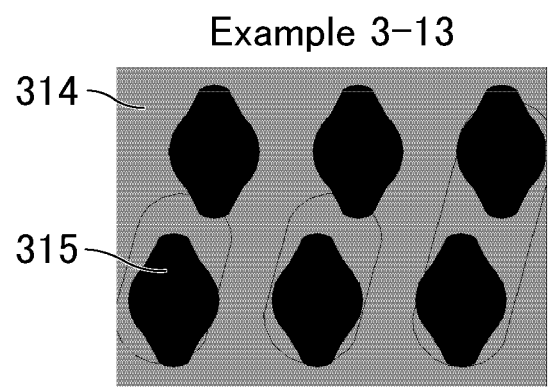
Example 3-14
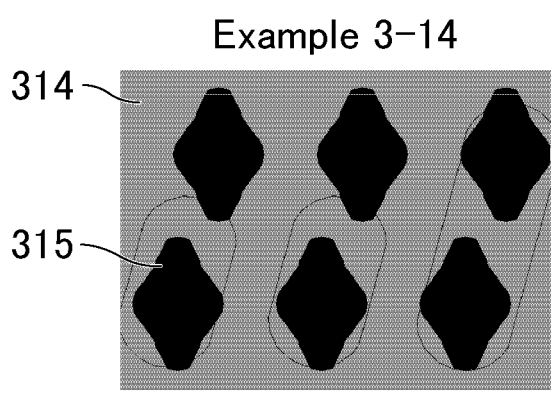
Example 3-15
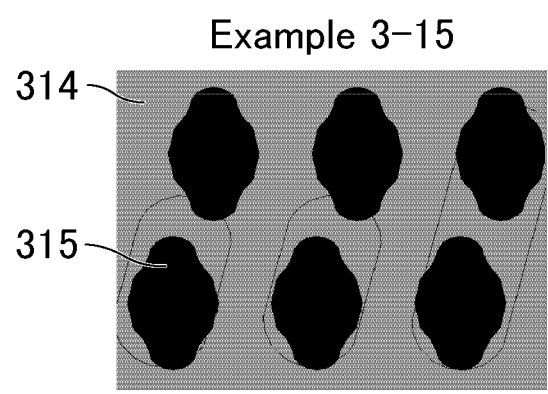
Example 3-16
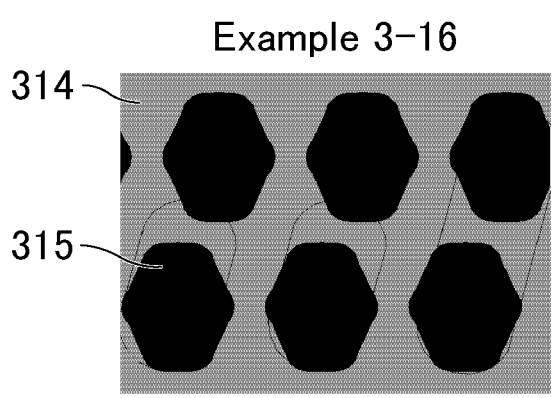

Fig. 75
Example 3-17
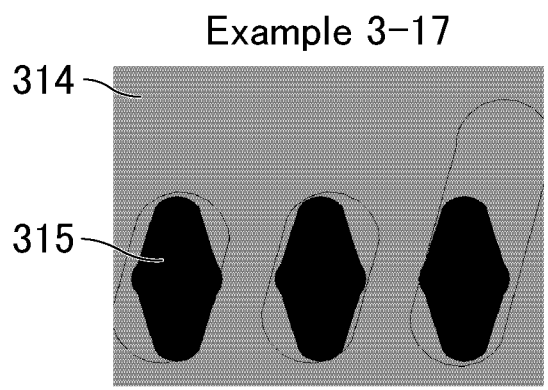
Example 3-18
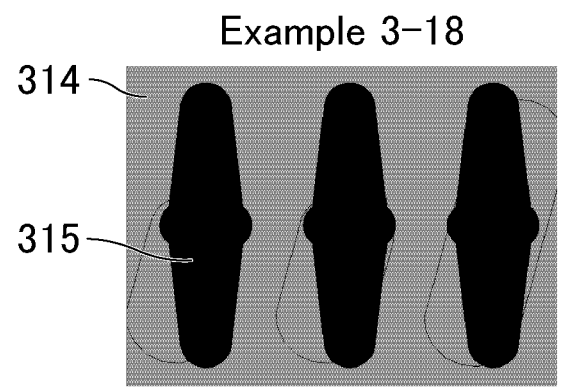
Example 3-19
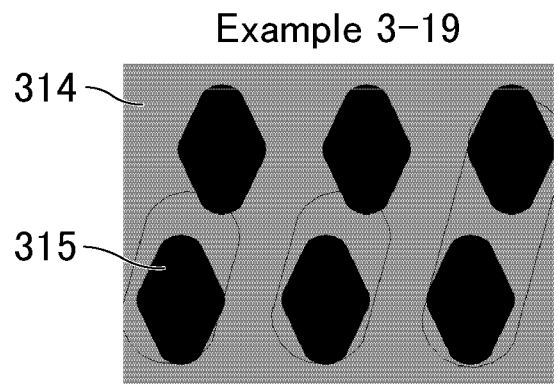

Fig. 76
Example 3-2
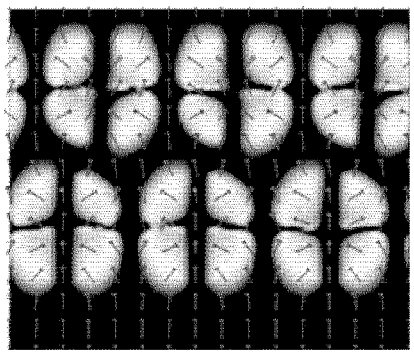
Example 3-3
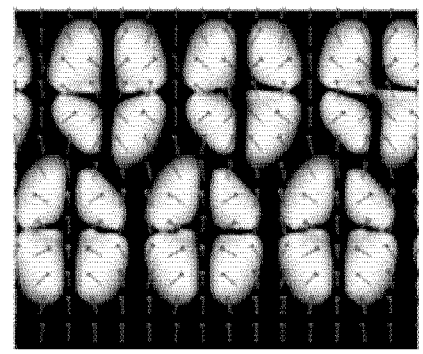
Example 3-4
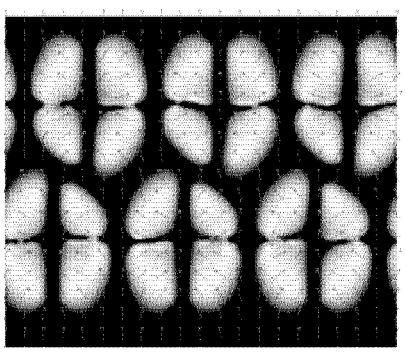
Example 3-5
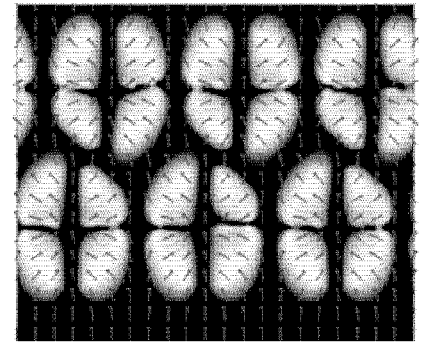
Example 3-6
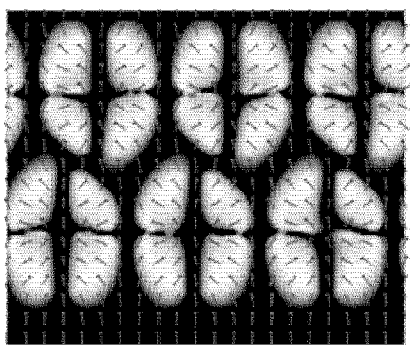
Example 3-7
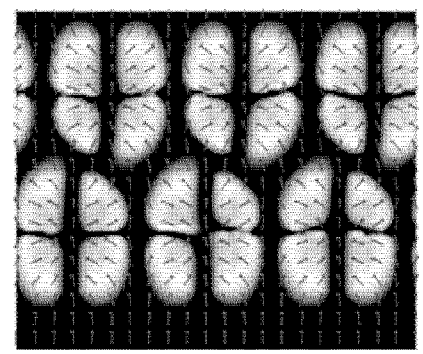
Example 3-8
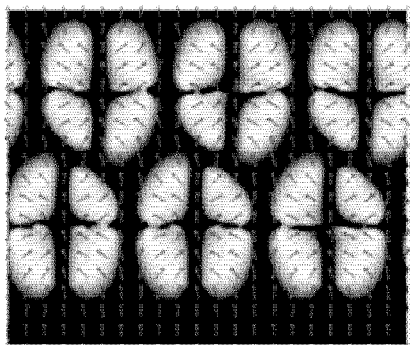
Example 3-9
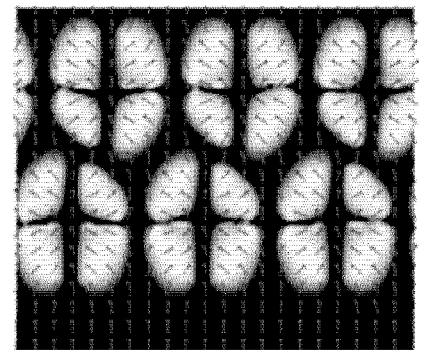

Fig. 77
Example 3-10
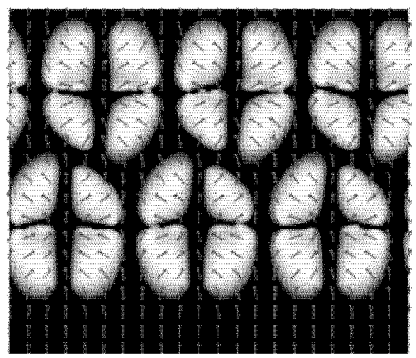
Example 3-11
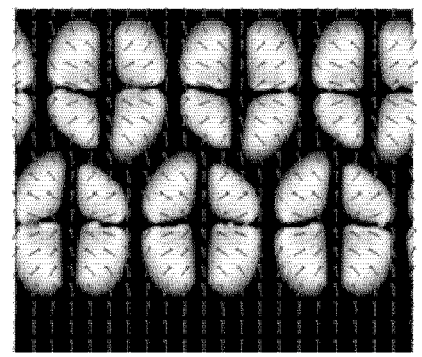
Example 3-12
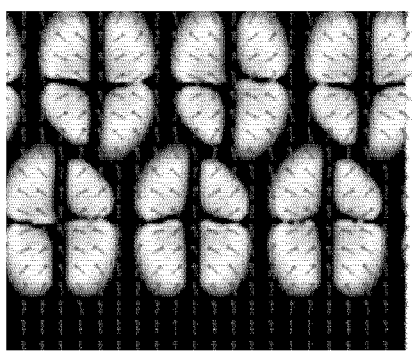
Example 3-13
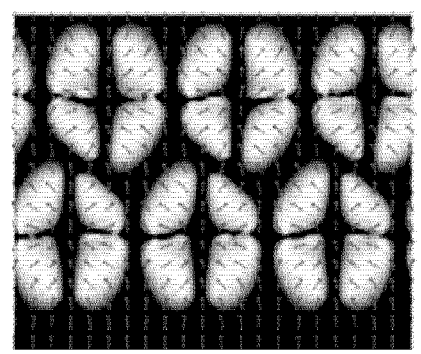
Example 3-14
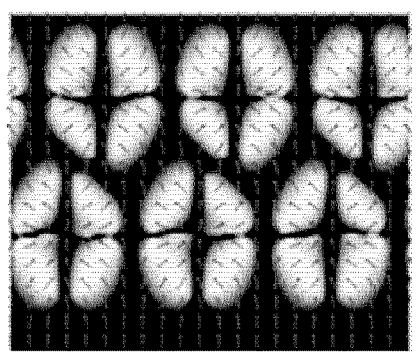
Example 3-15
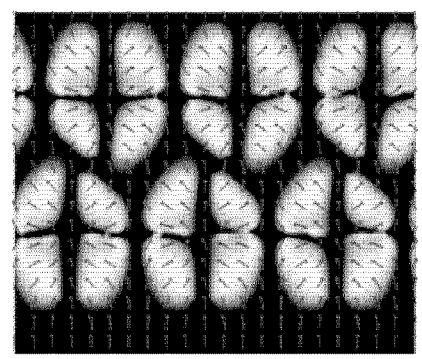
Example 3-16
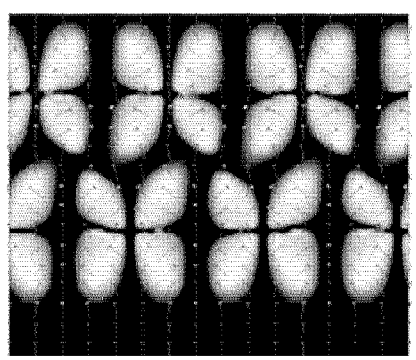

Fig. 78
Example 3-17
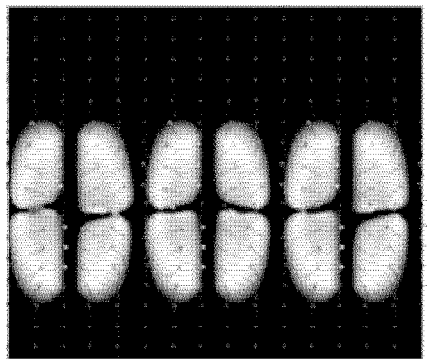
Example 3-18
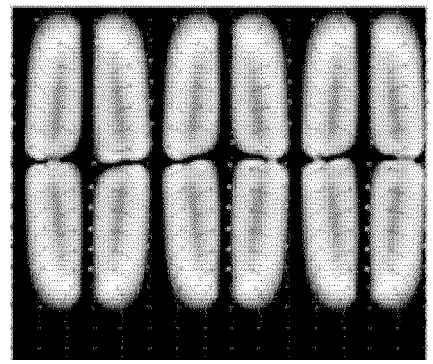
Example 3-19
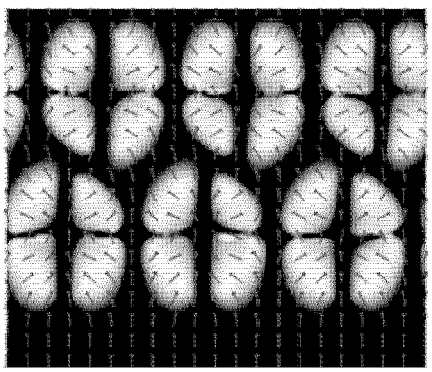
Fig. 79
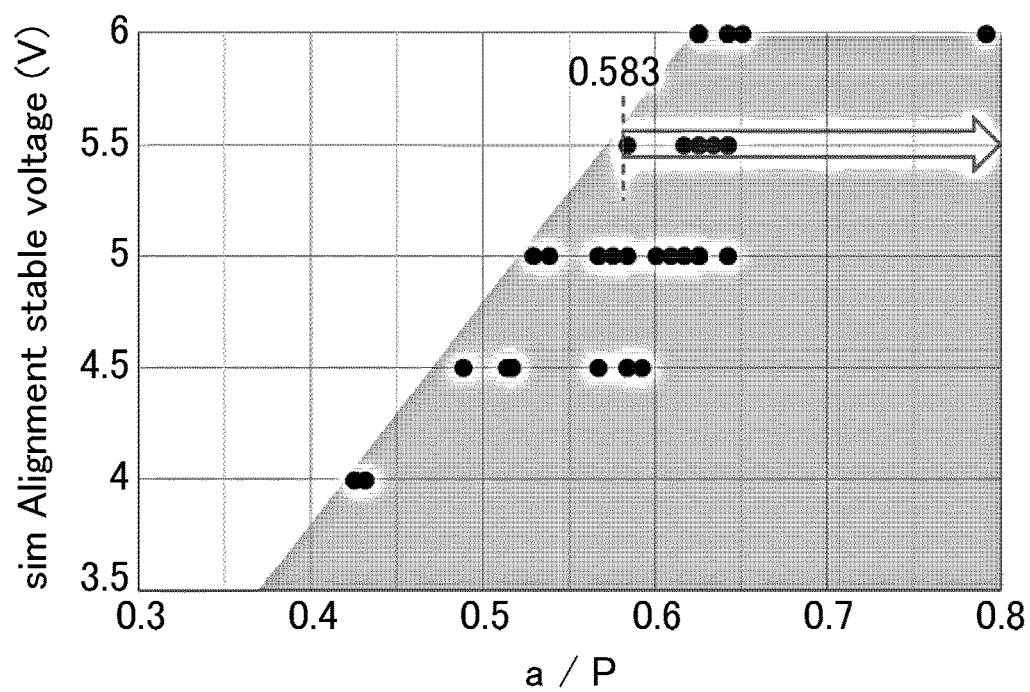

Fig. 85
Example 3-20
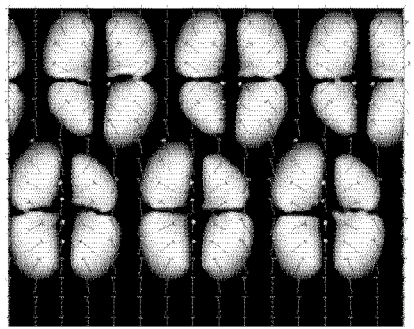
Example 3-21
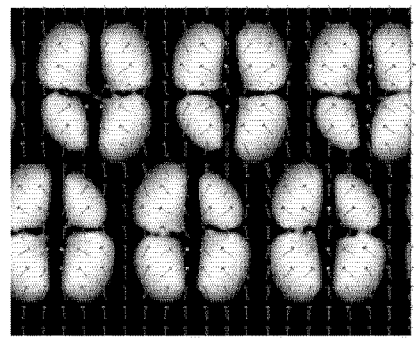
Comparative Example 3-29
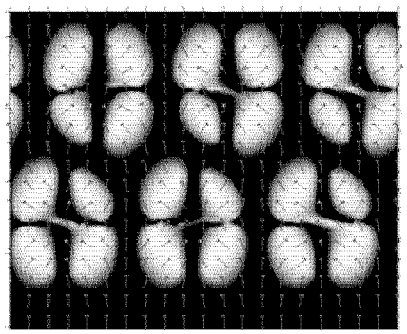
Fig. 86
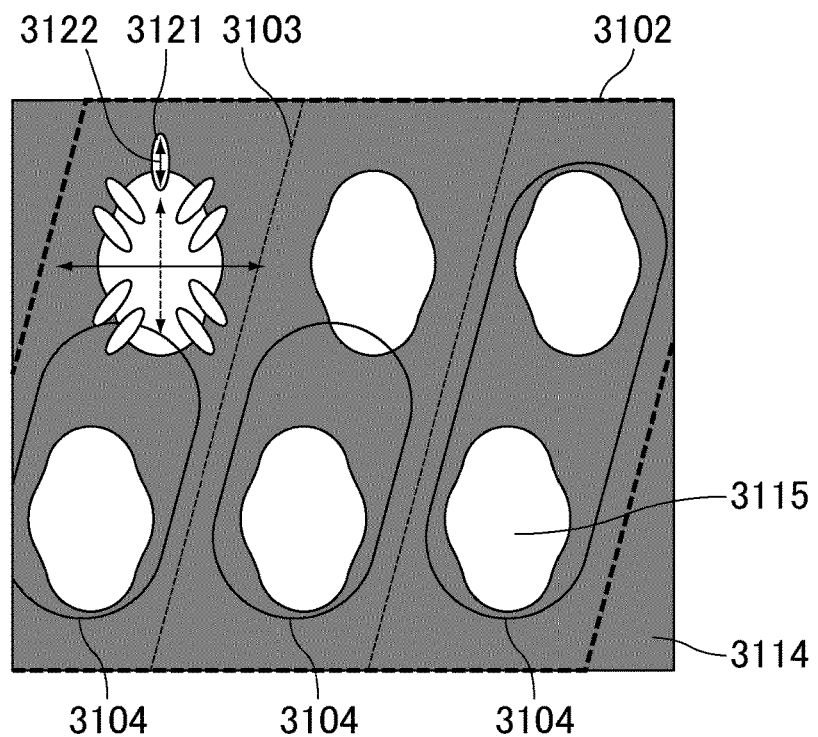

3102    3103

Fig. 88
(1)
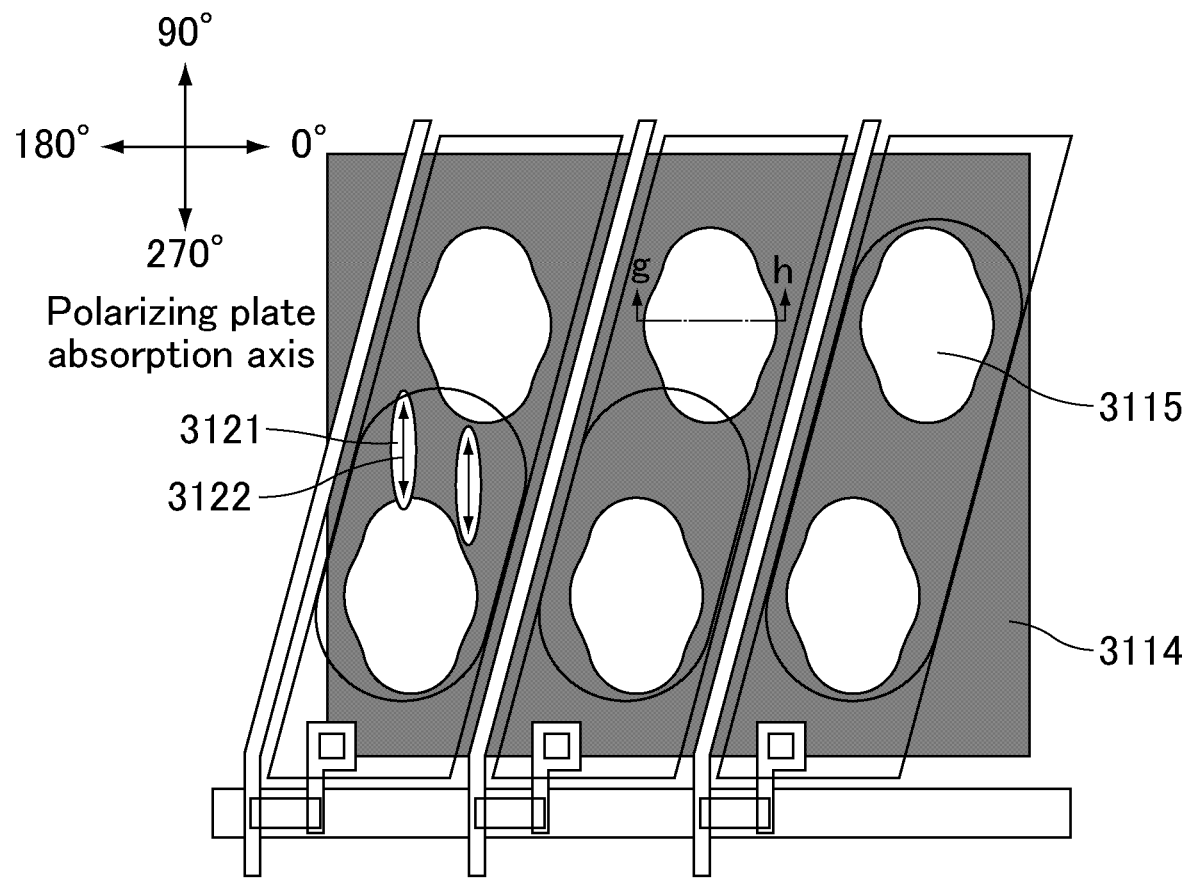
(2)
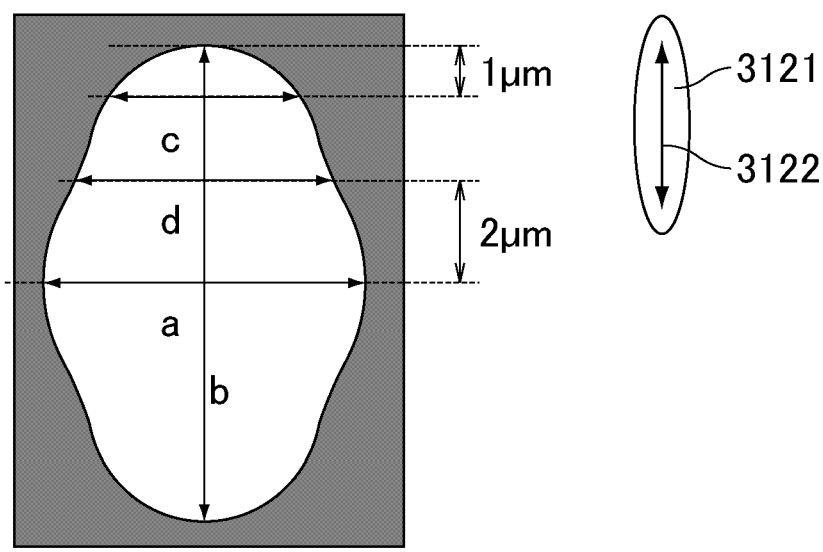

Fig. 93
Comparative Example 3-2
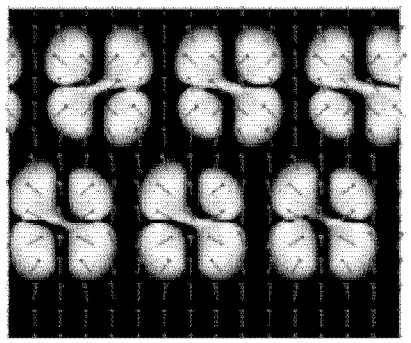
Comparative Example 3-3
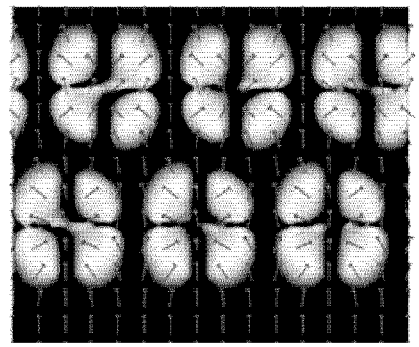
Comparative Example 3-4
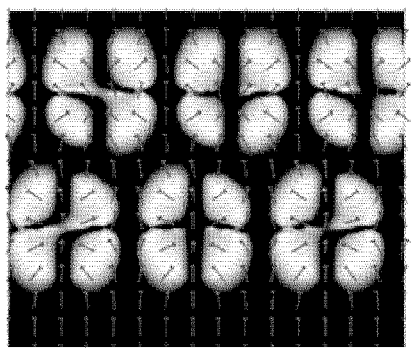
Comparative Example 3-5
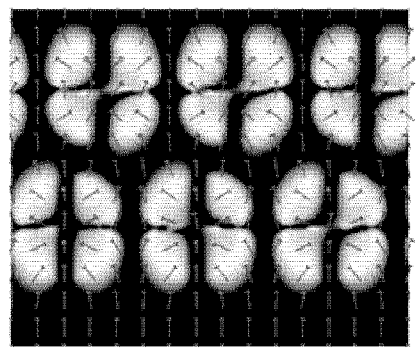
Comparative Example 3-6
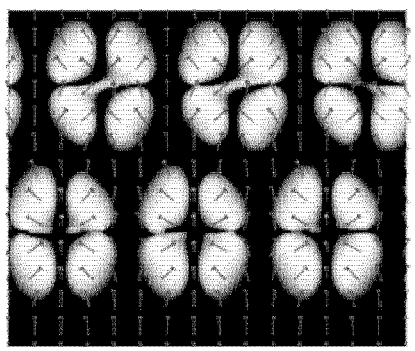
Comparative Example 3-7
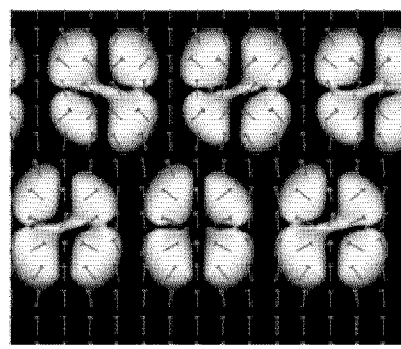
Comparative Example 3-8
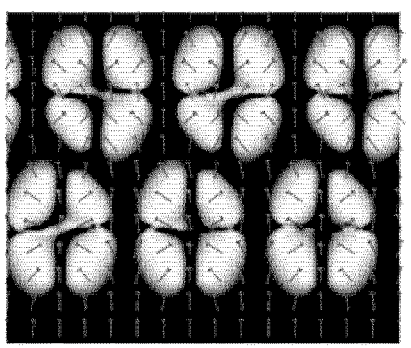
Comparative Example 3-9
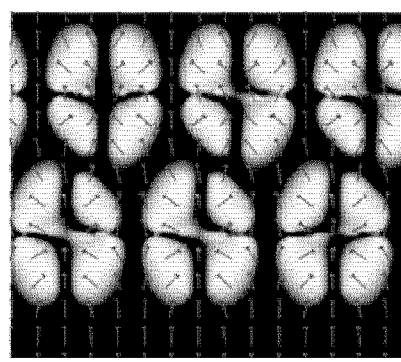

Fig. 94
Comparative Example 3-10
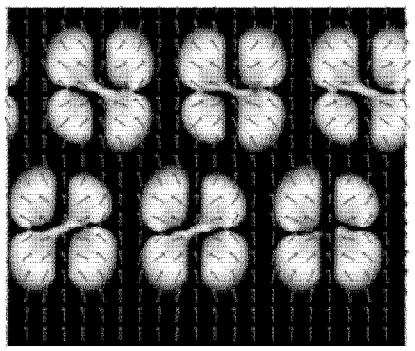
Comparative Example 3-11
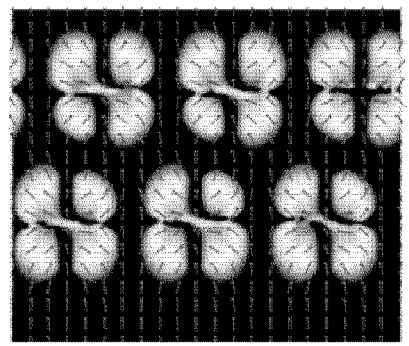
Comparative Example 3-12
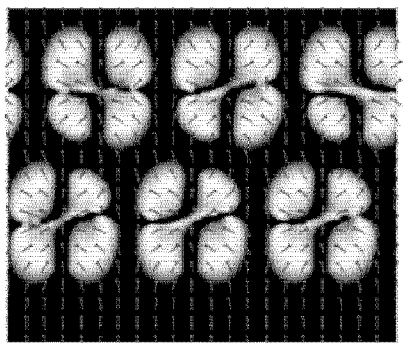
Comparative Example 3-13
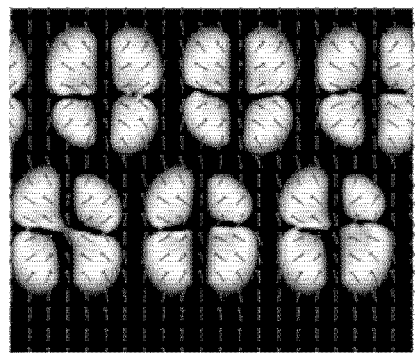
Comparative Example 3-14
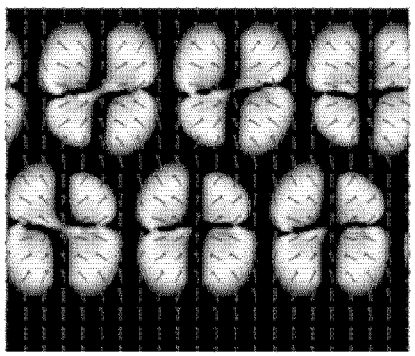
Comparative Example 3-15
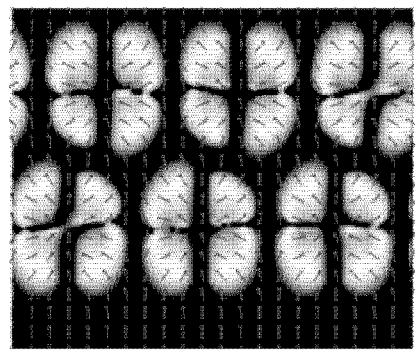
Comparative Example 3-16
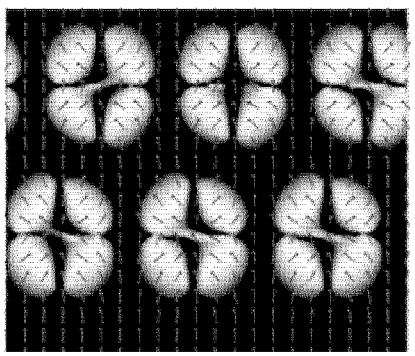
Comparative Example 3-17
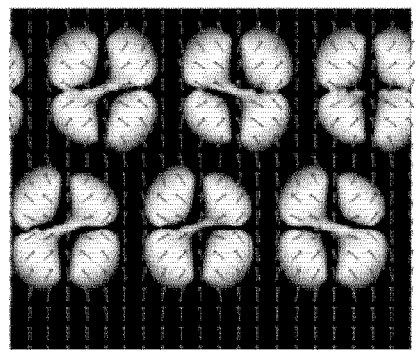

Fig. 95
Comparative Example 3-18
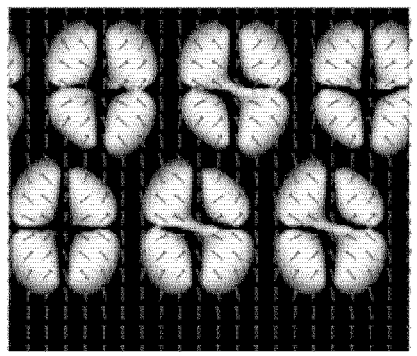
Comparative Example 3-19
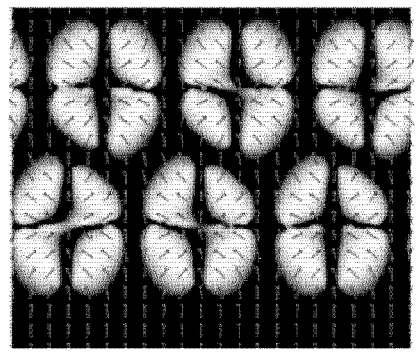
Comparative Example 3-20
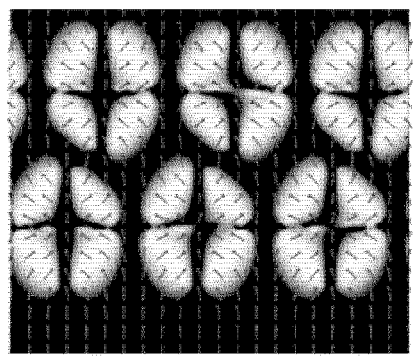
Comparative Example 3-21
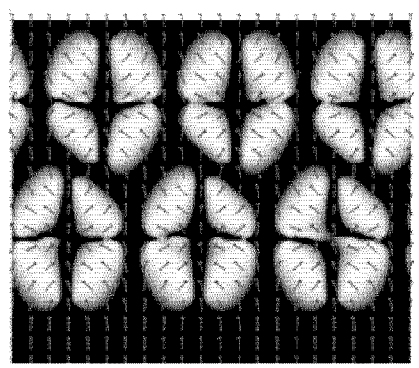
Comparative Example 3-22
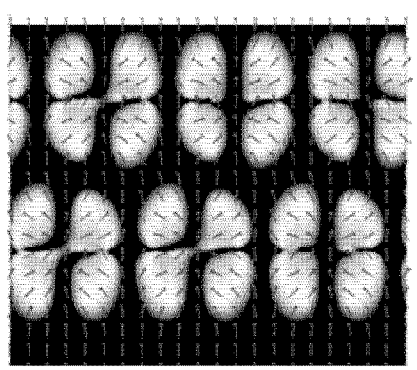
Comparative Example 3-23
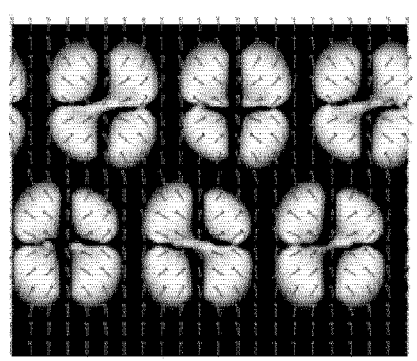
Comparative Example 3-24
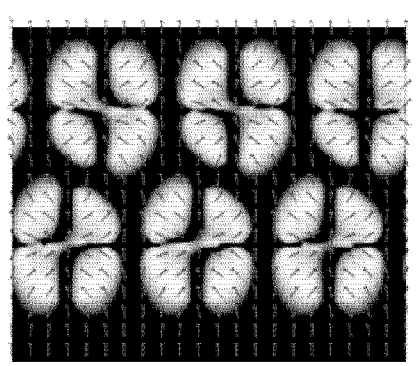

Fig. 96
Comparative Example 3-25
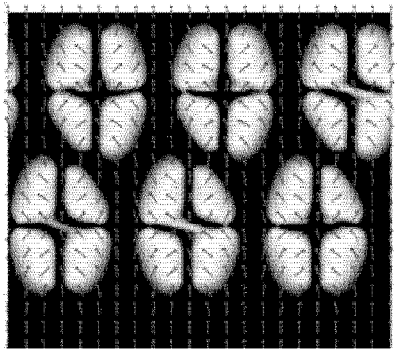
Comparative Example 3-26
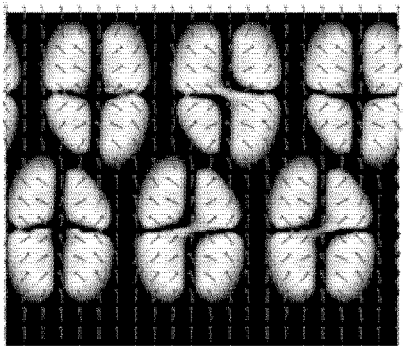
Comparative Example 3-27
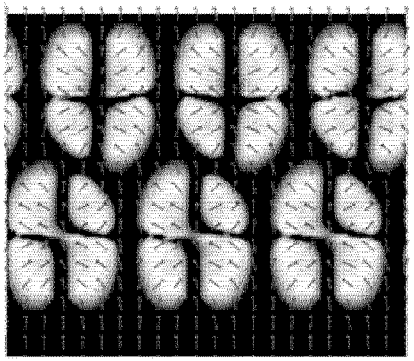
Comparative Example 3-28
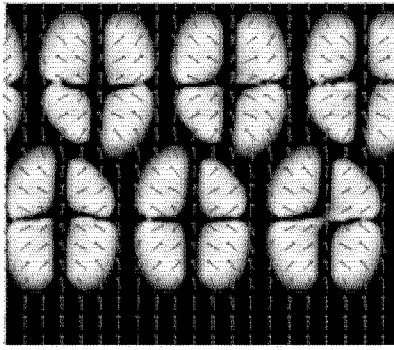
Fig. 97
|  | a/P | b/P | c/P | d/P | (a-c)/P | (a-d)/P | a+b+c+d /P² |
|---|---|---|---|---|---|---|---|
| Example 3-1 | 0.642 | 0.942 | 0.308 | 0.467 | 0.333 | 0.175 | 0.197 |
| Example 3-2 | 0.633 | 0.850 | 0.342 | 0.492 | 0.292 | 0.142 | 0.193 |
| Example 3-3 | 0.625 | 0.925 | 0.308 | 0.450 | 0.317 | 0.175 | 0.192 |
| Example 3-4 | 0.617 | 0.900 | 0.308 | 0.483 | 0.308 | 0.133 | 0.192 |
| Example 3-5 | 0.625 | 0.925 | 0.300 | 0.500 | 0.325 | 0.125 | 0.196 |
| Example 3-6 | 0.642 | 0.942 | 0.308 | 0.517 | 0.333 | 0.125 | 0.201 |
| Example 3-7 | 0.625 | 0.917 | 0.354 | 0.475 | 0.271 | 0.150 | 0.198 |
| Example 3-8 | 0.625 | 0.917 | 0.308 | 0.442 | 0.317 | 0.183 | 0.191 |
| Example 3-9 | 0.625 | 0.917 | 0.308 | 0.475 | 0.317 | 0.150 | 0.194 |
| Example 3-10 | 0.625 | 0.917 | 0.308 | 0.525 | 0.317 | 0.100 | 0.198 |
| Example 3-11 | 0.625 | 0.917 | 0.308 | 0.529 | 0.317 | 0.096 | 0.198 |
| Example 3-12 | 0.575 | 0.942 | 0.308 | 0.458 | 0.267 | 0.117 | 0.190 |
| Example 3-13 | 0.642 | 0.942 | 0.258 | 0.533 | 0.383 | 0.108 | 0.198 |
| Example 3-14 | 0.642 | 0.942 | 0.225 | 0.471 | 0.417 | 0.171 | 0.190 |
| Example 3-15 | 0.642 | 0.942 | 0.308 | 0.567 | 0.333 | 0.075 | 0.205 |
| Example 3-16 | 0.792 | 0.905 | 0.483 | 0.650 | 0.308 | 0.142 | 0.236 |
| Example 3-17 | 0.642 | 1.167 | 0.313 | 0.517 | 0.329 | 0.125 | 0.220 |
| Example 3-18 | 0.650 | 2.000 | 0.308 | 0.517 | 0.342 | 0.133 | 0.290 |
| Example 3-19 | 0.617 | 0.908 | 0.296 | 0.488 | 0.321 | 0.129 | 0.192 |

Fig. 98

| | a/P | b/P | c/P | d/P | (a-c)/P | (a-d)/P | a+b+c+d /P² |
|---|---|---|---|---|---|---|---|
| Comparative Example 3-1 | 0.517 | 0.737 | 0.317 | 0.400 | 0.200 | 0.117 | 0.164 |
| Comparative Example 3-2 | 0.592 | 0.750 | 0.308 | 0.383 | 0.283 | 0.208 | 0.169 |
| Comparative Example 3-3 | 0.575 | 0.783 | 0.317 | 0.433 | 0.258 | 0.142 | 0.176 |
| Comparative Example 3-4 | 0.600 | 0.808 | 0.325 | 0.458 | 0.275 | 0.142 | 0.183 |
| Comparative Example 3-5 | 0.608 | 0.825 | 0.333 | 0.475 | 0.275 | 0.133 | 0.187 |
| Comparative Example 3-6 | 0.583 | 0.833 | 0.208 | 0.358 | 0.375 | 0.225 | 0.165 |
| Comparative Example 3-7 | 0.517 | 0.792 | 0.267 | 0.392 | 0.250 | 0.125 | 0.164 |
| Comparative Example 3-8 | 0.567 | 0.875 | 0.258 | 0.392 | 0.308 | 0.175 | 0.174 |
| Comparative Example 3-9 | 0.617 | 0.908 | 0.300 | 0.442 | 0.317 | 0.175 | 0.189 |
| Comparative Example 3-10 | 0.425 | 0.750 | 0.308 | 0.383 | 0.117 | 0.042 | 0.156 |
| Comparative Example 3-11 | 0.432 | 0.737 | 0.308 | 0.408 | 0.123 | 0.023 | 0.157 |
| Comparative Example 3-12 | 0.488 | 0.783 | 0.317 | 0.429 | 0.172 | 0.059 | 0.168 |
| Comparative Example 3-13 | 0.513 | 0.808 | 0.325 | 0.463 | 0.188 | 0.051 | 0.176 |
| Comparative Example 3-14 | 0.529 | 0.825 | 0.333 | 0.479 | 0.196 | 0.050 | 0.181 |
| Comparative Example 3-15 | 0.538 | 0.850 | 0.342 | 0.492 | 0.197 | 0.047 | 0.185 |
| Comparative Example 3-16 | 0.583 | 0.833 | 0.146 | 0.363 | 0.438 | 0.221 | 0.160 |
| Comparative Example 3-17 | 0.517 | 0.792 | 0.200 | 0.392 | 0.317 | 0.125 | 0.158 |
| Comparative Example 3-18 | 0.567 | 0.875 | 0.183 | 0.354 | 0.383 | 0.213 | 0.165 |
| Comparative Example 3-19 | 0.617 | 0.908 | 0.208 | 0.442 | 0.408 | 0.175 | 0.181 |
| Comparative Example 3-20 | 0.625 | 0.925 | 0.204 | 0.450 | 0.421 | 0.175 | 0.184 |
| Comparative Example 3-21 | 0.642 | 0.942 | 0.204 | 0.471 | 0.438 | 0.171 | 0.188 |
| Comparative Example 3-22 | 0.583 | 0.833 | 0.375 | 0.488 | 0.208 | 0.096 | 0.190 |
| Comparative Example 3-23 | 0.517 | 0.792 | 0.267 | 0.408 | 0.250 | 0.108 | 0.165 |
| Comparative Example 3-24 | 0.567 | 0.875 | 0.267 | 0.442 | 0.300 | 0.125 | 0.179 |
| Comparative Example 3-25 | 0.625 | 0.917 | 0.208 | 0.225 | 0.417 | 0.400 | 0.165 |
| Comparative Example 3-26 | 0.625 | 0.917 | 0.258 | 0.300 | 0.367 | 0.325 | 0.175 |
| Comparative Example 3-27 | 0.625 | 0.917 | 0.308 | 0.388 | 0.317 | 0.238 | 0.186 |
| Comparative Example 3-28 | 0.625 | 0.917 | 0.308 | 0.404 | 0.317 | 0.221 | 0.188 |

Fig. 99

|  | a/P | b/P | c/P | d/P | (a-c)/P | (a-d)/P | a+b+c+d /P² |
|---|---|---|---|---|---|---|---|
| Example 3-20 | 0.578 | 0.853 | 0.265 | 0.398 | 0.313 | 0.180 | 0.199 |
| Example 3-21 | 0.580 | 0.862 | 0.234 | 0.399 | 0.346 | 0.181 | 0.221 |
| Comparative Example 3-29 | 0.579 | 0.854 | 0.247 | 0.399 | 0.331 | 0.180 | 0.234 |

LIQUID CRYSTAL DISPLAY DEVICE

TECHNICAL FIELD

The present invention relates to a liquid crystal display device. In particular, the present invention relates to a liquid crystal display device suitable as a horizontal alignment mode liquid crystal display device provided with high-definition pixels.

BACKGROUND ART

Liquid crystal display devices are display devices that utilize a liquid crystal composition for display. The typical display mode thereof is applying voltage to a liquid crystal composition sealed between paired substrates to change the alignment state of liquid crystal molecules in the liquid crystal composition according to the applied voltage, thereby controlling the amount of light transmitted. These liquid crystal display devices, having characteristics such as thin profile, lightweight, and low power consumption, have been used in a broad range of fields.

The display modes of liquid crystal display devices include horizontal alignment modes, in which the alignment of liquid crystal molecules is controlled by rotation of the liquid crystal molecules mainly in a plane parallel to the substrate surfaces. The horizontal alignment modes have received attention because these modes make it easy to achieve wide viewing angle characteristics. For example, the in-plane switching (IPS) mode and the fringe field switching (FFS) mode, both a type of horizontal alignment mode, are widely used in recent liquid crystal display devices for smartphones or tablet PCs (tablet terminals).

There is continuing research and development of the horizontal alignment modes to achieve higher definition pixels, an improved transmittance, and an improved response speed to improve display quality. As a technique for improving the response speed, for example, Patent Literature 1 discloses a technique related to a liquid crystal display device using a fringe electric field, in which technique a first electrode is provided with a comb tooth portion of a specific shape. In addition, Patent Literature 2 discloses an electrode structure related to an FFS mode liquid crystal display, the electrode structure provided with a slit including two linear portions and a V-shaped portion formed by connecting the two linear portions in a V shape, and describes that this technique can suppress defects caused by process variations and improve display performance.

CITATION LIST

Patent Literature

Patent Literature 1: JP 2015-114493 A
Patent Literature 2: WO 2013/021929 A1

SUMMARY OF INVENTION

Technical Problem

The horizontal alignment modes offer the advantage of wide viewing angles, but have the problem that they are slow in response as compared to vertical alignment modes such as the multi-domain vertical alignment (MVA) mode. As a result of various investigations, the present inventors have considered that high speed can be achieved even in the horizontal alignment mode if four liquid crystal domains are formed by rotating liquid crystal molecules in a range smaller than a fixed pitch when a voltage is applied (in a voltage-applied state), and a distortion force caused by bend (and spray) alignment formed in a narrow region is used.

The present inventors conducted various studies on the influence of a shape of an opening of an electrode on a rotational direction of the liquid crystal molecules in an FFS mode liquid crystal display device. FIG. 24 is a schematic plan view showing a counter electrode in the FFS mode liquid crystal display device studied by the present inventors. An opening 117 of a counter electrode 114 in FIG. 24 is formed in a rectangular shape. FIG. 25 is a plan view showing simulation results of distribution of liquid crystal molecule alignments in an on state in a display unit of a liquid crystal display device using the counter electrode of FIG. 24. As shown in FIGS. 24 and 25, in the FFS mode liquid crystal display device, it has been found that the liquid crystal molecules can be rotated by forming the opening 117 of the counter electrode 114 in a rectangular shape, thereby forming four liquid crystal domains. However, as shown by a portion surrounded by the dotted lines in FIGS. 24 and 25, it has been found that as the applied voltage is increased, symmetry in a cross-shaped dark portion (disclination) generated at the center of the display unit gradually collapses, so that response speed slows down.

FIG. 59 is a schematic plan view showing a counter electrode in another FFS mode liquid crystal display device studied by the present inventors. In the FFS mode liquid crystal display device studied by the present inventors, when the shape of an opening 2117 of a counter electrode 2114 is formed in a rectangular shape as shown in FIG. 59, in a case where a voltage is applied between a pixel electrode 2112 and the counter electrode 2114, four liquid crystal domains can be formed by rotating liquid crystal molecules 2121.

However, in the FFS mode liquid crystal display device studied by the present inventors, it has been found that when a low voltage (for example, 2 V) is applied, an outline portion of the opening 2117 which is parallel to an initial alignment azimuth 2122 of the liquid crystal molecules 2121 becomes bright in a delayed fashion. The reason for this is considered as follows.

When the voltage is applied, the liquid crystal molecules rotate so as to be perpendicular to or parallel to the contour of the opening. Accordingly, in the FFS mode liquid crystal display device studied by the present inventors, it is considered that first, the liquid crystal molecules 2121 at four corners of the rectangular opening 2117 start to rotate, and subsequently the liquid crystal molecules 2121 in a long side portion of the opening 2117 start to rotate due to the influence of the rotation of the liquid crystal molecules 2121 at the four corners. As a result, it is considered that, since the rotation of the liquid crystal molecules 2121 in the long side portion of the opening 2117 is relatively delayed, the response speed slows down in the long side portion of the opening 2117.

Although the response speed can be improved in a horizontal mode by using the technique of Patent Literature 1, the shape of the electrode is largely restricted in high-definition pixels (ultrahigh-definition pixels) of not less than 700 ppi or not less than 800 ppi, for example, and it is difficult to employ a complex electrode shape as disclosed in Patent Literature 1.

In Patent Literature 2, the influence of the V-shaped portion provided in an opening of the electrode allows the liquid crystal molecules at the time of voltage application to be aligned to be divided into two upper and lower regions, and display performance such as transmittance can be improved; however, the high speed effect is not large, and there is still room for improvement in the response speed.

In addition, the present inventors have focused on the following viewpoints. That is, as described above, the horizontal alignment modes offer the advantage of wide viewing angles, but have the problem that they are slow in response as compared to vertical alignment modes such as the multi-domain vertical alignment (MVA) mode.

As described above, although the response speed can be improved in the horizontal mode by using the technique of Patent Literature 1, the shape of the electrode is largely restricted in high-definition pixels (ultrahigh-definition pixels) of not less than 700 ppi or not less than 800 ppi, for example, and it is difficult to employ a complex electrode shape as disclosed in Patent Literature 1.

As described above, in Patent Literature 2, the influence of the V-shaped portion provided in the opening of the electrode allows the liquid crystal molecules in the voltage-applied state to be aligned to be divided into two upper and lower regions, and display performance such as transmittance can be improved; however, the high speed effect is not large, and there is still room for improvement in the response speed.

As a result of various investigations, the present inventors have found that, as described above, high speed can be achieved even in the horizontal alignment mode when four liquid crystal domains are formed by rotating liquid crystal molecules in a range smaller than a fixed pitch in the voltage-applied state, and the liquid crystal molecules in the liquid crystal domains adjacent to each other are rotated in opposite directions to each other, whereby a distortion force caused by bend and spray liquid crystal alignment formed in a narrow region is used.

FIG. 86 is a schematic plan view of a counter electrode in a FFS mode liquid crystal display device of Comparative Embodiment 3-1 studied by the present inventors. FIG. 87 is a plan view showing the simulation results of distribution of liquid crystal molecule alignments in the voltage-applied state in the FFS mode liquid crystal display device of Comparative Embodiment 3-1 studied by the present inventors. In FIG. 87, the applied voltage was set to 5 V.

As shown in FIG. 86, in the FFS mode liquid crystal display device of Comparative Embodiment 3-1, a pixel 3102 is divided into three display units 3103. In a counter electrode 3114, two openings 3115 are provided in one display unit 3103. The opening 3115 has a longitudinal shape and has a shape symmetrical with respect to the alignment azimuth of liquid crystal molecules 3121 in a no-voltage-applied state (initial alignment azimuth 3122 of the liquid crystal molecules 3121). An opening 3104 of the black matrix is located on the opening 3115.

In the FFS mode liquid crystal display device of Comparative Embodiment 3-1 having the counter electrode 3114 including the opening 3115 thus configured, in the voltage-applied state, four liquid crystal domains as shown in FIG. 87 are formed, and the response speed can be improved.

However, when a high voltage was applied to the FFS mode liquid crystal display device of Comparative Embodiment 3-1, the rotational direction of the liquid crystal molecules 3121 was not fixed at the center of the opening 3115, and the alignment of the liquid crystal molecules 3121 was unstable in some cases. As a result, it has been found that the symmetry of a cross-shaped dark line which is a boundary of the liquid crystal domains gradually collapses and the liquid crystal domains are connected to each other in a portion circled in FIG. 87, and the response speed becomes slow.

That is, when the shape of the opening 3115 is symmetrical with respect to the initial alignment azimuth 3122 of the liquid crystal molecules 3121, it is ideal that the liquid crystal molecules 3121 at the center of the opening 3115 do not rotate from the initial alignment azimuth 3122 of the liquid crystal molecules 3121. However, when a high voltage is applied, balance is broken by the influence of the surrounding liquid crystal molecules 3121, and the liquid crystal molecules 3121 may rotate in either direction even at the center of the opening 3115. Since the liquid crystal molecules 3121 at the center of the opening 3115 rotate slower than the liquid crystal molecules 3121 in the other region, the response speed of the liquid crystal display device becomes slow. That is, in order to stabilize the alignment of the liquid crystal molecules 3121 even in a high voltage-applied state, there is still room for improvement.

As shown above, there is a need for a technique to improve the response speed in a horizontal alignment mode liquid crystal display device having high-definition pixels.

In view of the above state of the art, it is an object of the present invention to provide a horizontal alignment mode liquid crystal display device that can achieve higher definition and improved response speed.

Solution to Problem

In order to achieve the above object, the present inventors made various investigations concerning a horizontal alignment mode liquid crystal display device capable of achieving high definition and high response, and consequently have noted the shape of an opening of an electrode used for forming a fringe electric field. The present inventors have found that when the shape of the opening includes a longitudinal-shaped portion and a pair of protrusions provided at specific positions of the longitudinal-shaped portion, and when the longitudinal direction of the longitudinal-shaped portion and the initial alignment azimuth of the liquid crystal molecules are parallel or orthogonal to each other, it is possible to precisely control the alignment of the liquid crystal molecules without complicating the shape of the opening. They found that this makes it possible to achieve high definition and improve the response speed and can solve the problems. These findings have now led to completion of the present invention.

A first aspect of the present invention may be a liquid crystal display device including, in the given order: a first substrate; a liquid crystal layer containing liquid crystal molecules; and a second substrate, wherein the first substrate includes a first electrode, a second electrode positioned closer to the liquid crystal layer than the first electrode is, and an insulating film between the first electrode and the second electrode, the second electrode is provided with an opening having a shape including a longitudinal-shaped portion and a pair of protrusions protruding to opposite sides from the longitudinal-shaped portion, the protrusions are provided at portions excluding both end portions in the longitudinal direction of the longitudinal-shaped portion and are located at positions corresponding to each other, in a no-voltage-applied state, where no voltage is applied between the first electrode and the second electrode, the liquid crystal molecules are aligned parallel to the first substrate, and in a plan view, the longitudinal direction of the longitudinal-shaped portion and an alignment azimuth of the liquid crystal molecules in the no-voltage-applied state are parallel or orthogonal to each other.

The protrusions may be located at the center in the longitudinal direction of the longitudinal-shaped portion.

The liquid crystal molecules may have positive anisotropy of dielectric constant.

The liquid crystal molecules may have negative anisotropy of dielectric constant.

At least one of the end portions in the longitudinal direction of the longitudinal-shaped portion may be rounded.

In the voltage-applied state where a voltage is applied between the first electrode and the second electrode, four liquid crystal domains may be generated in the opening.

The four liquid crystal domains may be generated in four regions symmetrical with respect to the longitudinal direction and the lateral direction of the longitudinal-shaped portion.

The end portions in the longitudinal direction of the longitudinal-shaped portion may be rounded.

Further, in order to achieve the above object, the present inventors further studied the horizontal alignment mode liquid crystal display device capable of high definition and high response, and as a result, the present inventors have found that when the shape of the opening has four inclined contours along four line segments inclined to the initial alignment azimuth of the liquid crystal molecules, it is possible to precisely control the alignment of the liquid crystal molecules without complicating the shape of the opening. They found that this makes it possible to achieve high definition and improve the response speed even in a low voltage-applied state and can solve the problems, thus arriving at the present invention.

A second aspect of the present invention may be a liquid crystal display device including, in the given order: a first substrate; a liquid crystal layer containing liquid crystal molecules; and a second substrate, wherein the first substrate includes a first electrode, a second electrode positioned closer to the liquid crystal layer than the first electrode is, and an insulating film between the first electrode and the second electrode, the second electrode is provided with an opening, in a no-voltage-applied state, where no voltage is applied between the first electrode and the second electrode, the liquid crystal molecules are aligned parallel to the first substrate, in a plan view, a contour of the opening includes a first inclined contour along a first line segment extending from an upper end portion of the opening to a right end portion of the opening, a second inclined contour along a second line segment extending from the upper end portion to a left end portion of the opening, a third inclined contour along a third line segment extending from a lower end portion of the opening to the left end portion, and a fourth inclined contour along a fourth line segment extending from the lower end portion to the right end portion, and in a plan view, the first, second, third, and fourth line segments are each allowed to be inclined with respect to an alignment azimuth of the liquid crystal molecules in the no-voltage-applied state.

An angle formed by each of the first, second, third, and fourth line segments with the alignment azimuth of the liquid crystal molecules in the no-voltage-applied state may be more than 0° and not more than 45° in a plan view.

The above angle may be not less than 2° and not more than 45° in a plan view.

The liquid crystal display device may have a plurality of display units arranged in a matrix, the opening may be provided in each of the display units, and the angle may be not less than 2° and less than 13° in a plan view.

The liquid crystal display device may have a plurality of display units arranged in a matrix, and there may be two of the openings in each of the display units, and the angle may be not less than 2° and less than 45° in a plan view.

The first and second inclined contours may be line-symmetric with respect to the alignment azimuth of the liquid crystal molecules in the no-voltage-applied state.

The third and fourth inclined contours may be line-symmetric with respect to the alignment azimuth of the liquid crystal molecules in the no-voltage-applied state.

The first and fourth inclined contours may be line-symmetric with respect to an azimuth orthogonal to the alignment azimuth of the liquid crystal molecules in the no-voltage-applied state, and the second and third inclined contours may be line-symmetric with respect to the azimuth orthogonal to the alignment azimuth of the liquid crystal molecules in the no-voltage-applied state The opening may have a shape including a longitudinal-shaped portion and a pair of protrusions protruding to opposite sides from the longitudinal-shaped portion, and the longitudinal-shaped portion may include the first, second, third and fourth inclined contours.

The opening may have a quadrangular shape having the upper end portion, the lower end portion, the left end portion, and the right end portion as apexes, and first to fourth sides of the quadrangular shape may include the first, second, third, and fourth inclined contours, respectively.

The liquid crystal molecules may have positive anisotropy of dielectric constant.

At least one of the upper end portion and the lower end portion of the opening may be rounded.

In the voltage-applied state, where a voltage is applied between the first electrode and the second electrode, there may be four liquid crystal domains in the opening.

The four liquid crystal domains may be generated in four regions symmetrical with respect to the alignment azimuth of the liquid crystal molecules in the no-voltage-applied state and an azimuth orthogonal to the alignment azimuth of the liquid crystal molecules in the no-voltage-applied state.

The liquid crystal display device may further include a pair of polarizing plates, and in a plan view, the first, second, third, and fourth line segments may be each inclined with respect to the transmission axes of the polarizing plates.

An angle formed by each of the first, second, third, and fourth line segments with one of the transmission axes of the polarizing plates may be more than 0° and not more than 45° in a plan view.

The angle formed by each of the first, second, third, and fourth line segments with one of the transmission axes of the polarizing plates may be not less than 2° and not more than 45° in a plan view.

The liquid crystal display device may have a plurality of display units arranged in a matrix, the opening may be provided in each of the display units, and the angle formed by each of the first, second, third, and fourth line segments with one of the transmission axes of the polarizing plates may be not less than 2° and less than 13° in a plan view.

The liquid crystal display device may have a plurality of display units arranged in a matrix, there may be two of the openings in each of the display units, and the angle formed by each of the first, second, third, and fourth line segments with one of the transmission axes of the polarizing plates may be not less than 2° and less than 45° in a plan view.

Each of the first, second, third, and fourth inclined contours may be linear or curved.

Each of the first, second, third, and fourth inclined contours may be curved and may protrude inward with respect to the opening.

Each of the first, second, third, and fourth inclined contours may be curved and may protrude outward with respect to the opening.

Each of the first, second, third, and fourth inclined contours may be curved and may be a combination of a curve protruding inward with respect to the opening and a curve protruding outward with respect to the opening.

In order to achieve the above object, the present inventors made various investigations on a liquid crystal display device capable of stabilizing the alignment of liquid crystal molecules even under a high voltage-applied state and achieving high definition, and as a result, attention has been paid to the definition of a screen and the shape of an opening of an electrode used for forming a fringe electric field. The present inventors have found that when the shape of the opening satisfies a specific conditional expression in the definition within a predetermined range, it is possible to precisely control the alignment of the liquid crystal molecules even in a high voltage-applied state without complicating the shape of the opening. They found that this makes it possible to achieve high definition and stabilize the alignment of the liquid crystal molecules even in a high voltage-applied state and can solve the problems, thus arriving at the present invention.

A third aspect of the present invention may be a liquid crystal display device including, in the given order: a first substrate; a liquid crystal layer containing liquid crystal molecules; and a second substrate, wherein the liquid crystal display device has a definition of not more than 920 ppi, the liquid crystal molecules have positive anisotropy of dielectric constant, the first substrate includes a first electrode, a second electrode positioned closer to the liquid crystal layer than the first electrode is, and an insulating film between the first electrode and the second electrode, the second electrode is provided with an opening, in a no-voltage-applied state, where no voltage is applied between the first electrode and the second electrode, the liquid crystal molecules are aligned parallel to the first substrate, and a planar shape of the opening satisfies the following (Formula 1) to (Formula 5):

$0.575 \leq a/P$ (Formula 1);

$0.850 \leq b/P$ (Formula 2);

$0.267 \leq (a-c)/P \leq 0.417$ (Formula 3);

$0.075 \leq (a-d)/P \leq 0.183$ (Formula 4); and $0.190 \leq (a+b+c+d)/P^2$ (Formula 5).

a, b, c and d in the above formulas respectively represent a length (μm) of the opening on a first straight line, on a second straight line, on a third straight line, and on a fourth straight line, and P represents a pixel pitch (μm). Here, the first straight line is a straight line which is orthogonal to an initial alignment azimuth of the liquid crystal molecules and has the longest length that divides the opening. The second straight line is a straight line which is parallel to the initial alignment azimuth of the liquid crystal molecules and has the longest length that divides the opening. The third straight line is a straight line which is parallel to the first straight line and is 1 μm away from one end portion of the opening on the second straight line. The fourth straight line is a straight line which is parallel to the first straight line, is 2 μm away from the first straight line, and is located between the first straight line and the third straight line.

The first straight line and the second straight line may intersect in a region of the opening.

An opening portion on the third straight line and an opening portion on the fourth straight line may be included in a region where an opening portion on the first straight line is virtually expanded in a direction parallel to the second straight line.

The planar shape of the opening may further satisfy the following (Formula 6) to (Formula 8):

$0.267 \leq (a-e)/P \leq 0.417$ (Formula 6);

$0.075 \leq (a-f)/P \leq 0.183$ (Formula 7); and $0.190 \leq (a+b+e+f)/P^2$ (Formula 8).

e and f in the above formulas respectively represent a length (μm) of the opening on a fifth straight line and a sixth straight line. Here, the fifth straight line is a straight line which is parallel to the first straight line and is 1 μm away from another end of the opening on the second straight line. The sixth straight line is a straight line which is parallel to the first straight line, has a distance of 2 μm from the first straight line, and is located between the first straight line and the fifth straight line.

The opening may include a longitudinal-shaped portion and a pair of protrusions protruding to opposite sides from the longitudinal-shaped portion.

The protrusions may have a circular-arc outer edge.

The protrusions may have a triangular shape or a shape in which at least one corner of a triangle is rounded.

The protrusions may have a circular-arc shape whose outer edge has irregularities.

In a plan view, the longitudinal direction of the longitudinal-shaped portion may be parallel to the initial alignment azimuth of the liquid crystal molecules.

At least one of the end portions in the longitudinal direction of the opening may be rounded.

The planar shape of the opening may be symmetrical with respect to the first straight line.

The planar shape of the opening may be symmetrical with respect to the second straight line.

In the voltage-applied state where a voltage is applied between the first electrode and the second electrode, four liquid crystal domains may be generated in the opening.

The four liquid crystal domains may be generated in four regions symmetrical with respect to the first straight line and the second straight line.

There may be two of the openings in a display unit.

Advantageous Effects of Invention

According to the present invention, in a horizontal alignment mode liquid crystal display device, it is possible to achieve high definition and to improve the response speed.

BRIEF DESCRIPTION OF DRAWINGS

FIG. 42 is a view relating to a liquid crystal display device of Example 2-2, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 43 is a view relating to a liquid crystal display device of Example 2-3, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 44 is a view relating to a liquid crystal display device of Example 2-4, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 45 is a view relating to a liquid crystal display device of Example 2-5, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 47 is a view relating to a liquid crystal display device of Example 2-7, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 48 is a view relating to a liquid crystal display device of Example 2-8, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 50 is a view relating to a liquid crystal display device of Example 2-9, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 51 is a view relating to a liquid crystal display device of Example 2-10, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 52 is a view relating to a liquid crystal display device of Example 2-11, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 53 is a view relating to a liquid crystal display device of Example 2-12, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 54 is a view relating to a liquid crystal display device of Example 2-13, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 56 is a view relating to a liquid crystal display device of Example 2-14, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 57 is a view relating to a liquid crystal display device of Example 2-15, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 58 is a view relating to a liquid crystal display device of Example 2-16, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 62 is a view relating to a liquid crystal display device of Comparative Example 2-2, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 74 is a schematic plan view of each counter electrode in liquid crystal display devices of Examples 3-10 to 3-16.

FIG. 75 is a schematic plan view of each counter electrode in liquid crystal display devices of Examples 3-17 to 3-19.

FIG. 76 is a plan view showing the simulation results of the distribution of liquid crystal molecule alignments in the voltage-applied state in the liquid crystal display devices of Examples 3-2 to 3-9.

FIG. 77 is a plan view showing the simulation results of the distribution of liquid crystal molecule alignments in the voltage-applied state in the liquid crystal display devices of Examples 3-10 to 3-16.

FIG. 78 is a plan view showing the simulation results of the distribution of liquid crystal molecule alignments in the voltage-applied state in the liquid crystal display devices of Examples 3-17 to 3-19.

FIG. 79 is a graph obtained by plotting an alignment stable voltage of each of the liquid crystal display devices of Examples 3-1 to 3-19 and liquid crystal display devices of Comparative Examples 3-1 to 3-28 against a/P.

FIG. 85 is a plan view showing the simulation results of the distribution of liquid crystal molecule alignments in the voltage-applied state in the liquid crystal display devices of Examples 3-20 and 3-21 and Comparative Example 3-29.

FIG. 86 is a schematic plan view of a counter electrode in an FFS mode liquid crystal display device of Comparative Embodiment 3-1.

FIG. 88 is a view relating to the liquid crystal display device of Comparative Example 3-1, wherein (1) is a schematic plan view of the liquid crystal display device, and (2) is a schematic plan view for explaining a shape of an opening provided in a counter electrode.

FIG. 93 is a plan view showing the simulation results of the distribution of liquid crystal molecule alignments in the voltage-applied state in the liquid crystal display device of Examples 3-2 to 3-9.

FIG. 94 is a plan view showing the simulation results of the distribution of liquid crystal molecule alignments in the voltage-applied state in the liquid crystal display device of Comparative Examples 3-10 to 3-17.

FIG. 95 is a plan view showing the simulation results of the distribution of liquid crystal molecule alignments in the voltage-applied state in the liquid crystal display device of Comparative Examples 3-18 to 3-24.

FIG. 96 is a plan view showing the simulation results of the distribution of liquid crystal molecule alignments in the voltage-applied state in the liquid crystal display device of Comparative Examples 3-25 to 3-28.

FIG. 97 is a table showing the relationship between a, b, c, and d of the openings of the counter electrodes and the pixel pitch in Examples 3-1 to 3-19.

FIG. 98 is a table showing the relationship between a, b, c, and d of the openings of the counter electrodes and the pixel pitch in Comparative Examples 3-1 to 3-28.

FIG. 99 is a table showing the relationship between a, b, c, and d of the openings of the counter electrodes and the pixel pitch in Examples 3-20 and 3-21 and Comparative Example 3-29.

DESCRIPTION OF EMBODIMENTS

Figure 1:
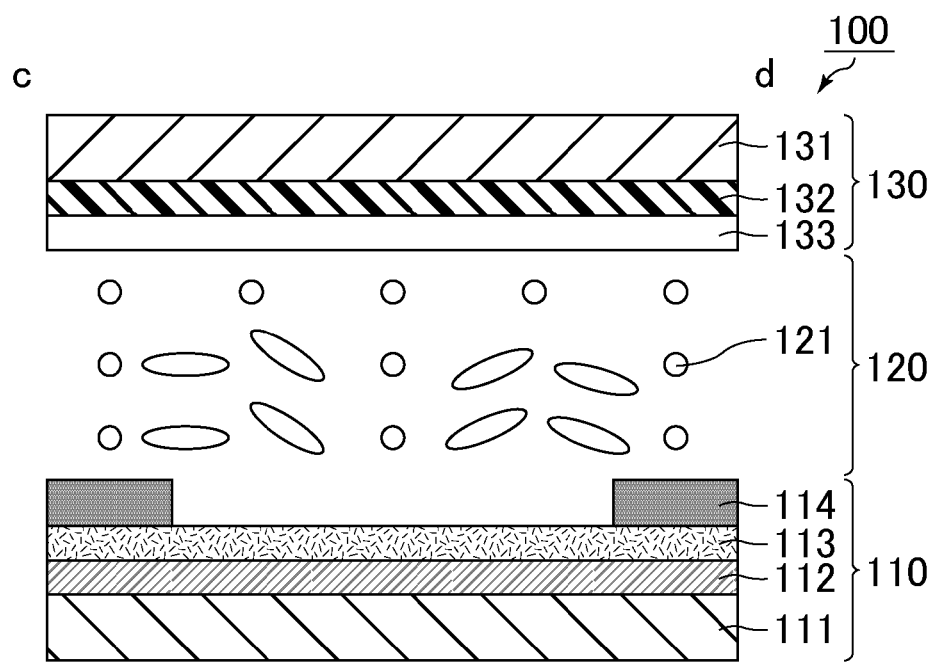
FIG. 1 is a schematic cross-sectional view of a liquid crystal display device of Embodiment 1-1 in an on state.

Hereinafter, embodiments of the present invention will be described. The following embodiments, however, are not intended to limit the scope of the present invention. The present invention may appropriately be modified within the scope of the configuration of the present invention.

The same components or components having the same or similar function are commonly provided with the same reference sign in the drawings, and description of such components may be omitted. The configurations described in the embodiments may appropriately be combined or modified within the spirit of the present invention.

Embodiment 1-1

Figure 2:
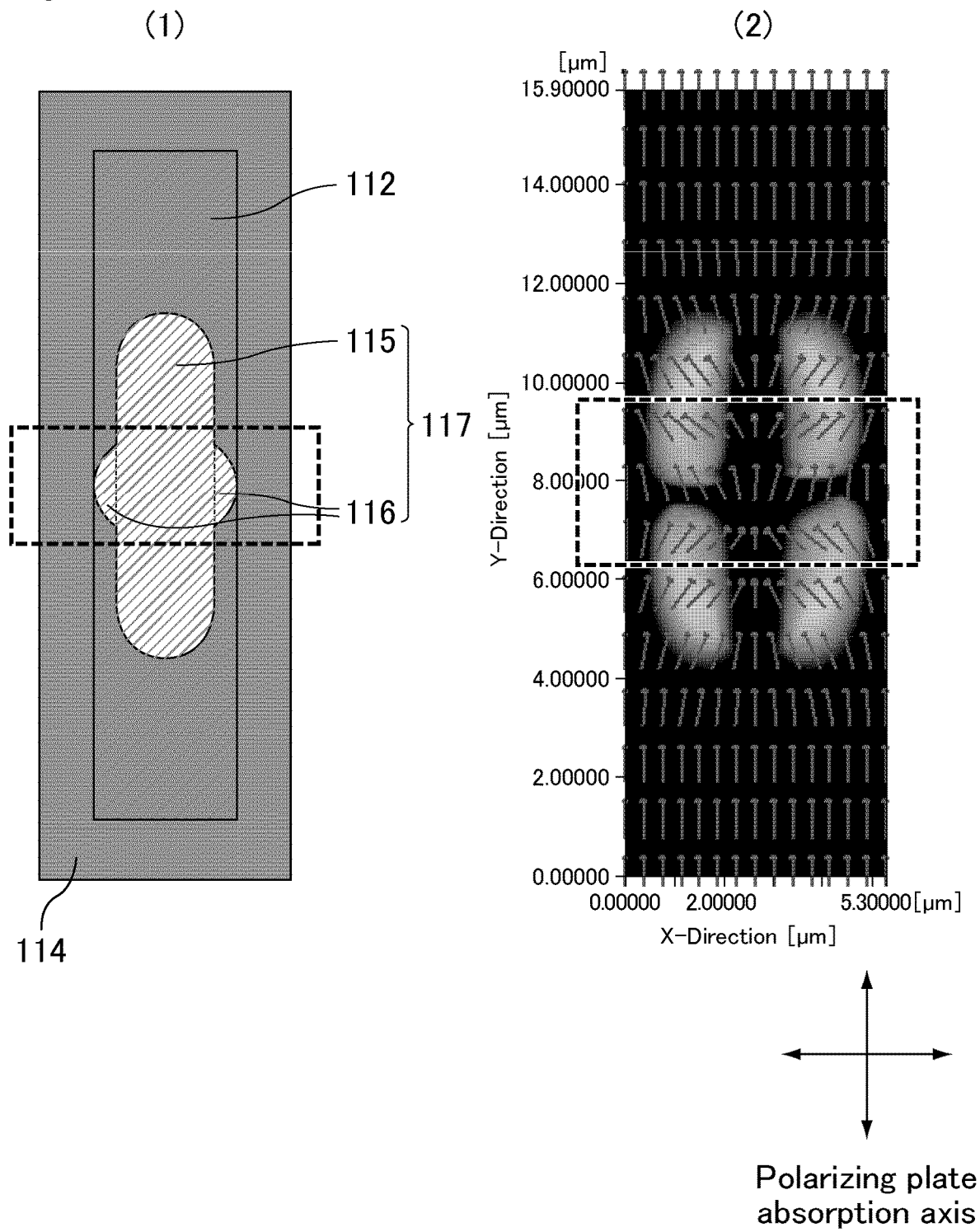
FIG. 2 is a view relating to the liquid crystal display device of Embodiment 1-1, wherein (1) is a schematic plan view of a counter electrode, and (2) is a plan view showing the simulation results of distribution of on-state liquid crystal molecule alignments in a display unit.
Figure 3:
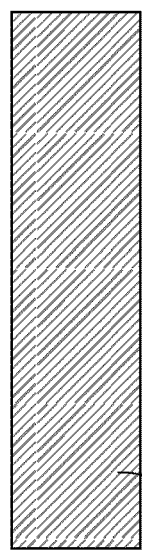
FIG. 3 is a schematic plan view of a pixel electrode in the liquid crystal display device of Embodiment 1-1.
Figure 4:
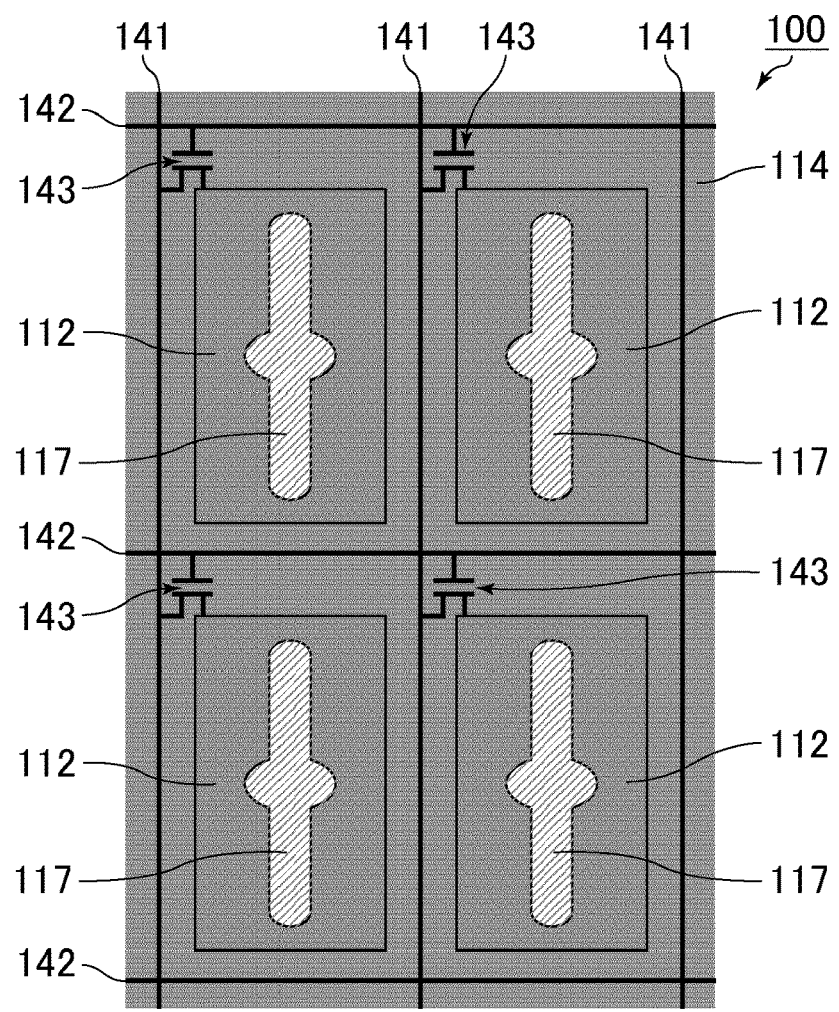
FIG. 4 is a schematic plan view of the liquid crystal display device of Embodiment 1-1.
Figure 5:
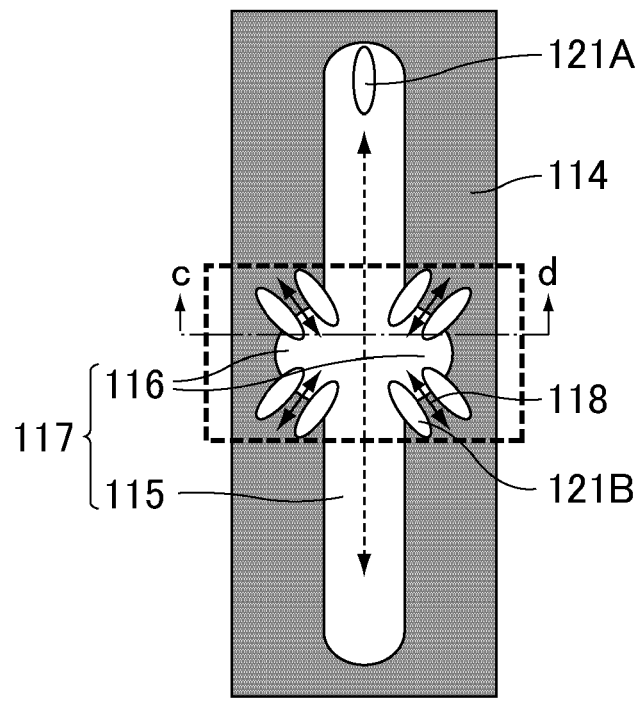
FIG. 5 is a schematic view for explaining control of the on-state liquid crystal molecule alignments in the liquid crystal display device of Embodiment 1-1.

With reference to FIGS. 1 to 5, a liquid crystal display device of Embodiment 1-1 will be described below. FIG. 1 is a schematic cross-sectional view of the liquid crystal display device of Embodiment 1-1 in an on state. FIG. 2 is a view relating to the liquid crystal display device of Embodiment 1-1, wherein (1) is a schematic plan view of a counter electrode, and (2) is a plan view showing the simulation results of distribution of on-state liquid crystal molecule alignments in a display unit. FIG. 3 is a schematic plan view of a pixel electrode in the liquid crystal display device of Embodiment 1-1. FIG. 4 is a schematic plan view of the liquid crystal display device of Embodiment 1-1. FIG. 5 is a schematic view for explaining control of the on-state liquid crystal molecule alignments in the liquid crystal display device of Embodiment 1-1. FIG. 1 shows a cross section taken along the line c-d in FIG. 5.

As shown in FIG. 1, a liquid crystal display device 100 of Embodiment 1-1 includes a first substrate 110, a liquid crystal layer 120 containing liquid crystal molecules 121, and a second substrate 130, in the given order. The first substrate 110 is a TFT array substrate and has a stacked structure including, in order toward the liquid crystal layer 120, a first polarizer (not shown), an insulating substrate (e.g., glass substrate) 111, a pixel electrode (first electrode) 112, an insulating layer (insulating film) 113, and a counter electrode (second electrode) 114. The second substrate 130 is a color filter substrate and has a stacked structure including, in order toward the liquid crystal layer 120, a second polarizer (not shown), an insulating substrate (e.g., glass substrate) 131, a color filter 132, and an overcoat layer 133. The first polarizer and the second polarizer are both absorptive polarizers and disposed in the crossed Nicols with their absorption axes perpendicular to each other.

Although not shown in FIG. 1, a horizontal alignment film is typically disposed on the liquid crystal layer 120 side surface of the first substrate 110 and/or the second substrate 130. The horizontal alignment film acts to align the liquid crystal molecules 121 near the film parallel to the film surface. In addition, the horizontal alignment film adjusts the orientations of the major axes (hereinafter also referred to as "alignment azimuths") of the liquid crystal molecules 121 aligned parallel to the first substrate 110 to a specific in-plane azimuth. The horizontal alignment film preferably has been subjected to alignment treatment such as photo-alignment treatment or rubbing treatment. The horizontal alignment film may be made of an inorganic material or an organic material.

The alignment mode of the liquid crystal display device 100 is a fringe field switching (FFS) mode.

In the no-voltage-applied state (off state), where no voltage is applied between the pixel electrode 112 and the counter electrode 114, the liquid crystal molecules 121 are aligned parallel to the first substrate 110. The "parallel" herein includes not only being completely parallel, but also a range (substantially parallel) that can be equated with being parallel in the art. The pre-tilt angle (angle of tilt in the off state) of the liquid crystal molecules 121 is preferably less than 3°, more preferably less than 1° relative to the surface of the first substrate 110.

In the liquid crystal layer 120 in the voltage-applied state (on state), the alignment of the liquid crystal molecules 121 is controlled by the stacked structure of the first substrate 110 including the pixel electrode 112, the insulating layer 113, and the counter electrode 114. The pixel electrode 112 is an electrode formed in each display unit. The counter electrode 114 is common to a plurality of display units. The "display unit" means a region corresponding to one pixel electrode 112. The display unit may be one called "pixel" in the technical field of liquid crystal display devices, or may be one called "sub-pixel" or "dot" in the cases where one pixel is divided for driving.

The positions of the counter electrode 114 and the pixel electrode 112 may be switched. Specifically, although in the stacked structure shown in FIG. 1 the counter electrode 114 is adjacent to the liquid crystal layer 120 via a horizontal alignment film (not shown), the pixel electrode 112 may be adjacent to the liquid crystal layer 120 via a horizontal alignment film (not shown). In such a case, an opening 117 including protrusions 116 in a longitudinal-shaped portion 115 to be described later is formed in the pixel electrode 112 instead of the counter electrode 114.

In the stacked structure shown in FIG. 1, an opening 117 including a pair of the protrusions 116 in the longitudinal-shaped portion 115 is formed in the counter electrode 114 as shown in FIG. 2(1). This opening 117 is used for generating a fringe electric field (oblique electric field). The opening 117 is preferably formed in each display unit, and preferably formed in all the display units.

The shape of the opening 117 of the counter electrode 114 includes the longitudinal-shaped portion 115 and the pair of protrusions 116 protruding to the opposite sides from the longitudinal-shaped portion 115, and the pair of protrusions 116 are provided at a portion (hereinafter referred to as the "intermediate portion") except for both end portions in the longitudinal direction of the longitudinal-shaped portion 115 and located at positions corresponding to each other. Since the opening 117 thus configured does not include a complex shape, the opening 117 can be applied to high-definition pixels (ultrahigh-definition pixels) of not less than 800 ppi, for example, without any problem.

The longitudinal-shaped portion 115 is an opening portion formed in a longitudinal shape having a longitudinal length larger than the width in the lateral direction, and examples of the longitudinal shape include an ellipse; a shape similar to an ellipse such as an egg shape; a long polygon such as a rectangle; a shape similar to a long polygon; and a shape in which at least one corner of a long polygon is rounded. Although both the end portions of the longitudinal-shaped portion 115 are not necessarily rounded, it is preferable that at least one of the end portions is rounded, and it is more preferable that both the end portions are rounded. When at least one end portion of the longitudinal-shaped portion 115 is rounded, the alignment of the liquid crystal molecules is fixed by the electric field in the oblique direction at this end portion, and the response speed can be further improved.

The pair of protrusions 116 protrude to the opposite sides (outside, lateral direction) from the longitudinal-shaped portion 115, and are provided at opposite edge portions of an intermediate portion of the longitudinal-shaped portion 115. Each of the protrusions 116 may largely protrude from the longitudinal-shaped portion 115 or may only slightly protrude, and the size of each of the protrusions 116 is not limited. Each of the protrusions 116 only needs to protrude from the longitudinal-shaped portion 115, and its outer edge may be a circular-arc shape or an elliptical arc shape, may be curved, or may have irregularities. Further, each of the protrusions 116 may be shaped into a polygon such as a triangle or a trapezoid (however, a trapezoid whose longer base is adjacent to the longitudinal-shaped portion 115) or a shape in which at least one corner of such a polygon is rounded.

The pair of protrusions 116 are provided at positions corresponding to each other at the intermediate portion of the longitudinal-shaped portion 115, and although the pair of protrusions 116 may be provided at positions close to one end portion of the longitudinal-shaped portion 115, the pair of protrusions 116 are preferably provided at the center in the longitudinal direction of the longitudinal-shaped portion 115. By providing the pair of protrusions 116 at the center in the longitudinal direction of the longitudinal-shaped portion 115, it is possible to align and divide the liquid crystal molecules into four substantially symmetrical regions at the time of voltage application, so that the response speed can be further improved. The pair of protrusions 116 are preferably provided opposite to each other, preferably provided at substantially the same position in the longitudinal direction of the longitudinal-shaped portion 115, and preferably provided at positions symmetrical with respect to the longitudinal direction of the longitudinal-shaped portion 115.

The pair of protrusions 116 may be provided at a portion of the intermediate portion like the counter electrode used in Examples 1-1, 1-2, 1-3 and 1-6 to be described later, or may be provided over the entire intermediate portion as in Examples 1-4 and 1-5. By adjusting the position and size of the pair of protrusions 116, it becomes possible to balance a cross-shaped dark portion (a region where the liquid crystal molecules do not move) generated at the center of the display unit at the time of voltage application, and to stabilize the alignment of the liquid crystal molecules.

In a plan view, the alignment azimuth (initial alignment azimuth) of the liquid crystal molecules 121 in the no-voltage-applied state is parallel or orthogonal to the longitudinal direction of the longitudinal-shaped portion 115. As a result, the liquid crystal molecules 121 are rotated by voltage application, and domains of the liquid crystal molecules 121 can be formed in four regions in one opening. That is, it is possible to form four liquid crystal domains in one opening in the voltage-applied state. A cross-shaped dark portion (a region where the liquid crystal molecules 121 do not move), that is, a disclination exists at the center of the four liquid crystal domains, and it is considered that the liquid crystal molecules 121 which do not move serve as walls for generating a force in a direction opposite to the rotational direction of the four liquid crystal domains to improve the response speed. The liquid crystal domain means a region defined by a boundary (disclination) in which discontinuity of the alignment of the liquid crystal molecules 121 occurs in the liquid crystal layer 120. That is, the liquid crystal domain means a region defined by a boundary where the liquid crystal molecules 121 do not rotate from the initial alignment azimuth in the voltage-applied state. The boundary between the liquid crystal domains where the liquid crystal molecules 121 do not rotate from the initial alignment azimuth in the voltage-applied state is also called a disclination. In the liquid crystal display device in a normally black mode, the disclination located in a region through which light can pass (light-transmissive region) is visually recognized as a dark line. The initial alignment azimuth of the liquid crystal molecules 121 parallel the longitudinal direction of the longitudinal-shaped portion 115 can be achieved by subjecting an alignment film to photo alignment treatment or rubbing treatment in the lateral direction of the longitudinal-shaped portion 115, and the initial alignment azimuth of the liquid crystal molecules 121 orthogonal to the longitudinal direction of the longitudinal-shaped portion 115 can be achieved by subjecting the alignment film to photo alignment treatment or rubbing treatment in the longitudinal direction of the longitudinal-shaped portion 115.

In the case of using the opening 117 formed only with the longitudinal-shaped portion 115 not including the pair of protrusions 116, although it is possible to form four liquid crystal domains, symmetry around the center of the disclination collapses, and the disclination cannot be fixed, so that a region where the liquid crystal molecules 121 tend to rotate and a region where the liquid crystal molecules 121 are hard to rotate are formed. It is considered that, in the region where the liquid crystal molecules 121 tend to rotate, the liquid crystal molecules 121 continue to rotate more than necessary, resulting in a slow response speed. On the other hand, by arranging the pair of protrusions 116 in the longitudinal-shaped portion 115, as shown in FIG. 5, for example, an electric field 118 in an oblique direction is generated near the pair of protrusions 116, and the alignment of the liquid crystal molecules 121B is stabilized at the time of voltage application, so that the disclination can be fixed. As a result, it is considered that the response speed can be improved. Further, it is considered that, when the pair of protrusions 116 are provided at the center in the longitudinal direction of the longitudinal-shaped portion 115, since the four liquid crystal domains are generated in four regions symmetrical (substantially symmetrical) with respect to the longitudinal direction and the lateral direction of the longitudinal-shaped portion 115, the response speed can be further improved. From such a viewpoint, it is preferable that the shape of the opening 117 of the counter electrode 114 is symmetrical with respect to the initial alignment azimuth of the liquid crystal molecules 121, and it is preferable that the shape of the opening 117 is symmetrical with respect to the longitudinal direction and the lateral direction of the longitudinal-shaped portion 115.

Specific examples of the opening shape of the counter electrode 114 include, as shown in FIG. 2(1), the opening 117 including the pair of protrusions 116 in the longitudinal-shaped portion 115 in one display unit. In the voltage-applied state, in the opening 117 including the pair of protrusions 116 in the longitudinal-shaped portion 115, as shown in FIG. 2(2), the liquid crystal molecules are aligned and divided into four liquid crystal domains. As described above, when the pair of protrusions 116 are formed at the intermediate portion of the longitudinal-shaped portion 115, it is possible to maintain the symmetry of the liquid crystal molecules 121 even when a high voltage is applied, so that the liquid crystal molecules 121 do not gradually collapse and bend alignment can be fixed, which makes it possible to achieve high speed.

Since the counter electrode 114 provides a common potential to the display units, the counter electrode 114 may be formed on almost the entire surface (excluding the openings for producing a fringe electric field) of the first substrate 110. The counter electrode 114 may be electrically connected to an external connecting terminal at the periphery (frame region) of the first substrate 110.

As shown in FIG. 3, the pixel electrode 112 is a planer electrode with no opening. The pixel electrode 112 and the counter electrode 114 are stacked together via the insulating layer 113. As shown in FIG. 4, in a plan view, each pixel electrode 112 is positioned under the corresponding opening 117 in the counter electrode 114. Thus, a fringe electric field is generated around the opening 117 in the counter electrode 114 when a potential difference is generated between the pixel electrodes 112 and the counter electrode 114. As shown in FIG. 4, the openings 117 in the counter electrode 114 are preferably arranged in line in the row direction and/or the column direction in adjacent display units. This arrangement can stabilize the alignment of the liquid crystal molecules 121 in the voltage-applied state. For example, arranging the openings 117 in adjacent display units in a staggered manner in the row or column direction causes unstable alignment of the liquid crystal molecules 121, which may decrease the response speed.

As in the circuit shown in FIG. 4, the drain of a TFT 143 is electrically connected to the corresponding pixel electrode 112. To the gate of the TFT 143 is electrically connected a gate signal line 142, and to the source of the TFT 143 is electrically connected a source signal line 141. Thus, the switching on/off of the TFT 143 is controlled by scanning signals input to the gate signal line 142. When the TFT 143 is on, data signals (source voltage) input to the source signal line 141 are provided to the pixel electrode 112 through the TFT 143. In this way, in the voltage-applied state (on state), the source voltage is applied to the lower layer pixel electrode 112 via the TFT 143, and the fringe electric field is generated between the counter electrode 114 formed in the upper layer via the insulating film 113 and the pixel electrode 112. The TFT 143 preferably has a channel formed from indium-gallium-zinc-oxygen (IGZO), which is an oxide semiconductor.

The insulating layer 113 between the pixel electrode 112 and the counter electrode 114 may be, for example, an organic film (dielectric constant ε=3 to 4), an inorganic film (dielectric constant ε=5 to 7) such as a silicon nitride (SiNx) film or a silicon oxide (SiO$_2$) film, or a multilayer film containing any of these films.

The liquid crystal molecules 121 may have negative or positive value for the anisotropy of dielectric constant (Δε) defined by the formula below. In other words, the liquid crystal molecules 121 may have negative anisotropy of dielectric constant or positive anisotropy of dielectric constant. Since liquid crystal materials containing liquid crystal molecules 121 having negative anisotropy of dielectric constant tend to have a relatively high viscosity, liquid crystal materials containing liquid crystal molecules 121 having positive anisotropy of dielectric constant are advantageous from the standpoint of achieving a high-speed response. However, even with a liquid crystal material having negative anisotropy of dielectric constant, if this liquid crystal material has a viscosity as low as that of a liquid crystal material having positive anisotropy of dielectric constant, the same effect can be obtained by means of the present embodiment. The initial alignment azimuth of the liquid crystal molecules 121 having negative anisotropy of dielectric constant is a direction of rotation by 90 degrees with respect to the liquid crystal molecules 121 having positive anisotropy of dielectric constant.

$$\Delta\varepsilon = \text{(dielectric constant in the major axis direction)} - \text{(dielectric constant in the minor axis direction)}$$

From the viewpoint of high speed and high transmittance, when the liquid crystal molecules 121 having positive anisotropy of dielectric constant are used, it is preferable that the initial alignment azimuth of the liquid crystal molecules 121 in a plan view is parallel to the longitudinal direction of the longitudinal-shaped portion 115, and when the liquid crystal molecules 121 having negative anisotropy of dielectric constant are used, it is preferable that the initial alignment azimuth of the liquid crystal molecules 121 in a plan view is orthogonal to the longitudinal direction of the longitudinal-shaped portion 115. On the other hand, in a plan view, when the initial alignment azimuth of the liquid crystal molecules 121 having positive anisotropy of dielectric constant is made orthogonal to the longitudinal direction of the longitudinal-shaped portion 115, or when the initial alignment azimuth of the liquid crystal molecules 121 having negative anisotropy of dielectric constant is made parallel to the longitudinal direction of the longitudinal-shaped portion 115, although the effect of speeding up is provided, the effect is not large, and the transmittance is extremely lowered.

In a plan view, the alignment azimuth of the liquid crystal molecules 121 in the no-voltage-applied state (off state) is parallel to the absorption axis of one of the first polarizer and the second polarizer, and orthogonal to the absorption axis of the other. The control mode of the liquid crystal display device 100 is thus what is called a normally black mode, which provides black display when the liquid crystal layer 120 is in the no-voltage-applied state (off state).

The second substrate 130 is not limited and may be a color filter substrate typically used in the field of liquid crystal display devices. The overcoat layer 133 smooths the liquid crystal layer 120 side surface of the second substrate 130, and may be an organic film (dielectric constant ε=3 to 4).

The first substrate 110 and the second substrate 130 are typically bonded to each other with a sealing material formed to surround the periphery of the liquid crystal layer 120. The first substrate 110, the second substrate 130, and the sealing material hold the liquid crystal layer 120 in a predetermined region. Examples of the sealing material include epoxy resins containing an inorganic or organic filler and a curing agent.

The liquid crystal display device 100 may contain components such as a backlight; an optical film (e.g., retardation film, viewing angle-increasing film, and luminance-increasing film); external circuits (e.g., a tape-carrier package (TCP) and a printed circuit board (PCB)); and a bezel (frame), in addition to the first substrate 110, liquid crystal layer 120, and second substrate 130. These components are not limited, and may be those usually used in the field of liquid crystal display devices. The description of these components is thus omitted.

The operation of the liquid crystal display device 100 will be described hereinbelow.

In an off state (the no-voltage-applied state where no voltage is applied between the first electrode and the second electrode), no electric field is formed in the liquid crystal layer 120 and the liquid crystal molecules 121 are aligned parallel to the first substrate 110. Since the alignment azimuth of the liquid crystal molecules 121 is parallel to the absorption axis of one of the first polarizer and the second polarizer, and since the first polarizer and the second polarizer are disposed in the crossed Nicols, the liquid crystal panel in the off state does not transmit light and provides black display.

FIG. 1 shows the voltage-applied state (on state), where a voltage is applied between the pixel electrode 112 and the counter electrode 114. In the liquid crystal layer 120 in the on state, an electric field according to the level of the voltage between the pixel electrode 112 and the counter electrode 114 is generated. Specifically, since the opening 117 is formed in the counter electrode 114 positioned closer to the liquid crystal layer 120 than the pixel electrode 112 is, a fringe electric field is generated around the opening 117. The liquid crystal molecules 121 rotate under the effect of the electric field and change their alignment azimuth from the alignment azimuth in the off state to the alignment azimuths in the on state (see FIG. 5). The liquid crystal panel in the on state thus transmits light to provide white display.

Each and every detail described for Embodiment 1-1 of the present invention shall be applied to all the aspects of the present invention.

The present invention is described below in more detail based on examples and comparative examples according to Embodiment 1-1. The examples, however, are not intended to limit the scope of the present invention.

Example 1-1

A liquid crystal display device of Example 1-1 is a specific example of the liquid crystal display device 100 of Embodiment 1-1 described above, and has the following configuration.

Figure 6:
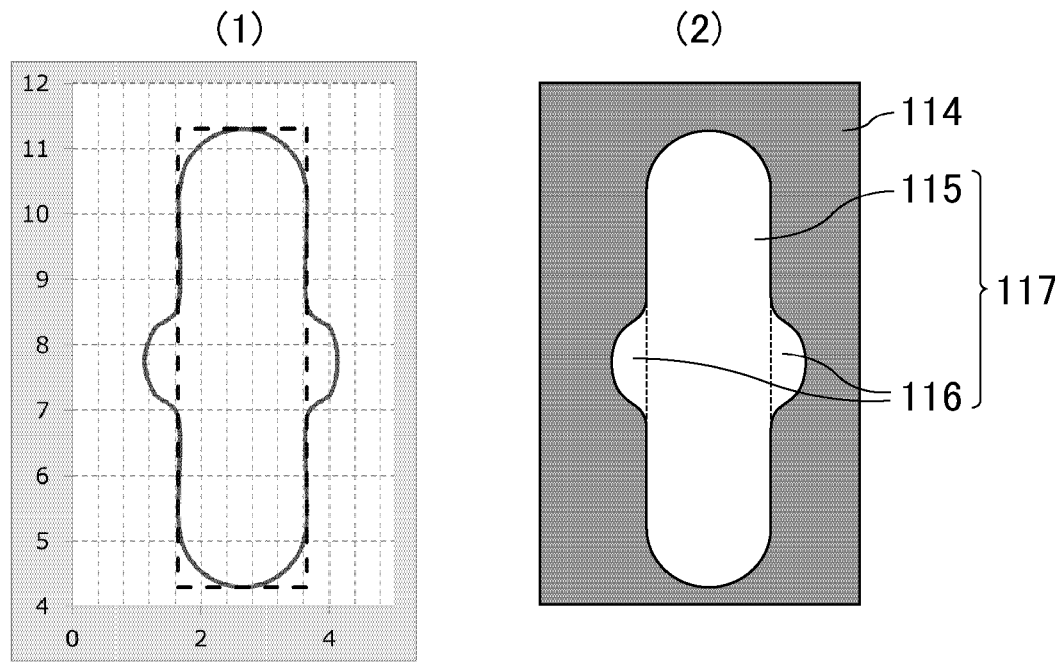
FIG. 6 is a view relating to a counter electrode of a liquid crystal display device of Example 1-1, wherein (1) is a plan view showing an opening shape, and (2) is a schematic plan view of the counter electrode.

FIG. 6 is a view relating to a counter electrode of the liquid crystal display device of Example 1-1, wherein (1) is a plan view showing an opening shape, and (2) is a schematic plan view of the counter electrode. The unit of the numerical value in FIG. 6(1) is μm, and the broken line in FIG. 6(1) shows the opening shape in Comparative Example 1-1 to be described later.

For the counter electrode 114 in the liquid crystal display device 100, the opening 117 obtained by die-cutting the counter electrode 114 into the shape of the solid line in FIG. 6(1) was set.

For the liquid crystal layer 120, the refractive index anisotropy (Δn) was set to 0.11, the in-plane retardation (Re) was set to 310 nm, and the viscosity was set to 70 cps. In addition, the anisotropy of dielectric constant (Δε) of the liquid crystal molecules 121 was set to 7 (positive type), and setting was performed such that the initial alignment of the liquid crystal molecules 121 was parallel to the direction of the liquid crystal molecules 121A in an initial alignment state of FIG. 5, that is, parallel to the longitudinal direction of sub-pixels and the longitudinal-shaped portion 115 of the opening 117. The polarizing plate was in what is called a normally black mode, which provides black display when the liquid crystal layer 120 is in the no-voltage-applied state (off state).

Figure 7:
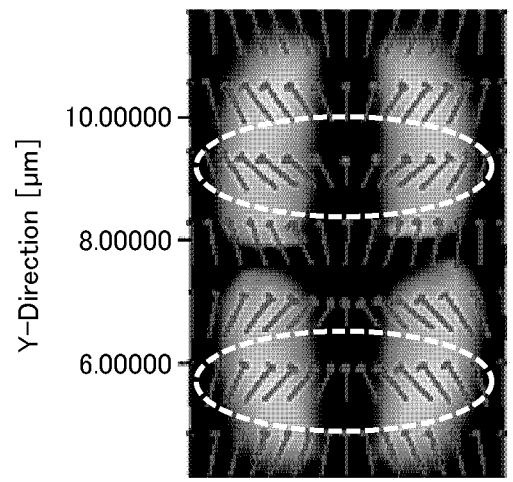
FIG. 7 is a plan view showing simulation results of the distribution of on-state liquid crystal molecule alignments in the vicinity of an opening of the counter electrode used in Example 1-1.
Figure 8:
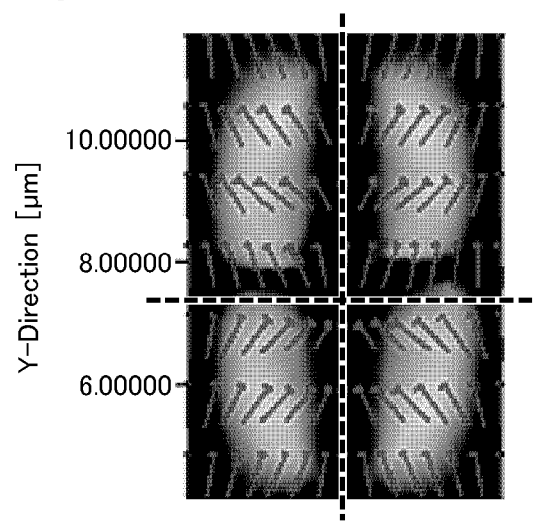
FIG. 8 is a plan view showing the simulation results of the distribution of on-state liquid crystal molecule alignments in the vicinity of the opening of the counter electrode used in Example 1-1.
Figure 9:
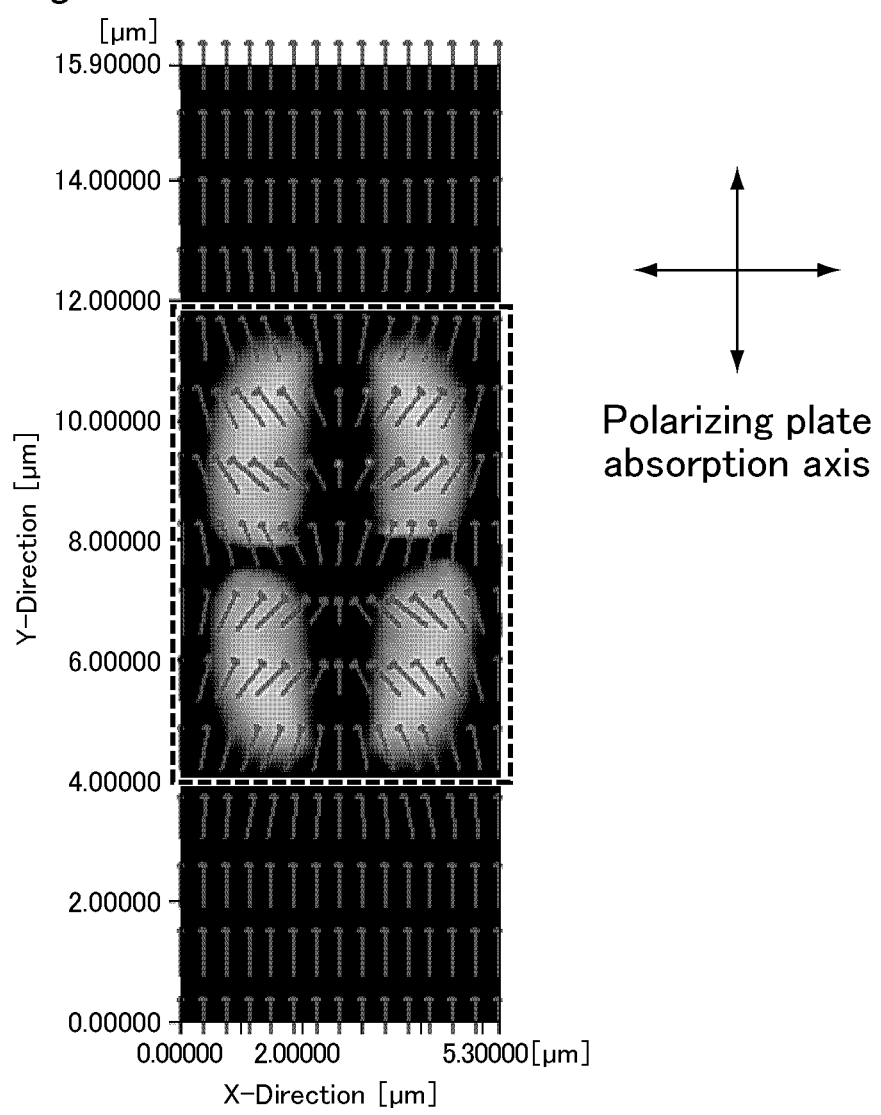
FIG. 9 is a plan view showing the simulation results of the distribution of on-state liquid crystal molecule alignments in the display unit of Example 1-1.
Figure 10:
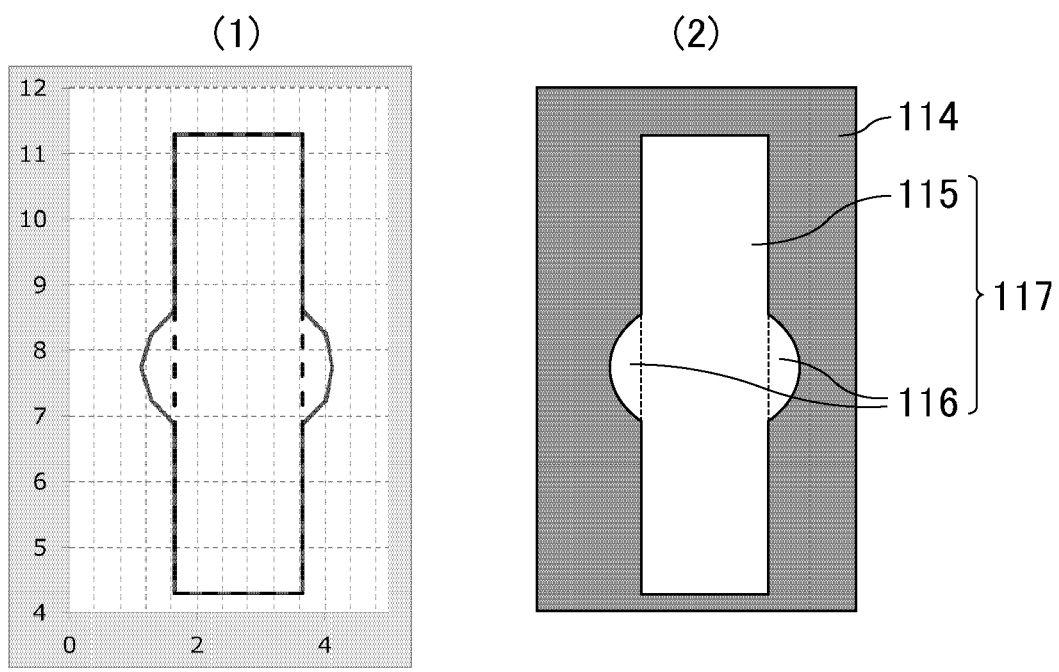
FIG. 10 is a view relating to a counter electrode of a liquid crystal display device of Example 1-2, wherein (1) is a plan view showing an opening shape, and (2) is a schematic plan view of the counter electrode.
Figure 11:
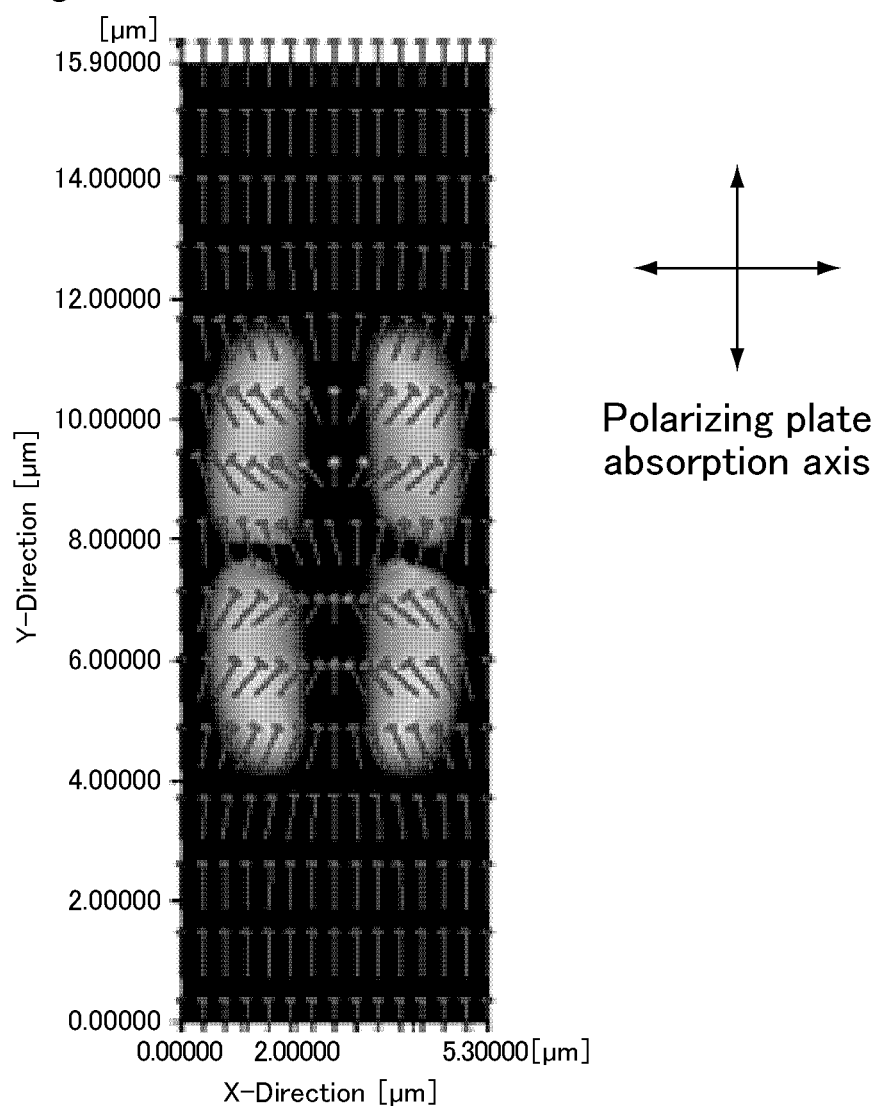
FIG. 11 is a plan view showing the simulation results of the distribution of on-state liquid crystal molecule alignments in a display unit of Example 1-2.
Figure 12:
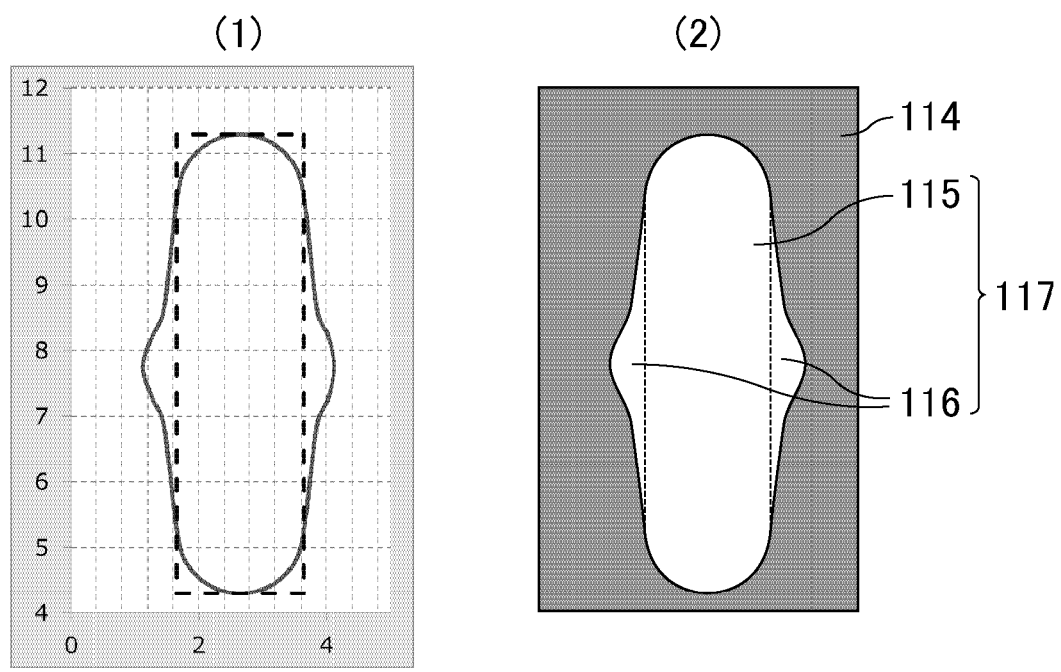
FIG. 12 is a view relating to a counter electrode of a liquid crystal display device of Example 1-3, wherein (1) is a plan view showing an opening shape, and (2) is a schematic plan view of the counter electrode.
Figure 13:
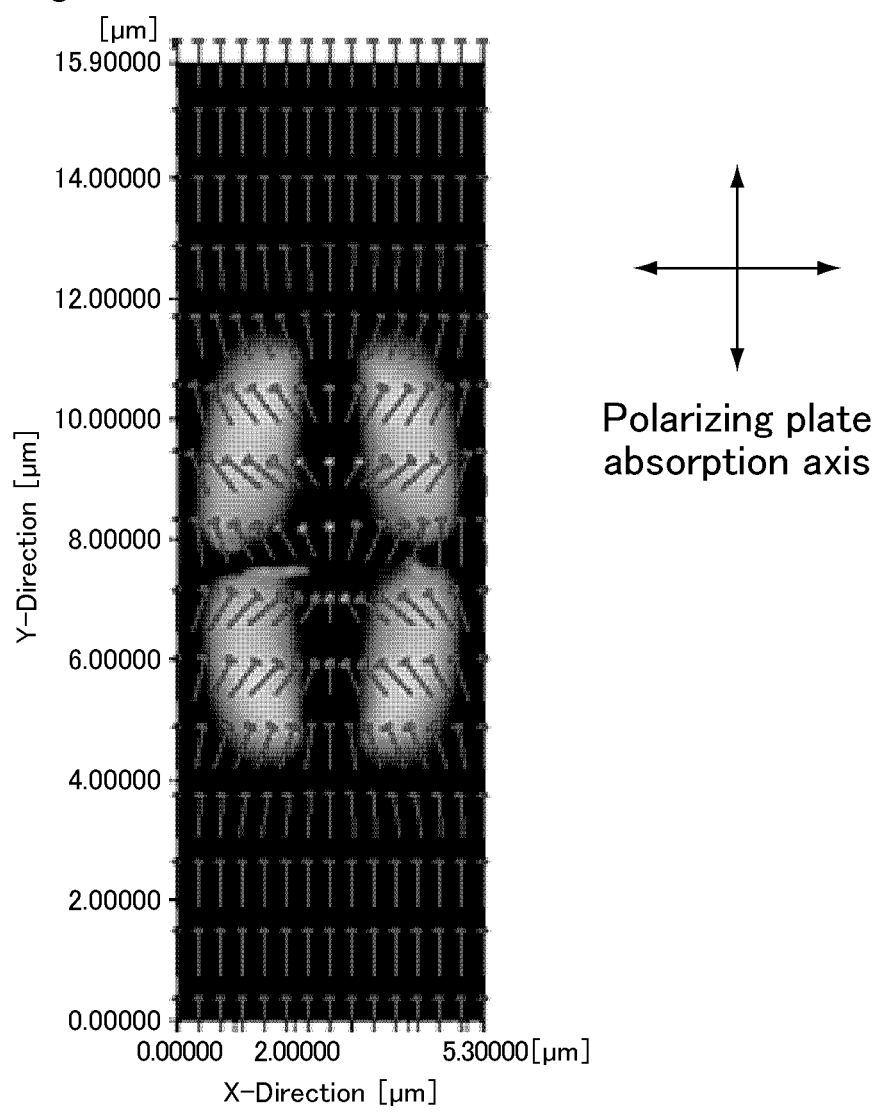
FIG. 13 is a plan view showing the simulation results of the distribution of on-state liquid crystal molecule alignments in the display unit of Example 1-3.
Figure 14:
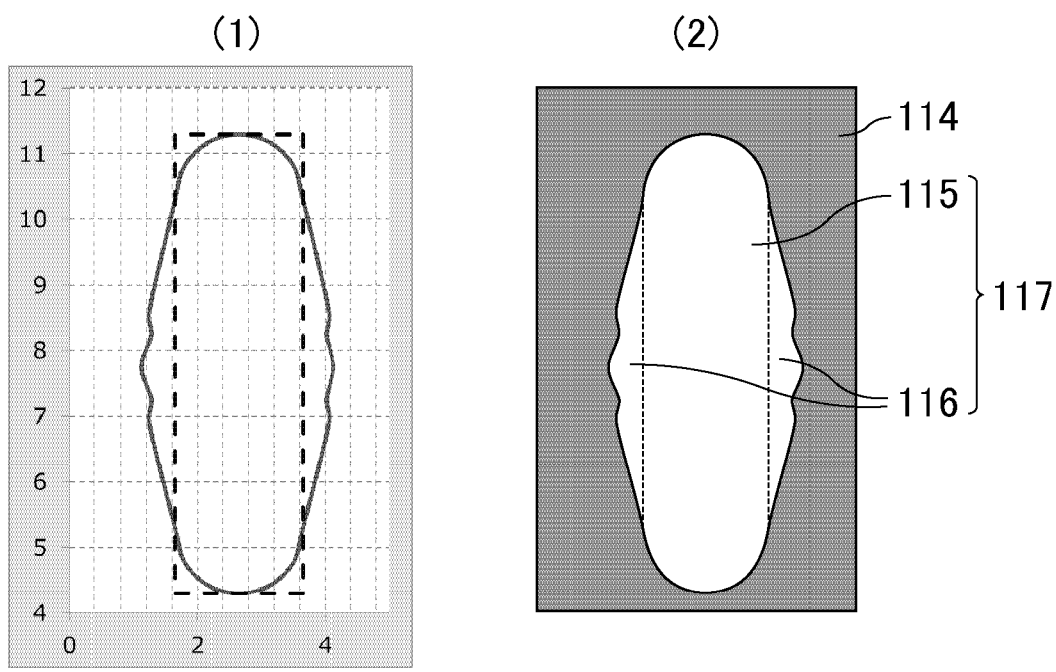
FIG. 14 is a view relating to a counter electrode of a liquid crystal display device of Example 1-4, wherein (1) is a plan view showing an opening shape, and (2) is a schematic plan view of the counter electrode.
Figure 15:
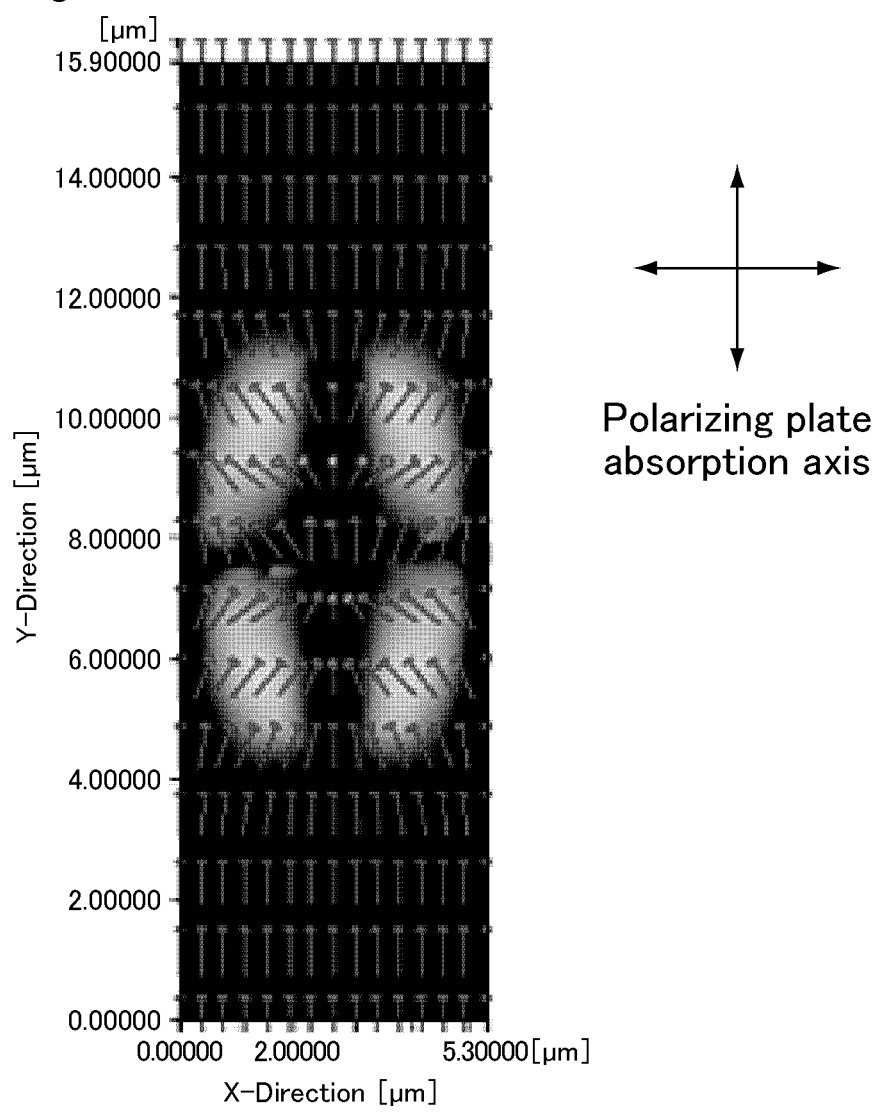
FIG. 15 is a plan view showing the simulation results of the distribution of on-state liquid crystal molecule alignments in the display unit of Example 1-4.
Figure 16:
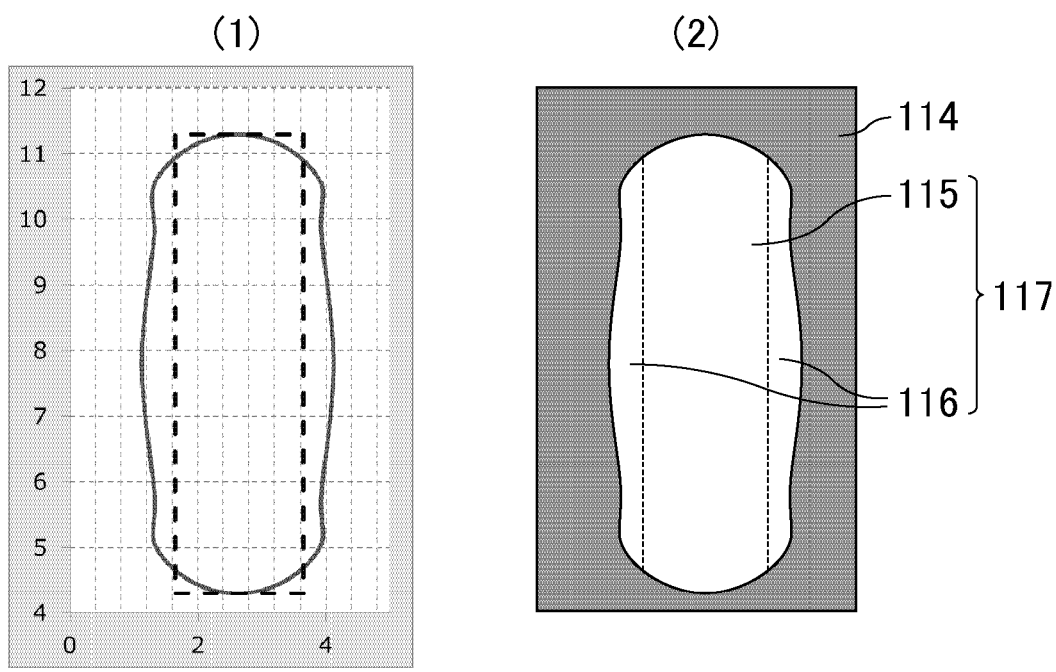
FIG. 16 is a view relating to a counter electrode of a liquid crystal display device of Example 1-5, wherein (1) is a plan view showing an opening shape, and (2) is a schematic plan view of the counter electrode.
Figure 17:
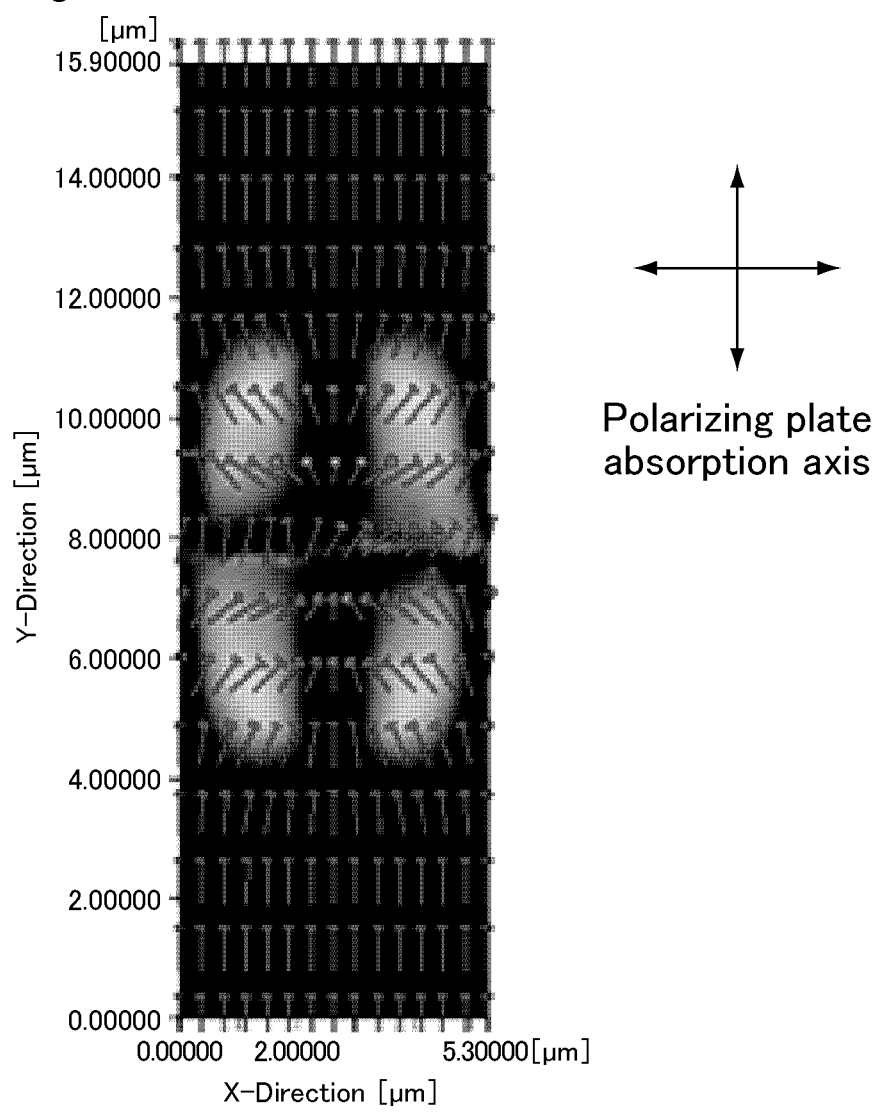
FIG. 17 is a plan view showing the simulation results of the distribution of on-state liquid crystal molecule alignments in the display unit of Example 1-5.
Figure 18:
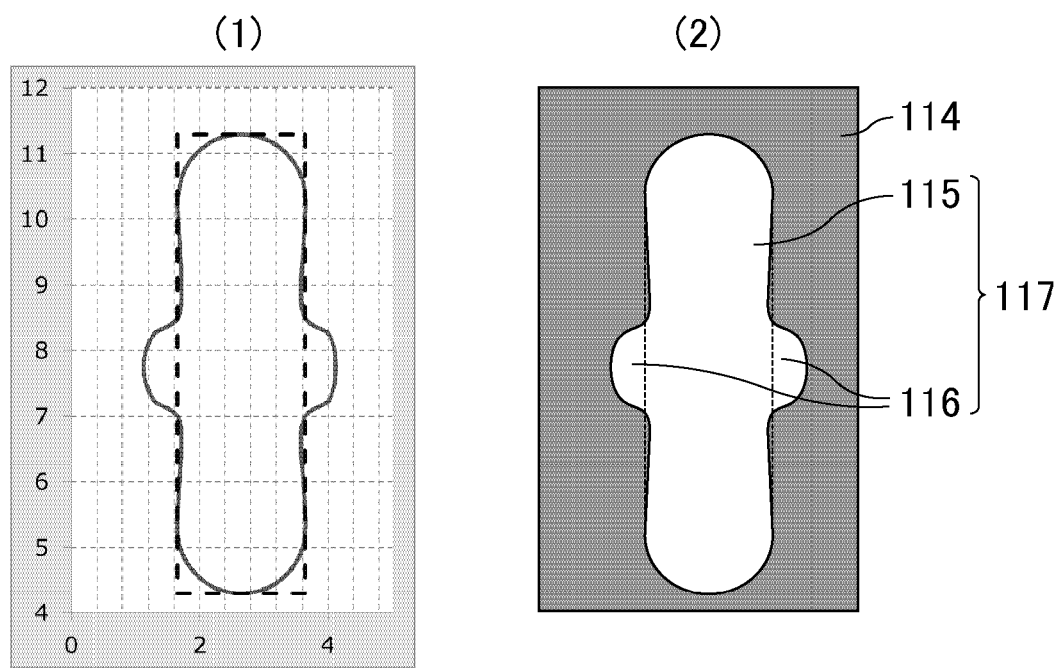
FIG. 18 is a view relating to a counter electrode of a liquid crystal display device of Example 1-6, wherein (1) is a plan view showing an opening shape, and (2) is a schematic plan view of the counter electrode.
Figure 19:
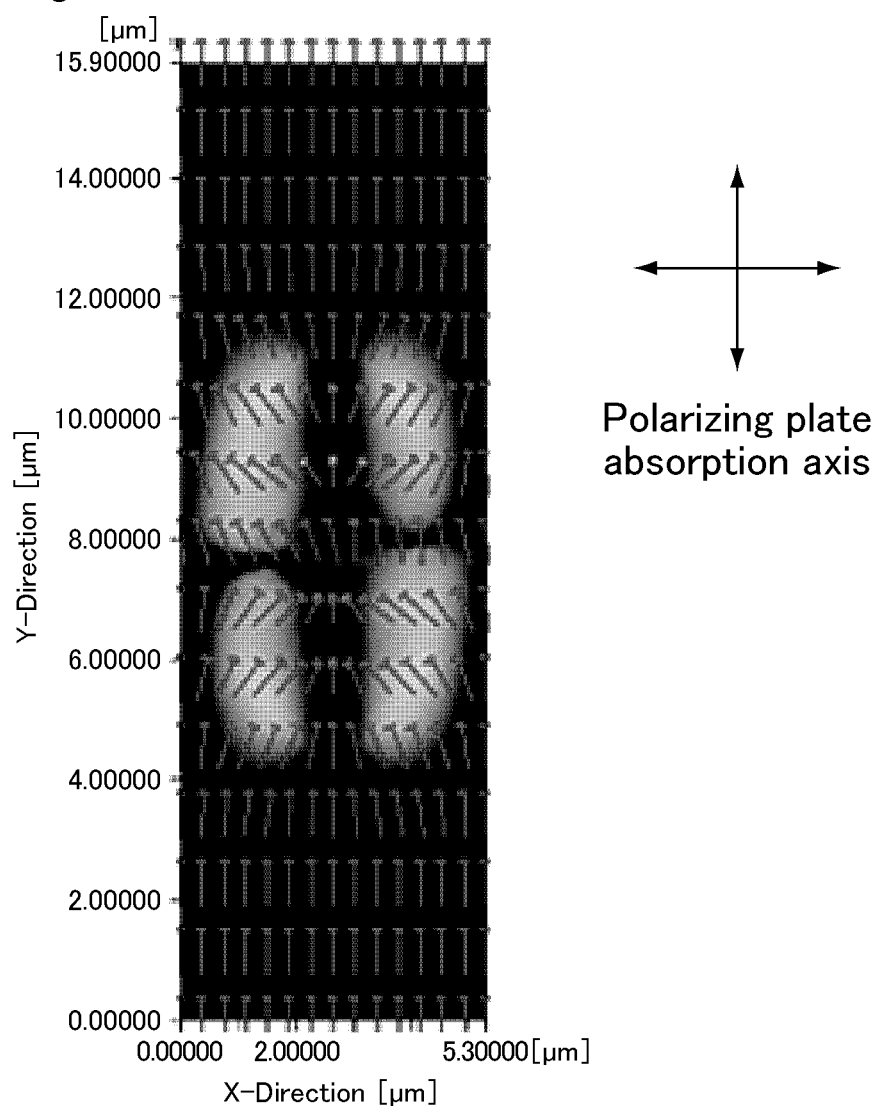
FIG. 19 is a plan view showing the simulation results of the distribution of on-state liquid crystal molecule alignments in the display unit of Example 1-6.

With reference to FIGS. 7 to 9, the distribution of alignments of the liquid crystal molecules 121 in the liquid crystal display device of Example 1-1 in the on state (6.5 V application) will be described.

FIGS. 7 and 8 are plan views showing the simulation results of the distribution of on-state liquid crystal molecule alignments in the vicinity of an opening of a counter electrode used in Example 1. FIG. 9 is a plan view showing the simulation results of the distribution of on-state liquid crystal molecule alignments in the display unit of Example 1-1. LCD-Master3D available from Shintech, Inc. was used for simulation of each example and each comparative example. In the display unit in Example 1-1, when a voltage is applied between the pixel electrode 112 and the counter electrode 114, the liquid crystal molecules 121 quickly rotate to change the alignment state. In FIG. 7, the liquid crystal molecules 121 in the two regions surrounded by ellipses are bend-aligned. The liquid crystal molecules 121 on the right side and those on the left side in each region are aligned in opposite directions. That is, as shown by four regions delimited by broken lines in FIG. 8, the liquid crystal molecules 121 are aligned and divided into four liquid crystal domains in the on state, and the four liquid crystal domains are formed in the directions of 45 degrees each from the center of the opening 117.

When the voltage between the pixel electrode 112 and the counter electrode 114 is removed, the distortion force derived from the bend alignment formed in the narrow regions allows high-speed response of the liquid crystal molecules 121. Since the existence of the pair of protrusions 116 fixes the disclination existing at the center of each of FIGS. 7 to 9 and maintains the symmetry of the four liquid crystal domains, high speed performance is obtained even at high voltage. In addition, since the liquid crystal molecules 121 in the direction of 45 degrees from the center of the opening 117 also rotate sufficiently from the beginning of voltage application, high transmittance can be achieved.

Example 1-2 to Example 1-6

The liquid crystal display device of each of Example 1-2 to Example 1-6 has the same configuration as the liquid crystal display device of Example 1-1 except that the shape of the opening 117 in the counter electrode 114 was changed to that of FIG. 10, FIG. 12, FIG. 14, FIG. 16, or FIG. 18. FIG. 10, FIG. 12, FIG. 14, FIG. 16, and FIG. 18 are views relating respectively to counter electrodes of the liquid crystal display devices of Examples 1-2 to 1-6, wherein (1) is a plan view showing an opening shape, and (2) is a schematic plan view of the counter electrode. The unit of the numerical value in each of FIG. 10(1), FIG. 12(1), FIG. 14(1), FIG. 16(1), and FIG. 18(1) is μm, and the broken lines of these figures each show the opening shape in Comparative Example 1-1 to be described later. The opening 117 of FIG. 10 used in Example 1-2 has the pair of protrusions 116 provided at the center of the rectangle. The opening 117 of FIG. 12 used in Example 1-3 is obtained by enlarging the pair of protrusions 116 of the opening 117 used in Example 1-1. The opening 117 of FIG. 14 used in Example 1-4 is obtained by further enlarging the pair of protrusions 116 of the opening 117 used in Example 1-1. The opening 117 of FIG. 16 used in Example 1-5 is obtained by increasing the width of the longitudinal-shaped portion 115 of the opening 117 used in Example 1-1. The opening 117 of FIG. 18 used in Example 1-6 is obtained by slightly recessing the periphery of the pair of protrusions 16 of the opening 117 used in Example 1-1.

FIG. 11, FIG. 13, FIG. 15, FIG. 17, and FIG. 19 are plan views showing the simulation results of the distribution of on-state liquid crystal molecule alignments in the display unit of Examples 1-2 to 1-6.

In each of Examples 1-2 to 1-6, the symmetry of the four liquid crystal domains is maintained by the effect of the pair of protrusions 116, and a cross-shaped disclination can be fixed; therefore, high speed can be achieved even at high voltage.

Example 7

Figure 20:
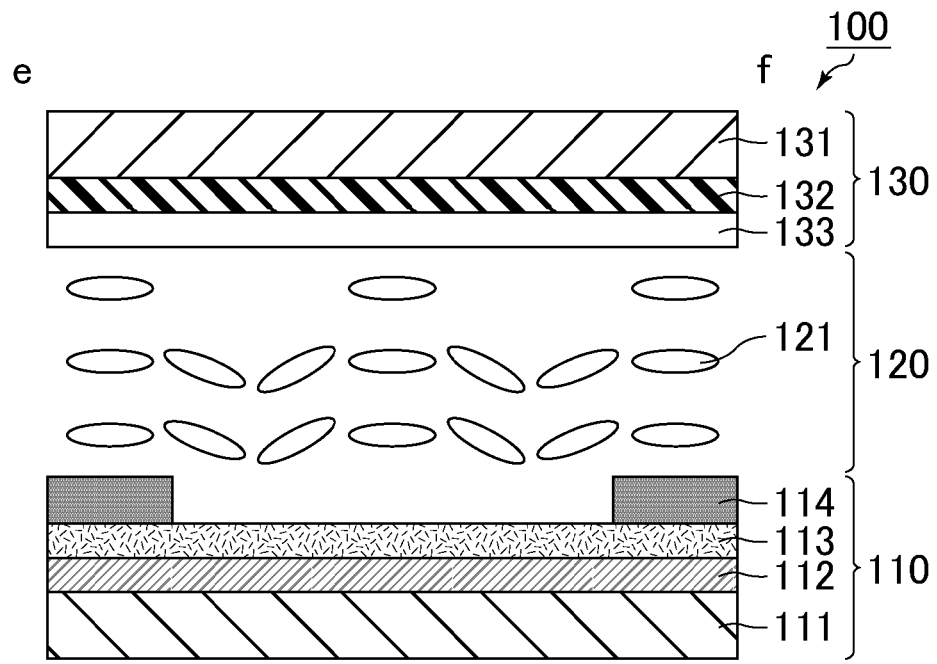
FIG. 20 is a schematic cross-sectional view of a liquid crystal display device of Example 1-7 in an on state.
Figure 21:
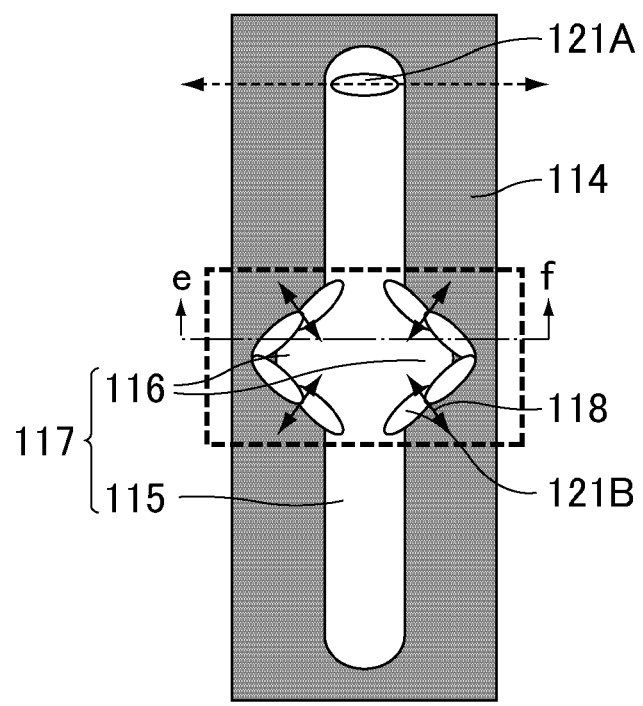
FIG. 21 is a schematic view for explaining control of the on-state liquid crystal molecule alignments in the liquid crystal display device of Example 1-7.

FIG. 20 is a schematic cross-sectional view of a liquid crystal display device of Example 1-7 in an on state. FIG. 21 is a schematic view for explaining control of the on-state liquid crystal molecule alignments in the liquid crystal display device of Example 1-7. FIG. 20 shows a cross section taken along the line e-f in FIG. 21.

The liquid crystal display device of Example 1-7 has the same configuration as the liquid crystal display device of Example 1-1 except that the anisotropy of dielectric constant of the liquid crystal material used in Example 1-1 was changed to −7. The initial alignment of the liquid crystal molecules 121 in Example 1-7 was set in the direction of the liquid crystal molecules 121A in the initial alignment state of FIG. 21.

As shown in FIG. 20, a liquid crystal display device 100 of Example 1-7 includes a first substrate 110, a liquid crystal layer 120 containing liquid crystal molecules 121, and a second substrate 130, in the given order. The first substrate 110 is a TFT array substrate and has a stacked structure including, in order toward the liquid crystal layer 120, a first polarizer (not shown), an insulating substrate (e.g., glass substrate) 111, a pixel electrode (first electrode) 112, an insulating layer (insulating film) 113, and a counter electrode (second electrode) 114. The second substrate 130 is a color filter substrate and has a stacked structure including, in order toward the liquid crystal layer 120, a second polarizer (not shown), an insulating substrate (e.g., glass substrate) 131, a color filter 132, and an overcoat layer 133. The first polarizer and the second polarizer are both absorptive polarizers and disposed in the crossed Nicols with their absorption axes perpendicular to each other.

Figure 22:
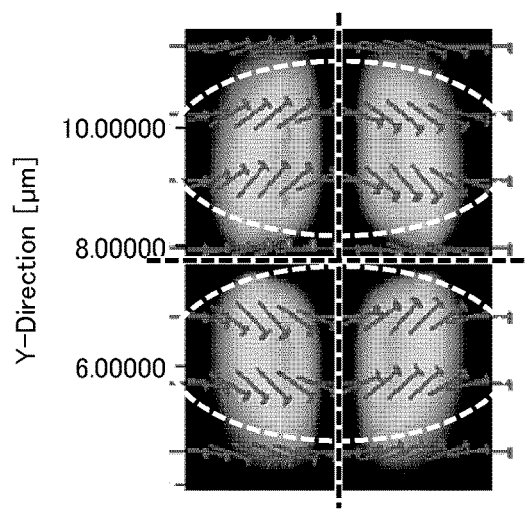
FIG. 22 is a plan view showing the simulation results of the distribution of on-state liquid crystal molecule alignments in the vicinity of an opening of a counter electrode of the liquid crystal display device of Example 1-7.
Figure 23:
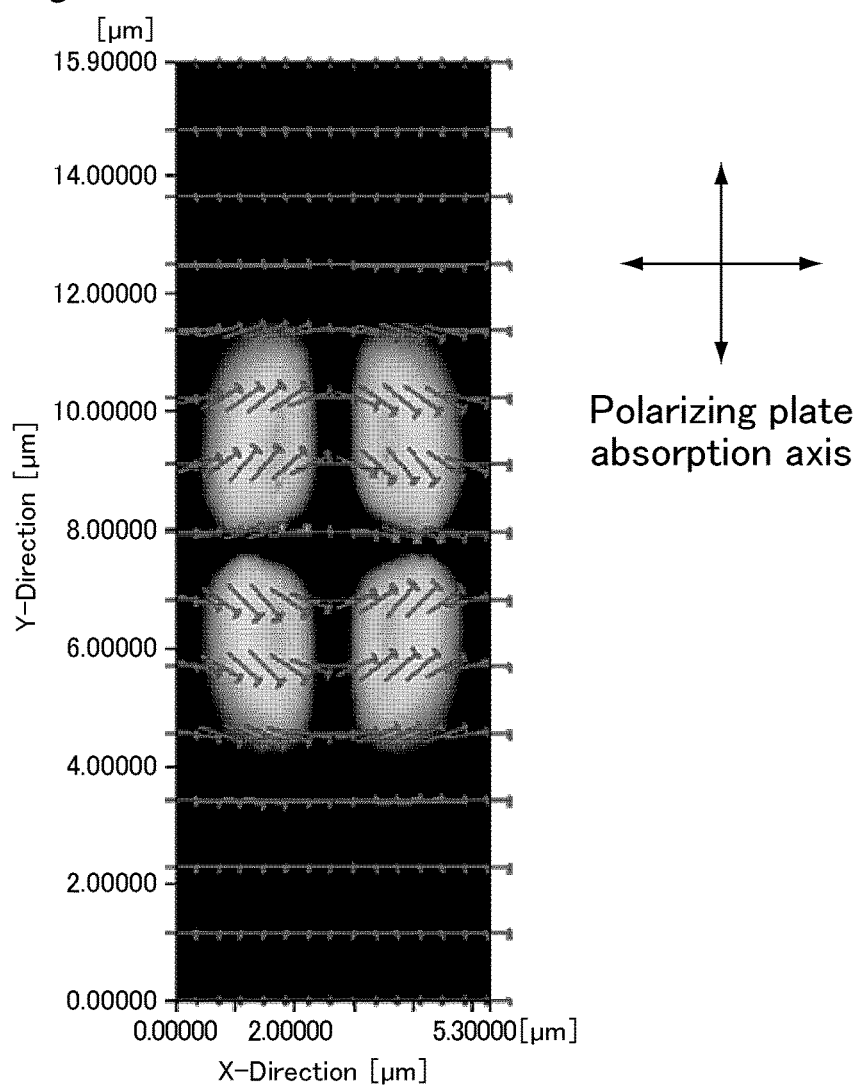
FIG. 23 is a plan view showing the simulation results of the distribution of on-state liquid crystal molecule alignments in the display unit of Example 1-7.
Figure 24:
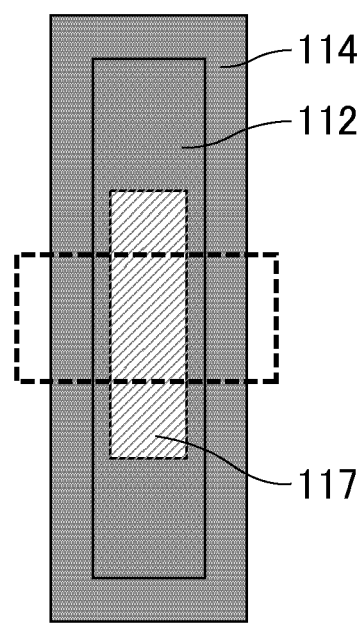
FIG. 24 is a schematic plan view of a counter electrode in an FFS mode liquid crystal display device studied by the present inventors.
Figure 25:
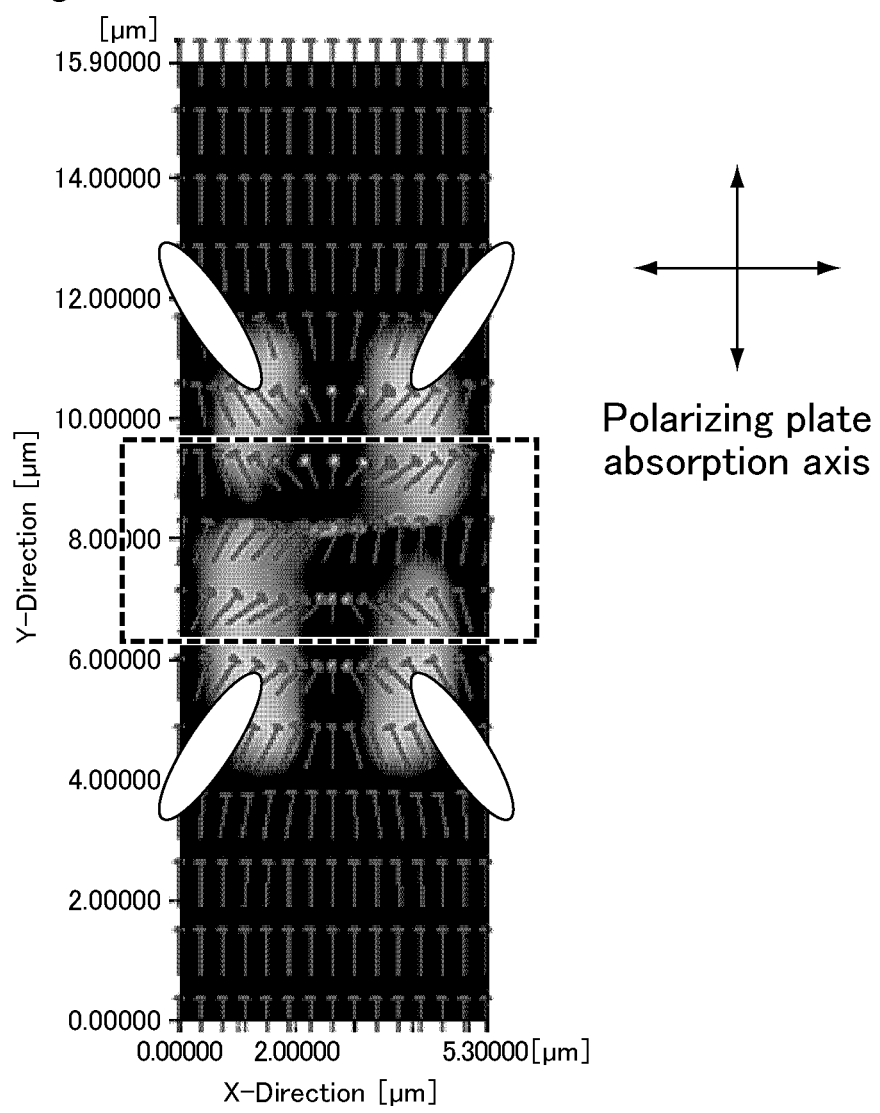
FIG. 25 is a plan view showing the simulation results of the distribution of on-state liquid crystal molecule alignments in the display unit of a liquid crystal display device using the counter electrode of FIG. 24.
Figure 26:
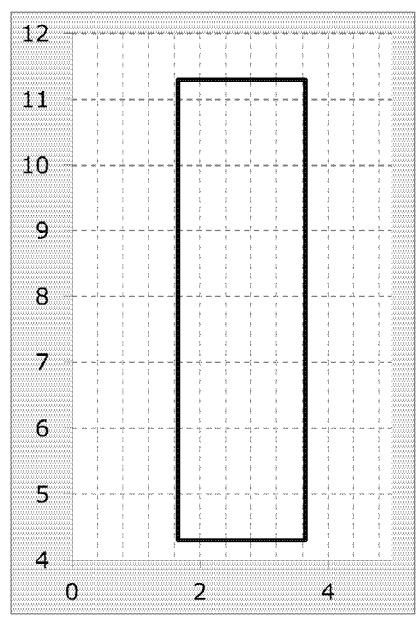
FIG. 26 is a plan view showing an opening shape of a counter electrode in a liquid crystal display device of Comparative Example 1-1.
Figure 27:
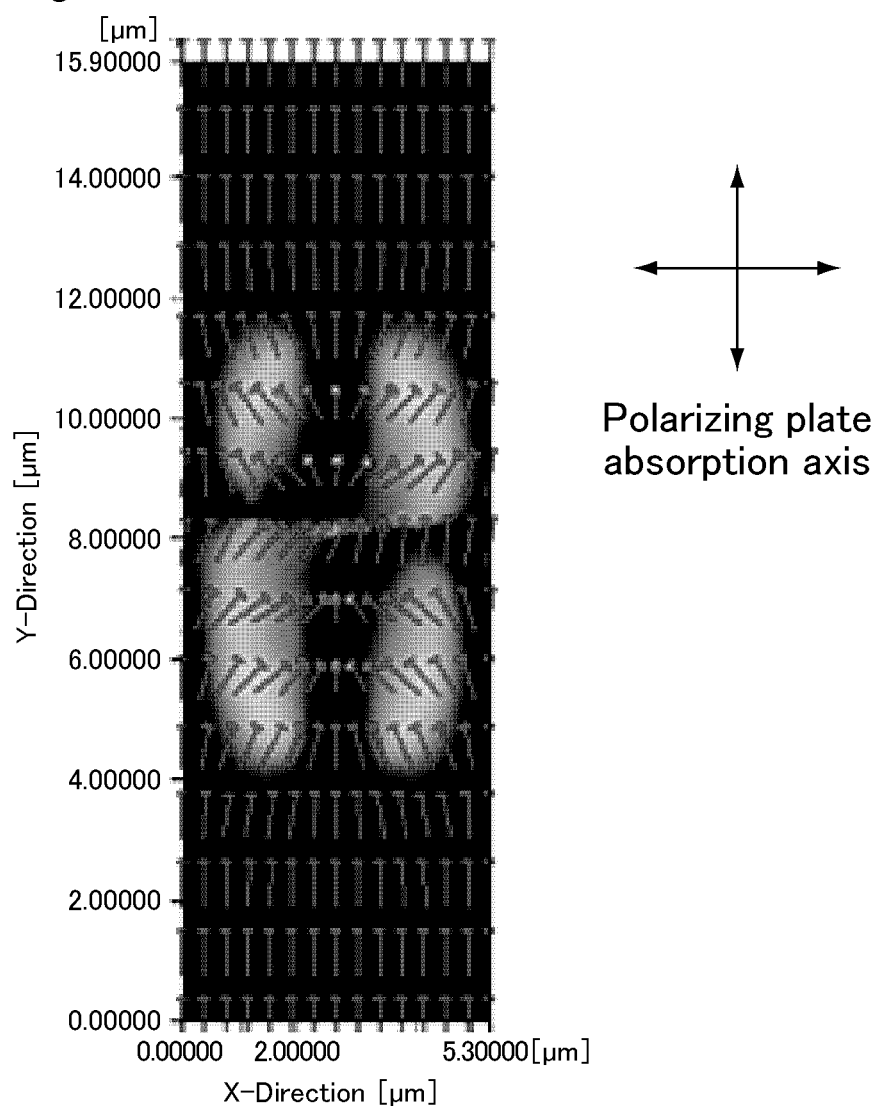
FIG. 27 is a plan view showing the simulation results of the distribution of on-state liquid crystal molecule alignments in the display unit of Comparative Example 1-1.

With reference to FIGS. 22 and 23, the distribution of alignments of the liquid crystal molecules 121 in the liquid crystal display device of Example 1-7 in the on state (6.5 V application) will be described. FIG. 22 is a plan view showing the simulation results of the distribution of on-state liquid crystal molecule alignments in the vicinity of an opening of a counter electrode of the liquid crystal display device of Example 1-7. FIG. 23 is a plan view showing the simulation results of the distribution of on-state liquid crystal molecule alignments in the display unit of Example 1-7.

In the display unit in Example 1-7, when a voltage is applied between the pixel electrode 112 and the counter electrode 114, the liquid crystal molecules 121 quickly rotate to change the alignment state. In FIG. 22, the liquid crystal molecules 121 in the two regions surrounded by ellipses are bend-aligned. The liquid crystal molecules 121 on the right side and those on the left side in each region are aligned in opposite directions. That is, as shown by four regions delimited crosswise by broken lines in FIG. 22, the liquid crystal molecules 121 are aligned and divided into four liquid crystal domains in the on state, and the four liquid crystal domains are formed in the directions of 45 degrees each from the center of the opening 117.

When the voltage between the pixel electrode 112 and the counter electrode 114 is removed, the distortion force derived from the bend alignment formed in the narrow regions allows high-speed response of the liquid crystal molecules 121. When the pair of protrusions 116 exists, as shown in FIG. 21, the electric field 118 in the oblique direction is generated near the pair of protrusions 116, and the alignment of the liquid crystal molecules 121B is stabilized at the time of voltage application. As a result, the disclination existing at each center of FIG. 22 and FIG. 23 is fixed, and the symmetry of the four liquid crystal domains is maintained, so that high speed performance is obtained even at high voltage. In addition, since the liquid crystal molecules 121 in the direction of 45 degrees from the center of the opening 117 also rotate sufficiently from the beginning of voltage application, high transmittance can be achieved.

Comparative Example 1-1 to Comparative Example 1-4

Figure 28:
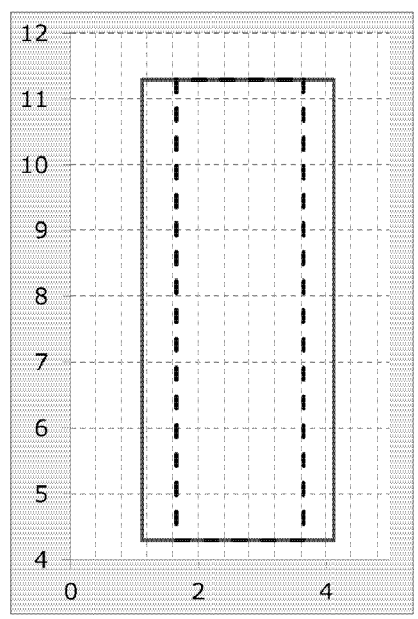
FIG. 28 is a plan view showing an opening shape of a counter electrode in a liquid crystal display device of Comparative Example 1-2.
Figure 29:
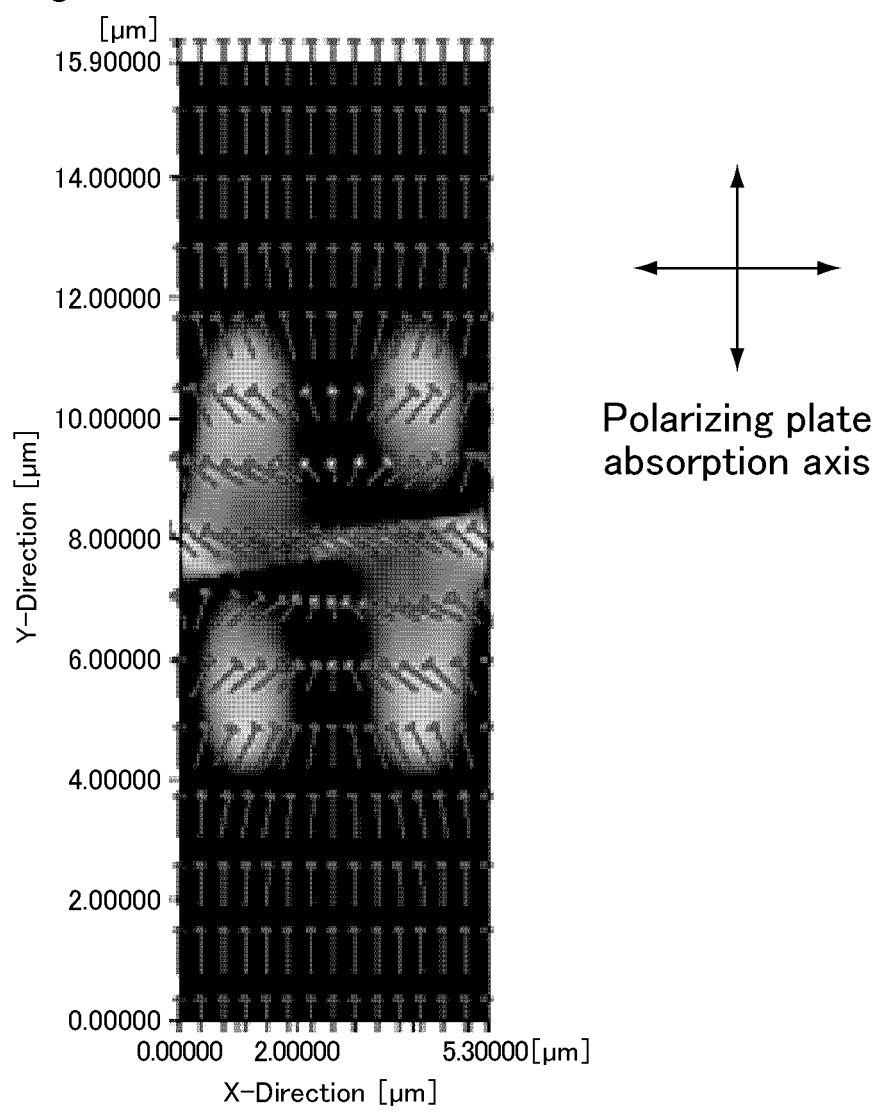
FIG. 29 is a plan view showing the simulation results of the distribution of on-state liquid crystal molecule alignments in the display unit of Comparative Example 1-2.
Figure 30:
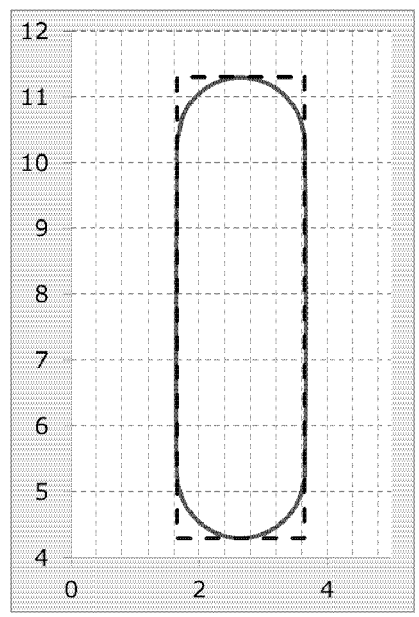
FIG. 30 is a plan view showing an opening shape of a counter electrode in a liquid crystal display device of Comparative Example 1-3.
Figure 31:
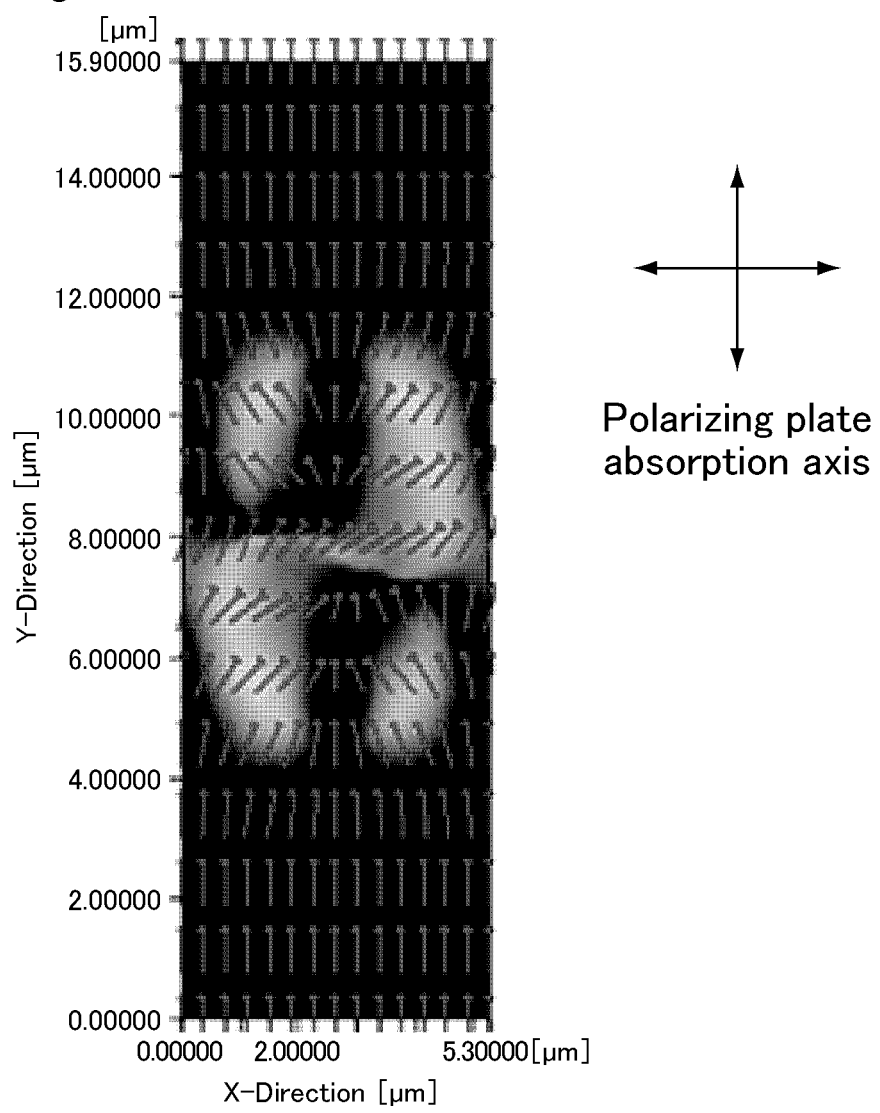
FIG. 31 is a plan view showing the simulation results of the distribution of on-state liquid crystal molecule alignments in the display unit of Comparative Example 1-3.
Figure 32:
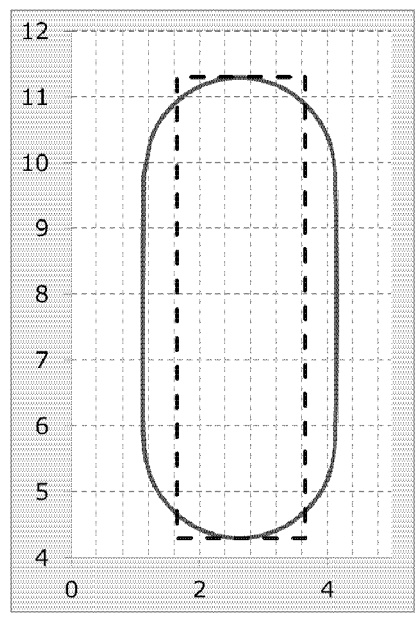
FIG. 32 is a plan view showing an opening shape of a counter electrode in a liquid crystal display device of Comparative Example 1-4.
Figure 33:
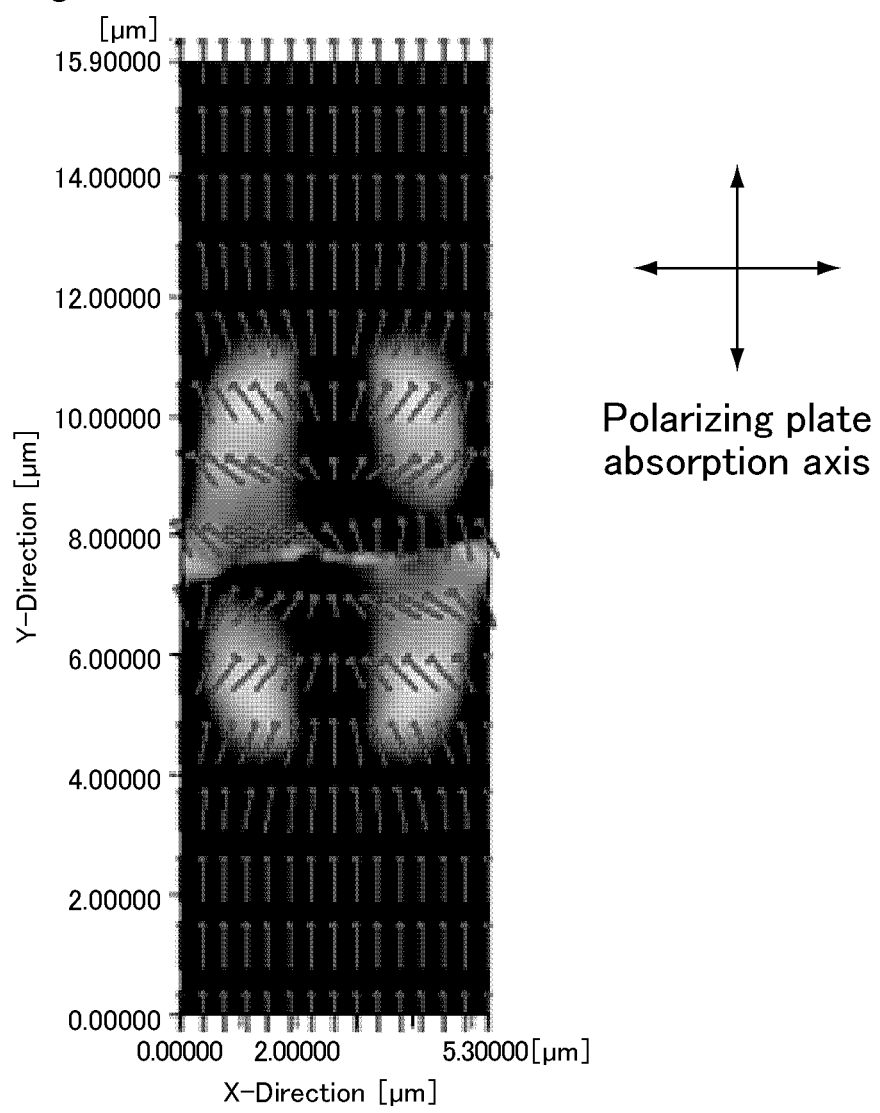
FIG. 33 is a plan view showing the simulation results of the distribution of on-state liquid crystal molecule alignments in the display unit of Comparative Example 1-4.

Liquid crystal display devices of Comparative Example 1-1 to Comparative Example 1-4 have the same configuration as the liquid crystal display device of Example 1-1 except that the shape of the opening 117 in the counter electrode 114 was changed to that of FIG. 26, FIG. 28, FIG. 30 or FIG. 32. FIG. 26, FIG. 28, FIG. 30, and FIG. 32 are plan views showing the opening shapes of the counter electrodes in the liquid crystal display devices of Comparative Examples 1-1 to 1-4. The unit of the numerical value in each of FIG. 26, FIG. 28, FIG. 30, and FIG. 32 is µm, and the broken lines in FIG. 28, FIG. 30, and FIG. 32 show the opening shape in Comparative Example 1-1. The opening 117 of FIG. 26 used in Comparative Example 1-1 has a rectangle shape. The opening 117 of FIG. 28 used in Comparative Example 1-2 is obtained by increasing the width in the lateral direction of the opening 117 used in Comparative Example 1-1. The opening 117 of FIG. 30 used in Comparative Example 1-3 is obtained by rounding both end portions of the opening 117 used in Comparative Example 1-1 to form the opening 117 into an elliptical shape. The opening 117 of FIG. 32 used in Comparative Example 1-4 is obtained by laterally extending the elliptical opening 117 used in Comparative Example 1-3.

FIG. 27, FIG. 29, FIG. 31, and FIG. 33 are plan views showing the simulation results of the distribution of on-state liquid crystal molecule alignments in the display unit of Comparative Examples 1-1 to 1-4.

In each of Comparative Examples 1-1 to 1-4, the symmetry of the four liquid crystal domains collapses, and the cross-shaped disclination collapses, so that response is delayed.

Comparison of Examples and Comparative Examples

For the liquid crystal display devices of Examples 1-1 to 1-7 and Comparative Examples 1-1 to 1-4, rise and decay responses were simulated under the following evaluation conditions. The obtained results are shown in Table 1 below.
(Evaluation Conditions)

With the maximum transmittance obtainable by optical modulation being defined as a transmittance ratio of 100%, the rise response time is defined as time required for the transmittance ratio to change from 10% to 90%, and the decay response time is defined as time required for the transmittance ratio to change from 90% to 10%. The rise response characteristics correspond to switching from black display to white display, and the decay response characteristics correspond to switching from white display to black display. When black-white response (decay time) and black-white response (rise time) are less than 4.175 ms, which is a quarter of the period of one frame (=16.7 ms) at 60 Hz, the liquid crystal display device can accommodate double-speed display, thus achieving good display performance. If the rise and decay times are not more than 4.2 ms, it is marked with ○, and if the rise and decay times exceed 4.2 ms, it is marked with x.

TABLE 1

| | Rise response | Judgment | Decay response | Judgment | Total | Comprehensive judgment |
|---|---|---|---|---|---|---|
| Example 1-1 | 3.9 | ○ | 2.5 | ○ | 6.4 | ○ |
| Example 1-2 | 3.9 | ○ | 3.1 | ○ | 7.0 | ○ |
| Example 1-3 | 4.2 | ○ | 4.0 | ○ | 8.2 | ○ |
| Example 1-4 | 3.1 | ○ | 2.5 | ○ | 5.6 | ○ |
| Example 1-5 | 3.9 | ○ | 3.1 | ○ | 7.0 | ○ |
| Example 1-6 | 4.0 | ○ | 2.7 | ○ | 6.7 | ○ |
| Example 1-7 | 2.1 | ○ | 2.3 | ○ | 4.4 | ○ |
| Comparative Example 1-1 | 7.3 | x | 5.8 | x | 13.1 | x |
| Comparative Example 1-2 | 5.0 | x | 5.6 | x | 10.6 | x |
| Comparative Example 1-3 | 5.3 | x | 3.4 | ○ | 8.7 | x |
| Comparative Example 1-4 | 10.1 | x | 8.5 | x | 18.6 | x |
| Criteria | Not more than 4.2 ms | | Not more than 4.2 ms | | Not more than 8.4 ms | |

As shown in Table 1, the rise response times and the decay response times in Examples 1-1 to 1-7 were less than 4.2 ms, and good response performance was obtained. However, in Comparative Examples 1-1 to 1-4, at least one of the rise response time and the decay response time exceeded 4.2 ms, and good response characteristics were not obtained. That is, it has been found that Embodiment 1-1 has a high-speed response.

Since decay response in Example 1-1 is faster than that in Example 1-2, it has been found that when both the end portions of the longitudinal-shaped portion 115 of the counter electrode are rounded into a circle, the decay response is accelerated. This is the effect of speeding up by the elliptical shape.

Since Example 1-1 is faster than Example 1-6 in both the rise response and the decay response, it has been found that when a hollow is provided around the pair of protrusions 116 of the opening 117, the response is slightly slowed down. This is thought to be because the hollow obstructs smooth rotation of the liquid crystal molecules 121.

As apparent from Examples 1-3, 1-4, and 1-5, good response characteristics can be obtained even if the shape of the opening 117 is widened in the lateral direction.

As apparent from Example 1-7, the response speed can be increased even when the liquid crystal molecules 121 (negative liquid crystal) having negative anisotropy of dielectric constant are used.

In Comparative Example 1-3, since the opening 117 has an elliptical shape, although the decay response speed is increased, the disclination cannot be fixed, and the performance cannot be improved as desired. In order to realize the speeding up, it is preferable to provide the pair of protrusions 116 and fix the alignment as in Examples.

Embodiment 2-1

Figure 34:
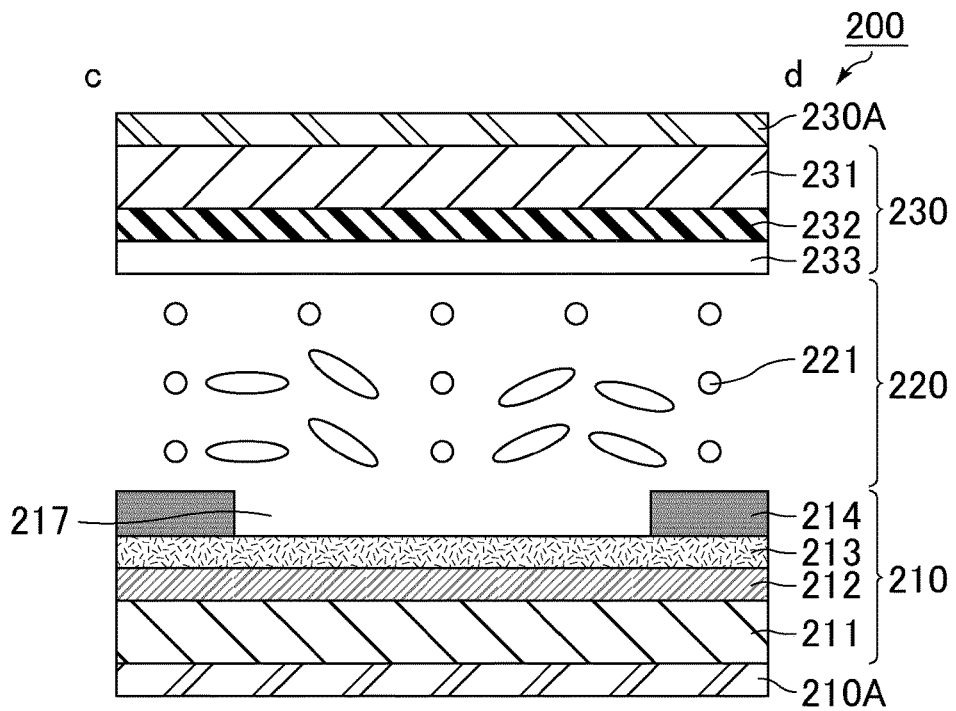
FIG. 34 is a schematic cross-sectional view of a liquid crystal display device of Embodiment 2-1 in a voltage-applied state.

With reference to FIGS. 34 to 39, a liquid crystal display device of Embodiment 2-1 will be described below. FIG. 34 is a schematic cross-sectional view of the liquid crystal display device of Embodiment 2-1 in a voltage-applied state. FIG. 34 shows a cross section taken along the line c-d in FIG. 35.

As shown in FIG. 34, a liquid crystal display device 200 of Embodiment 2-1 includes a first substrate 210, a liquid crystal layer 220 containing liquid crystal molecules 221, and a second substrate 230, in the given order. The first substrate 210 is a TFT array substrate and has a stacked structure including, in order toward the liquid crystal layer 220, a first polarizing plate 210A, an insulating substrate (e.g., glass substrate) 211, a pixel electrode (first electrode) 212, an insulating layer (insulating film) 213, and a counter electrode (second electrode) 214. The second substrate 230 is a color filter substrate and has a stacked structure including, in order toward the liquid crystal layer 220, a second polarizing plate 230A, an insulating substrate (e.g., glass substrate) 231, a color filter 232, and an overcoat layer 233. The first polarizing plate 210A and the second polarizing plate 230A are both absorptive polarizing plates and disposed in the crossed Nicols with their absorption axes orthogonal to each other. An opening 217 is formed in a counter electrode 214.

Although not shown in FIG. 34, a horizontal alignment film is typically disposed on the liquid crystal layer 220 side surface of the first substrate 210 and/or the second substrate 230. The horizontal alignment film acts to align the liquid crystal molecules 221 near the film parallel to the film surface. In addition, the horizontal alignment film adjusts the orientations of the major axes (hereinafter also referred to as "alignment azimuths") of the liquid crystal molecules 221 aligned parallel to the first substrate 210 to a specific in-plane azimuth. The horizontal alignment film preferably has been subjected to alignment treatment such as photo-alignment treatment or rubbing treatment. The horizontal alignment film may be made of an inorganic material or an organic material.

The alignment mode of the liquid crystal display device 200 is a fringe field switching (FFS) mode.

In the no-voltage-applied state, where no voltage is applied between the pixel electrode (first electrode) 212 and the counter electrode (second electrode) 214 (this state is hereinafter also simply referred to as the "no-voltage-applied state"), the alignment of the liquid crystal molecules 221 is controlled parallel to the first substrate 210. As described above, the "parallel" herein includes not only being completely parallel, but also a range that can be equated with being parallel (substantially parallel) in the art. The pre-tilt angle (angle of tilt in the no-voltage-applied state) of the liquid crystal molecules 221 is preferably less than 3°, more preferably less than 1° relative to the surface of the first substrate 210, and it is particularly preferable to set the pre-tilt angle to 0° by using a photo-alignment film. When the pre-tilt angle is set to 0°, the influence of the pre-tilt angle on the liquid crystal domain is eliminated, and the balance of the four liquid crystal domains can be easily maintained uniformly. In this specification, the alignment azimuth of the liquid crystal molecules 221 in the no-voltage-applied state is also referred to as the initial alignment azimuth of the liquid crystal molecules 221.

In the voltage-applied state, where a voltage is applied between the pixel electrode (first electrode) 212 and the counter electrode (second electrode) 214 (this state is hereinafter also simply referred to as the "voltage-applied state"), the alignment of the liquid crystal molecules 221 is controlled by the stacked structure of the first substrate 210 including the pixel electrode 212, the insulating layer 213, and the counter electrode 214. The pixel electrode 212 is an electrode formed in each display unit. The counter electrode 214 is common to a plurality of display units.

As described above, the "display unit" means a region corresponding to one pixel electrode 212. The display unit may be one called "pixel" in the technical field of liquid crystal display devices, or may be one called "sub-pixel" or "dot" in the cases where one pixel is divided for driving. Examples of the alignment of the display units (sub pixels) in the cases where one pixel is divided for driving include a three color stripe arrangement including, for example, red, green and blue, a three color mosaic arrangement or delta arrangement including, for example, red, green and blue, a four color stripe arrangement including, for example, red, green, blue and yellow, and a squared pattern. When the three color stripe arrangement is used, the aspect ratio of the display unit is 3:1; when the four color stripe arrangement is used, the aspect ratio of the display unit is 4:1; and when the three color mosaic arrangement, three color delta arrangement, or four colored squared pattern is used, the aspect ratio of the display unit is 1:1. On the other hand, the aspect ratio of the pixel is usually 1:1 regardless of whether or not the pixel is divided for driving. The shape and number of the openings 217 can be adjusted according to the shape of the display unit. When the display unit has a longitudinal shape (preferably a rectangular shape) as in the case where the three color stripe arrangement or four color stripe arrangement is employed, and when the opening 217 has a longitudinal shape, it is preferable that the longitudinal direction of the display unit (preferably a direction of along side of a rectangular shape) is coincident with the longitudinal direction of the opening 217.

The voltage-applied state means a state where the liquid crystal molecules 221 rotate under the effect of the electric field and a voltage equal to or higher than a minimum voltage (threshold voltage) necessary for changing the alignment azimuth is applied, and may be a state where a voltage at which white display is performed (white voltage) is applied.

The positions of the counter electrode 214 and the pixel electrode 212 may be switched. Specifically, although in the stacked structure shown in FIG. 34 the counter electrode 214 is adjacent to the liquid crystal layer 220 via a horizontal alignment film (not shown), the pixel electrode 212 may be adjacent to the liquid crystal layer 220 via a horizontal alignment film (not shown). In such a case, the opening 217 to be described later is formed in the pixel electrode 212 instead of the counter electrode 214.

In the stacked structure shown in FIG. 34, the opening 217 is formed in the counter electrode 214. This opening 217 is used for generating a fringe electric field (oblique electric field). The opening 217 is preferably formed in each display unit, and preferably formed in all the display units.

Figure 35:
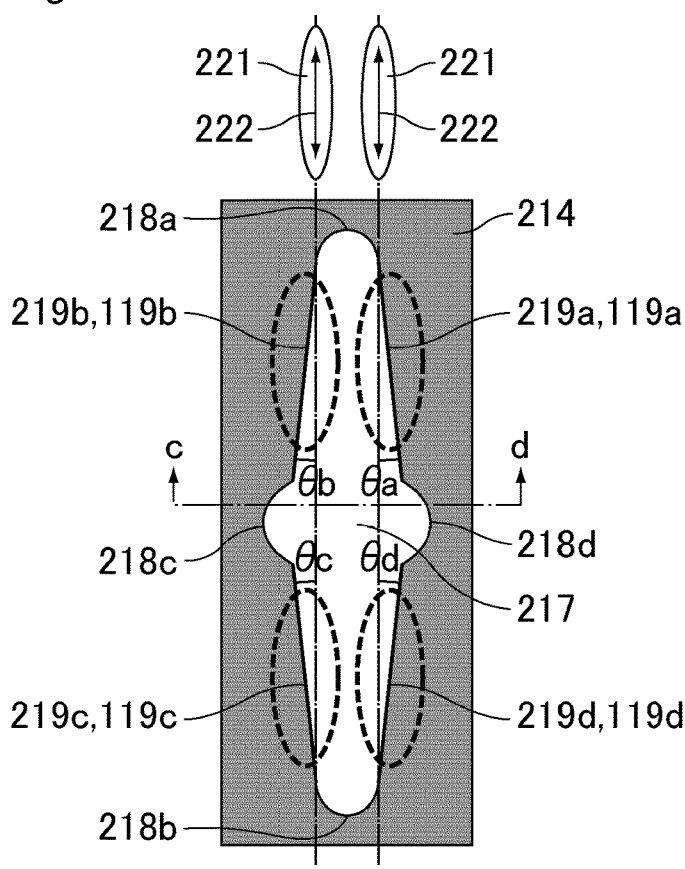
FIG. 35 is a schematic plan view for explaining an opening shape of a counter electrode of the liquid crystal display device of Embodiment 2-1.

The opening 217 will be described with reference to FIG. 35. FIG. 35 is a schematic plan view for explaining an opening shape of a counter electrode of the liquid crystal display device of Embodiment 2-1. In a plan view, the contour of the opening 217 includes a first inclined contour 219a along a first line segment 119a extending from an upper end portion 218a of the opening 217 to a right end portion 218d of the opening 217, a second inclined contour 219b along a second line segment 119b extending from the upper end portion 218a to a left end portion 218c of the opening 217, a third inclined contour 219c along a third line segment 119c extending from a lower end portion 218b of the opening 217 to the left end portion 218c, and a fourth inclined contour 219d along a fourth line segment 119d extending from the lower end portion 218b to the right end portion 218d, and in a plan view, the first, second, third, and fourth line segments 119a to 119d are each inclined with respect to the alignment azimuth of the liquid crystal molecules 221 in the no-voltage-applied state. That is, in a plan view, angles θa, θb, θc, and θd formed by the first line segment 119a, the second line segment 119b, the third line segment 119c, and the fourth line segment 119d with the initial alignment azimuth 222 of the liquid crystal molecules 221 are more than 0°. The first line segment 119a, the second line segment 119b, the third line segment 119c, and the fourth line segment 119d each represent a virtual line segment. The first inclined contour 219a is connected to the contour of the upper end portion 218a and the contour of the right end portion 218d, the second inclined contour 219b is connected to the contour of the upper end portion 218a and the contour of the left end portion 218c, the third inclined contour 219c is connected to the contour of the lower end portion 218b and the contour of the left end portion 218c, and the fourth inclined contour 219d is connected to the contour of the lower end portion 218b and the contour of the right end portion 218d.

The opening 217 is used for generating a fringe electric field (oblique electric field). The opening 217 is formed in each display unit, and preferably formed in all the display units. Since the opening 217 thus configured does not include a complex shape, the opening 217 can be applied to high-definition pixels (ultrahigh-definition pixels) of not less than 800 ppi, for example, without any problem. Although the definition of the liquid crystal display device 200 is not particularly limited, it is preferably not less than 400 ppi and not more than 1200 ppi, and more preferably not less than 800 ppi and not more than 1200 ppi. The definition (ppi: pixel per inch) in this specification is represented by the number of pixels arranged per inch (2.54 cm). When one pixel is divided into a plurality of sub-pixels (display units) for driving, the definition may be calculated based on the size of one pixel constituted by a plurality of sub-pixels. When sub-pixels (for example, RGB) of different colors are arranged in a direction parallel to a gate signal line in stripe arrangement, the size in a direction (the longitudinal direction of the sub-pixel) parallel to a source signal line of the sub-pixel corresponds to the size of one pixel in the case of calculating the definition.

In this specification, the first inclined contour 219a, the second inclined contour 219b, the third inclined contour 219c, and the fourth inclined contour 219d are each also simply referred to as the "inclined contour" when they are referred without being distinguished from one another. The first line segment 119a, the second line segment 119b, the third line segment 119c, and the fourth line segment 119d are each also simply referred to as the "line segment" when they are referred without being distinguished from one another. In a plan view, the angles θa, θb, θc, and θd formed by the first line segment 119a, the second line segment 119b, the third line segment 119c, and the fourth line segment 119d with the initial alignment azimuth 222 of the liquid crystal molecules 221 are each also simply referred to as the "angle θ" when they are referred without being distinguished from one another.

In this specification, the fact that the inclined contour follows a line segment means that the inclined contour is coincident with the line segment, or that the inclined contour runs (advances) parallel to the line segment, and both of them may be parallel or nonparallel as long as the effect of the present invention is exhibited. In the latter case (nonparallel case), the inclined contour may be curved or may include a linear portion nonparallel to the line segment. As shown in FIG. 35, when the inclined contour is coincident with the line segment, the angles θa, θb, θc, and θd correspond to the respective angles formed by the first inclined contour 219a, the second inclined contour 219b, the third inclined contour 219c, and the fourth inclined contour 219d with the initial alignment azimuth 222 of the liquid crystal molecules 221.

Figure 36:
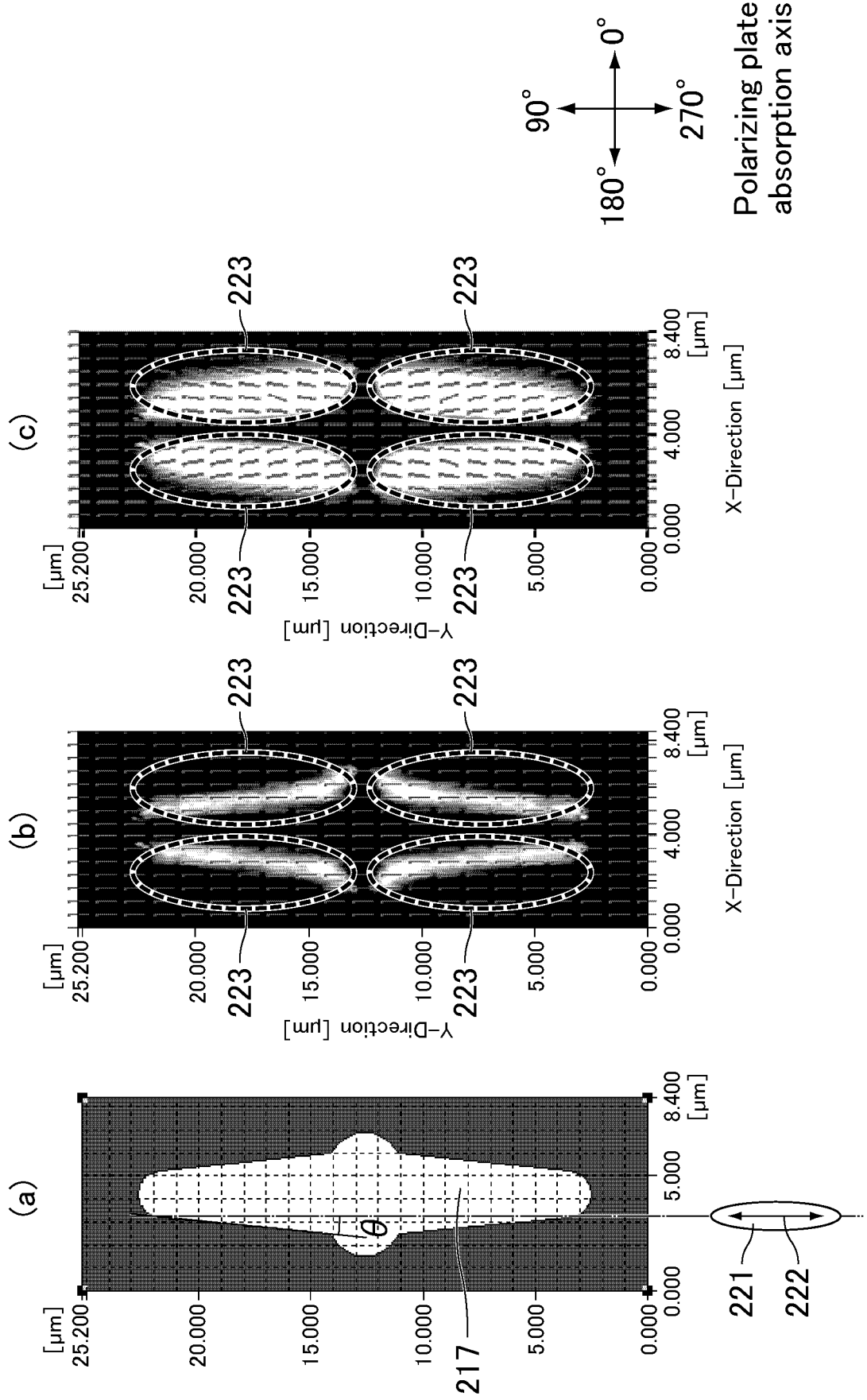
FIG. 36 is a view relating to the liquid crystal display device of Embodiment 2-1, wherein (a) is a plan view showing the opening shape of the counter electrode, (b) is a plan view showing the simulation results of the distribution of liquid crystal molecule alignments in the display unit after a lapse of 2 msec after application of a voltage of 2 V, and (c) is a plan view showing the simulation results of the distribution of liquid crystal molecule alignments in the display unit after a lapse of 10 msec after application of a voltage of 2 V.

FIG. 36 is a view relating to the liquid crystal display device of Embodiment 2-1, wherein (a) is a plan view showing the opening shape of the counter electrode, (b) is a plan view showing the simulation results of the distribution of liquid crystal molecule alignments in the display unit after a lapse of 2 msec after application of a voltage of 2 V, and (c) is a plan view showing the simulation results of the distribution of liquid crystal molecule alignments in the display unit after a lapse of 10 msec after application of a voltage of 2 V. In the opening 217 shown in FIG. 36(a), the angle θ formed by a line segment with the initial alignment azimuth 222 of the liquid crystal molecules 221 is set to be more than 0°. In the simulation results, a transmittance distribution chart is also described.

In the liquid crystal display device 200 having the opening 217 having the shape shown in FIG. 36(a), as shown in FIG. 36 (b), after application of a low voltage of 2 V, four liquid crystal domains 223 are formed in only 2 ms. Thereafter, the four liquid crystal domains 223 having uniform brightness are formed when 10 msec have elapsed after voltage application. As described above, the liquid crystal display device 200 of the present embodiment has high response characteristics even in a low voltage-applied state. The reason for this is considered as follows.

When a voltage is applied between the pixel electrode 212 and the counter electrode 214, the liquid crystal molecules 221 rotate so as to be perpendicular to or parallel to the contour of the opening 217. Accordingly, the liquid crystal molecules in the contour of the opening parallel to or perpendicular to the initial alignment azimuth of the liquid crystal molecules rotate under the effect of the surrounding liquid crystal molecules, so that the liquid crystal molecules cannot respond smoothly. On the other hand, in the inclined contour along the line segment inclined with respect to the initial alignment azimuth 222 of the liquid crystal molecules 221, in the voltage-applied state, the liquid crystal molecules 221 smoothly rotate toward the side where an angle formed by the inclined contour with the initial alignment azimuth 222 of the liquid crystal molecules 221 is an acute angle, so that the response speed can be increased even in the low voltage-applied state. The liquid crystal display device 200 of the present embodiment is particularly suitable for increasing the response speed from black display to gray display as an intermediate tone.

In a plan view, the angles θa, θb, θc, and θd are each preferably more than 0° and not more than 45°, more preferably not less than 2° and not more than 45°. When such an aspect is adopted, the rotation of the liquid crystal molecules 221 becomes smoother, and the response speed can be further increased even in the low voltage-applied state.

At least one of the upper end portion 218a and the lower end portion 218b of the opening 217 is preferably rounded. When at least one of the upper end portion 218a and the lower end portion 218b of the opening 217 is rounded, the alignment of the liquid crystal molecules 221 is fixed by the electric field in the oblique direction at this end portion, and the response speed can be further improved.

The upper end portion 218a and the lower end portion 218b of the opening 217 are preferably located on a straight line parallel to the initial alignment azimuth 222 of the liquid crystal molecules 221. When such an aspect is adopted, it is possible to increase the symmetry of the liquid crystal domains 223 generated in the voltage-applied state, and to improve the response speed. From the same viewpoint, the left end portion 218c and the right end portion 218d of the opening 217 are preferably located on a straight line orthogonal to the initial alignment azimuth 222 of the liquid crystal molecules 221.

Each opening 217 preferably has one first inclined contour 219a, one second inclined contour 219b, one third inclined contour 219c, and one fourth inclined contour 219d. Since the opening 217 thus configured does not include a complex shape, further higher definition can be achieved.

In the liquid crystal display device 200, the four liquid crystal domains 223 are formed in one opening 217 in the voltage-applied state as shown in FIG. 36(c), for example. A cross-shaped dark line exists at the center of the four liquid crystal domains 223, and it is considered that the liquid crystal molecules 221 which do not move serve as walls for generating a force in a direction opposite to the rotational direction of the four liquid crystal domains 223 to improve the response speed. In the present embodiment, it is preferable that the four liquid crystal domains 223 are formed in each opening 217 in the voltage-applied state (preferably a white voltage-applied state). When such an aspect is adopted, it is possible to further increase the response speed.

As described above, in the present specification, the liquid crystal domain means a region defined by a boundary where the liquid crystal molecules 221 do not rotate from the initial alignment azimuth 222 in the voltage-applied state. The boundary between the liquid crystal domains where the liquid crystal molecules 221 do not rotate from the initial alignment azimuth 222 in the voltage-applied state is also called a disclination. In the liquid crystal display device in a normally black mode, the disclination located in a region through which light can pass (light-transmissive region) is visually recognized as a dark line.

It is preferable that the four domains 223 are generated in four regions symmetrical with respect to the initial alignment azimuth 222 of the liquid crystal molecules 221 and an azimuth orthogonal to the initial alignment azimuth 222 of the liquid crystal molecules 221. The response speed can be further improved by increasing the symmetry of the four liquid crystal domains.

It is preferable that the first inclined contour 219a and the second inclined contour 219b are line-symmetric with respect to the initial alignment azimuth 222 of the liquid crystal molecules 221. In addition, it is preferable that the third inclined contour 219c and the fourth inclined contour 219d are line-symmetric with respect to the initial alignment azimuth 222 of the liquid crystal molecules 221. When such an aspect is adopted, the symmetry of the liquid crystal domains formed in the voltage-applied state increases, and the response speed can be further improved.

It is preferable that the first inclined contour 219a and the fourth inclined contour 219d are line-symmetric with respect to the initial alignment azimuth 222 of the liquid crystal molecules 221 and the second inclined contour 219b and the third inclined contour 219c are line-symmetric with respect to the initial alignment azimuth 222 of the liquid crystal molecules 221. When such an aspect is adopted, the symmetry of the liquid crystal domains 223 formed in the voltage-applied state increases, and the response speed can be further improved.

The first inclined contour 219a, the second inclined contour 219b, the third inclined contour 219c, and the fourth inclined contour 219d may each be linear or curved. In the latter case, for example, they may each have a triangular wave shape, a trapezoidal wave shape, a sine wave shape, a sawtooth wave shape, a rectangular wave shape, or the like.

When the inclined contour is linear, an angle formed by the inclined contour with the initial alignment azimuth 222 of the liquid crystal molecules 221 is equal to the angle formed by the line segment with the initial alignment azimuth 222 of the liquid crystal molecules 221. That is, when the first, second, third and fourth inclined contours 219a to 219d are linear, the angle formed by each of the first, second, third, and fourth inclined contours 219a to 219d with the initial alignment azimuth 222 of the liquid crystal molecules 221 is preferably more than 0° and not more than 45°, more preferably not less than 2° and not more than 45° in a plan view.

When the inclined contour is curved, examples of the shape of the inclined contour include a shape protruding inward with respect to the opening 217, a shape protruding outward with respect to the opening 217, and a shape in which a curve protruding inward with respect to the opening 217 and a curve protruding outward with respect to the opening 217 are combined. As compared with the shape in which the curve protruding inward with respect to the opening 217 and the curve protruding outward with respect to the opening 217 are combined, the shape protruding outward with respect to the opening 217 can further increase the response speed, and as compared with a shape in which the inclined contour protrudes outward, a shape in which the inclined contour protrudes inward can further increase the response speed.

The liquid crystal display device 200 has a plurality of display units arranged in a matrix. When one opening 217 is provided in each display unit, the angles θa, θb, θc, and θd are each preferably not less than 2° and less than 13°, more preferably not less than 2° and not more than 11.6° in a plan view. When such an aspect is adopted, it is possible to widen an opening region in the counter electrode 214 and to improve the transmittance. From the same viewpoint, when one opening 217 is provided in each display unit, it is preferable that the inclined contour is linear and the angle formed by the inclined contour with the initial alignment azimuth 222 of the liquid crystal molecules 221 is preferably not less than 2° and less than 13° (more preferably not less than 2° and not more than 11.6°) in a plan view.

When two openings 217 are provided in each display unit, the angles θa, θb, θc, and θd are each preferably not less than 2° and less than 45°, more preferably not less than 2° and not more than 35.6° in a plan view. When such an aspect is adopted, it is possible to widen an opening region in the counter electrode 214 and to improve the transmittance. From the same viewpoint, when two openings 217 are provided in each display unit, it is preferable that the inclined contour is linear and the angle formed by the inclined contour with the initial alignment azimuth 222 of the liquid crystal molecules 221 is preferably not less than 2° and less than 45° (more preferably not less than 2° and not more than 35.6°) in a plan view.

In the above description, the inclinations of the four line segments 119a to 119d and the four inclined contours 219a to 219d have been described with reference to the initial alignment azimuth 222 of the liquid crystal molecules 221. Here, as shown in FIG. 36, in the liquid crystal display device 200 of the present embodiment, the absorption axis of one of the first polarizing plate 210A and the second polarizing plate 230A as the pair of polarizing plates is parallel to the initial alignment azimuth 222 of the liquid crystal molecules 221. Accordingly, the inclinations of the four line segments 119a to 119d and the four inclined contours 219a to 219d can be described as follows with reference to the transmission axis of the polarizing plate.

That is, in a plan view, it is preferable that the first, second, third, and fourth line segments 119a to 119d are each inclined with respect to the transmission axis of each of the first polarizing plate 210A and the second polarizing plate 230A. When an angle formed by each of the first, second, third, and fourth line segments 119a to 119d with the transmission axis of one of the first polarizing plate 210A and the second polarizing plate 230A is preferably more than 0° and not more than 45°, more preferably not less than 2° and not more than 45° in a plan view. When such an aspect is adopted, the rotation of the liquid crystal molecules 221 becomes smoother, and the response speed can be further increased even in the low voltage-applied state. From the same viewpoint, it is preferable that the inclined contour is linear and the angle formed by the inclined contour with the transmission axis of one of the first polarizing plate 210A and the second polarizing plate 230A is preferably more than 0° and not more than 45° (more preferably not less than 2° and not more than 45°) in a plan view.

When one opening 217 is provided in each display unit, the angle formed by each of the first, second, third, and fourth line segments 119a to 119d with the transmission axis of one of the first polarizing plate 210A and the second polarizing plate 230A is preferably not less than 2° and less than 13°, more preferably not less than 2° and not more than 11.6° in a plan view. When such an aspect is adopted, it is possible to widen an opening region in the counter electrode 214 and to improve the transmittance. From the same viewpoint, when one opening 217 is provided in each display unit, it is preferable that the inclined contour is linear and the angle formed by the inclined contour with the transmission axis of one of the first polarizing plate 210A and the second polarizing plate 230A is preferably not less than 2° and less than 13° (more preferably not less than 2° and not more than 11.6°) in a plan view.

When two openings 217 are provided in each display unit, the angle formed by each of the first, second, third, and fourth line segments 119a to 119d with the transmission axis of one of the first polarizing plate 210A and the second polarizing plate 230A is preferably not less than 2° and less than 45°, more preferably not less than 2° and not more than 35.6°. When such an aspect is adopted, it is possible to widen an opening region in the counter electrode 214 and to improve the transmittance. From the same viewpoint, when two openings 217 are provided in each display unit, it is preferable that the inclined contour is linear and the angle formed by the inclined contour with the transmission axis of one of the first polarizing plate 210A and the second polarizing plate 230A is preferably not less than 2° and less than 45° (more preferably not less than 2° and not more than 35.6°) in a plan view.

The absorption axis (polarizing plate absorption axis) of one polarizing plate is orthogonal to the transmission axis (polarizing plate transmission axis). When the polarizing plates are arranged in the crossed Nicols, the absorption axis of one polarizing plate is parallel to the transmission axis of the other polarizing plate. That is, an angle formed by the line segment with the transmission axis of one of the pair of polarizing plates (the first polarizing plate 210A and the second polarizing plate 230A) is equal to an angle formed by the line segment with the absorption axis of the other polarizing plate.

Although the angles θa, θb, θc and θd may be different from each other, the angles θa and θb are preferably substantially equal to each other, the angles θc and θd are preferably substantially equal to each other, and from the viewpoint of viewing angle characteristics of the liquid crystal display device 200, the angles θa, θb, θc and θd are more preferably substantially equal to each other.

Figure 37:
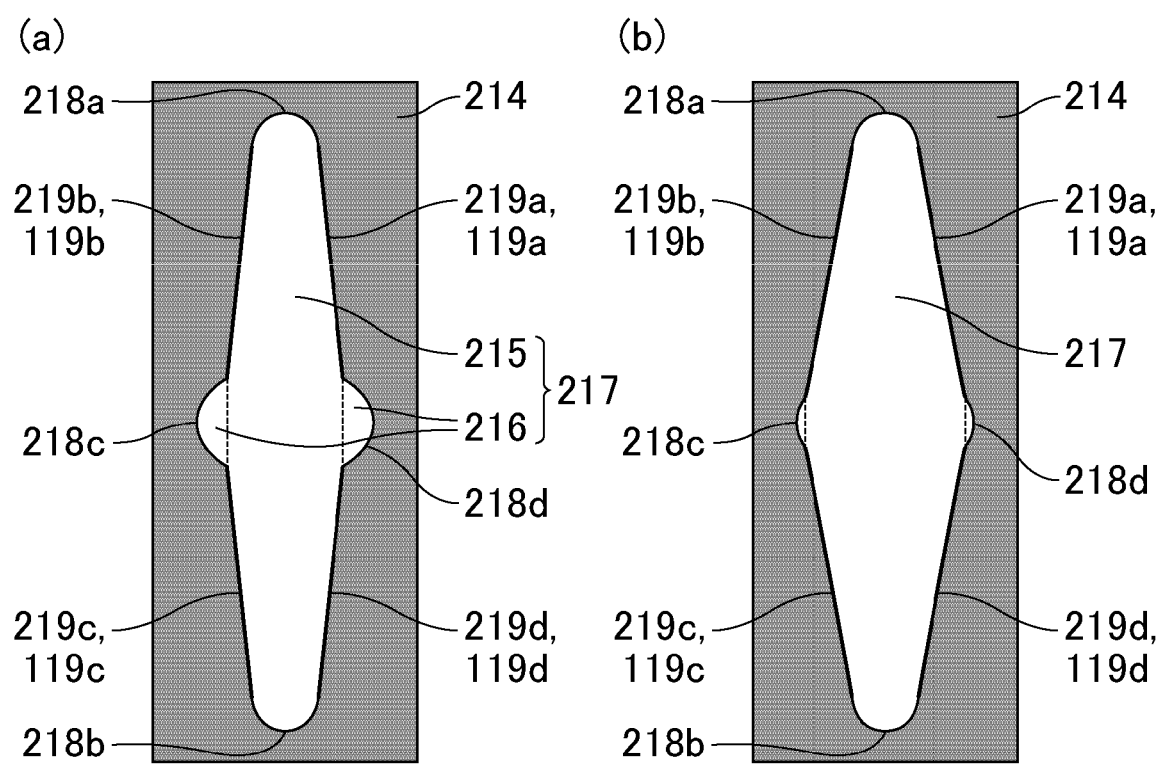
FIG. 37 is a schematic plan view of the counter electrode of the liquid crystal display device of Embodiment 2-1, wherein (a) is a schematic plan view showing Example 1 of the counter electrode, and (b) is a schematic plan view showing Example 2 of the counter electrode.

FIG. 37 is a schematic plan view of the counter electrode of the liquid crystal display device of Embodiment 2-1, wherein (a) is a schematic plan view showing Example 1 of the counter electrode, and (b) is a schematic plan view showing Example 2 of the counter electrode.

As shown in FIG. 37(a), the shape of the opening 217 of the counter electrode 214 in Example 1 may include a longitudinal-shaped portion 215 and a pair of protrusions 216 protruding to the opposite sides from the longitudinal-shaped portion 215, and the longitudinal-shaped portion 215 may include the first inclined contour 219a, the second inclined contour 219b, the third inclined contour 219c, and the fourth inclined contour 219d. It is preferable that the pair of protrusions 216 are provided at a portion (hereinafter referred to as the "intermediate portion") except for both end portions (the upper end portion 218a and the lower end portion 218b) in the longitudinal direction of the longitudinal-shaped portion 215 and located at positions corresponding to each other. The first to fourth inclined contours 219a to 219d are linear, and may be coincident with the first to fourth line segments 119a to 119d, respectively. Since the opening 217 thus configured does not include a complex shape, the opening 217 can be applied to high-definition pixels of not less than 800 ppi, for example, without any problem.

The longitudinal-shaped portion 215 is an opening portion formed in a longitudinal shape having a longitudinal length larger than the width in the lateral direction, and examples of the longitudinal shape include an ellipse; a shape similar to an ellipse such as an egg shape; a long polygon such as a quadrangle; a shape similar to a long polygon; and a shape in which at least one corner of a long polygon is rounded. Although both the end portions of the longitudinal-shaped portion 215 are not necessarily rounded, it is preferable that at least one of the end portions is rounded, and it is more preferable that both the end portions are rounded. When at least one end portion (the upper end portion 218a and/or the lower end portion 218b) of the longitudinal-shaped portion 215 is rounded, the alignment of the liquid crystal molecules 221 is fixed by the electric field in the oblique direction at this end portion, and the response speed can be further improved. In FIG. 37 (a), although the case is illustrated where the inclined contours 219a to 219d are linear and are coincident with the line segments 119a to 119d, the inclined contours 219a to 219d may protrude inward with respect to the opening 217 as in Example 2-14 to be described later or may protrude outward with respect to the opening 217 as in Example 2-15 to be described later, or may be a combination of curves protruding inward and outward with respect to the opening 217 as in Example 2-16 to be described later.

The protrusions 216 protrude to the opposite sides (outside, lateral direction) from the longitudinal-shaped portion 215, and are provided at opposite edge portions of an intermediate portion of the longitudinal-shaped portion 215. The protrusions 216 correspond to the left end portion 218c and the right end portion 218d. Each of the protrusions 216 may largely protrude from the longitudinal-shaped portion 215 or may only slightly protrude, and the size of each of the protrusions 216 is not limited. Each of the protrusions 216 only needs to protrude from the longitudinal-shaped portion 215, and its outer edge may be a circular-arc shape or an elliptical arc shape, may be curved, or may have irregularities. Further, each of the protrusions 216 may be shaped into a polygon such as a triangle or a trapezoid (however, a trapezoid whose longer base is adjacent to the longitudinal-shaped portion 215) or a shape in which at least one corner of such a polygon is rounded.

The pair of protrusions 216 are provided at positions corresponding to each other at the intermediate portion of the longitudinal-shaped portion 215, and although the pair of protrusions 216 may be provided at positions close to one end portion of the longitudinal-shaped portion 215, the pair of protrusions 216 are preferably provided at the center in the longitudinal direction of the longitudinal-shaped portion 215. By providing the pair of protrusions 216 at the center in the longitudinal direction of the longitudinal-shaped portion 215, it is possible to align and divide the liquid crystal molecules 221 into four substantially symmetrical regions in the voltage-applied state, so that the response speed can be further improved. The pair of protrusions 216 are preferably provided opposite to each other, preferably provided at substantially the same position in the longitudinal direction of the longitudinal-shaped portion 215, and preferably provided at positions symmetrical with respect to the longitudinal direction of the longitudinal-shaped portion 215.

As shown in FIG. 37(b), the shape of the opening 217 of the counter electrode 214 in Example 2 is a quadrangular shape having the upper end portion 218a, the lower end portion 218b, the left end portion 218c, and the right end portion 218d as apexes, and first to fourth sides of the quadrangular shape may include the first inclined contour 219a, the second inclined contour 219b, the third inclined contour 219c, and the fourth inclined contour 219d, respectively. Examples of the quadrangular shape include a rhombus shape; a shape similar to a rhombus shape; a shape in which two adjacent sides of a rhombus shape are longer than the remaining two adjacent sides (this shape is hereinafter also referred to as a modified rhombus); and a shape similar to the modified rhombus. The corners of the quadrangular shape, that is, the upper end portion 218a, the lower end portion 218b, the left end portion 218c, and the right end portion 218d may be rounded as shown in FIG. 37(b) or angular. However, it is preferable that at least one of the upper end portion 218a and the lower end portion 218b is rounded, and it is more preferable that the upper end portion 218a and the lower end portion 218b are rounded. When the upper end portion 218a and/or the lower end portion 218b are/is rounded, the alignment of the liquid crystal molecules 221 is fixed by the electric field in the oblique direction at this end portion, and the response speed can be further improved. The first to fourth inclined contours 219a to 219d are linear, and may be coincident with the first to fourth line segments 119a to 119d, respectively. Since the opening 217 thus configured does not include a complex shape, the opening 217 can be applied to high-definition pixels of not less than 800 ppi, for example, without any problem. In FIG. 37(b), although the case is illustrated where the inclined contours 219a to 219d are linear and are coincident with the line segments 119a to 119d, the inclined contours 219a to 219d may protrude inward with respect to the opening 217 as in Example 214 to be described later or may protrude outward with respect to the opening 217 as in Example 2-15 to be described later, or may be a combination of curves protruding inward and outward with respect to the opening 217 as in Example 2-16 to be described later.

Since the counter electrode 214 provides a common potential to the display units, the counter electrode 214 may be formed on almost the entire surface (excluding the openings for producing a fringe electric field) of the first substrate 210. The counter electrode 214 may be electrically connected to an external connecting terminal at the periphery (frame region) of the first substrate 210.

Figure 38:
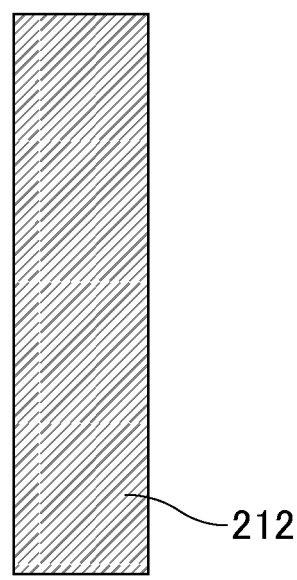
FIG. 38 is a schematic plan view of a pixel electrode in the liquid crystal display device of Embodiment 2-1.

FIG. 38 is a schematic plan view of a pixel electrode in the liquid crystal display device of Embodiment 2-1. As shown in FIG. 38, the pixel electrode 212 is a planer electrode with no opening.

Figure 39:
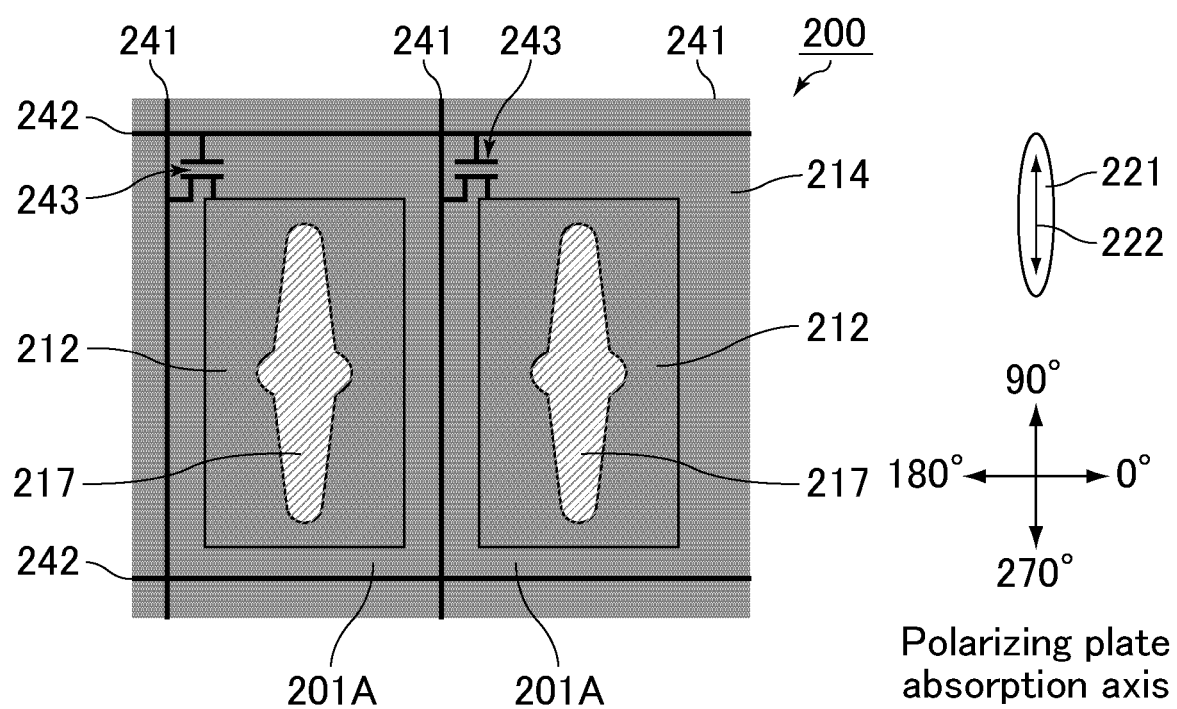
FIG. 39 is a schematic plan view of the liquid crystal display device of Embodiment 2-1.

FIG. 39 is a schematic plan view of the liquid crystal display device of Embodiment 2-1. As shown in FIG. 39, the liquid crystal display device 200 is an active matrix drive type and transmission type liquid crystal display device, and has a display region constituted of a plurality of pixels arranged in a matrix in row and column directions. In the present specification, the up-down direction in a plan view corresponds to one of the row direction and the column direction, and the right-left direction in a plan view corresponds to the other of the row direction and the column direction; however, generally, the up-down direction in a plan view corresponds to the column direction, and the right-left direction in a plan view corresponds to the row direction. Accordingly, the upper end portion 218a and the lower end portion 218b of the opening 217 are located on a straight line parallel to one of the row direction and the column direction, the left end portion 218c and the right end portion 218d of the opening 217 are located on a straight line parallel to the other of the row direction and the column direction, the upper end portion 218a and the lower end portion 218b of the opening 217 are usually located on a straight line parallel to the column direction, and the left end portion 218c and the right end portion 218d of the opening 217 are usually located on a straight line parallel to the row direction.

The pixel electrode 212 and the counter electrode 214 are stacked together via the insulating layer 213. As shown in FIG. 39, in a plan view, each pixel electrode 212 is positioned under the corresponding opening 217 in the counter electrode 214. Thus, a fringe electric field is generated around the openings 217 in the counter electrode 214 when a potential difference is generated between the pixel electrodes 212 and the counter electrode 214. As shown in FIG. 39, the openings 217 in the counter electrode 214 are preferably arranged in line in the row direction and/or the column direction in adjacent display units 201A. This arrangement can stabilize the alignment of the liquid crystal molecules 221 in the voltage-applied state.

As in the circuit shown in FIG. 39, the drain of a TFT 243 is electrically connected to the corresponding pixel electrode 212. To the gate of the TFT 243 is electrically connected a gate signal line 242 extending in the row direction, and to the source of the TFT 243 is electrically connected a source signal line 241 extending in the column direction. Thus, the switching on/off of the TFT 243 is controlled by scanning signals input to the gate signal line 242. When the TFT 243 is on, data signals (source voltage) input to the source signal line 241 are provided to the pixel electrode 212 through the TFT 243. In this way, in the voltage-applied state, the source voltage is applied to the lower layer pixel electrode 212 via the TFT 243, and the fringe electric field is generated between the counter electrode 214 formed in the upper layer via the insulating film 213 and the pixel electrode 212. The TFT 243 preferably has a channel formed from indium-gallium-zinc-oxygen (IGZO), which is an oxide semiconductor.

The insulating layer 213 between the pixel electrode 212 and the counter electrode 214 may be, for example, an organic film (dielectric constant ε=3 to 4), an inorganic film (dielectric constant ε=5 to 7) such as a silicon nitride (SiNx) film or a silicon oxide (SiO$_2$) film, or a multilayer film containing any of these films.

The liquid crystal molecules 221 may have negative or positive value for the anisotropy of dielectric constant (Δε) defined by the formula below. In other words, the liquid crystal molecules 221 may have negative anisotropy of dielectric constant or positive anisotropy of dielectric constant. Since liquid crystal materials containing liquid crystal molecules 221 having negative anisotropy of dielectric constant tend to have a relatively high viscosity, liquid crystal materials containing liquid crystal molecules 221 having positive anisotropy of dielectric constant are advantageous from the standpoint of achieving a high-speed response. However, even with a liquid crystal material having negative anisotropy of dielectric constant, if this liquid crystal material has a viscosity as low as that of a liquid crystal material having positive anisotropy of dielectric constant, the same effect can be obtained by means of the present embodiment. The initial alignment azimuth 222 of the liquid crystal molecules 221 having negative anisotropy of dielectric constant is a direction of rotation by 90 degrees with respect to the liquid crystal molecules 221 having positive anisotropy of dielectric constant.

Δε=(dielectric constant in the major axis direction)−(dielectric constant in the minor axis direction)

When the opening 217 includes the longitudinal-shaped portion 215 and the pair of protrusions 216 protruding to the opposite sides from the longitudinal-shaped portion 215, and when the liquid crystal molecules 221 have positive anisotropy of dielectric constant, from the viewpoint of high speed and high transmittance, it is preferable that the initial alignment azimuth 222 of the liquid crystal molecules 221 is parallel to the longitudinal direction of the longitudinal-shaped portion 215 in a plan view. When the opening 217 includes the longitudinal-shaped portion 215 and the pair of protrusions 216 protruding to the opposite sides from the longitudinal-shaped portion 215, and when the liquid crystal molecules 221 have negative anisotropy of dielectric constant, from the viewpoint of high speed and high transmittance, it is preferable that the initial alignment azimuth 222 of the liquid crystal molecules 221 is orthogonal to the longitudinal direction of the longitudinal-shaped portion 215 in a plan view. On the other hand, in a plan view, when the initial alignment azimuth 222 of the liquid crystal molecules 221 having positive anisotropy of dielectric constant is made orthogonal to the longitudinal direction of the longitudinal-shaped portion 215, or when the initial alignment azimuth 222 of the liquid crystal molecules 221 having negative anisotropy of dielectric constant is made parallel to the longitudinal direction of the longitudinal-shaped portion 215, although the effect of speeding up is provided, the effect is not large, and the transmittance is extremely lowered.

When the opening 217 has a quadrangular shape having the upper end portion 218a, the lower end portion 218b, the left end portion 218c, and the right end portion 218d as apexes, and when the liquid crystal molecules 221 have positive anisotropy of dielectric constant, from the viewpoint of high speed and high transmittance, it is preferable that the initial alignment azimuth 222 of the liquid crystal molecules 221 is parallel to the straight line connecting the upper end portion 218a and the lower end portion 218b in a plan view. When the opening 217 has a quadrangular shape having the upper end portion 218a, the lower end portion 218b, the left end portion 218c, and the right end portion 218d as apexes, and when the liquid crystal molecules 221 have negative anisotropy of dielectric constant, from the viewpoint of high speed and high transmittance, it is preferable that the initial alignment azimuth 222 of the liquid crystal molecules 221 is parallel to the azimuth orthogonal to the straight line connecting the upper end portion 218a and the lower end portion 218b in a plan view. On the other hand, in a plan view, when the initial alignment azimuth 222 of the liquid crystal molecules 221 having positive anisotropy of dielectric constant is made parallel to the azimuth orthogonal to a straight line connecting the upper end portion 218a and the lower end portion 218b, or when the initial alignment azimuth 222 of the liquid crystal molecules 221 having negative anisotropy of dielectric constant is made parallel to the straight line connecting the upper end portion 218a and the lower end portion 218b, although the effect of speeding up is provided, the effect is not large, and the transmittance is extremely lowered.

That is, even if the opening 217 has any shape, from the viewpoint of high speed and high transmittance, when the liquid crystal molecules 221 have positive anisotropy of dielectric constant, it is preferable that the upper end portion 218a and the lower end portion 218b are located on the straight line parallel to the initial alignment azimuth 222 of the liquid crystal molecules 221, and when the liquid crystal molecules 221 have negative anisotropy of dielectric constant, it is preferable that the upper end portion 218a and the lower end portion 218b are located on the straight line orthogonal to the initial alignment azimuth 222 of the liquid crystal molecules 221.

The initial alignment azimuth 222 of the liquid crystal molecules 221 directed as shown in FIG. 39 (along the longitudinal direction of the display unit 201A) can be achieved by subjecting an alignment film to photo alignment treatment or rubbing treatment in the lateral direction of the display unit 201A. The initial alignment azimuth 222 of the liquid crystal molecules 221 parallel to the lateral direction of the display unit 201A can be achieved by subjecting the alignment film to photo alignment treatment or rubbing treatment in the longitudinal direction of the display unit 201A.

In a plan view, the initial alignment azimuth 222 of the liquid crystal molecules 221 is parallel to the absorption axis of one of the first polarizing plate 210A and the second polarizing plate 230A, and orthogonal to the absorption axis of the other. The control mode of the liquid crystal display device 200 is thus what is called a normally black mode, which provides black display when the liquid crystal layer 220 is in the no-voltage-applied state.

The second substrate 230 is not limited and may be a color filter substrate typically used in the field of liquid crystal display devices. The overcoat layer 233 smooths the liquid crystal layer 220 side surface of the second substrate 230, and may be an organic film (dielectric constant ε=3 to 4).

The first substrate 210 and the second substrate 230 are typically bonded to each other with a sealing material formed to surround the periphery of the liquid crystal layer 220. The first substrate 210, the second substrate 230, and the sealing material hold the liquid crystal layer 220 in a predetermined region. Examples of the sealing material include epoxy resins containing an inorganic or organic filler and a curing agent.

The liquid crystal display device 200 may contain components such as a backlight; an optical film (e.g., retardation film, viewing angle-increasing film, and luminance-increasing film); external circuits (e.g., a tape-carrier package (TCP) and a printed circuit board (PCB)); and a bezel (frame), in addition to the first substrate 210, liquid crystal layer 220, and second substrate 230. These components are not limited, and may be those usually used in the field of liquid crystal display devices. The description of these components is thus omitted.

The operation of the liquid crystal display device 200 will be described hereinbelow.

In the liquid crystal layer 220 in the no-voltage-applied state, no electric field is generated, and the liquid crystal molecules 221 are aligned parallel to the first substrate 210. Since the alignment azimuth of the liquid crystal molecules 221 is parallel to the absorption axis of one of the first polarizing plate 210A and the second polarizing plate 230A, and since the first polarizing plate and the second polarizing plate are disposed in the crossed Nicols, the liquid crystal display device in the no-voltage-applied state does not transmit light and provides black display.

FIG. 34 shows the voltage-applied state. In the liquid crystal layer 220 in the voltage-applied state, an electric field according to the level of the voltage between the pixel electrode 212 and the counter electrode 214 is generated. Specifically, since the opening 217 is formed in the counter electrode 214 positioned closer to the liquid crystal layer 220 than the pixel electrode 212 is, a fringe electric field is generated around the opening 217. The liquid crystal molecules 221 rotate under the effect of the electric field and change their alignment azimuth from the alignment azimuth in the no-voltage-applied state to the alignment azimuth in the voltage-applied state. The liquid crystal display device in the voltage-applied state thus transmits light to provide white display.

Each and every detail described for Embodiment 2-1 of the present invention shall be applied to all the aspects of the present invention.

The present invention is described below in more detail based on examples and comparative examples according to Embodiment 2-1. The examples, however, are not intended to limit the scope of the present invention.

Example 2-1

A liquid crystal display device of Example 2-1 is a specific example of the liquid crystal display device 200 of Embodiment 2-1 described above, and has the following configuration.

Figure 40:
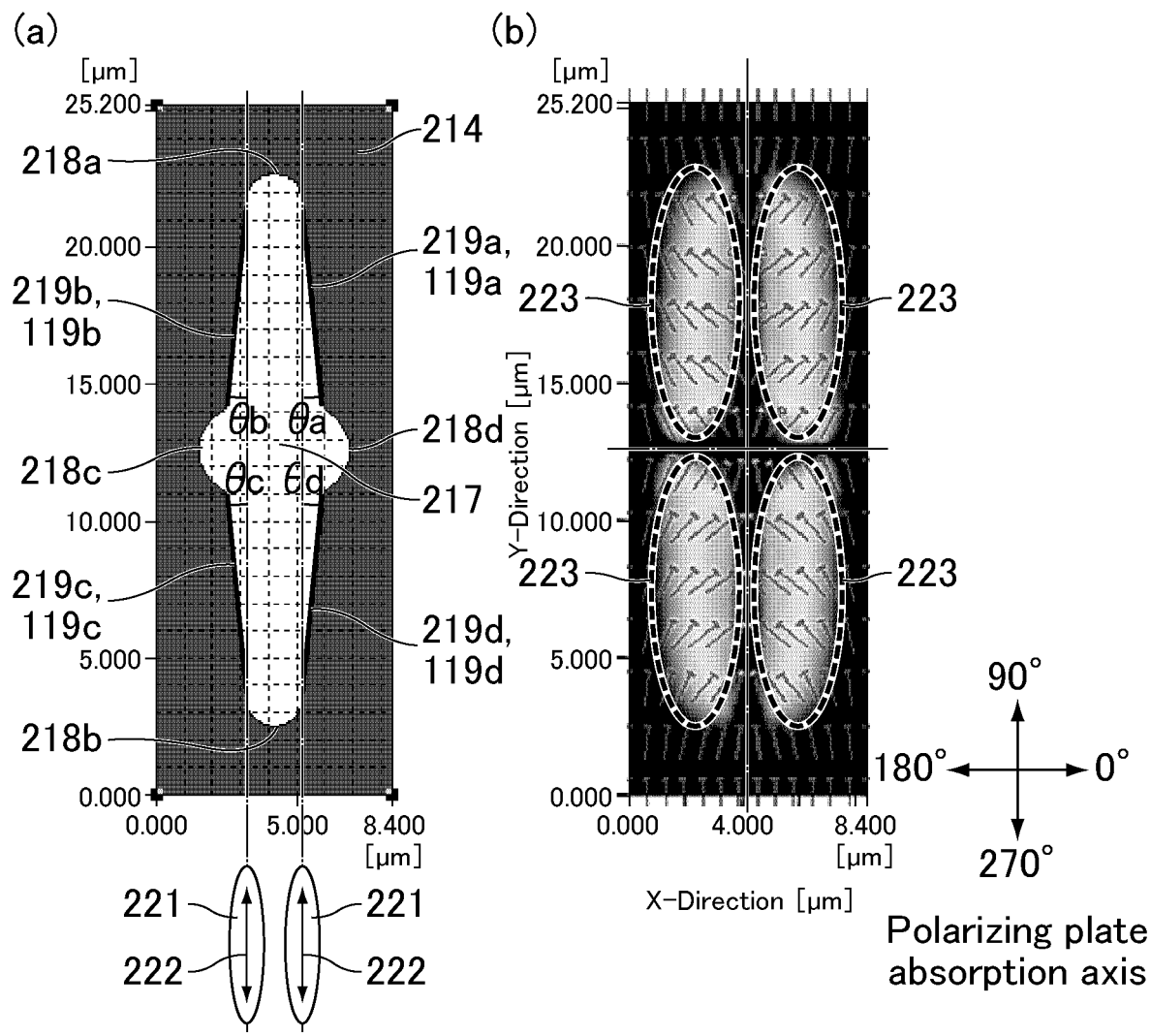
FIG. 40 is a view relating to a liquid crystal display device of Example 2-1, wherein (a) is a plan view showing an opening shape of the counter electrode, and (b) is a plan view showing the simulation results of distribution of liquid crystal molecule alignments in the display unit in the voltage-applied state.

FIG. 40 is a view relating to the liquid crystal display device of Example 2-1, wherein (a) is a plan view showing an opening shape of a counter electrode, and (b) is a plan view showing the simulation results of distribution of liquid crystal molecule alignments in the display unit in the voltage-applied state.

For the counter electrode in the liquid crystal display device, an opening obtained by die-cutting the counter electrode into the shape of FIG. 40(a) was set. As shown in FIG. 40(a), in Example 2-1, the four line segments and the four inclined contours of the opening coincide with each other. In Example 2-1, one opening was provided in the counter electrode in each display unit.

For the liquid crystal layer, the refractive index anisotropy ($\Delta n$) was set to 0.11, the in-plane retardation (Re) was set to 310 nm, and the viscosity was set to 68 cps. In addition, the anisotropy of dielectric constant ($\Delta \varepsilon$) of the liquid crystal molecules was set to 6.9 (positive type), and the angle θ formed by each of the four inclined line segments (four inclined contours) with the initial alignment azimuth of the liquid crystal molecules was set to 6°. Moreover, a pair of polarizing plates were arranged on a pair of substrates on the opposite sides from the liquid crystal layer, the pair of substrates holding the liquid crystal layer in between. The pair of polarizing plates were arranged in the crossed Nicols so that the polarizing plate absorption axes were parallel and perpendicular to the initial alignment azimuth of liquid crystal molecules, and were set to what is called a normally black mode which provided black display when the liquid crystal layer was in the no-voltage-applied state. That is, an angle formed by the four inclined line segments with one of the polarizing plate transmission axes is coincident with the angle θ formed by the four inclined line segments with the initial alignment azimuth of the liquid crystal molecules.

With reference to FIG. 40(b), the distribution of alignments of the liquid crystal molecules in the liquid crystal display device of Example 2-1 in the voltage-applied state (4.5 V application) will be described.

In the display unit in Example 2-1, when a voltage was applied between the pixel electrode and the counter electrode, the liquid crystal molecules quickly rotated to change the alignment state. As shown by four regions surrounded by ellipses in FIG. 40(b), it is found that the liquid crystal molecules are aligned and divided into four liquid crystal domains in the voltage-applied state, and the four liquid crystal domains are formed in the directions of 45 degrees, 135 degrees, 225 degrees, and 315 degrees from the center of the opening. As described above, since the liquid crystal molecules in the directions of 45 degrees, 135 degrees, 225 degrees, and 315 degrees from the center of the opening also rotate sufficiently from the beginning of voltage application, high transmittance can be achieved.

Figure 41:
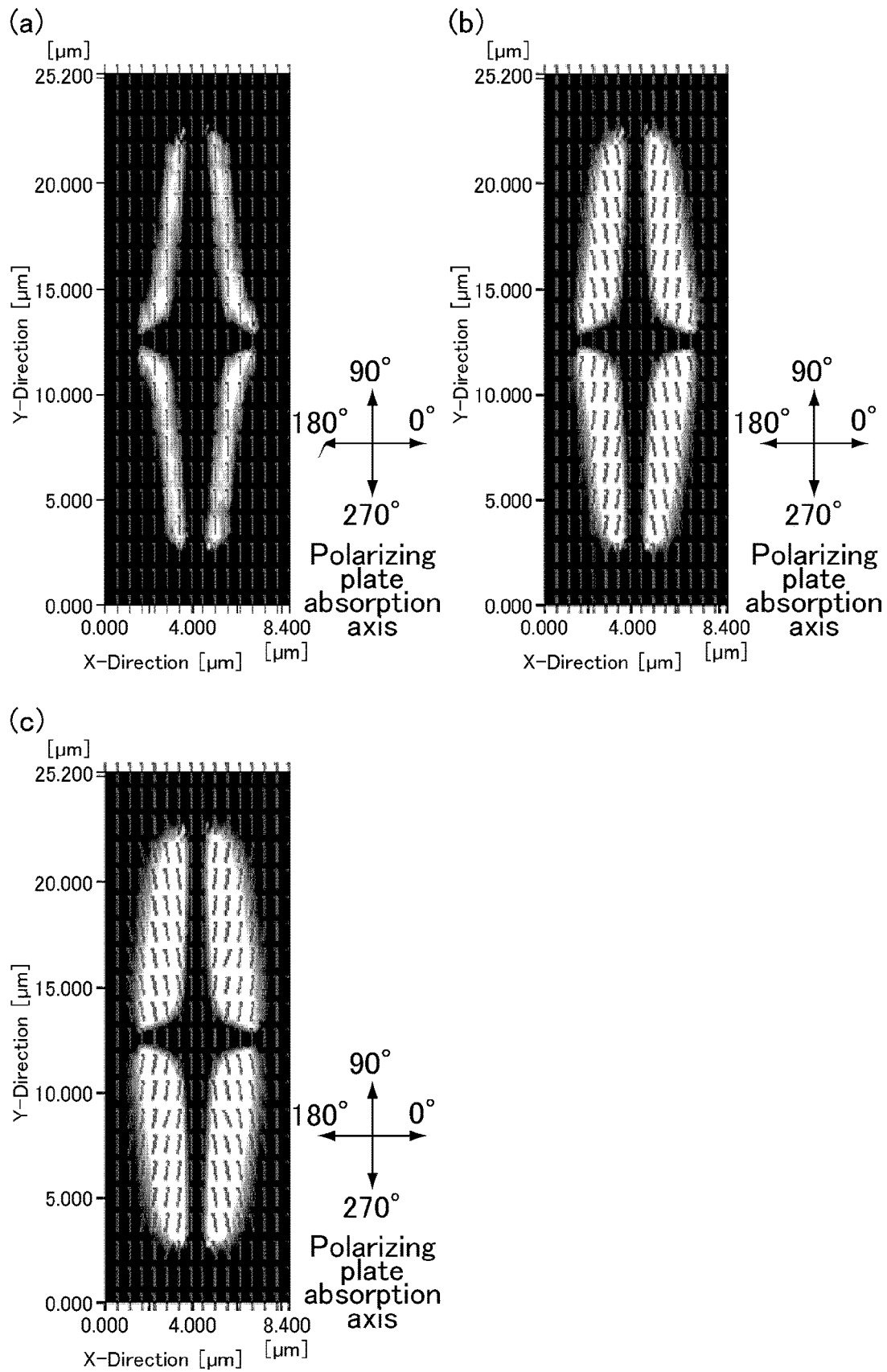
FIG. 41 is a plan view showing the simulation results of distribution of liquid crystal molecule alignments in the display unit when a voltage of 2 V is applied to the liquid crystal display device of Example 2-1, wherein (a) shows the simulation results after a lapse of 2 msec after the voltage application, (b) shows the simulation results after a lapse of 6 msec after the voltage application, and (c) shows the simulation results after a lapse of 10 msec after the voltage application.
Figure 46:
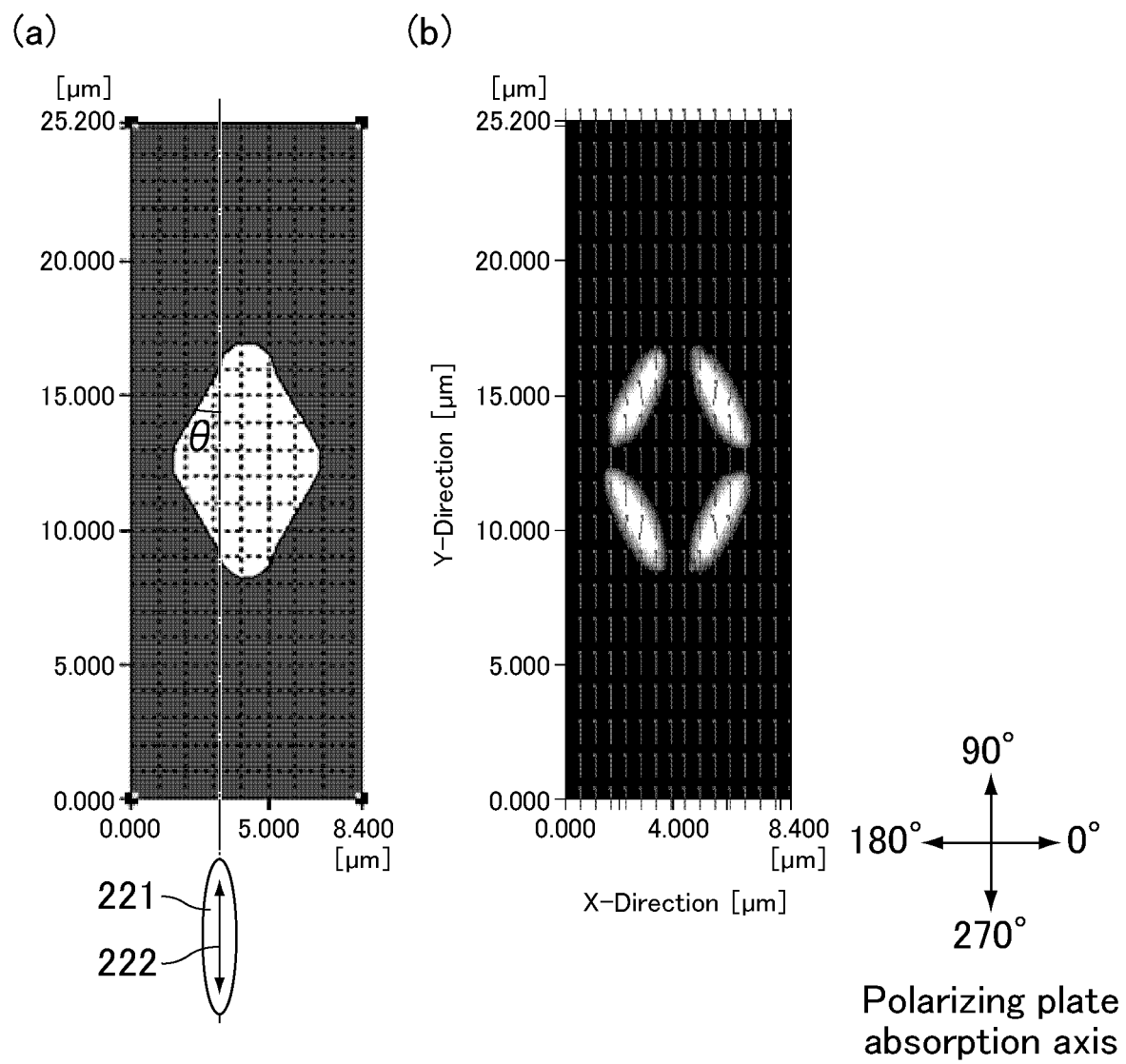
FIG. 46 is a view relating to a liquid crystal display device of Example 2-6, wherein (a) is a plan view showing an opening shape of a counter electrode, and (b) is a plan view showing the simulation results of the distribution of liquid crystal molecule alignments in the display unit after a lapse of 2 msec after application of a voltage of 2 V.

FIG. 41 is a plan view showing the simulation results of distribution of liquid crystal molecule alignments in the display unit when a voltage of 2 V is applied to the liquid crystal display device of Example 2-1, wherein (a) shows the simulation results after a lapse of 2 msec after the voltage application, (b) shows the simulation results after a lapse of 6 msec after the voltage application, and (c) shows the simulation results after a lapse of 10 msec after the voltage application.

As shown in FIG. 41, in the liquid crystal display device of Example 2-1, the liquid crystal molecules smoothly move along the inclined contour of the opening of the counter electrode. Therefore, when the applied voltage was as low as 2.0 V, four liquid crystal domains were formed in only 2 msec after voltage application. As described above, the liquid crystal display device of Example 2-1 had high response characteristics even in the low voltage-applied state.

Comparative Example 2-1

Figure 60:
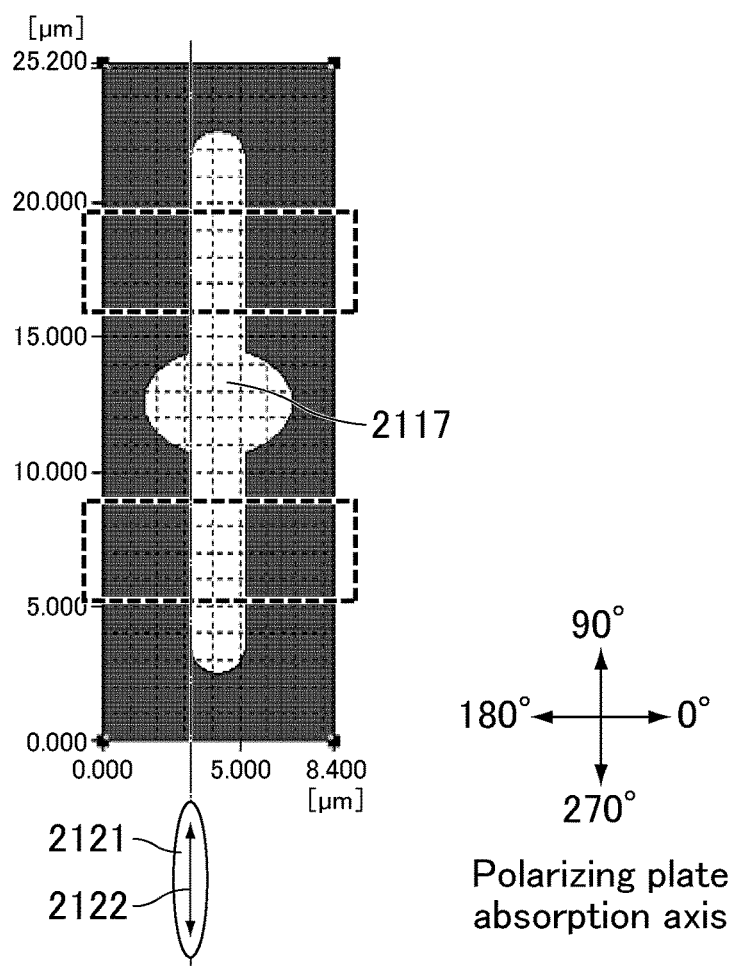
FIG. 60 is a plan view showing an opening shape of a counter electrode of a liquid crystal display device of Comparative Example 2-1.

FIG. 60 is a plan view showing an opening shape of a counter electrode of a liquid crystal display device of Comparative Example 2-1. The liquid crystal display device of Comparative Example 2-1 has the same configuration as the liquid crystal display device of Example 2-1, except that the shape of the opening provided in the counter electrode was changed to that in FIG. 60, that is, the angle θ formed by four contours of the opening with the initial alignment azimuth of the liquid crystal molecules was 0°. That is, an angle formed by four line segments of the opening with the transmission axis of one of the polarizing plates is 0°.

Figure 61:
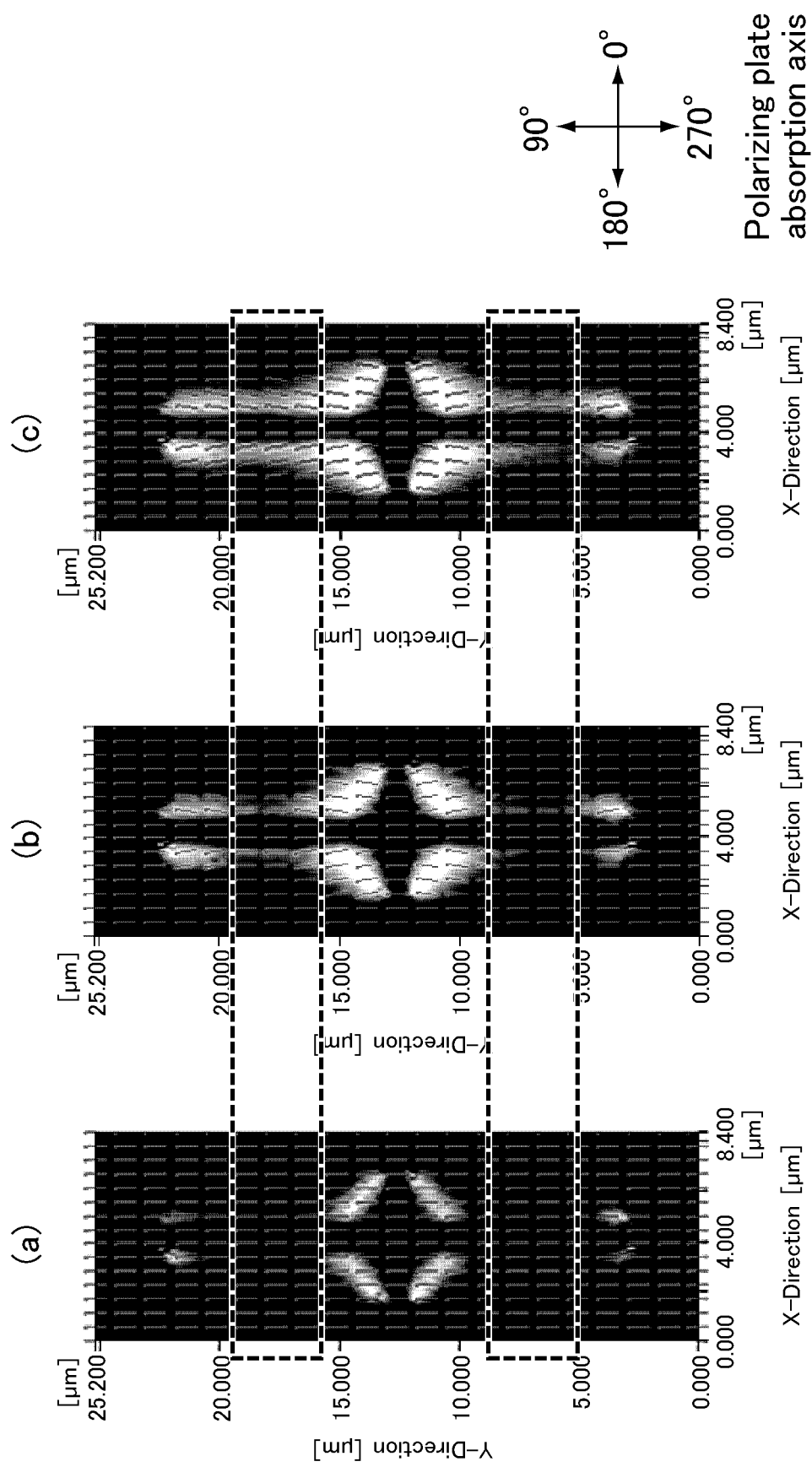
FIG. 61 is a plan view showing the simulation results of distribution of liquid crystal molecule alignments in the display unit when a voltage of 2 V is applied to the liquid crystal display device of Comparative Example 2-1, wherein (a) shows the simulation results after a lapse of 2 msec after the voltage application, (b) shows the simulation results after a lapse of 6 msec after the voltage application, and (c) shows the simulation results after a lapse of 10 msec after the voltage application.

FIG. 61 is a plan view showing the simulation results of distribution of liquid crystal molecule alignments in the display unit when a voltage of 2 V is applied to the liquid crystal display device of Comparative Example 2-1, wherein (a) shows the simulation results after a lapse of 2 msec after the voltage application, (b) shows the simulation results after a lapse of 6 msec after the voltage application, and (c) shows the simulation results after a lapse of 10 msec after the voltage application.

Comparison of Example 2-1 and Comparative Example 2-1

As shown in FIG. 41, in the liquid crystal display device of Example 2-1 in which the angle θ was 6°, transmittance distribution after a lapse of 2 msec after voltage application was substantially uniform; however, in the liquid crystal display device of Comparative Example 2-1 in which the angle θ as 0°, the transmittance distribution after a lapse of 2 msec after voltage application was not uniform. In the liquid crystal display device of Comparative Example 2-1, it can be seen that a portion surrounded by the dotted line in FIG. 61 becomes bright 6 msec later after voltage application. The reason for this is considered as follows.

Since positive type liquid crystal molecules are aligned perpendicular to the contour of the opening shape of the counter electrode, it is considered that the liquid crystal display device of Example 2-1 having a contour inclined with respect to the initial alignment azimuth of liquid crystal molecules rotates more smoothly than Comparative Example 1, and high response characteristics can be obtained even in the low voltage-applied state.

Examples 2-2 to 2-8

Liquid crystal display devices of Examples 2-2 to 2-8 have the same configuration as the liquid crystal display device of Example 2-1 except that the shape of the opening in the counter electrode was changed to that of FIG. 42(*a*) to FIG. 48(*a*). FIGS. 42 to 48 are views relating respectively to the liquid crystal display devices of Examples 2-2 to 2-8, wherein (a) is a plan view showing the opening shape of the counter electrode, and (b) is a plan view showing the simulation results of the distribution of liquid crystal molecule alignments in the display unit after a lapse of 2 msec after application of a voltage of 2 V. As shown in FIG. 42(*a*) to FIG. 48(*a*), also in Examples 2-2 to 2-8, the four line segments and the four inclined contours of the opening are coincident with each other.

In the liquid crystal display devices of Examples 2-2 to 2-8, the four inclined line segments (four inclined contours) were each inclined with respect to the initial alignment azimuth of the liquid crystal molecules at 2°, 10°, 13°, 20°, 30°, 45°, and 50°. That is, the angle θ formed by the four inclined line segments (four inclined contours) with the initial alignment azimuth of the liquid crystal molecules was set to 2° in Example 2-2, 10° in Example 2-3, 13° in Example 2-4, 20° in Example 2-5, 30° in Example 2-6, 45° in Example 2-7, and 50° in Example 2-8. The opening shapes of the counter electrodes in Examples 2-1 to 2-8 and Comparative Example 2-1 are fixed in terms of the length in the lateral direction of the opening and are varied in terms of the angle θ. In other words, the four inclined line segments (four inclined contours) are each inclined at 2°, 10°, 13°, 20°, 30°, 45°, and 50° with respect to the transmission axis of one of the polarizing plates.

Similarly to the liquid crystal display device of Example 2-1, also in the liquid crystal display devices of Examples 2-2 to 2-8, the transmittance distribution after a lapse of 2 msec after voltage application was substantially uniform. From these results, it is understood that in the liquid crystal display devices of Examples 2-2 to 2-8, as compared with the liquid crystal display device of Comparative Example 2-1, the liquid crystal molecules uniformly and smoothly move along the contour of the opening shape of the counter electrode.

Comparison of Examples 2-1 to 2-8 and Comparative Example 2-1

For the liquid crystal display devices of Examples 2-1 to 2-8 and Comparative Example 2-1, the rise response was simulated under the following evaluation conditions. In addition, the transmittance at the time of applying a voltage of 4.5 V was determined. The obtained results are shown in Table 2 below.

(Evaluation Condition of Rise Response)

With the maximum transmittance obtainable by optical modulation being defined as a transmittance ratio of 100%, the rise response time upon application of 2 V is defined as time required for the transmittance ratio to change from 10% to 90%. The rise response characteristics correspond to switching from black display to white display.

TABLE 2

|  | Comparative Example 2-1 | Example 2-2 | Example 2-1 | Example 2-3 | Example 2-4 | Example 2-5 | Example 2-6 | Example 2-7 | Example 2-8 |
| --- | --- | --- | --- | --- | --- | --- | --- | --- | --- |
| Angle θ | 0° | 2° | 6° | 10° | 13° | 20° | 30° | 45° | 50° |
| Rise response time upon application of 2.0 V [msec] | 13.0 | 11.3 | 10.5 | 10.0 | 9.5 | 8.5 | 7.7 | 7.0 | 7.0 |
| Transmittance upon application of 4.5 V | 14.3% | 14.8% | 15.6% | 15.9% | 12.9% | 8.5% | 5.7% | 3.8% | 3.4% |

When a voltage of 2.0 V was applied, the rise response time in the liquid crystal display device of Comparative Example 2-1 was 13.0 msec. On the other hand, when 2.0 V was applied, the rise response time in the liquid crystal display devices of Examples 2-1 to 2-8 was 7.0 msec to 11.3 msec, and for the liquid crystal display device of Comparative Example 2-1, the liquid crystal display devices of Examples 2-1 to 2-8 had high response characteristics.

From the results of the rise response time in the liquid crystal display devices of Examples 2-1 to 2-8, it has been found that as the angle θ formed by the inclined line segment (inclined contour) with the initial alignment azimuth of the liquid crystal molecules increases, the rise response time becomes shorter, and the response speed is improved. This is thought to be because the liquid crystal molecules having positive anisotropy of dielectric constant are aligned perpendicularly to the contour of the opening of the counter electrode for the above-mentioned reason, so that as the angle θ increases, the liquid crystal molecules rotate more smoothly even at low voltage, and the response speed is improved.

In a range of the angle θ from 45° to 50°, no change is observed in the rise response time, while the transmittance upon application of 4.5 V decreases from 3.8% to 3.4%. Thus, the angle θ is preferably not less than 2° and not more than 45°.

Figure 49:
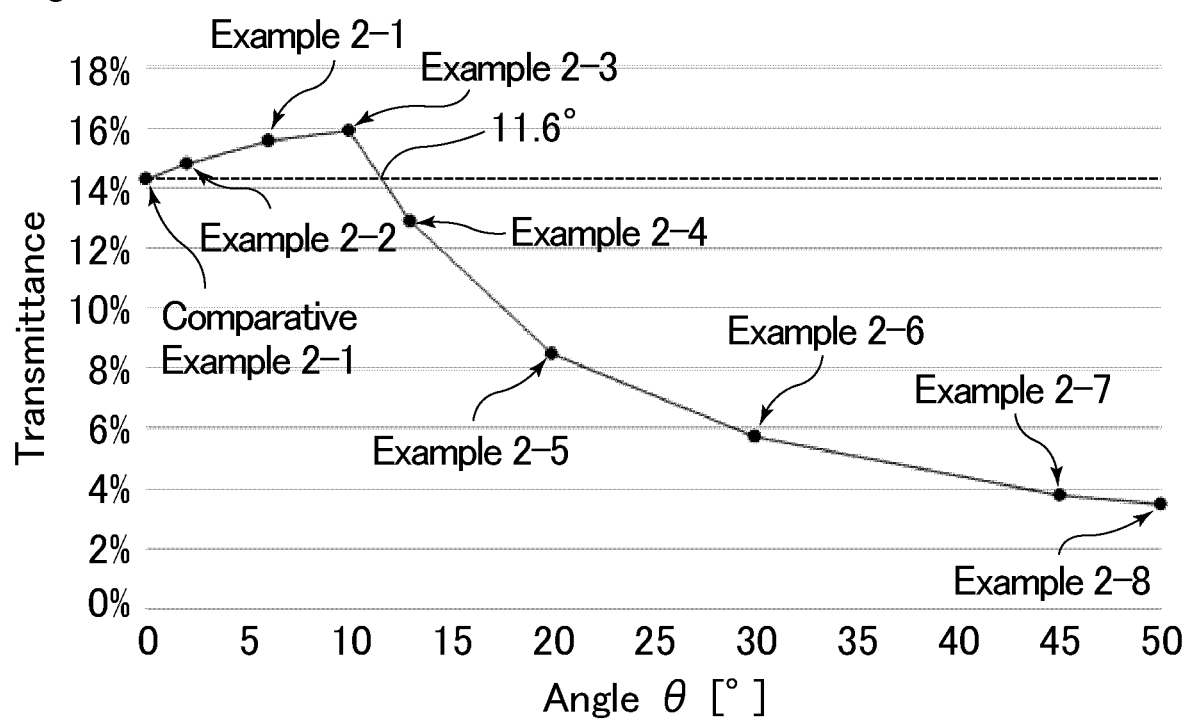
FIG. 49 is a graph showing a relationship between an angle θ, formed by four inclined line segments (four inclined contours) with an initial alignment azimuth of liquid crystal molecules, and transmittance.

Next, the relationship between the angle θ and the transmittance will be discussed. FIG. 49 is a graph showing the relationship between the angle θ, formed by four inclined line segments (four inclined contours) with an initial alignment azimuth of liquid crystal molecules, and the transmittance. As shown in FIG. 49, the transmittance gently improves as the angle θ increases from 0° to 10°, but when the angle θ is more than 10°, the transmittance decreases.

This is thought to be because the longitudinal length of the opening shape of the counter electrode can be maintained until the angle θ reaches 10°, the area of the opening shape increases, and the number of moving liquid crystal molecules increases, so that the transmittance is improved. On the other hand, when the angle θ is more than 10°, it is considered that the opening shape is shortened in the longitudinal direction, the range in which the liquid crystal molecules move is narrowed, and the transmittance is reduced.

It is understood from FIG. 49 that the range of the angle θ in the liquid crystal display device capable of obtaining the transmittance equal to or higher than that of the liquid crystal display device of Comparative Example 2-1 is not less than 2° and not more than 11.6°. From the above relationship, the angle θ in the case of providing one opening in each display unit is preferably not less than 2° and not more than 45°, more preferably not less than 2° and less than 13°, still more preferably not less than 2° and not more than 11.6°. When such an aspect is adopted, excellent response characteristics can be obtained even at low voltage.

Examples 2-9 to 2-13 and Comparative Example 2-2

In Examples 2-1 to 2-8 and Comparative Example 2-1, one opening was provided in each display unit; however, in Examples 2-9 to 2-13 and Comparative Example 2-2, it has been considered that two openings are provided in each display unit.

Liquid crystal display devices of Examples 2-9 to 2-13 and Comparative Example 2-2 have the same configuration as the liquid crystal display device of Example 2-1 except that the shape of the opening in the counter electrode was changed to that of FIG. 50(a) to FIG. 54(a) and FIG. 62. FIGS. 50 to 54 and 62 are views relating respectively to the liquid crystal display devices of Examples 2-9 to 2-13 and Comparative Example 2-2, wherein (a) is a plan view showing the opening shape of the counter electrode, and (b) is a plan view showing the simulation results of the distribution of liquid crystal molecule alignments in the display unit after a lapse of 2 msec after application of a voltage of 2 V. As shown in FIG. 50(a) to FIG. 54(a), also in Examples 2-9 to 2-13, the four line segments and the four inclined contours of the opening are coincident with each other.

In the liquid crystal display devices of Examples 2-9 to 2-13, the four inclined line segments (four inclined contours) were each inclined with respect to the initial alignment azimuth of the liquid crystal molecules at 10°, 2°, 25°, 30°, and 45°. That is, the angle θ formed by the four inclined line segments (four inclined contours) with the initial alignment azimuth of the liquid crystal molecules was set to 10° in Example 2-9, 2° in Example 2-10, 25° in Example 2-11, 30° in Example 2-12, and 45° in Example 2-13. In the liquid crystal display device of Comparative Example 2-2, the angle θ formed by four contours of the opening with the initial alignment azimuth of the liquid crystal molecules was set to 0°. The intervals between the openings in Examples 2-9 to 2-13 and Comparative Example 2-2 were set so as to be acceptable in terms of the process of forming two openings in the counter electrode. In addition, the longitudinal length of the opening was set as an upper limit value acceptable in terms of the process, the length in the lateral direction was fixed, and the angle θ was varied.

Similarly to the liquid crystal display device of Example 2-1, also in the liquid crystal display devices of Examples 2-9 to 2-13, the transmittance distribution after a lapse of 2 msec after voltage application was substantially uniform. On the other hand, in the liquid crystal display device of Comparative Example 2-2, the transmittance distribution after a lapse of 2 msec after voltage application was not uniform. This is thought to be because in the liquid crystal display devices of Examples 2-9 to 2-13 each having an opening having the line segment inclined with respect to the initial alignment azimuth of the liquid crystal molecules, the liquid crystal molecules uniformly and smoothly moved as compared with the liquid crystal display device of Comparative Example 2-2.

Comparison of Examples 2-9 to 2-13 and Comparative Example 2-2

For the liquid crystal display devices of Examples 2-9 to 2-13 and Comparative Example 2-2, the rise response upon application of 2 V was evaluated similarly to Example 2-1, for example. The obtained results are shown in Table 3 below.

TABLE 3

|  | Comparative Example 2-2 | Example 2-10 | Example 2-9 | Example 2-11 | Example 2-12 | Example 2-13 |
| --- | --- | --- | --- | --- | --- | --- |
| Angle θ | 0° | 2° | 10° | 25° | 30° | 45° |
| Rise response time upon application of 2.0 V [msec] | 8.4 | 7.8 | 7.6 | 7.5 | 7.2 | 6.2 |

From the above Table 3, it has been found that even when two openings are provided in each display unit, as the angle θ increases, the rise response time becomes shorter, and the response speed is improved. This is thought to be because the liquid crystal molecules having positive anisotropy of dielectric constant are aligned perpendicularly to the contour of the opening of the counter electrode for the above-mentioned reason, so that as the angle θ increases, the liquid crystal molecules rotate more smoothly even at low voltage, and the response speed is improved.

Figure 55:
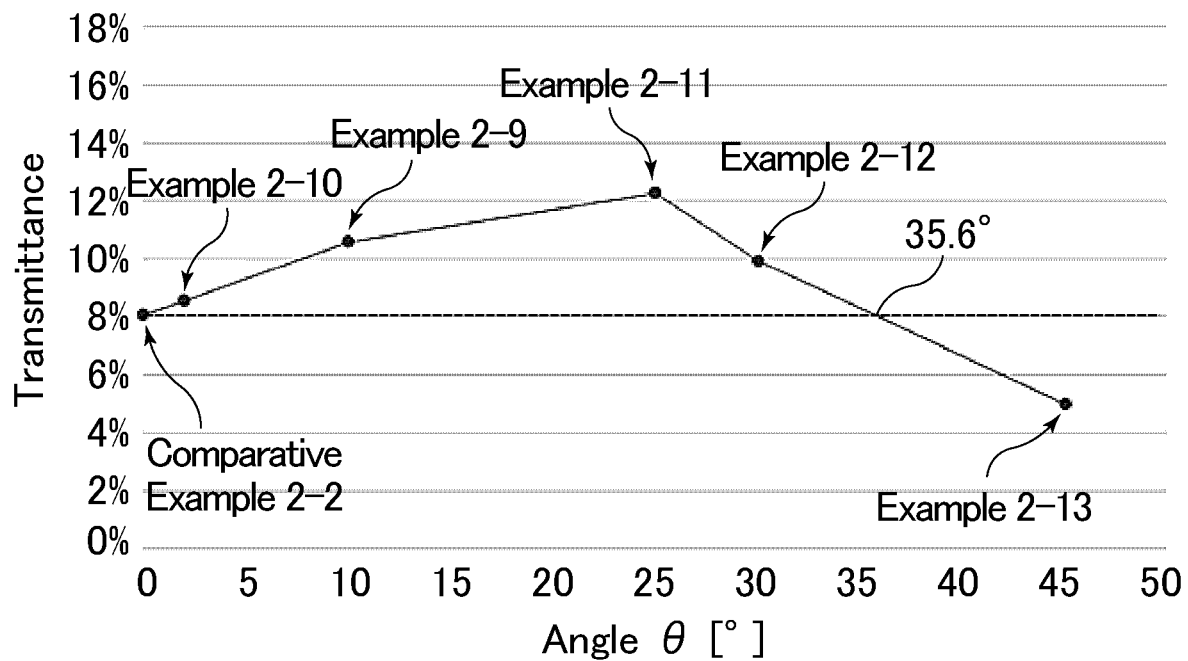
FIG. 55 is a graph showing a relationship between the angle θ, formed by four inclined line segments (four inclined contours) with an initial alignment azimuth of liquid crystal molecules, and the transmittance.
Figure 59:
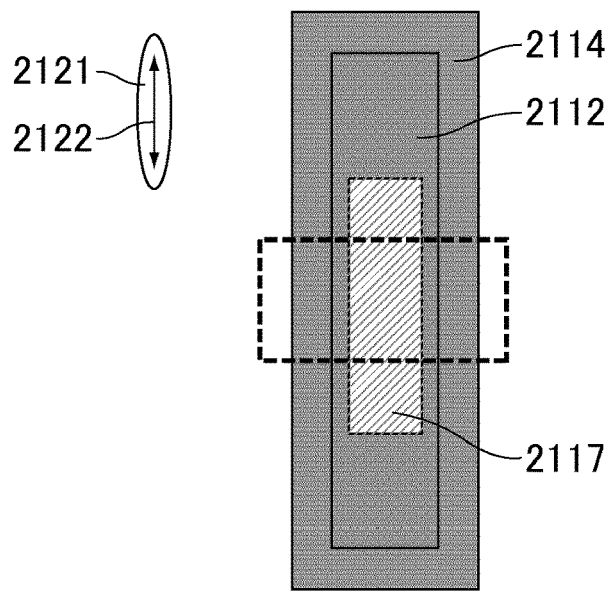
FIG. 59 is a schematic plan view of a counter electrode in another FFS mode liquid crystal display device studied by the present inventors.

Next, the relationship between the angle θ and the transmittance will be discussed. FIG. 55 is a graph showing a relationship between the angle θ, formed by four inclined line segments (inclined contours) with the initial alignment azimuth of the liquid crystal molecules, and the transmittance. As shown in FIG. 55, the transmittance gently improves as the angle θ increases from 0° to 25°, but when the angle θ is more than 25°, the transmittance decreases.

This is thought to be because the longitudinal length of the opening shape of the counter electrode can be maintained until the angle θ reaches 25°, the area of the opening shape increases, and the number of moving liquid crystal molecules increases, so that the transmittance is improved. On the other hand, when the angle θ is more than 25°, it is considered that the opening shape is shortened in the longitudinal direction, the range in which the liquid crystal molecules move is narrowed, and the transmittance is reduced.

It is understood from FIG. 55 that the range of the angle θ in the liquid crystal display device capable of obtaining the transmittance equal to or higher than that of the liquid crystal display device of Comparative Example 2-2 is not less than 2° and not more than 35.6°. From the above relationship, the angle θ in the case of providing two openings in each display unit is preferably not less than 2° and not more than 45°, more preferably not less than 2° and less than 45°, still more preferably not less than 2° and not more than 35.6°. When such an aspect is adopted, excellent response characteristics can be obtained even at low voltage.

Examples 2-14 to 2-16

In Examples 2-1 to 2-13, the inclined contour of the opening was linear; however, in Examples 2-14 to 2-16, it has been considered that the inclined contour of the opening was curved.

Liquid crystal display devices of Examples 2-14 to 2-16 have the same configuration as the liquid crystal display device of Example 2-1 except that the shape of the opening in the counter electrode was changed to that of FIG. 56(a) to FIG. 58(a). FIGS. 56 to 58 are views relating respectively to the liquid crystal display devices of Examples 2-14 to 2-16, wherein (a) is a plan view showing the opening shape of the counter electrode, and (b) is a plan view showing the simulation results of the distribution of liquid crystal molecule alignments in the display unit after a lapse of 2 msec after application of a voltage of 2 V. As shown in FIG. 56(a) to FIG. 58(a), in Examples 2-14 to 2-16, the four inclined contours of the opening follow the four line segments but are not coincident with the four line segments.

As shown in FIG. 56(a), the shape of the opening in Example 2-14 is obtained by protruding the inclined contour of the opening in Example 2-1 inward with respect to the opening. As shown in FIG. 57(a), the shape of the opening in Example 2-15 is obtained by protruding the inclined contour of the opening in Example 2-1 outward with respect to the opening. As shown in FIG. 58(a), the shape of the opening in Example 2-16 is a combination of curves in which the inclined contour of the opening in Example 2-1 is protruded inward and outward with respect to the opening (one which meanders so as to protrude inward and outward with respect to the opening).

Comparison of Examples 2-14 to 2-16 and Comparative Example 2-1

For the liquid crystal display devices of Examples 2-14 to 2-16, the rise response upon application of 2 V was evaluated similarly to Example 2-1, for example. In addition, the transmittance at the time of applying a voltage of 4.5 V was determined. The obtained results are shown in Table 4 below.

TABLE 4

|  | Example 2-14 | Example 2-15 | Example 2-16 | Comparative Example 2-1 |
| --- | --- | --- | --- | --- |
| Rise response time upon application of 2.0 V [msec] | 10.2 | 11.9 | 12.1 | 13.0 |
| Transmittance upon application of 4.5 V | 15.3% | 15.8% | 15.5% | 14.3% |

In the liquid crystal display devices of Examples 2-14 to 2-16, as compared with the liquid crystal display device of Comparative Example 2-1, the rise response time in the voltage-applied state of 2.0 V and the transmittance in the voltage-applied state of 4.5 V are improved. In addition, it can be seen that the rise response time in the voltage-applied state of 2.0 V is excellent in the order of Example 2-14, Example 2-15, and Example 2-16.

From the simulation results shown in FIG. 56(b) to FIG. 58(b), it is understood that in the order of Example 2-14, Example 2-15, and Example 2-16, the liquid crystal molecules uniformly move along the inclined contour of the opening of the counter electrode. That is, when comparing Examples 2-14 to 2-16, it is understood that the liquid crystal molecules in Example 2-14 move most uniformly. The reason for this is considered as follows. That is, it is considered that in the vicinity of an inflection point of a curve, liquid crystal molecules having different rotational directions exist, and the liquid crystal molecules obstruct rotations each other, so that as the number of inflection points in the opening shape becomes small, the movement (rotation) of the liquid crystal molecules becomes uniform. As shown in FIG. 57(b) and FIG. 58(b), in the simulation results of Examples 2-15 and 2-16, more than four liquid crystal domains are formed; however, if a high voltage (for example, 4.5 V, white voltage) is applied, four liquid crystal domains are formed.

From the above results, when the inclined contour of the opening is curved, the inclined contour is preferably a combination of a curve protruding inward with respect to the opening and a curve protruding outward with respect to the opening, more preferably a curve protruding outward with respect to the opening, and still more preferably a curve protruding inward with respect to the opening.

Embodiment 3-1

Figure 63:
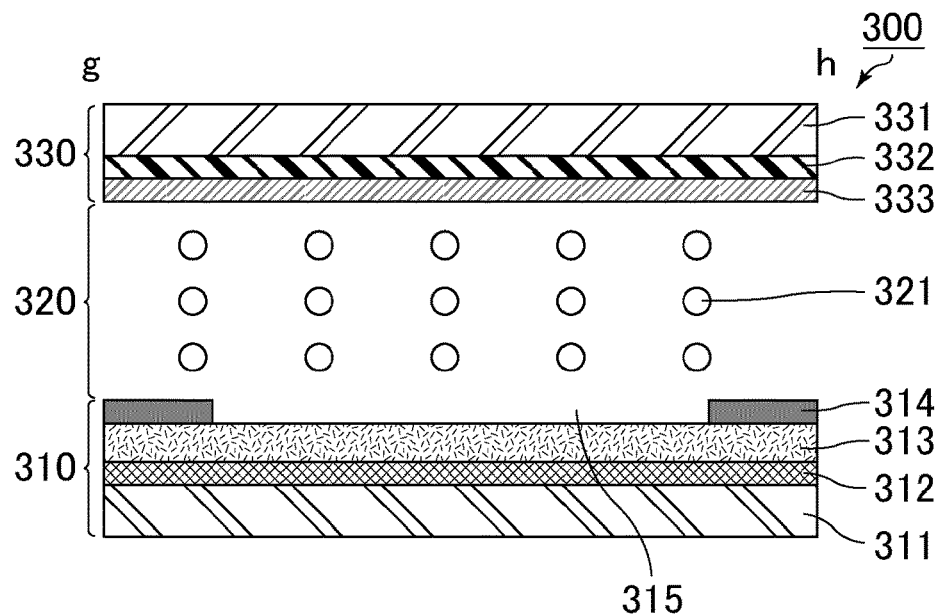
FIG. 63 is a schematic cross-sectional view of a liquid crystal display device of Embodiment 3-1 in a no-voltage-applied state.

With reference to FIGS. 63 to 68, a liquid crystal display device of Embodiment 3-1 will be described below. According to the present embodiment, in particular, it is possible to provide a liquid crystal display device capable of stabilizing the alignment of liquid crystal molecules even under a high voltage-applied state and achieving high definition. FIG. 63 is a schematic cross-sectional view of the liquid crystal display device of Embodiment 3-1 in a no-voltage-applied state. FIG. 63 shows a cross section taken along the line g-h in FIG. 64.

As shown in FIG. 63, a liquid crystal display device 300 of Embodiment 3-1 includes a first substrate 310, a liquid crystal layer 320 containing liquid crystal molecules 321, and a second substrate 330, in the given order. The first substrate 310 is an array substrate and has a stacked structure including, in order toward the liquid crystal layer 320, a first polarizer (not shown), an insulating substrate (e.g., glass substrate) 311, a pixel electrode (first electrode) 312, an insulating layer (insulating film) 313, and a counter electrode (second electrode) 314, and an opening 315 is formed in the counter electrode 314. The second substrate 330 is a color filter substrate and has a stacked structure including, in order toward the liquid crystal layer 320, a second polarizer (not shown), an insulating substrate (e.g., glass substrate) 331, a color filter 332, and an overcoat layer 333. The first polarizer and the second polarizer are both absorptive polarizers and disposed in the crossed Nicols with their absorption axes perpendicular to each other.

In the no-voltage-applied state, where no voltage is applied between the pixel electrode (first electrode) 312 and the counter electrode (second electrode) 314 (this state is hereinafter also simply referred to as the "no-voltage-applied state"), the alignment of the liquid crystal molecules 321 is controlled parallel to the first substrate 310. As described above, the "parallel" herein includes not only being completely parallel, but also a range that can be equated with being parallel (substantially parallel) in the art. The pre-tilt angle (angle of tilt in the no-voltage-applied state) of the liquid crystal molecules 321 is preferably less than 3°, more preferably less than 1° relative to the surface of the first substrate 310, and it is still more preferable to set the pre-tilt angle to 0° by using a photo-alignment film. As described above, in this specification, the alignment azimuth of the liquid crystal molecules 321 in the no-voltage-applied state is also referred to as the initial alignment azimuth of the liquid crystal molecules 321. The alignment azimuth of the liquid crystal molecules 321 means the orientations of the major axes of the liquid crystal molecules 321.

In the voltage-applied state, where a voltage is applied between the pixel electrode (first electrode) 312 and the counter electrode (second electrode) 314 (this state is hereinafter also simply referred to as the "voltage-applied state"), the alignment of the liquid crystal molecules 321 is controlled by the stacked structure of the first substrate 310 including the pixel electrode 312, the insulating layer 313, and the counter electrode 314. The pixel electrode 312 is an electrode formed in each display unit. The counter electrode 314 is common to a plurality of display units.

As described above, the "display unit" is a region corresponding to one pixel electrode 312. The display unit may be one called "pixel" in the technical field of liquid crystal display devices, or may be one called "sub-pixel" or "dot" in the cases where one pixel is divided for driving. Examples of the alignment of the display units (sub pixels) in the cases where one pixel is divided for driving include a three color stripe arrangement including, for example, red, green and blue, a three color mosaic arrangement or delta arrangement including, for example, red, green and blue, a four color stripe arrangement including, for example, red, green, blue and yellow, and a squared pattern. When the three color stripe arrangement is used, the aspect ratio of the display unit is 3:1; when the four color stripe arrangement is used, the aspect ratio of the display unit is 4:1; and when the three color mosaic arrangement, three color delta arrangement, or four colored squared pattern is used, the aspect ratio of the display unit is 1:1. On the other hand, the aspect ratio of the pixel is usually 1:1 regardless of whether or not the pixel is divided for driving. The shape and number of the openings 315 can be adjusted according to the shape of the display unit. When the display unit has a longitudinal shape (for example, a parallelogram or a rectangle) as in the case where the three color stripe arrangement or four color stripe arrangement is employed, and when the opening 315 has a longitudinal shape, it is preferable that the longitudinal direction of the display unit (for example, a direction of a long side of a parallelogram or a rectangular shape) is coincident with the longitudinal direction of the opening 315, or the angle formed by both of them is not more than 45°.

As described above, the voltage-applied state means a state where the liquid crystal molecules 321 rotate under the effect of the electric field and a voltage equal to or higher than a minimum voltage (threshold voltage) necessary for changing the alignment azimuth is applied, and may be a state where a voltage at which white display is performed (white voltage) is applied.

The pixel electrode 312 is a planer electrode with no opening. The pixel electrode 312 and the counter electrode 314 are stacked together via the insulating layer 313, and each pixel electrode 312 is positioned under the corresponding opening 315 provided in the counter electrode 314. Thus, a fringe electric field is generated around the openings 315 in the counter electrode 314 when a potential difference is generated between the pixel electrodes 312 and the counter electrode 314.

Since the counter electrode 314 provides a common potential to the display units, the counter electrode 314 may be formed on almost the entire surface (excluding the openings for producing a fringe electric field) of the first substrate 310. The counter electrode 314 may be electrically connected to an external connecting terminal at the periphery (frame region) of the first substrate 310.

The insulating layer 313 between the pixel electrode 312 and the counter electrode 314 may be, for example, an organic film (dielectric constant ε=3 to 4), an inorganic film (dielectric constant ε=5 to 7) such as a silicon nitride (SiNx) film or a silicon oxide (SiO$_2$) film, or a multilayer film containing any of these films.

The liquid crystal molecules 321 have positive anisotropy of dielectric constant. Since liquid crystal materials containing liquid crystal molecules having negative anisotropy of dielectric constant tend to have a relatively high viscosity, in the present embodiment, the liquid crystal molecules 321 having positive anisotropy of dielectric constant are used from the standpoint of improving the response speed. The liquid crystal molecules having negative anisotropy of dielectric constant are less susceptible to the effect of a vertical attracting electric field of the fringe electric field as compared with the liquid crystal molecules 321 having positive anisotropy of dielectric constant, and the alignment is unlikely to collapse. Therefore, in the case of using liquid crystal molecules having negative anisotropy of dielectric constant, it is considered that the numerical range in the condition of the planar shape of the opening 315, which will be described later, slightly deviates. The anisotropy of dielectric constant (Δε) is defined by the following formula.

Δε=(dielectric constant in the major axis direction)−(dielectric constant in the minor axis direction)

The anisotropy of dielectric constant (Δε) of the liquid crystal molecules 321 may be not less than 1 and not more than 10, and the viscosity of the liquid crystal layer 20 at 20° C. may be not less than 50 cps and not more than 90 cps. The refractive index anisotropy (Δn) of the liquid crystal layer 320 may be not less than 0.09 and not more than 0.15, and the in-plane retardation (Re) of the liquid crystal layer 320 may be not less than 280 nm and not more than 340 nm.

The second substrate 330 is not limited and may be a color filter substrate typically used in the field of liquid crystal display devices. A color array of the color filter 332 is not particularly limited, and may be, for example, a stripe arrangement including red, green and blue. The overcoat layer 333 smooths the liquid crystal layer 320 side surface of the second substrate 330, and may be an organic film (dielectric constant ε=3 to 4).

The first substrate 310 and the second substrate 330 are typically bonded to each other with a sealing material formed to surround the periphery of the liquid crystal layer 320. The first substrate 310, the second substrate 330, and the sealing material hold the liquid crystal layer 320 in a predetermined region. Examples of the sealing material include epoxy resins containing an inorganic or organic filler and a curing agent.

The liquid crystal display device 300 may contain components such as a backlight; an optical film (e.g., retardation film, viewing angle-increasing film, and luminance-increasing film); external circuits (e.g., a tape-carrier package (TCP) and a printed circuit board (PCB)); and a bezel (frame), in addition to the first substrate 310, liquid crystal layer 320, and second substrate 330. These components are not limited, and may be those usually used in the field of liquid crystal display devices. The description of these components is thus omitted.

The alignment mode of the liquid crystal display device 300 is a fringe field switching (FFS) mode.

Although not shown in FIG. 63, a horizontal alignment film is typically disposed on the liquid crystal layer 320 side surface of the first substrate 310 and/or the second substrate 330. The horizontal alignment film acts to align the liquid crystal molecules 321 near the film parallel to the film surface. In addition, the horizontal alignment film can adjust the orientations of the major axes of the liquid crystal molecules 321 aligned parallel to the first substrate 310 to a specific in-plane azimuth. The horizontal alignment film preferably has been subjected to alignment treatment such as photo-alignment treatment or rubbing treatment. The horizontal alignment film may be made of an inorganic material or an organic material.

The positions of the counter electrode 314 and the pixel electrode 312 may be switched. Specifically, although in the stacked structure shown in FIG. 63 the counter electrode 314 is adjacent to the liquid crystal layer 320 via a horizontal alignment film (not shown), the pixel electrode 312 may be adjacent to the liquid crystal layer 320 via a horizontal alignment film (not shown). In such a case, the opening 315 is formed in the pixel electrode 312 instead of the counter electrode 314.

Figure 64:
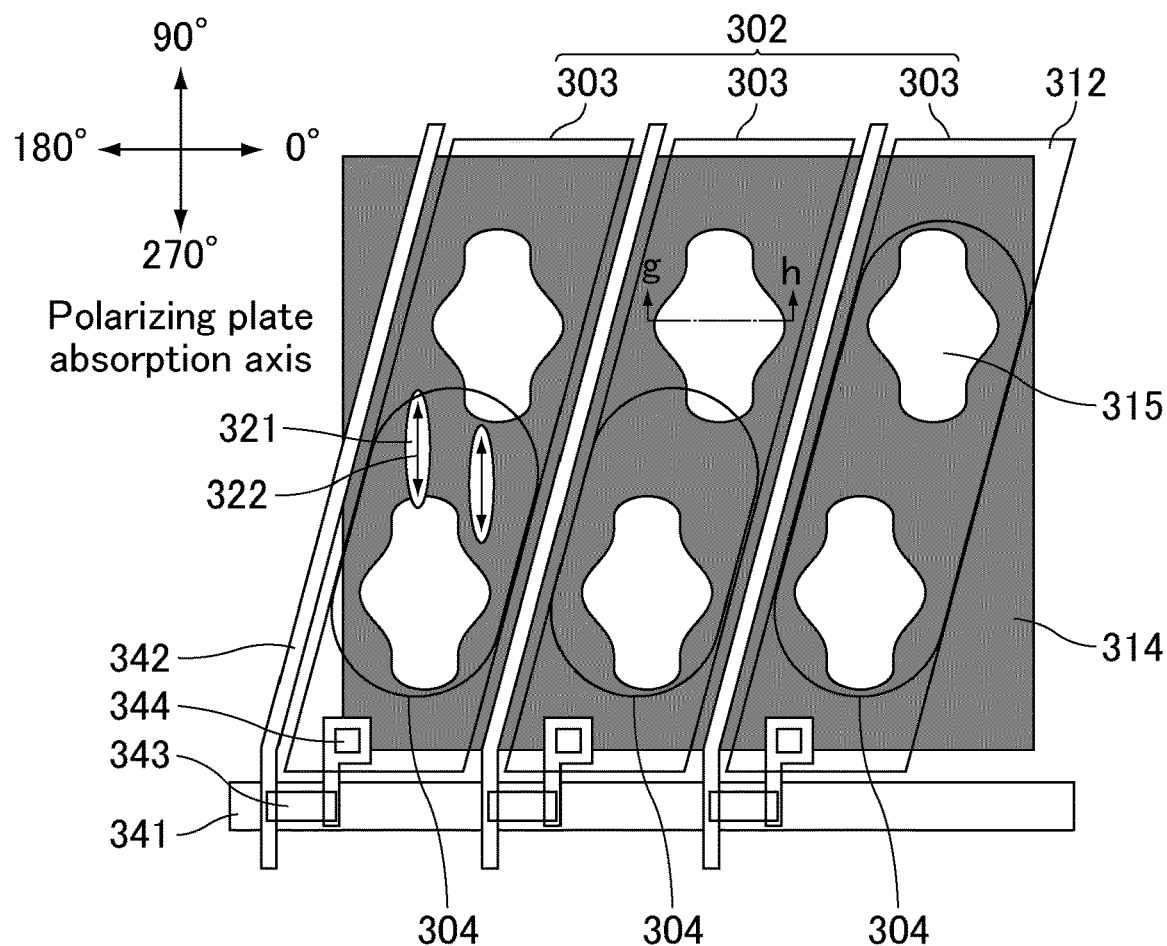
FIG. 64 is a schematic plan view of the liquid crystal display device of Embodiment 3-1.

FIG. 64 is a schematic plan view of the liquid crystal display device of Embodiment 3-1. As shown in FIG. 64, the liquid crystal display device 300 is an active matrix drive type and transmission type liquid crystal display device, and has a display region constituted of a plurality of pixels 302 arranged in a matrix in row and column directions.

In a plan view, each of the openings 315 is formed so as to overlap with the corresponding pixel electrode 312, and its planar shape is a shape satisfying a specific condition to be described later. Although the opening 315 in the present embodiment entirely overlaps with the pixel electrode 312, only a portion thereof may overlap with the pixel electrode 312. An opening 304 of the black matrix is located on the opening 315. The black matrix is also called a black mask.

These openings 315 are used for generating a fringe electric field (oblique electric field). The opening 315 is preferably formed in each display unit 303 (sub-pixel in FIG. 64), and preferably formed in all the display units 303. Although the planar shape of each of the display units 303 in the present embodiment is a parallelogram, the planar shape of each of the display units 303 is not particularly limited, and examples thereof include a rectangular shape, a square shape, and a V shape. One pixel 302 may be constituted from a plurality of display units 303 (for example, three display units, that is, red, green, and blue display units), and in the present embodiment, one pixel 302 is constituted from the three display units 303.

In a plan view, the initial alignment azimuth 322 of the liquid crystal molecules 321 is parallel to the polarization axis of one of the first polarizer and the second polarizer, and perpendicular to the polarization axis of the other. The control mode of the liquid crystal display device 300 is thus what is called a normally black mode, which provides black display when the liquid crystal layer 320 is in the no-voltage-applied state.

As shown in FIG. 64, the drain of a TFT 343 is electrically connected to the corresponding pixel electrode 312 via a contact hole 344. To the gate of the TFT 343 is electrically connected a gate signal line (scanning line) 341, and to the source of the TFT 343 is electrically connected a source signal line (signal line) 342. Thus, the switching on/off of the TFT 343 is controlled by scanning signals input to the gate signal line 341. When the TFT 343 is on, data signals (source voltage) input to the source signal line 342 are provided to the pixel electrode 312 through the TFT 343. In this way, in the voltage-applied state, the source voltage is applied to the lower layer pixel electrode 312 via the TFT 343, and the fringe electric field is generated between the counter electrode 314 formed in the upper layer via the insulating film 313 and the pixel electrode 312. The TFT 343 preferably has a channel formed from indium-gallium-zinc-oxygen (IGZO), which is an oxide semiconductor.

Figure 65:
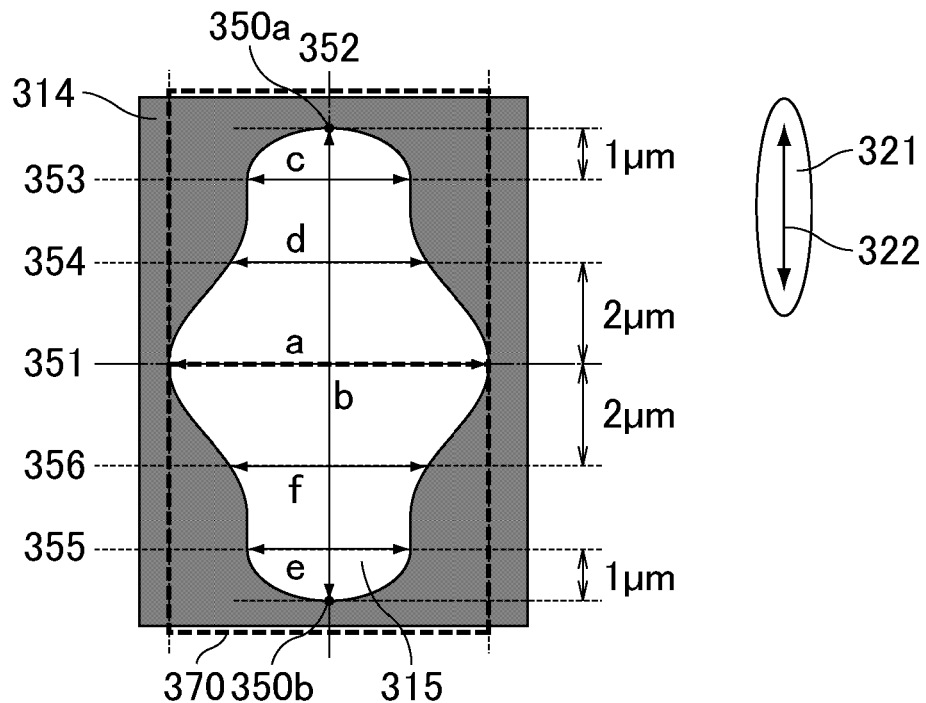
FIG. 65 is a schematic plan view for explaining a shape of an opening provided in a counter electrode of the liquid crystal display device of Embodiment 3-1.

The shape of the opening 315 will be described with reference to FIG. 65. FIG. 65 is a schematic plan view for explaining the shape of the opening provided in the counter electrode of the liquid crystal display device of Embodiment 3-1.

The planar shape of the opening 315 provided in the counter electrode 314 of the present embodiment satisfies the following (Formula 1) to (Formula 5).

$$0.575 \leq a/P \qquad \text{(Formula 1)}$$

$$0.850 \leq b/P \qquad \text{(Formula 2)}$$

$$0.267 \leq (a-c)/P \leq 0.417 \qquad \text{(Formula 3)}$$

$$0.075 \leq (a-d)/P \leq 0.183 \qquad \text{(Formula 4)}$$

$$0.190 \leq (a+b+c+d)/P^2 \qquad \text{(Formula 5)}$$

The symbols a, b, c and d in the above formulas respectively represent the length (μm) of the opening 315 on a first straight line 351, on a second straight line 352, on a third straight line 353, and on a fourth straight line 354, and P represents a pixel pitch (μm).

The symbol a in the above formulas represents the length (μm) of the opening 315 on the first straight line 351. The first straight line 351 is a straight line which is orthogonal to the initial alignment azimuth 322 of the liquid crystal molecules 321 and has the longest length that divides the opening 315.

The symbol b in the above formulas represents the length (μm) of the opening 315 on the second straight line 352. The second straight line 352 is a straight line which is parallel to the initial alignment azimuth 322 of the liquid crystal molecules 321 and has the longest length that divides the opening 315.

The symbol c in the above formulas represents the length (μm) of the opening 315 on the third straight line 353. The third straight line 353 is a straight line which is parallel to the first straight line 351 and is 1 μm away from one end portion 350a of the opening 315 on the second straight line 352.

The symbol d in the above formulas represents the length (μm) of the opening 315 on the fourth straight line 354. The fourth straight line 354 is a straight line which is parallel to the first straight line 351, has a distance of 2 μm from the first straight line 351, and is located between the first straight line 351 and the third straight line 353.

In a case where the definition (screen resolution according to pixel density) of the liquid crystal display device 300 is not more than 920 ppi, when the opening 315 satisfies all the conditions of the above (Formula 1) to (Formula 5), it is possible to precisely control the alignment of the liquid crystal molecules 321 without complicating the shape of the opening 315. As a result, higher definition of the liquid crystal display device 300 and stabilization of the alignment of the liquid crystal molecules 321 in the high voltage-applied state can be achieved simultaneously, and the response speed of the liquid crystal display device 300 can be improved.

Although the definition of the liquid crystal display device 300 is preferably not less than 600 ppi and not more than 920 ppi, more preferably not less than 700 ppi and not more than 910 ppi, and still more preferably not less than 706 ppi and not more than 901 ppi. When such an aspect is adopted, it is possible to rotate the liquid crystal molecules 321 with a small pitch and to increase distortion (twisting power) of the alignment of the liquid crystal molecules 321 in the voltage-applied state, and the response speed can be further improved. As described above, the definition (ppi: pixel per inch) in this specification is represented by the number of pixels arranged per inch (2.54 cm). When one pixel is divided into a plurality of sub-pixels (display units) for driving, the definition may be calculated based on the size of one pixel constituted by a plurality of sub-pixels. When sub-pixels (for example, RGB) of different colors are arranged in a direction parallel to a gate signal line in stripe arrangement, the size in a direction (the longitudinal direction of the sub-pixel) parallel to a source signal line of the sub-pixel corresponds to the size of one pixel in the case of calculating the definition.

The planar shape of the opening 315 satisfies the above (Formula 1) and preferably satisfies the following (Formula 1-1). When such an aspect is adopted, the distortion (twisting power) of the alignment of the liquid crystal molecules 321 in the voltage-applied state can be increased, and the response speed can be further improved.

$$0.575 \leq a/P \leq 0.792 \qquad \text{(Formula 1-1)}$$

The planar shape of the opening 315 satisfies the above (Formula 2) and preferably satisfies the following (Formula 2-1). When such an aspect is adopted, the distortion (twisting power) of the alignment of the liquid crystal molecules 321 in the voltage-applied state can be increased, and the response speed can be further improved.

$$0.850 \leq b/P \leq 2.000 \qquad \text{(Formula 2-1)}$$

The planar shape of the opening 315 satisfies the above (Formula 5) and preferably satisfies the following (Formula 5-1). When such an aspect is adopted, the distortion (twisting power) of the alignment of the liquid crystal molecules 321 in the voltage-applied state can be increased, and the response speed can be further improved.

$$0.190 \leq (a+b+c+d)/P^2 \leq 0.290 \qquad \text{(Formula 5-1)}$$

The planar shape of the opening 315 preferably satisfies the following (Formula C1).

$$0.225 \leq c/P \leq 0.483 \qquad \text{(Formula C1)}$$

The planar shape of the opening 315 preferably satisfies the following (Formula D1).

$$0.442 \leq d/P \leq 0.650 \qquad \text{(Formula D1)}$$

It is preferable that the first straight line 351 and the second straight line 352 intersect within a region of the opening 315. When such an aspect is adopted, in the voltage-applied state, four liquid crystal domains can be easily formed, and the response speed can be easily improved.

An opening portion on the third straight line 353 and an opening portion on the fourth straight line 354 are preferably included in a region 370 where an opening portion on the first straight line 351 is virtually expanded in a direction parallel to the second straight line 352. When such an aspect is adopted, it is possible to increase the symmetry of the liquid crystal domains generated in the voltage-applied state, and to further improve the response speed.

The planar shape of the opening 315 preferably further satisfies the following (Formula 6) to (Formula 8). When such an aspect is adopted, it is possible to increase the symmetry of the liquid crystal domains generated in the voltage-applied state, and to further improve the response speed.

$$0.267 \leq (a-e)/P \leq 0.417 \quad \text{(Formula 6)}$$

$$0.075 \leq (a-f)/P \leq 0.183 \quad \text{(Formula 7)}$$

$$0.190 \leq (a+b+e+f)/P^2 \quad \text{(Formula 8)}$$

e and f in the above formulas respectively represent the length (μm) of the opening 315 on the fifth straight line 355 and the sixth straight line 356.

e in the above formula represents the length (μm) of the opening 315 on the fifth straight line 355. The fifth straight line 355 is a straight line which is parallel to the first straight line 351 and is 1 μm away from the other end portion 350b of the opening 315 on the second straight line 352. That is, the third straight line 353 and the fifth straight line 355 are located at corresponding with respect to the first straight line 351.

f in the above formula represents the length (μm) of the opening 315 on the sixth straight line 356. The sixth straight line 356 is a straight line which is parallel to the first straight line 351, has a distance of 2 μm from the first straight line 351, and is located between the first straight line 351 and the fifth straight line 355. That is, the fourth straight line 354 and the sixth straight line 356 are located at corresponding positions with respect to the first straight line 351.

The planar shape of the opening 315 preferably satisfies the above (Formula 8) and more preferably satisfies the following (Formula 8-1). When such an aspect is adopted, the distortion (twisting power) of the alignment of the liquid crystal molecules 321 in the voltage-applied state can be increased, and the response speed can be further improved.

$$0.190 \leq (a+b+e+f)/P^2 \leq 0.290 \quad \text{(Formula 8-1)}$$

The planar shape of the opening 315 preferably satisfies the following (Formula E1).

$$0.225 \leq e/P \leq 0.483 \quad \text{(Formula E1)}$$

The planar shape of the opening 315 preferably satisfies the following (Formula F1).

$$0.442 \leq f/P \leq 0.650 \quad \text{(Formula F1)}$$

The opening 315 is preferably symmetrical with respect to the first straight line 351, more preferably symmetrical with respect to the first straight line 351 and the second straight line 352. When such an aspect is adopted, the symmetry of the liquid crystal domains generated in the voltage-applied state increases, and the response speed can be further improved.

Figure 66:
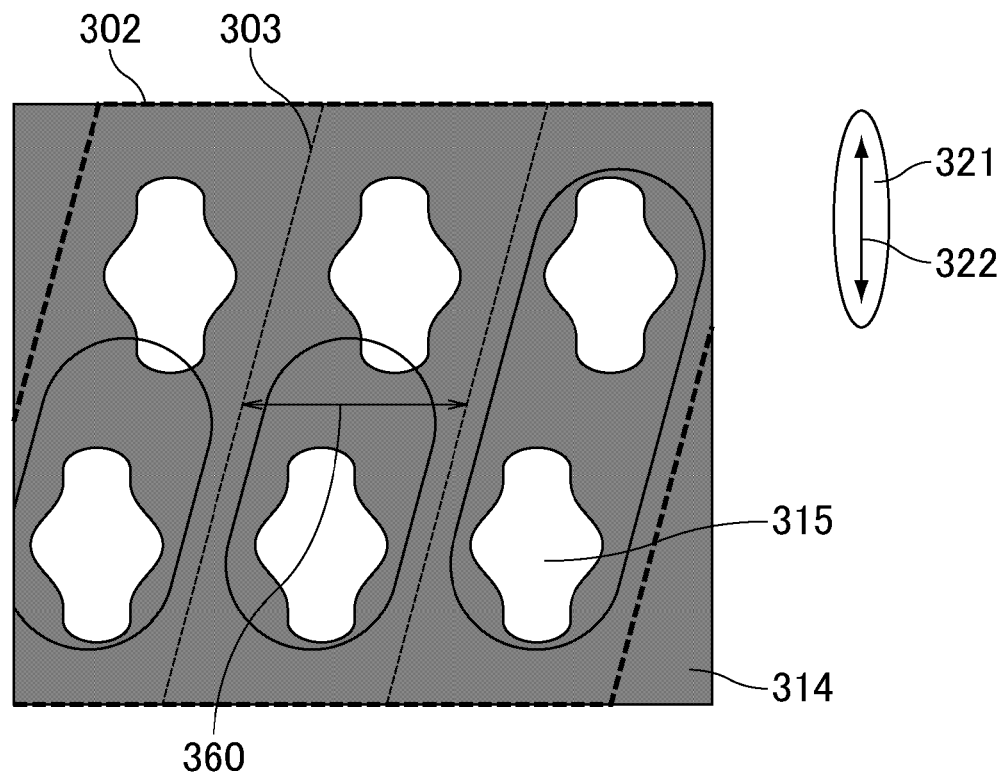
FIG. 66 is a schematic plan view of the counter electrode in the liquid crystal display device of Embodiment 3-1.

FIG. 66 is a schematic plan view of a counter electrode in the liquid crystal display device of Embodiment 3-1. P in the above formula represents the pixel pitch (μm). Here, a pixel pitch 360 represents a shorter one of the pitches in the row direction and the column direction of the display unit 303. That is, when each of the pixels 302 is divided and a plurality of display units 303 exist in each of the pixels 302, the pixel pitch 360 represents a shorter one of the pitches in the row direction and the column direction of the sub-pixels (dots), and when each of the pixels 302 is not divided into the plurality of display units 303 and only one display unit 303 exists in each of the pixels 302, the pixel pitch 360 represents a shorter one of the pitches in the row direction and the column direction of the pixels 302. However, when the pitch in the row direction and the pitch in the column direction of the display unit 303 are the same, the pixel pitch 360 may be either pitch.

As shown in FIG. 66, in the liquid crystal display device 300, it is preferable that two openings 315 are provided in each display unit 303. When such an aspect is adopted, it is possible to rotate the liquid crystal molecules 321 with a smaller pitch and to increase distortion (twisting power) of the alignment of the liquid crystal molecules 321 in the voltage-applied state, and the response speed can be further improved.

Figure 67:
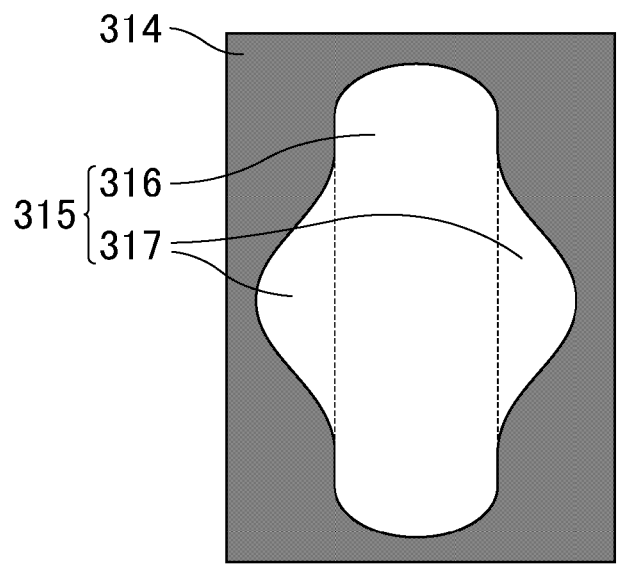
FIG. 67 is a schematic plan view of the counter electrode in the liquid crystal display device of Embodiment 3-1.

FIG. 67 is a schematic plan view of the counter electrode in the liquid crystal display device of Embodiment 3-1. It is preferable that the shape of the opening 315 of the counter electrode 314 includes a longitudinal-shaped portion 316 and a pair of protrusions 317 protruding to the opposite sides from the longitudinal-shaped portion 316, and it is more preferable that the pair of protrusions 317 are provided at a portion (hereinafter referred to as the "intermediate portion") except for both end portions in the longitudinal direction of the longitudinal-shaped portion 316 and located at positions corresponding to each other. Since the opening 315 thus configured does not include a complex shape, the opening 315 can be applied to high-definition pixels (ultra-high-definition pixels) of not less than 700 ppi, for example, without any problem.

The longitudinal-shaped portion 316 is an opening portion formed in a longitudinal shape having a longitudinal length larger than the width in the lateral direction, and examples of the longitudinal shape include an ellipse; a shape similar to an ellipse such as an egg shape; a long polygon such as a rectangle; a shape similar to a long polygon; and a shape in which at least one corner of a long polygon is rounded. Although both the end portions of the longitudinal-shaped portion 316 are not necessarily rounded, it is preferable that at least one of the end portions is rounded, and it is more preferable that both the end portions are rounded. When at least one end portion of the longitudinal-shaped portion 316 is rounded, the alignment of the liquid crystal molecules is fixed by the electric field in the oblique direction at this end portion, and the response speed can be further improved.

The longitudinal direction of the longitudinal-shaped portion 316 is preferably parallel to the initial alignment azimuth 322 of the liquid crystal molecules 321. When such an aspect is adopted, it is possible to increase the symmetry of the liquid crystal domains generated in the voltage-applied state, and to further improve the response speed.

The initial alignment azimuth 322 of the liquid crystal molecules 321 parallel to the longitudinal direction of the longitudinal-shaped portion 316 can be achieved by subjecting the alignment film to photo alignment treatment or rubbing treatment in the lateral direction of the longitudinal-shaped portion 316. The initial alignment azimuth 322 of the liquid crystal molecules 321 orthogonal to the longitudinal direction of the longitudinal-shaped portion 316 can be achieved by subjecting the alignment film to photo alignment treatment or rubbing treatment in the longitudinal direction of the longitudinal-shaped portion 316.

The pair of protrusions 317 protrude to the opposite sides (outside, lateral direction) from the longitudinal-shaped portion 316, and are provided at opposite edge portions of an intermediate portion of the longitudinal-shaped portion 316. Each of the protrusions 317 may largely protrude from the longitudinal-shaped portion 316 or may only slightly protrude, and the size of each of the protrusions 317 is not limited. Each of the protrusions 317 only needs to protrude from the longitudinal-shaped portion 316, and its outer edge may be a circular-arc shape or an elliptical arc shape, may be curved, or may have irregularities. Further, each of the protrusions 317 may be shaped into a polygon such as a triangle or a trapezoid (however, a trapezoid whose longer base is adjacent to the longitudinal-shaped portion 316) or a shape in which at least one corner of such a polygon is rounded. It is preferable that the pair of protrusions 317 have a circular-arc outer edge, have a circular-arc shape whose outer edge has irregularities, or have a triangular shape or a shape in which at least one corner of a triangle is rounded. When such an aspect is adopted, the alignment of the liquid crystal molecules 321 located at the center of the opening 315 can be further stabilized in the voltage-applied state, and the response speed can be further improved.

The pair of protrusions 317 are provided at positions corresponding to each other at the intermediate portion of the longitudinal-shaped portion 316, and although the pair of protrusions 317 may be provided at positions close to one end portion of the longitudinal-shaped portion 316, the pair of protrusions 317 are preferably provided at the center in the longitudinal direction of the longitudinal-shaped portion 316. By providing the pair of protrusions 317 at the center in the longitudinal direction of the longitudinal-shaped portion 316, it is possible to align and divide the liquid crystal molecules 321 into four substantially symmetrical regions at the time of voltage application, so that the response speed can be further improved. The pair of protrusions 317 are preferably provided opposite to each other, preferably provided at substantially the same position in the longitudinal direction of the longitudinal-shaped portion 316, and preferably provided at positions symmetrical with respect to the longitudinal direction of the longitudinal-shaped portion 316.

The pair of protrusions 317 may be provided at a portion of the intermediate portion or may be provided over the entire intermediate portion. By adjusting the position and size of the pair of protrusions 317, it becomes possible to balance a cross-shaped dark line (a region where the liquid crystal molecules do not move) generated at the center of the display unit 303 at the time of voltage application, and to stabilize the alignment of the liquid crystal molecules 321.

Figure 68:
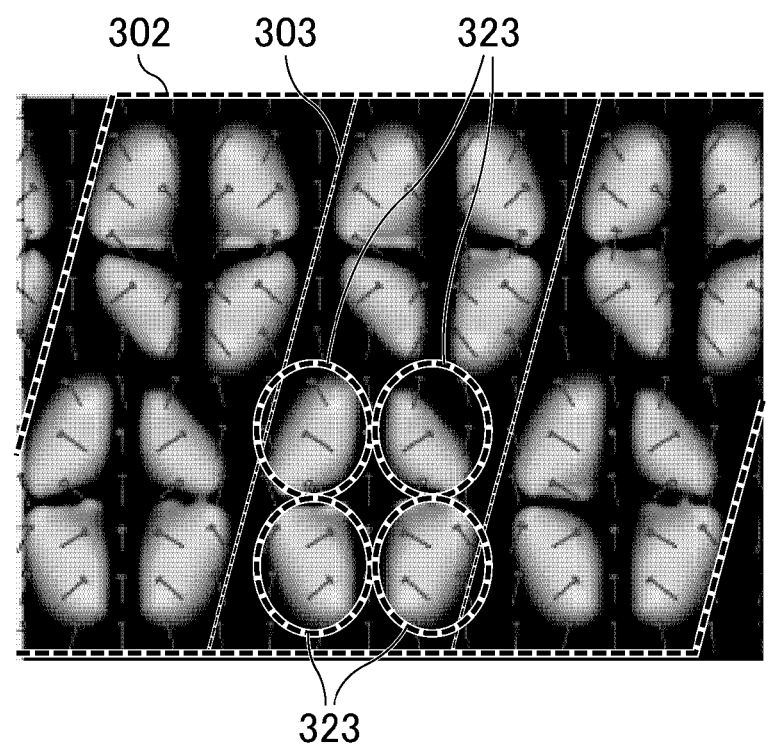
FIG. 68 is a plan view showing the simulation results of the distribution of liquid crystal molecule alignments in the voltage-applied state in the liquid crystal display device of Embodiment 3-1.

FIG. 68 is a plan view showing the simulation results of the distribution of liquid crystal molecule alignments in the voltage-applied state in the liquid crystal display device of Embodiment 3-1. In the simulation in FIG. 68, the applied voltage was set to 5.5 V.

In the liquid crystal display device 300, the four liquid crystal domains 323 are formed in each opening 315 in a high voltage-applied state of 5.5 V as shown in FIG. 68. A cross-shaped dark line exists at the center of the four liquid crystal domains 323, and it is considered that the liquid crystal molecules 321 which do not move serve as walls for generating a force in a direction opposite to the rotational direction of the four liquid crystal domains 323 to improve the response speed.

As described above, in the present specification, the liquid crystal domain means a region defined by a boundary where the liquid crystal molecules 321 do not rotate from the initial alignment azimuth 322 in the voltage-applied state. The boundary between the liquid crystal domains where the liquid crystal molecules 321 do not rotate from the initial alignment azimuth 322 in the voltage-applied state is also called a disclination. In the liquid crystal display device in a normally black mode, the disclination located in a region through which light can pass (light-transmissive region) is visually recognized as a dark line.

It is preferable that the four liquid crystal domains 323 are generated in four regions symmetrical with respect to the initial alignment azimuth 322 of the liquid crystal molecules 321 and an azimuth orthogonal to the initial alignment azimuth 322 of the liquid crystal molecules 321. The response speed can be further improved by increasing the symmetry of the four liquid crystal domains 323.

It is preferable that the opening 315 is line-symmetric with respect to a straight line parallel to the initial alignment azimuth 322 of the liquid crystal molecules 321 (in other words, a straight line parallel to the second straight line 352), and it is more preferable that the opening 315 is line-symmetric with respect to a straight line parallel to the initial alignment azimuth 322 of the liquid crystal molecules 321 (in other words, a straight line parallel to the second straight line 352) and a straight line parallel to a straight line orthogonal to the initial alignment azimuth 322 of the liquid crystal molecules 321 (in other words, a straight line parallel to the first straight line 351). When such an aspect is adopted, the symmetry of the liquid crystal domains 323 formed in the voltage-applied state increases, and the response speed can be further improved.

In the present embodiment and Examples and Comparative Examples according to this embodiment, the schematic plan view of the counter electrode in which the simulation of the distribution of liquid crystal molecule alignments in the voltage-applied state has been performed shows the opening of the black matrix as a reference. However, since the distribution of liquid crystal molecule alignments does not show transmitted light, the opening of the black matrix is not taken into account in the simulation of the distribution of liquid crystal molecule alignments. On the other hand, FIG. 70, which will be described later, shows the results of actual alignment observation in the liquid crystal display devices of Example 3-1 and Comparative Example 3-1, that is, shows the transmitted light, so that the transmitted light at the opening of the black matrix is shown.

The operation of the liquid crystal display device 300 will be described hereinbelow.

In the liquid crystal layer 320 in the no-voltage-applied state, no electric field is generated, and the liquid crystal molecules 321 are aligned parallel to the first substrate 310. Since the initial alignment azimuth 322 of the liquid crystal molecules 321 is parallel to the absorption axis of one of the first polarizer and the second polarizer, and since the first polarizer and the second polarizer are disposed in the crossed Nicols, the liquid crystal panel in the no-voltage-applied state does not transmit light and provides black display.

In the liquid crystal layer 320 in the voltage-applied state, an electric field according to the level of the voltage between the pixel electrode 312 and the counter electrode 314 is generated. Specifically, since the opening 315 is formed in the counter electrode 314 positioned closer to the liquid crystal layer 320 than the pixel electrode 312 is, a fringe electric field is generated around the opening 315. The liquid crystal molecules 321 rotate under the effect of the electric field and change their alignment azimuth from the alignment azimuth in the no-voltage-applied state to the alignment azimuth in the voltage-applied state. The liquid crystal panel in the voltage-applied state thus transmits light to provide white display.

Each and every detail described for Embodiment 3-1 of the present invention shall be applied to all the aspects of the present invention.

The present invention is described below in more detail based on examples and comparative examples according to Embodiment 3-1. The examples, however, are not intended to limit the scope of the present invention.

Example 3-1

A liquid crystal display device of Example 3-1 was produced. A liquid crystal display device of Example 3-1 is a specific example of the liquid crystal display device 300 of Embodiment 3-1 described above, and has the following configuration.

Figure 69:
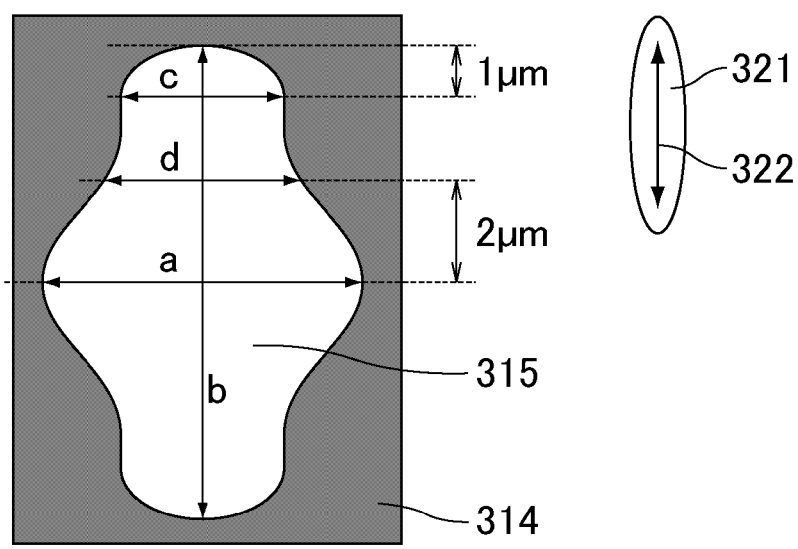
FIG. 69 is a schematic plan view for explaining a shape of an opening provided in the counter electrode of the liquid crystal display device of Example 3-1.

FIG. 69 is a schematic plan view for explaining a shape of an opening provided in a counter electrode of the liquid crystal display device of Example 3-1. For the counter electrode in the liquid crystal display device of Example 3-1, an opening obtained by die-cutting the counter electrode into the shape in FIG. 69 was set. An opening of the black matrix is provided on the opening. The widths a, b, c, and d shown in FIG. 69 were set as follows: a=7.700 μm, b=11.300 μm, c=3.700 μm, and d=5.600 μm.

For the liquid crystal layer held between upper and lower substrates, the refractive index anisotropy (Δn) was set to 0.111, and the in-plane retardation (Re) was set to 330 nm. In addition, the anisotropy of dielectric constant (Δε) of the liquid crystal molecules was set to 7 (positive type), the viscosity of the liquid crystal layer at 20° C. was set to 70 cps, and the initial alignment azimuth of the liquid crystal molecules was set to be parallel to each substrate and 90 degrees with respect to the polarizing plate absorption axis. The pair of polarizing plates were set to a normally black mode in which the polarizing plate absorption axes were arranged so as to be parallel and orthogonal to the initial alignment azimuth of the liquid crystal molecules.

A planar pixel electrode, an inorganic film having an anisotropy of dielectric constant ε of 6.9, and a counter electrode having an opening formed therein were arranged in this order on a lower substrate, and the liquid crystal layer and the counter electrode were adjacent to each other with a horizontal alignment film interposed therebetween. The opening had a point symmetrical shape and was line-symmetric with respect to a straight line parallel to the initial alignment azimuth of the liquid crystal molecules and a straight line parallel to a straight line orthogonal to the initial alignment azimuth of the liquid crystal molecules, and two openings were provided in each display unit. The definition of the liquid crystal display device was 706 ppi, the size of one pixel was 36 μm×36 μm, the size of one display unit was 12 μm×36 μm, and the pixel pitch was 12 μm. That is, one pixel was formed with three display units.

Comparative Example 3-1

FIG. 88 is a view relating to a liquid crystal display device of Comparative Example 3-1, wherein (1) is a schematic plan view of the liquid crystal display device, and (2) is a schematic plan view for explaining a shape of an opening provided in a counter electrode.

The liquid crystal display device of Comparative Example 3-1 was produced. A liquid crystal display device of Comparative Example 3-1 has the same configuration as the liquid crystal display device of Example 3-1 except that the shape of each opening in the counter electrode was changed to the shape shown in FIG. 88. In the liquid crystal display device of Comparative Example 3-1, the widths a, b, c, and d shown in FIG. 88 were set as follows: a=6.200 μm, b=8.840 μm, c=3.800 μm, and d=4.800 μm.

Comparison of Example 3-1 and Comparative Example 3-1

(Comparison by Alignment Observation)

Figure 70:
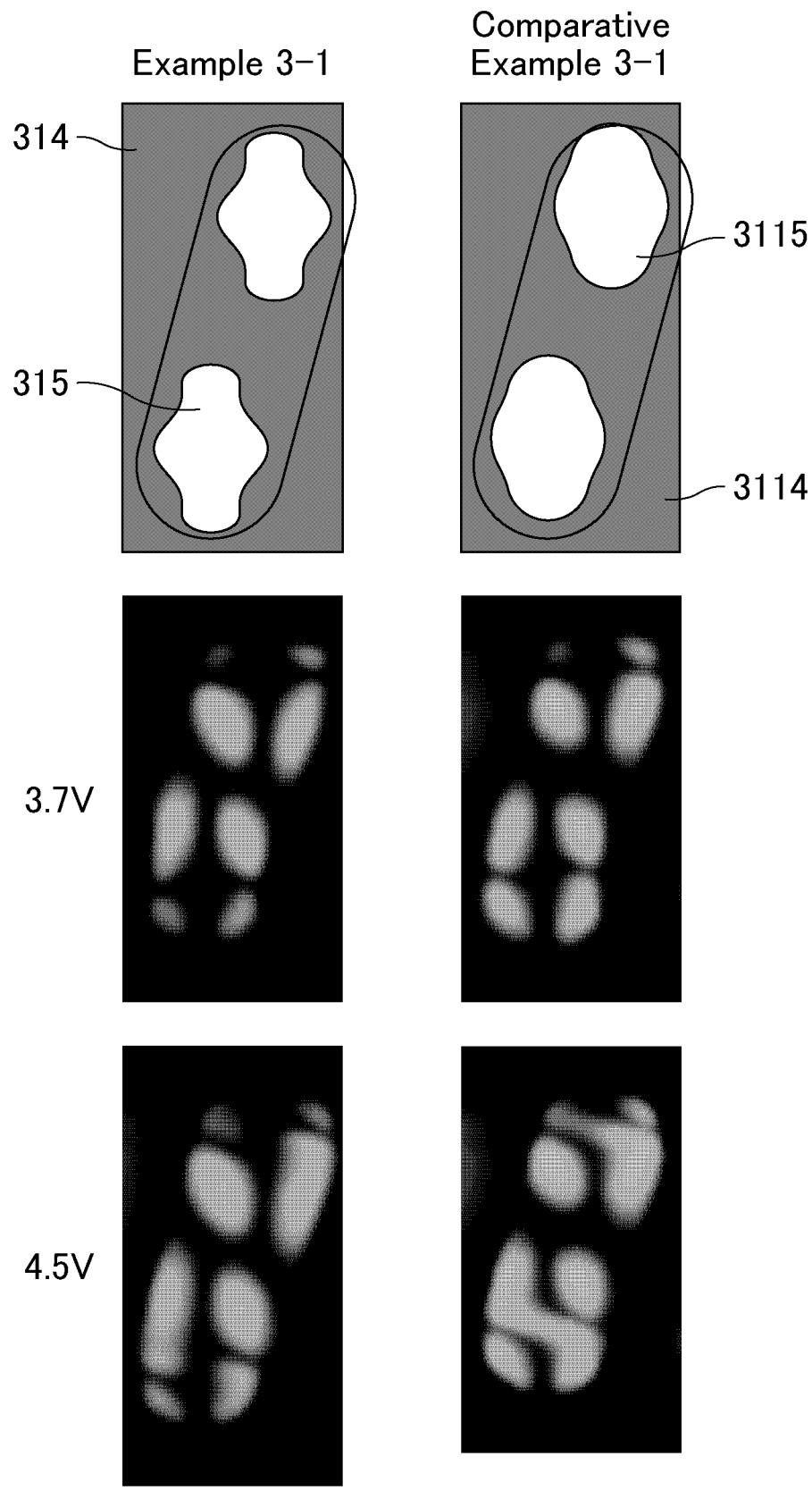
FIG. 70 is a view showing the results of alignment observation in the voltage-applied state in the liquid crystal display device of Example 3-1 and a liquid crystal display device of Comparative Example 3-1.

FIG. 70 is a view showing the results of alignment observation in the voltage-applied state in the liquid crystal display devices of Example 3-1 and Comparative Example 3-1.

As shown in FIG. 70, when a voltage of 3.7 V is applied, in the liquid crystal display devices of Example 3-1 and Comparative Example 3-1, the center of the opening is a dark line, indicating that the liquid crystal molecules do not rotate. On the other hand, when a voltage of 4.5 V is applied, in the liquid crystal display device of Example 3-1, the center of the opening is still a dark line, and the alignment of the liquid crystal molecules is stable, whereas in the liquid crystal display device of Comparative Example 3-1, the liquid crystal molecule alignments become unstable at the center of the opening and rotate, indicating that light is transmitted.

(Comparison by Rise Response Time)

Figure 71:
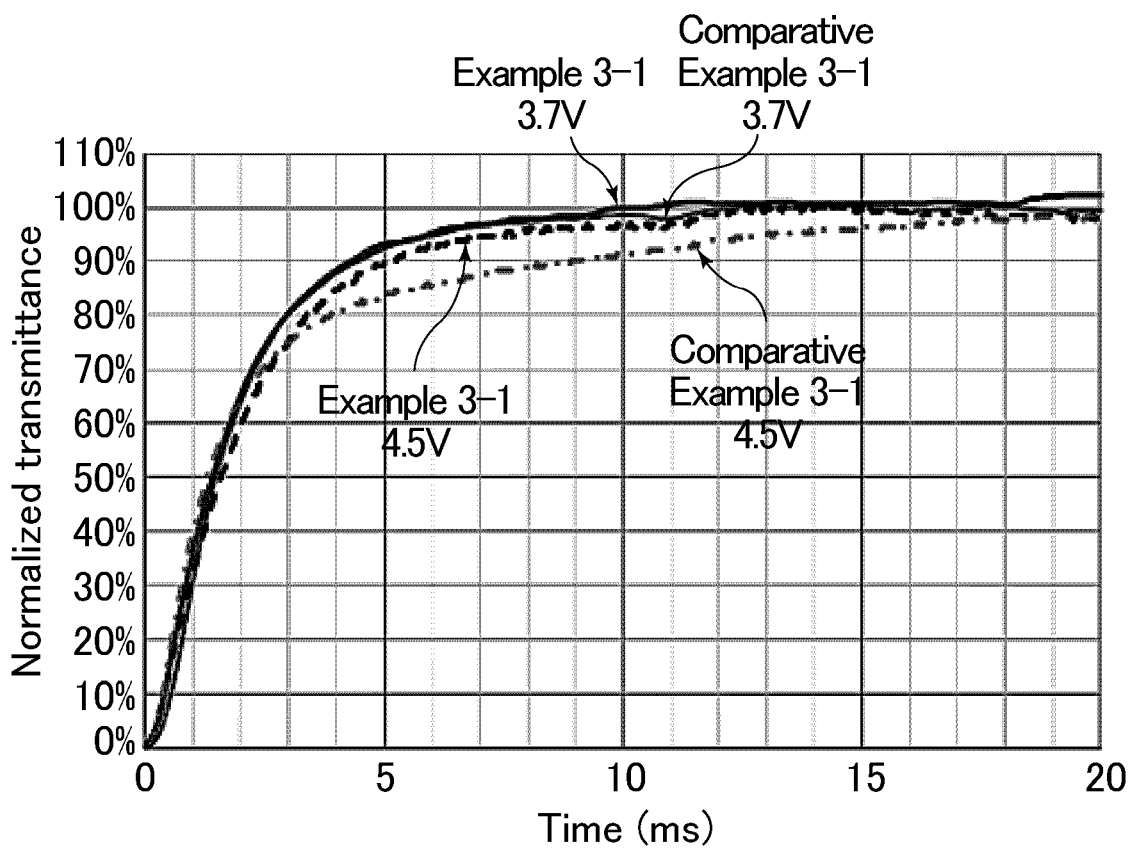
FIG. 71 is a graph showing a relationship between time and normalized transmittance in a rising response of the liquid crystal display devices of Example 3-1 and Comparative Example 3-1.

FIG. 71 is a graph showing a relationship between time and normalized transmittance in a rising response of the liquid crystal display devices of Example 3-1 and Comparative Example 3-1. With the maximum transmittance obtainable by optical modulation being defined as a normalized transmittance of 100%, the rise response time is defined as time required for the normalized transmittance to change from 10% to 90%, and with reference to FIG. 71, the rise response time was determined for the liquid crystal display devices of Example 3-1 and Comparative Example 3-1.

The rise response time of the liquid crystal display devices of Example 3-1 and Comparative Example 3-1 was 4 ms when a voltage of 3.7 V was applied to the liquid crystal display device of Example 3-1, 4.6 ms when a voltage of 4.5 V (white voltage) was applied to the liquid crystal display device of Example 3-1, 3.9 ms when a voltage of 3.7 V was applied to the liquid crystal display device of Comparative Example 3-1, and 8.6 ms when a voltage of 4.5 V was applied to the liquid crystal display device of Comparative Example 3-1.

When the liquid crystal molecules at the center of the opening do not rotate, the rise response time is within 5 ms in both Example 3-1 and Comparative Example 3-1. However, in the liquid crystal display device of Comparative Example 3-1 to which a voltage of 4.5 V was applied, since the liquid crystal molecules at the center of the opening rotate, the rise response time greatly exceeds 5 ms. Accordingly, in order to maintain high-speed response at all gray scales, it is important to provide such a shape that even at a white voltage of 4.5 V, the liquid crystal molecules at the center of the opening do not rotate.

(Comparison by Simulation of Alignment Distribution)

Figure 72:
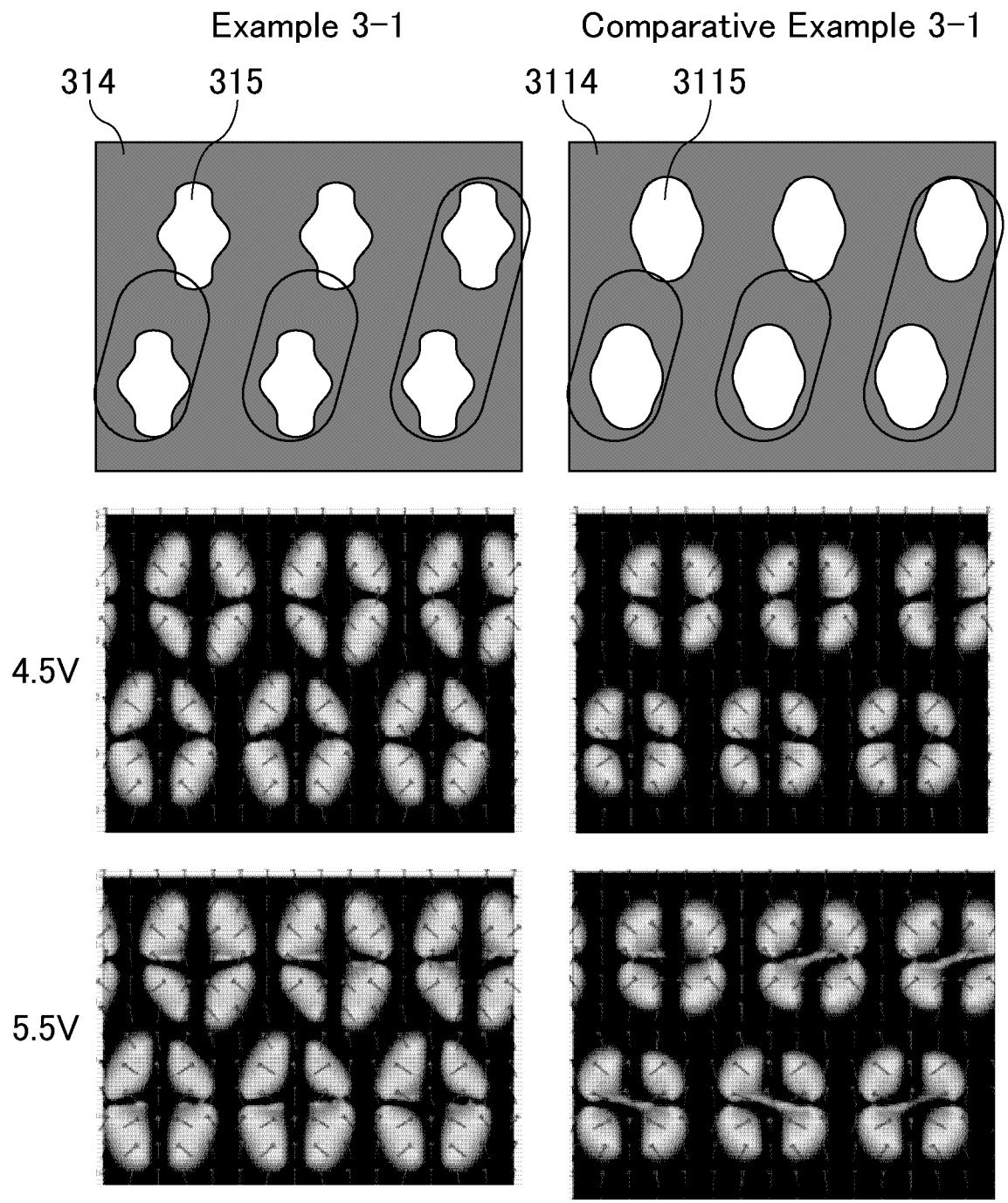
FIG. 72 is a plan view showing the simulation results of the distribution of liquid crystal molecule alignments in the voltage-applied state in the liquid crystal display device of Example 3-1 and Comparative Example 3-1.

FIG. 72 is a plan view showing the simulation results of the distribution of liquid crystal molecule alignments in the voltage-applied state in the liquid crystal display device of Example 3-1 and Comparative Example 3-1. Simulation was performed for one pixel (3 display units) minutes.

As shown in FIG. 72, when a voltage of 4.5 V is applied, both in the liquid crystal display devices of Example 3-1 and Comparative Example 3-1, a dark line exists at the center of the opening in all six openings, indicating that the liquid crystal molecules do not rotate at the center of the opening. Such a state is regarded as a state where the alignment of the liquid crystal molecules is stable.

On the other hand, when the applied voltage is increased to 5.5 V, in the liquid crystal display device of Example 3-1, a dark line still exists at the center of the opening, and the alignment of the liquid crystal molecules is stable, whereas in the liquid crystal display device of Comparative Example 3-1, the liquid crystal molecule alignments become unstable at the center of the opening and rotate, indicating that light is transmitted.

Comparing the actual measurement result by the alignment observation shown in FIG. 70 with the simulation results shown in FIG. 72, there is a correlation with the result concerning alignment stability of the liquid crystal molecules; however, in the simulation, it has been found that the liquid crystal molecules are stably aligned up to a voltage about 1.2 times higher than the actual measurement. Thus, in the following description, although a punched shape which stabilizes the alignment will be considered using simulation, consideration will be given while regarding the opening shape where the alignment of the liquid crystal molecules is stable up to 5.5 V in the simulation as the shape where the alignment is stable up to 4.5 V as a white voltage in actual measurement.

Examples 3-2 to 3-19

Figure 73:
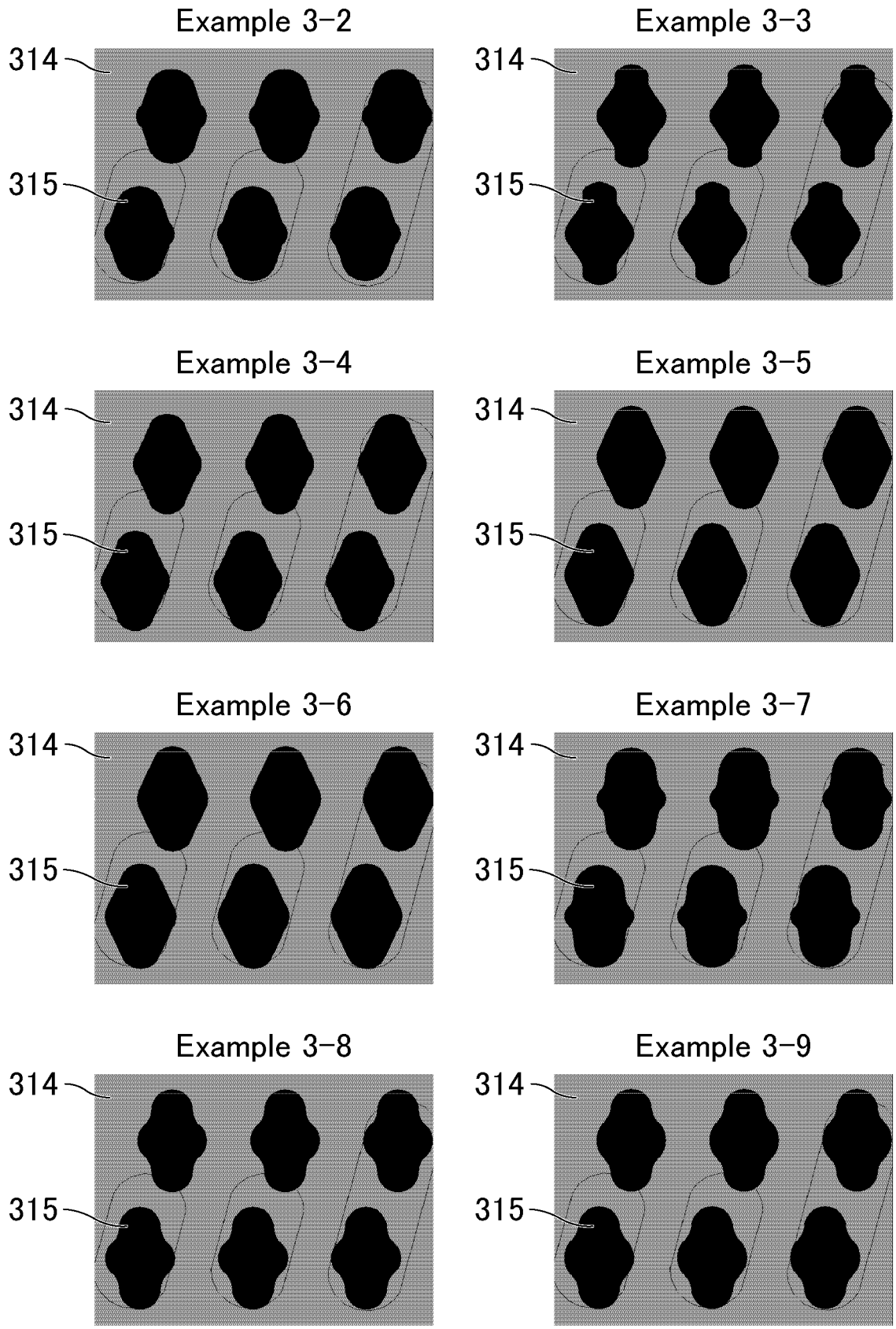
FIG. 73 is a schematic plan view of each counter electrode in liquid crystal display devices of Examples 3-2 to 3-9.

Liquid crystal display devices of Examples 3-2 to 3-19 have the same configuration as the liquid crystal display device of Example 3-1 except that the shape of each opening in the counter electrode was changed to the shapes shown in FIGS. 73 to 75. FIGS. 73 to 75 are schematic plan views of the counter electrodes in the liquid crystal display devices of Examples 3-2 to 3-9, Examples 3-10 to 3-16, and Examples 3-17 to 3-19. Table 5 shows a, b, c, and d of the openings of the counter electrodes used in the liquid crystal display devices of Examples 3-1 to 3-19, and FIG. 97 is a table showing the relationship between a, b, c, and d of the openings of the counter electrodes and the pixel pitch in Examples 3-1 to 3-19. In the FIGS. 97 to 99, those in which a/P, b/P, (a−c)/P, (a−d)/P, and (a+b+c+d)/P$^2$ are within the ranges of the above Formulas 1 to 5 are surrounded by thick frames.

TABLE 5

| | a (μm) | b (μm) | c (μm) | d (μm) | a − c (μm) | a − d (μm) | a + b + c + d (μm) |
|---|---|---|---|---|---|---|---|
| Example 3-1 | 7.700 | 11.300 | 3.700 | 5.600 | 4.000 | 2.1 | 28.3 |
| Example 3-2 | 7.600 | 10.200 | 4.100 | 5.900 | 3.500 | 1.700 | 27.800 |
| Example 3-3 | 7.500 | 11.100 | 3.700 | 5.400 | 3.800 | 2.100 | 27.700 |
| Example 3-4 | 7.400 | 10.800 | 3.700 | 5.800 | 3.700 | 1.600 | 27.700 |
| Example 3-5 | 7.500 | 11.100 | 3.600 | 6.000 | 3.900 | 1.500 | 28.200 |
| Example 3-6 | 7.700 | 11.300 | 3.700 | 6.200 | 4.000 | 1.500 | 28.900 |

TABLE 5-continued

| | a (μm) | b (μm) | c (μm) | d (μm) | a − c (μm) | a − d (μm) | a + b + c + d (μm) |
|---|---|---|---|---|---|---|---|
| Example 3-7 | 7.500 | 11.000 | 4.250 | 5.700 | 3.25 | 1.800 | 28.450 |
| Example 3-8 | 7.500 | 11.000 | 3.700 | 5.300 | 3.800 | 2.200 | 27.500 |
| Example 3-9 | 7.500 | 11.000 | 3.700 | 5.700 | 3.800 | 1.800 | 27.900 |
| Example 3-10 | 7.500 | 11.000 | 3.700 | 6.300 | 3.800 | 1.200 | 28.500 |
| Example 3-11 | 7.500 | 11.000 | 3.700 | 6.350 | 3.800 | 1.150 | 28.550 |
| Example 3-12 | 6.900 | 11.300 | 3.700 | 5.500 | 3.200 | 1.400 | 27.400 |
| Example 3-13 | 7.700 | 11.300 | 3.100 | 6.400 | 4.600 | 1.300 | 28.500 |
| Example 3-14 | 7.700 | 11.300 | 2.700 | 5.650 | 5.000 | 2.050 | 27.350 |
| Example 3-15 | 7.700 | 11.300 | 3.700 | 6.800 | 4.000 | 0.900 | 29.500 |
| Example 3-16 | 9.500 | 10.860 | 5.800 | 7.800 | 3.700 | 1.700 | 33.960 |
| Example 3-17 | 7.700 | 14.000 | 3.750 | 6.200 | 3.950 | 1.500 | 31.650 |
| Example 3-18 | 7.800 | 24.000 | 3.700 | 6.200 | 4.100 | 1.600 | 41.700 |
| Example 3-19 | 7.400 | 10.900 | 3.550 | 5.850 | 3.850 | 1.550 | 27.700 |

For the liquid crystal display devices of Examples 3-1 to 3-19 in which the values of a to d were variously changed, it was verified by simulation whether the alignment of the liquid crystal molecules was stable at a white voltage of 5.5 V.

FIGS. 76 to 78 are plan views showing the simulation results of the distribution of liquid crystal molecule alignments in the voltage-applied state in the liquid crystal display devices of Examples 3-2 to 3-9, Examples 3-10 to 3-16, and Examples 3-17 to 3-19.

Similarly to the simulation results of Example 3-1 described above, in the liquid crystal display devices of Examples 3-2 to 3-19, even if a voltage of 5.5 V is applied, a dark line exists at the center of the opening in all openings, indicating that the liquid crystal molecules do not rotate at the center of the opening. That is, it is understood that the liquid crystal molecules are stably aligned even if a voltage of 4.5 V is applied in actual measurement.

Comparative Examples 3-2 to 3-28

Liquid crystal display devices of Comparative Examples 3-2 to 3-28 have the same configuration as the liquid crystal display device of Example 3-1 except that the shape of each opening in the counter electrode was changed to the shapes of FIGS. 89 to 92. FIGS. 89 to 92 are schematic plan views of the counter electrodes in the liquid crystal display devices of Comparative Examples 3-2 to 3-9, Comparative Examples 3-10 to 3-17, Comparative Examples 3-18 to 3-24, and Comparative Examples 3-25 to 3-28. Table 7 shows a, b, c, and d of the openings of the counter electrodes used in Comparative Examples 3-1 to 3-28, and FIG. 98 is a table showing the relationship between a, b, c, and d of the openings of the counter electrodes and the pixel pitch in Comparative Examples 3-1 to 3-28.

TABLE 7

| | a (μm) | b (μm) | c (μm) | d (μm) | a − c (μm) | a − d (μm) | a + b + c + d (μm) |
|---|---|---|---|---|---|---|---|
| Comparative Example 3-1 | 6.200 | 8.840 | 3.800 | 4.800 | 2.400 | 1.400 | 23.640 |
| Comparative Example 3-2 | 7.100 | 9.000 | 3./00 | 4.600 | 3.400 | 2.500 | 24.400 |
| Comparative Example 3-3 | 6.900 | 9.400 | 3.800 | 5.200 | 3.100 | 1.700 | 25.300 |
| Comparative Example 3-4 | 7.200 | 9.700 | 3.900 | 5.500 | 3.300 | 1.700 | 26.300 |
| Comparative Example 3-5 | 7.300 | 9.900 | 4.000 | 5.700 | 3.300 | 1.600 | 26.900 |
| Comparative Example 3-6 | 7.000 | 10.000 | 2.500 | 4.300 | 4.500 | 2.700 | 23.800 |

TABLE 7-continued

| | a (µm) | b (µm) | c (µm) | d (µm) | a − c (µm) | a − d (µm) | a + b + c + d (µm) |
|---|---|---|---|---|---|---|---|
| Comparative Example 3-7 | 6.200 | 9.500 | 3.200 | 4.700 | 3.000 | 1.500 | 23.600 |
| Comparative Example 3-8 | 6.800 | 10.500 | 3.100 | 4.700 | 3.700 | 2.100 | 25.100 |
| Comparative Example 3-9 | 7.400 | 10.900 | 3.600 | 5.300 | 3.800 | 2.100 | 27.200 |
| Comparative Example 3-10 | 5.100 | 9.000 | 3.700 | 4.600 | 1.400 | 0.500 | 22.400 |
| Comparative Example 3-11 | 5.180 | 8.840 | 3.700 | 4.900 | 1.480 | 0.280 | 22.620 |
| Comparative Example 3-12 | 5.860 | 9.400 | 3.800 | 5.150 | 2.060 | 0.710 | 24.210 |
| Comparative Example 3-13 | 6.160 | 9.700 | 3.900 | 5.550 | 2.260 | 0.610 | 25.310 |
| Comparative Example 3-14 | 6.350 | 9.900 | 4.000 | 5.750 | 2.350 | 0.600 | 26.000 |
| Comparative Example 3-15 | 6.460 | 10.200 | 4.100 | 5.900 | 2.360 | 0.560 | 26.660 |
| Comparative Example 3-16 | 7.000 | 10.000 | 1.750 | 4.350 | 5.250 | 2.650 | 23.100 |
| Comparative Example 3-17 | 6.200 | 9.500 | 2.400 | 4.700 | 3.800 | 1.500 | 22.800 |
| Comparative Example 3-18 | 6.800 | 10.500 | 2.200 | 4.250 | 4.600 | 2.550 | 23.750 |
| Comparative Example 3-19 | 7.400 | 10.900 | 2.500 | 5.300 | 4.900 | 2.100 | 26.100 |
| Comparative Example 3-20 | 7.500 | 11.100 | 2.450 | 5.400 | 5.050 | 2.100 | 26.450 |
| Comparative Example 3-21 | 7.700 | 11.300 | 2.450 | 5.650 | 5.250 | 2.050 | 27.100 |
| Comparative Example 3-22 | 7.000 | 10.000 | 4.500 | 5.850 | 2.500 | 1.150 | 27.350 |
| Comparative Example 3-23 | 6.200 | 9.500 | 3.200 | 4.900 | 3.000 | 1.300 | 23.800 |
| Comparative Example 3-24 | 6.800 | 10.500 | 3.200 | 5.300 | 3.600 | 1.500 | 25.800 |
| Comparative Example 3-25 | 7.500 | 11.000 | 2.500 | 2.700 | 5.000 | 4.800 | 23.700 |
| Comparative Example 3-26 | 7.500 | 11.000 | 3.100 | 3.600 | 4.400 | 3.900 | 25.200 |
| Comparative Example 3-27 | 7.500 | 11.000 | 3.700 | 4.650 | 3.800 | 2.850 | 26.850 |
| Comparative Example 3-28 | 7.500 | 11.000 | 3.700 | 4.850 | 3.800 | 2.650 | 27.050 |

For the liquid crystal display devices of Comparative Examples 3-1 to 3-28 in which the values of a to d were variously changed, it was verified by simulation whether the alignment of the liquid crystal molecules was stable at a white voltage of 5.5 V.

FIGS. 93 to 96 are plan views showing the simulation results of the distribution of liquid crystal molecule alignments in the voltage-applied state in the liquid crystal display devices of Comparative Examples 3-2 to 3-9, Comparative Examples 3-10 to 3-17, Comparative Examples 3-18 to 3-24, and Comparative Examples 3-25 to 3-28.

Similarly to the simulation results of Comparative Example 3-1 described above, in the liquid crystal display devices of Comparative Examples 3-2 to 3-28, when a voltage of 5.5 V is applied, in at least one of six openings, the liquid crystal molecule alignments become unstable at the center of the opening and rotate, indicating that light is transmitted.

Alignment Stable Voltages of Examples 3-1 to 3-19 and Comparative Examples 3-1 to 3-28

For the liquid crystal display devices of Examples 3-1 to 3-19 and Comparative Examples 3-1 to 3-28, the maximum value of the voltage (alignment stable voltage) at which the liquid crystal molecules are stably aligned was obtained by simulation. In the simulation, a state where a dark line exists at the center of the opening in all the openings is a state where the liquid crystal molecules are stably aligned.

The alignment stable voltage obtained by the simulation was plotted against each of a/P, b/P, (a−c)/P, (a−d)/P and (a+b+c+d)/P$^2$.

Figure 80:
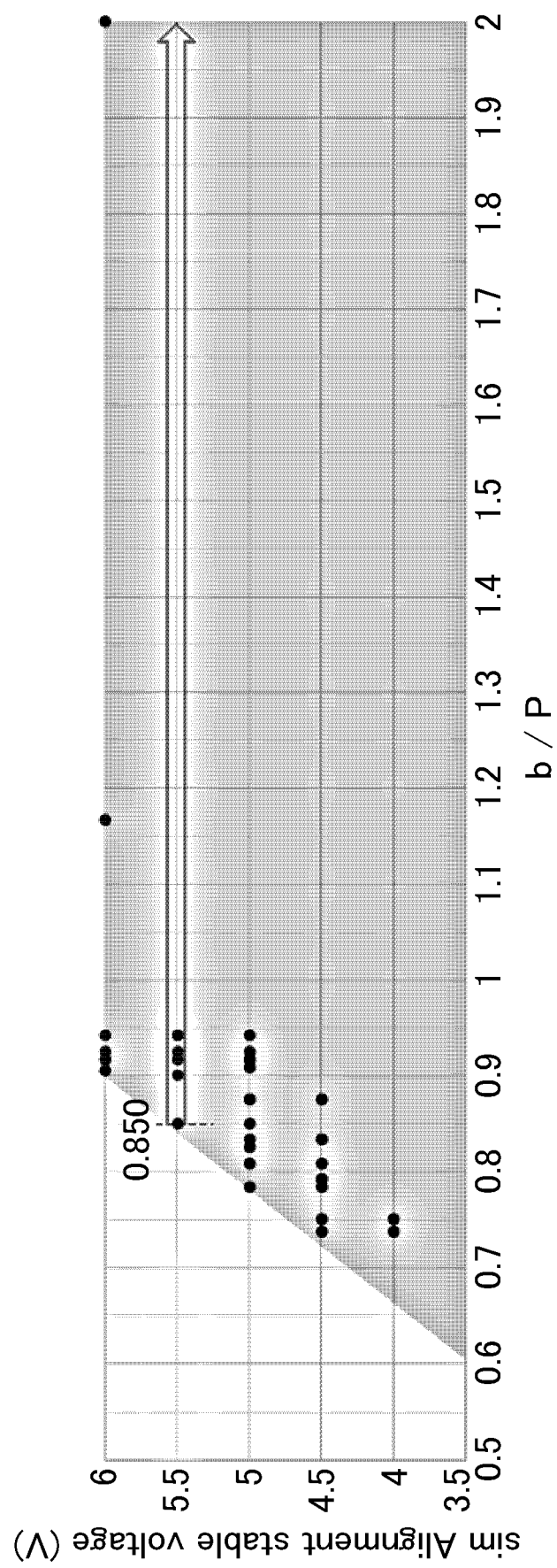
FIG. 80 is a graph obtained by plotting the alignment stable voltage of each of the liquid crystal display devices of Examples 3-1 to 3-19 and Comparative Examples 3-1 to 3-28 against b/P.
Figure 81:
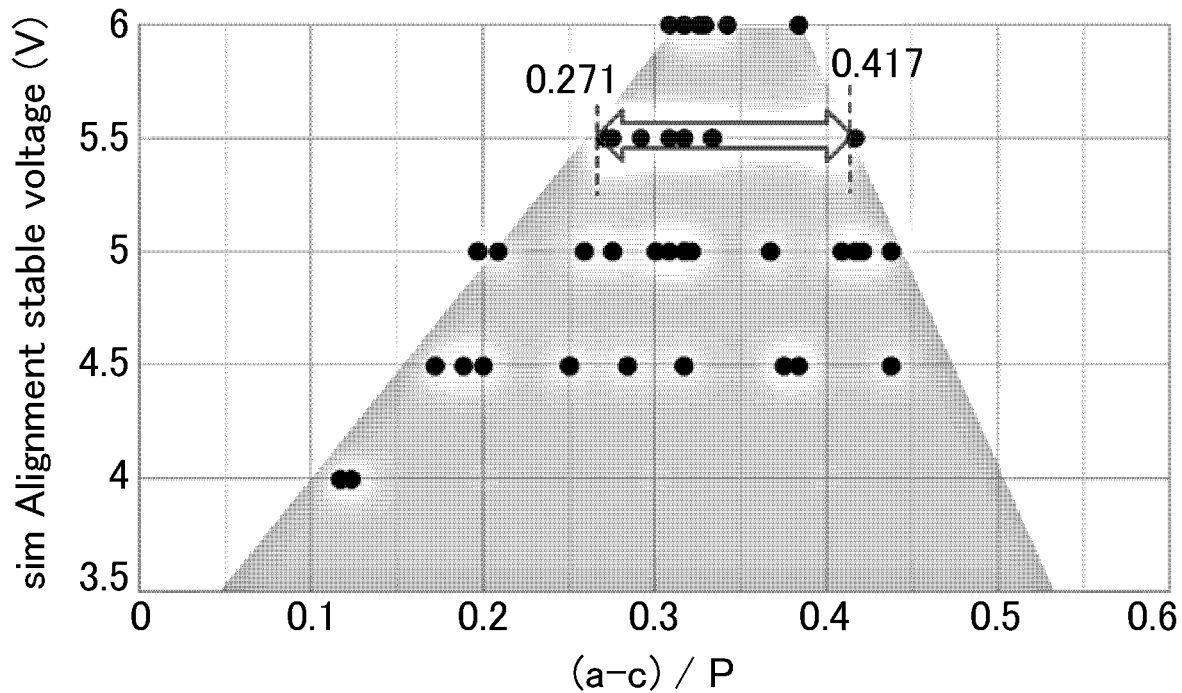
FIG. 81 is a graph obtained by plotting the alignment stable voltage of each of the liquid crystal display devices of Examples 3-1 to 3-19 and Comparative Examples 3-1 to 3-28 against (a−c)/P.
Figure 82:
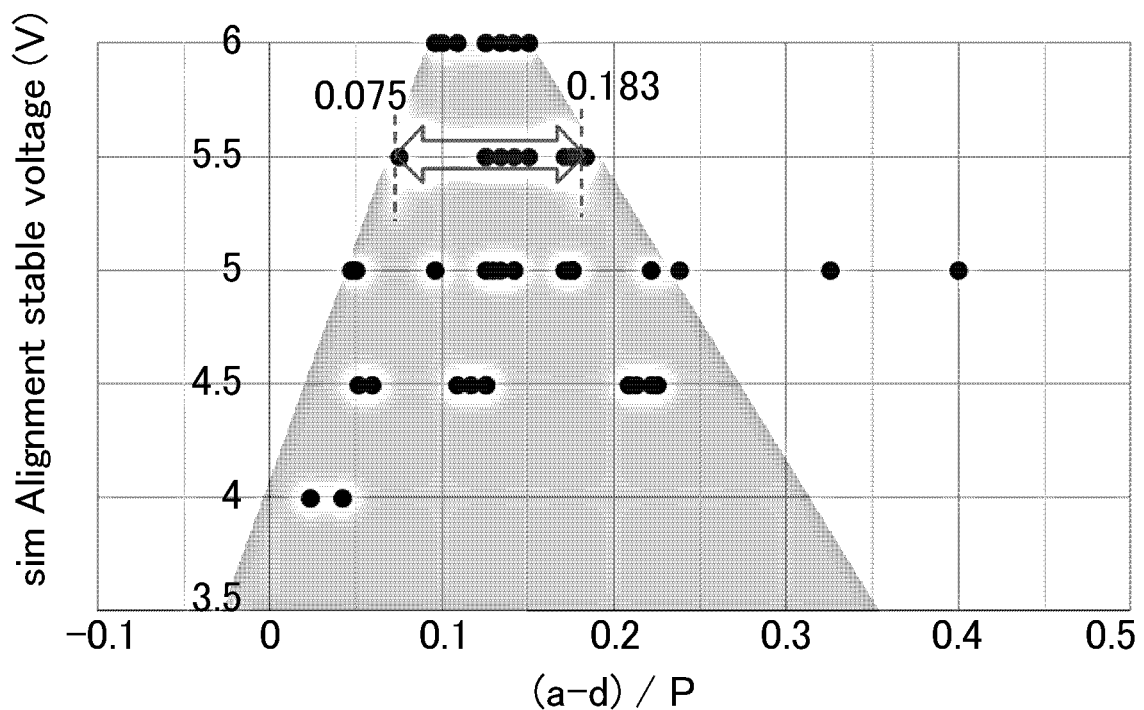
FIG. 82 is a graph obtained by plotting the alignment stable voltage of each of the liquid crystal display devices of Examples 3-1 to 3-19 and Comparative Examples 3-1 to 3-28 against (a−d)/P.
Figure 83:
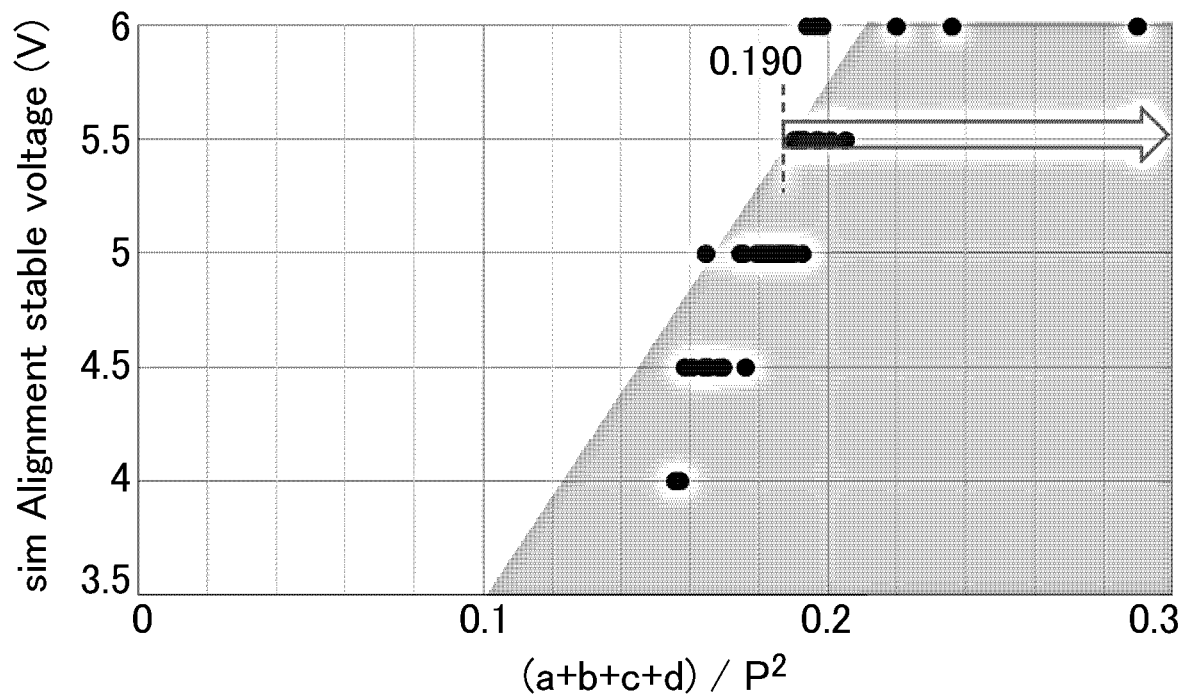
FIG. 83 is a graph obtained by plotting the alignment stable voltage of each of the liquid crystal display devices of Examples 3-1 to 3-19 and Comparative Examples 3-1 to 3-28 against $(a+b+c+d)/P^2$.

FIG. 79 is a graph obtained by plotting the alignment stable voltage of each of the liquid crystal display devices of Examples 3-1 to 3-19 and Comparative Examples 3-1 to 3-28 against a/P. FIG. 80 is a graph obtained by plotting the alignment stable voltage of each of the liquid crystal display devices of Examples 3-1 to 3-19 and Comparative Examples 3-1 to 3-28 against b/P. FIG. 81 is a graph obtained by plotting the alignment stable voltage of each of the liquid crystal display devices of Examples 3-1 to 3-19 and Comparative Examples 3-1 to 3-28 against (a−c)/P. FIG. 82 is a graph obtained by plotting the alignment stable voltage of each of the liquid crystal display devices of Examples 3-1 to 3-19 and Comparative Examples 3-1 to 3-28 against (a−d)/P. FIG. 83 is a graph obtained by plotting the alignment stable voltage of each of the liquid crystal display devices of Examples 3-1 to 3-19 and Comparative Examples 3-1 to 3-28 against (a+b+c+d)/P$^2$. In FIGS. 79 to 83, a range where the alignment stable voltage is not less than 5.5 V is indicated by the arrow.

In FIG. 79, the range indicated by the arrow where the alignment stable voltage is not less than 5.5 V is the range indicated by the above (Formula 1). In FIG. 80, the range indicated by the arrow where the alignment stable voltage is not less than 5.5 V is the range indicated by the above (Formula 2). In FIG. 81, the range indicated by the arrow where the alignment stable voltage is not less than 5.5 V is the range indicated by the above (Formula 3). In FIG. 82, the range indicated by the arrow where the alignment stable voltage is not less than 5.5 V is the range indicated by the above (Formula 4). In FIG. 83, the range indicated by the arrow where the alignment stable voltage is not less than 5.5 V is the range indicated by the above (Formula 5).

When the planar shape of the opening satisfies all of the above (Formula 1) to (Formula 5), the alignment stable voltage is not less than 5.5 V, so that the alignment of the liquid crystal molecules can be stabilized even in the high voltage-applied state, and the response speed can be improved even in a horizontal alignment mode liquid crystal display device.

In FIGS. 79 and 80, as the values of a and b are larger, the alignment of the liquid crystal molecules in the voltage-applied state is stabilized, so that it has been found that the conditions of the above (Formula 1) to (Formula 5) can be always applied to the liquid crystal display device used in Examples whose definition is less than 706 ppi.

Examples 3-20 and 3-21 and Comparative Example 3-29

Next, it has been considered whether the above (Formula 1) to (Formula 5) can be applied to how much high-definition liquid crystal display devices. That is, a/P is taken as a value around the lower limit (0.575) of (Formula 1), b/P is taken as a value around the lower limit (0.850) of (Formula 2), and the definition to which the above (Formula 1) to (Formula 5) can be applied has been considered.

Figure 84:
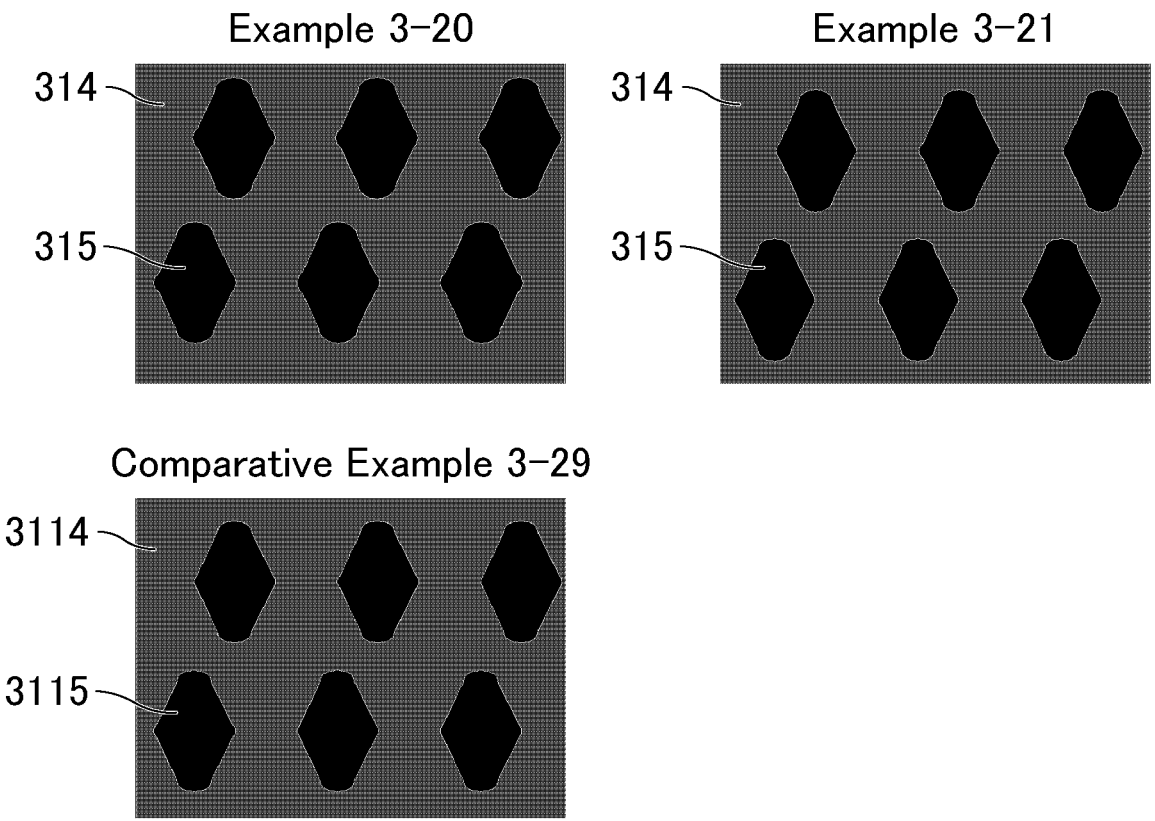
FIG. 84 is a schematic plan view of each counter electrode in liquid crystal display devices of Examples 3-20 and 3-21 and Comparative Example 3-29.
Figure 87:
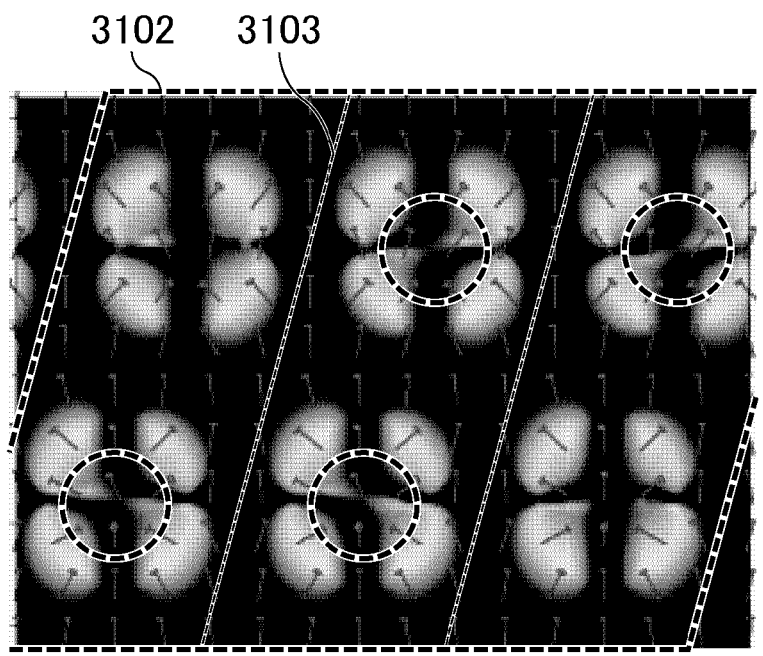
FIG. 87 is a plan view showing the simulation results of the distribution of liquid crystal molecule alignments in the voltage-applied state in the FFS mode liquid crystal display device of Comparative Embodiment 3-1.
Figure 89:
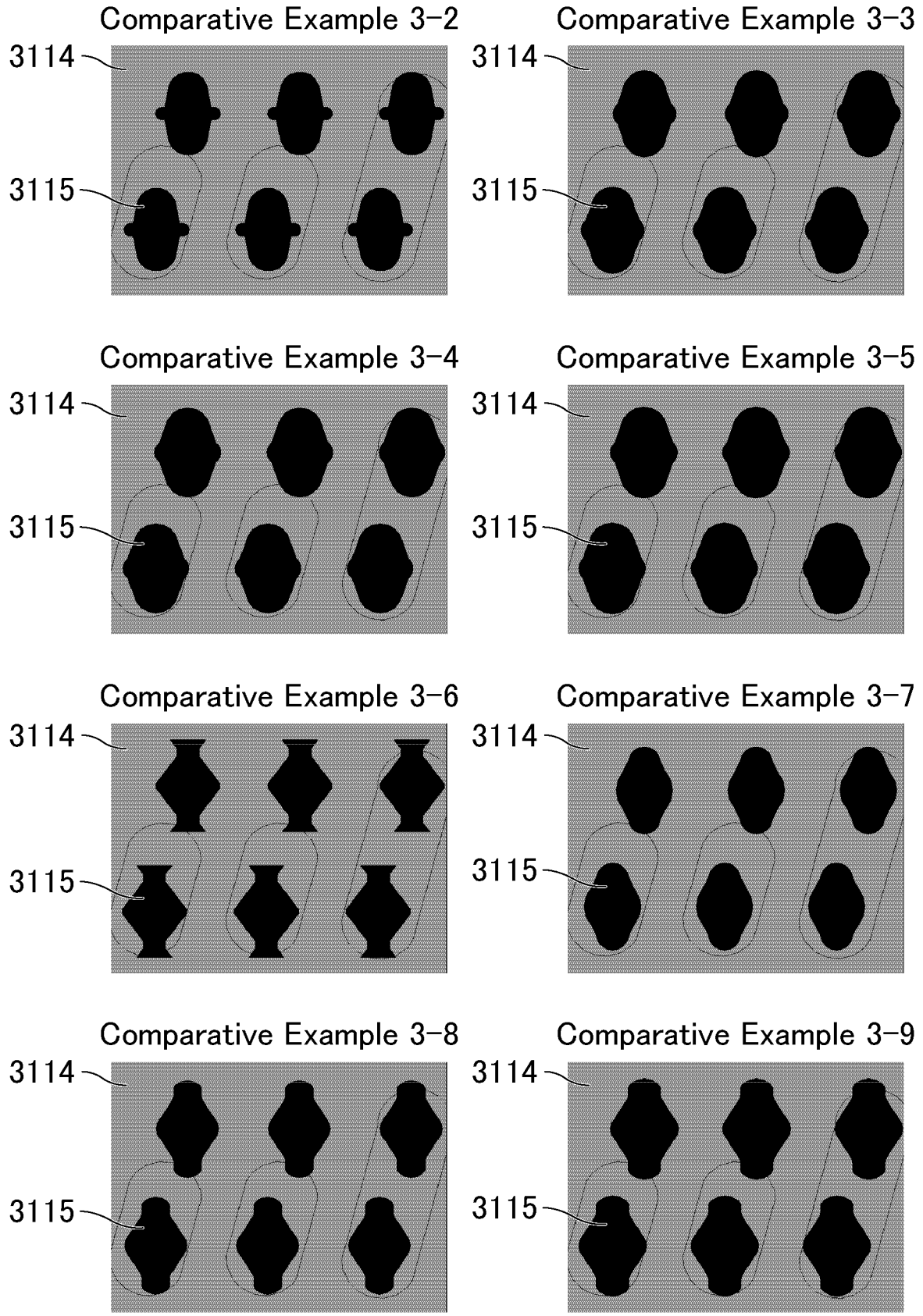
FIG. 89 is a schematic plan view of each counter electrode in liquid crystal display devices of Comparative Examples 3-2 to 3-9.
Figure 90:
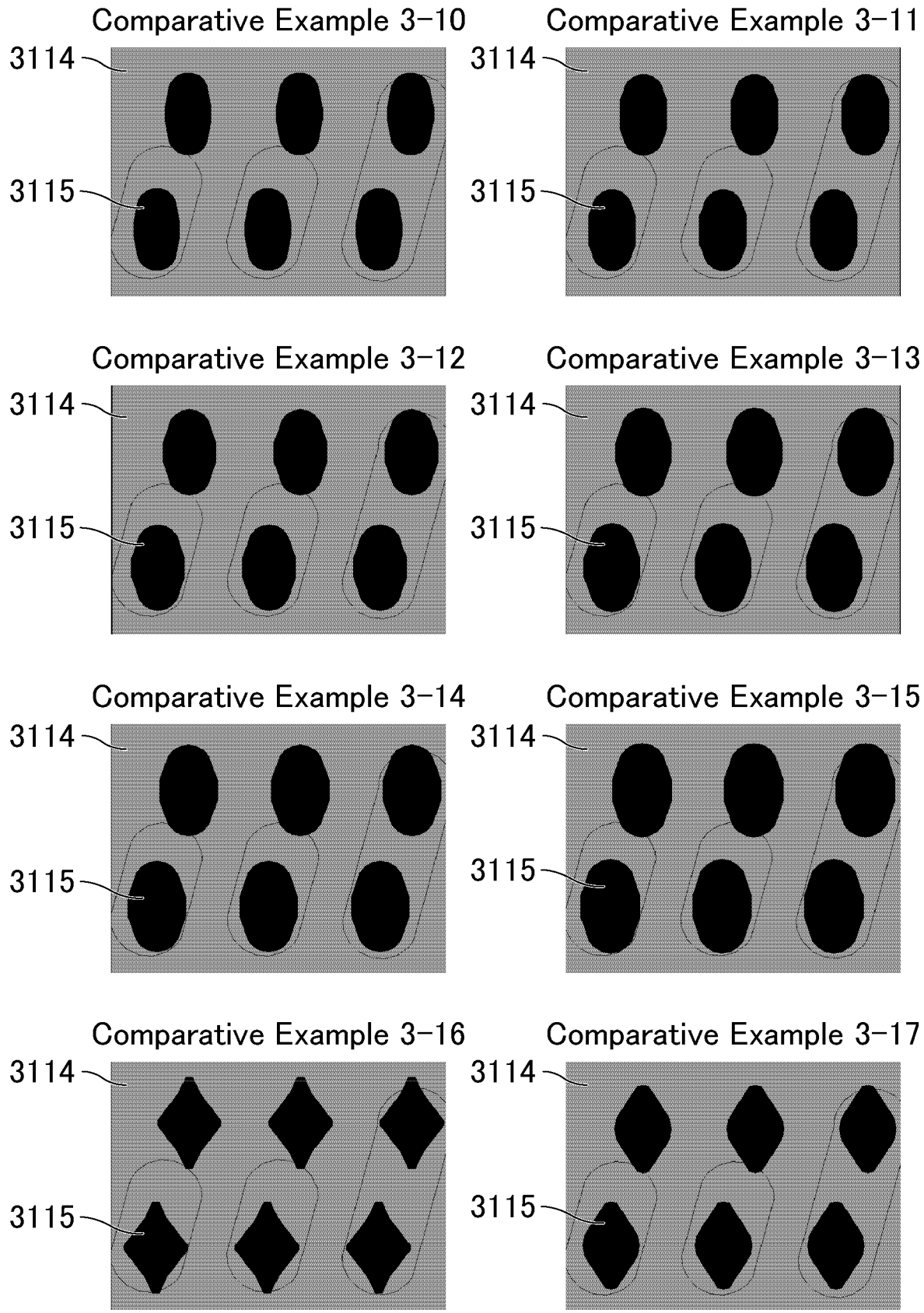
FIG. 90 is a schematic plan view of each counter electrode in liquid crystal display devices of Comparative Examples 3-10 to 3-17.
Figure 91:
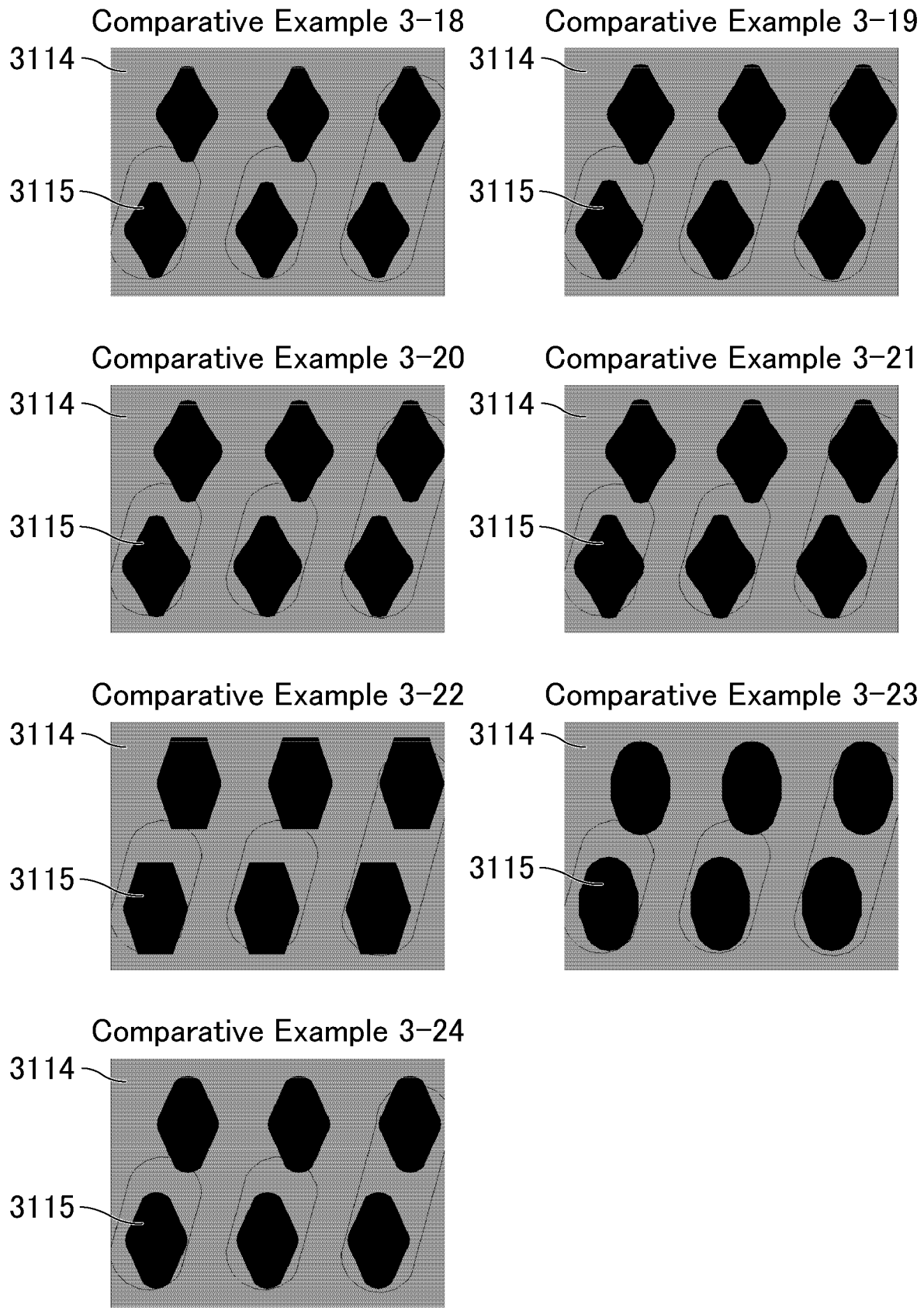
FIG. 91 is a schematic plan view of each counter electrode in liquid crystal display devices of Comparative Examples 3-18 to 3-24.
Figure 92:
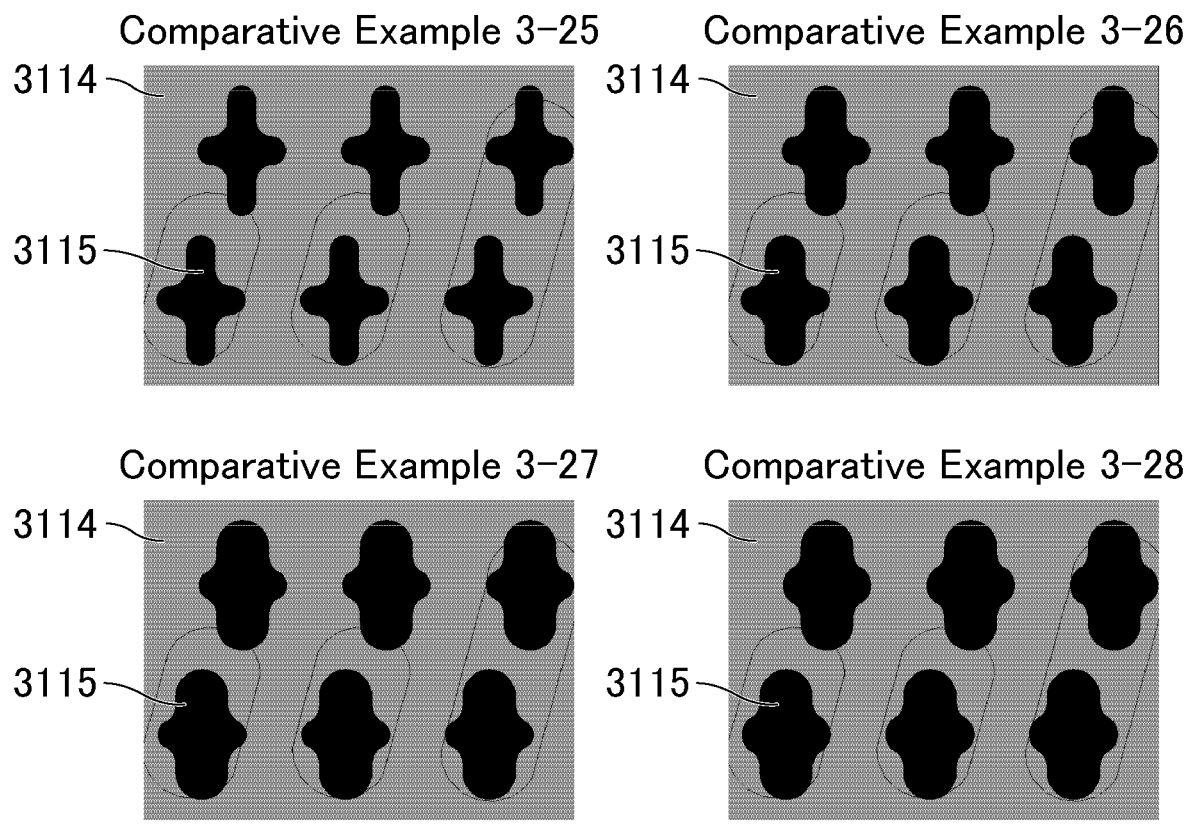
FIG. 92 is a schematic plan view of each counter electrode in liquid crystal display devices of Comparative Examples 3-25 to 3-28.

FIG. 84 is a schematic plan view of each counter electrode in liquid crystal display devices of Examples 3-20 and 3-21 and Comparative Example 3-29. The liquid crystal display device of Example 3-20 has the same configuration as the liquid crystal display device of Example 3-1 except that the shape of the opening in the counter electrode was changed to the shape of Example 3-20 of FIG. 84, the definition was changed to 803 ppi, the size of one pixel was changed to 31.65 μm×31.65 μm, the size of one display unit was changed to 10.55 μm×31.65 μm, and the pixel pitch was changed to 10.55 μm.

The liquid crystal display device of Example 3-21 has the same configuration as the liquid crystal display device of Example 3-1 except that the shape of the opening in the counter electrode was changed to the shape of Example 3-21 of FIG. 84, the definition was changed to 901 ppi, the size of one pixel was changed to 28.2 μm×28.2 μm, the size of one display unit was changed to 9.4 μm×28.2 μm, and the pixel pitch was changed to 9.4 μm.

The liquid crystal display device of Comparative Example 3-29 has the same configuration as the liquid crystal display device of Example 3-1 except that the shape of the opening in the counter electrode was changed to the shape of Comparative Example 3-29 of FIG. 84, the definition was changed to 951 ppi, the size of one pixel was changed to 26.7 μm×26.7 μm, the size of one display unit was changed to 8.9 μm×26.7 μm, and the pixel pitch was changed to 8.9 μm.

Table 9 shows a, b, c, and d of the openings of the counter electrodes used in the liquid crystal display devices of Examples 3-20 and 3-21 and Comparative Example 3-29, and FIG. 99 is a table showing the relationship between a, b, c, and d of the openings of the counter electrodes and the pixel pitch in Examples 3-20 and 3-21 and Comparative Example 3-29.

TABLE 9

| | a (μm) | b (μm) | c (μm) | d (μm) | a − c (μm) | a − d (μm) | a + b + c + d (μm) |
|---|---|---|---|---|---|---|---|
| Example 3-20 | 6.100 | 9.000 | 2.800 | 4.200 | 3.300 | 1.900 | 22.100 |
| Example 3-21 | 5.450 | 8.100 | 2.200 | 3.750 | 3.250 | 1.700 | 19.500 |
| Comparative Example 3-29 | 5.150 | 7.600 | 2.200 | 3.550 | 2.950 | 1.600 | 18.500 |

For the liquid crystal display devices of Examples 3-20 and 3-21 and Comparative Example 3-29, it was verified by simulation whether the alignment of the liquid crystal molecules was stable at a white voltage of 5.5 V.

FIG. 85 is a plan view showing the simulation results of the distribution of liquid crystal molecule alignments in the voltage-applied state in the liquid crystal display devices of Examples 3-20 and 3-21 and Comparative Example 3-29. With reference to FIG. 85, in Examples 3-20 and 3-21, even if a voltage of 5.5 V is applied, a dark line exists at the center of the opening in all six openings, indicating that the liquid crystal molecules do not rotate at the center of the opening. That is, it is understood that the liquid crystal molecules are stably aligned even if a voltage of 4.5 V is applied in actual measurement. On the other hand, in Comparative Example 3-29, when a voltage of 5.5V is applied, in at least one of six openings, the liquid crystal molecule alignments become unstable at the center of the opening and rotate, indicating that light is transmitted. As described above, it has been found that even if the relationship between a, b, c, and d of the opening and the pixel pitch satisfies the above (Formula 1) to (Formula 5), when the definition is not less than 951 ppi, the liquid crystal molecule alignments cannot be stabilized.

[Additional Remark 1]

The first aspect of the present invention may be a liquid crystal display device including, in the given order: the first substrate 110; the liquid crystal layer 120 containing liquid crystal molecules 121; and the second substrate 130, wherein the first substrate 110 includes the first electrode 112, the second electrode 114 positioned closer to the liquid crystal layer 120 than the first electrode 112 is, and an insulating film 113 between the first electrode 112 and the second electrode 114, the second electrode 114 is provided with an opening 117 having a shape including the longitudinal-shaped portion 115 and the pair of protrusions 116 protruding to the opposite sides from the longitudinal-shaped portion 115, the protrusions 116 are provided at portions excluding both end portions in the longitudinal direction of the longitudinal-shaped portion 115 and are located at positions corresponding to each other, in a no-voltage-applied state, where no voltage is applied between the first electrode 112 and the second electrode 114, the liquid crystal molecules 121 are aligned parallel to the first substrate 110, and in a plan view, the longitudinal direction of the longitudinal-shaped portion 115 and the alignment azimuth of the liquid crystal molecules 121 in the no-voltage-applied state are parallel or orthogonal to each other.

Since the second electrode 114 is provided with the opening 117 having a shape including the longitudinal-shaped portion 115 and the pair of protrusions 116 protrud- ing to the opposite sides from the longitudinal-shaped portion 115, it is unnecessary to form the opening 117 having a complex shape in the second electrode 114, and higher definition can be achieved.

The protrusions 116 are provided at positions corresponding to each other, except for both end portions in the longitudinal direction of the longitudinal-shaped portion 115, and in the no-voltage-applied state, where no voltage is applied between the first electrode 112 and the second electrode 114, the liquid crystal molecules 121 are aligned parallel to the first substrate 110. In a plan view, the longitudinal direction of the longitudinal-shaped portion 115 and the alignment azimuth of the liquid crystal molecules 121 in the no-voltage-applied state are parallel or orthogonal to each other, so that four liquid crystal domains partitioned by a cross-shaped disclination can be generated in the voltage-applied state, and, in addition, the disclination and the four liquid crystal domains can be fixed even in a high voltage-applied state. As a result, the response speed can be improved.

The protrusions 116 may be located at the center in the longitudinal direction of the longitudinal-shaped portion 115. According to this aspect, it is possible to align and divide the liquid crystal molecules 121 into four substantially symmetrical regions at the time of voltage application, so that the response speed can be further improved.

The liquid crystal molecules 121 may have positive anisotropy of dielectric constant. According to this aspect, the liquid crystal molecules 121 having a relatively low viscosity can be used, and the response speed can be further improved.

The liquid crystal molecules 121 may have negative anisotropy of dielectric constant.

At least one of the end portions in the longitudinal direction of the longitudinal-shaped portion 115 may be rounded. According to this aspect, an electric field in an oblique direction can be generated in a rounded end portion, and the response speed can be further improved.

In the voltage-applied state where a voltage is applied between the first electrode 112 and the second electrode 114, four liquid crystal domains may be generated in each opening 117.

The four liquid crystal domains may be generated in four regions symmetrical with respect to the longitudinal direction and the lateral direction of the longitudinal-shaped portion 115. According to this aspect, it is possible to further improve the response speed.

Both the end portions in the longitudinal direction of the longitudinal-shaped portion 115 may be rounded.

[Additional Remark 2]

The second aspect of the present invention may be a liquid crystal display device including, in the given order: the first substrate 210; the liquid crystal layer 220 containing liquid crystal molecules 221; and the second substrate 230, wherein the first substrate 210 includes the first electrode 212, the second electrode 214 positioned closer to the liquid crystal layer 220 than the first electrode 212 is, and the insulating film 213 between the first electrode 212 and the second electrode 214, the second electrode 214 is provided with the opening 217, in a no-voltage-applied state, where no voltage is applied between the first electrode 212 and the second electrode 214, the liquid crystal molecules 221 are aligned parallel to the first substrate 210, in a plan view, the contour of the opening 217 includes the first inclined contour 219a along the first line segment 119a extending from the upper end portion 218a of the opening 217 to the right end portion 218d of the opening 217, the second inclined contour 219b along the second line segment 119b extending from the upper end portion 218a to the left end portion 218c of the opening 217, the third inclined contour 219c along a third line segment 119c extending from the lower end portion 218b of the opening 217 to the left end portion 218c, and the fourth inclined contour 219d along the fourth line segment 119d extending from the lower end portion 218b to the right end portion 218d, and in a plan view, the first, second, third, and fourth line segments 119a to 119d are each allowed to be inclined with respect to an alignment azimuth of the liquid crystal molecules 221 in the no-voltage-applied state.

Since the opening 217 thus configured does not include a complex shape, it is possible to achieve higher definition, and since the liquid crystal molecules 221 can be smoothly rotated in the inclined contours 219a, 219b, 219c and 219d of the opening 217, the response speed can be increased even in a low voltage-applied state.

An angle formed by each of the first, second, third, and fourth line segments 119a, 119b, 119c, and 119d with the alignment azimuth of the liquid crystal molecules 221 in the no-voltage-applied state may be more than 0° and not more than 45° in a plan view. When such an aspect is adopted, the rotation of the liquid crystal molecules 221 becomes smoother, and the response speed can be further increased even in the low voltage-applied state.

The above angle may be not less than 2° and not more than 45° in a plan view. When such an aspect is adopted, the rotation of the liquid crystal molecules 21 becomes smoother, and the response speed can be further increased even in the low voltage-applied state.

The liquid crystal display device 200 may have the plurality of display units 201A arranged in a matrix, one opening 217 may be provided in each display unit 201A, and the angle may be not less than 2° and less than 13° in a plan view. When such an aspect is adopted, it is possible to widen an opening region in the counter electrode 214 and to improve the transmittance.

The liquid crystal display device 200 may have the plurality of display units 201A arranged in a matrix, two openings 217 may be provided in each display unit 201A, and the angle may be not less than 2° and less than 45° in a plan view. When such an aspect is adopted, it is possible to widen an opening region in the counter electrode 214 and to improve the transmittance.

The first and second inclined contours 219a and 219b may be line-symmetric with respect to the alignment azimuth of the liquid crystal molecules 221 in the no-voltage-applied state. When such an aspect is adopted, the symmetry of the liquid crystal domains 223 formed in the voltage-applied state increases, and the response speed can be further improved.

The third and fourth inclined contours 219c and 219d may be line-symmetric with respect to the alignment azimuth of the liquid crystal molecules 221 in the no-voltage-applied state. When such an aspect is adopted, the symmetry of the liquid crystal domains 223 formed in the voltage-applied state increases, and the response speed can be further improved.

The first and fourth inclined contours 219a and 219d may be line-symmetric with respect to an azimuth orthogonal to the alignment azimuth of the liquid crystal molecules 221 in the no-voltage-applied state, and the second and third inclined contours 219b and 219c may be line-symmetric with respect to the azimuth orthogonal to the alignment azimuth of the liquid crystal molecules 221 in the no-voltage-applied state. When such an aspect is adopted, the symmetry of the liquid crystal domains 223 formed in the voltage-applied state increases, and the response speed can be further improved.

The opening 217 may include the longitudinal-shaped portion 215 and the pair of protrusions 216 protruding to the opposite sides from the longitudinal-shaped portion 215, and the longitudinal-shaped portion 215 may include the first, second, third and fourth inclined contours 219*a*, 219*b*, 219*c*, and 219*d*. Since the opening 217 thus configured does not include a complex shape, the opening 217 can be applied to high-definition pixels of not less than 800 ppi, for example, without any problem.

The opening 217 may have a quadrangular shape having the upper end portion 218*a*, the lower end portion 218*b*, the left end portion 218*c*, and the right end portion 218*d* as apexes, and first to fourth sides of the quadrangular shape may include the first, second, third, and fourth inclined contours 219*a*, 219*b*, 219*c*, and 219*d*, respectively. Since the opening 217 thus configured does not include a complex shape, the opening 217 can be applied to high-definition pixels of not less than 800 ppi, for example, without any problem.

The liquid crystal molecules 221 may have positive anisotropy of dielectric constant. Since the liquid crystal molecules 221 having positive anisotropy of dielectric constant have a relatively low viscosity, the response speed can be further improved.

At least one of the upper end portion 218*a* and the lower end portion 218*b* of the opening 217 may be rounded. When such an aspect is adopted, the alignment of the liquid crystal molecules 221 can be fixed by the electric field in the oblique direction, and the response speed can be further improved.

In the voltage-applied state where a voltage is applied between the first electrode 212 and the second electrode 214, the four liquid crystal domains 223 may exist in each opening 217. When such an aspect is adopted, the response speed can be further improved using a distortion power generated by bend and spray alignments formed in a narrow region.

The four liquid crystal domains 223 may be generated in four regions symmetrical with respect to the alignment azimuth of the liquid crystal molecules 221 in the no-voltage-applied state and an azimuth orthogonal to the alignment azimuth of the liquid crystal molecules 221 in the no-voltage-applied state. The response speed can be further improved by increasing the symmetry of the four liquid crystal domains 223.

The liquid crystal display device 200 may further include a pair of polarizing plates (first polarizing plate 210A and second polarizing plate 230A), and in a plan view, the first, second, third, and fourth line segments 119*a*, 119*b*, 119*c*, and 119*d* may be each inclined with respect to the transmission axes of the polarizing plates (first polarizing plate 210A and second polarizing plate 230A).

An angle formed by each of the first, second, third, and fourth line segments 119*a*, 119*b*, 119*c*, and 119*d* with one of the transmission axes of the polarizing plates (first polarizing plate 210A and second polarizing plate 230A) may be more than 0° and not more than 45° in a plan view. When such an aspect is adopted, the rotation of the liquid crystal molecules 221 becomes smoother, and the response speed can be further increased even in the low voltage-applied state.

The angle formed by each of the first, second, third, and fourth line segments 119*a*, 119*b*, 119*c*, and 119*d* with the above-described transmission axis may be not less than 2° and not more than 45° in a plan view. When such an aspect is adopted, the rotation of the liquid crystal molecules 221 becomes smoother, and the response speed can be further increased even in the low voltage-applied state.

The liquid crystal display device 200 may have a plurality of display units 201A arranged in a matrix, one opening 217 may be provided in each display unit 201A, and the angle formed by each of the first, second, third, and fourth line segments 119*a*, 119*b*, 119*c*, and 119*d* with one of the transmission axes of the polarizing plates (first polarizing plate 210A and second polarizing plate 230A) may be not less than 2° and less than 13° in a plan view. When such an aspect is adopted, it is possible to widen an opening region in the counter electrode 214 and to improve the transmittance.

The liquid crystal display device 200 may have a plurality of display units 201A arranged in a matrix, two openings 217 may be provided in each display unit 201A, and the angle formed by each of the first, second, third, and fourth line segments 119*a*, 119*b*, 119*c*, and 119*d* with one of the transmission axes of the polarizing plates (first polarizing plate 210A and second polarizing plate 230A) may be not less than 2° and less than 45° in a plan view. When such an aspect is adopted, it is possible to widen an opening region in the counter electrode 214 and to improve the transmittance.

Each of the first, second, third, and fourth inclined contours 219*a*, 219*b*, 219*c* and 219*d* may be linear or curved. Since the opening 217 having such a shape does not include a complex shape, the opening 217 can be applied to high-definition pixels of not less than 800 ppi, for example, without any problem.

Each of the first, second, third, and fourth inclined contours 219*a*, 219*b*, 219*c*, and 219*d* may be curved and may protrude inward with respect to the opening 217.

Each of the first, second, third, and fourth inclined contours 219*a*, 219*b*, 219*c*, and 219*d* may be curved and may protrude outward with respect to the opening 217.

Each of the first, second, third, and fourth inclined contours 219*a*, 219*b*, 219*c*, and 219*d* may be curved and may be a combination of a curve protruding inward with respect to the opening 217 and a curve protruding outward with respect to the opening 217.

[Additional Remark 3]

The third aspect of the present invention may be the liquid crystal display device 300 including, in the given order: the first substrate 310; the liquid crystal layer 320 containing the liquid crystal molecules 321; and the second substrate 330, wherein the definition is not more than 920 ppi, the liquid crystal molecules 321 have positive anisotropy of dielectric constant, the first substrate 310 includes the first electrode 312, the second electrode 314 positioned closer to the liquid crystal layer 320 than the first electrode 312 is, and the insulating film 313 between the first electrode 312 and the second electrode 314, the second electrode 314 is provided with the opening 315, in a no-voltage-applied state, where no voltage is applied between the first electrode 312 and the second electrode 314, the liquid crystal molecules 321 are aligned parallel to the first substrate 310, and a planar shape of the opening 315 satisfies the following (Formula 1) to (Formula 5):

$$0.575 \leq a/P \quad \text{(Formula 1)}$$

$$0.850 \leq b/P \quad \text{(Formula 2)}$$

$$0.267 \leq (a-c)/P \leq 0.417 \quad \text{(Formula 3)}$$

$$0.075 \leq (a-d)/P \leq 0.183 \quad \text{(Formula 4)}$$

$$0.190 \leq (a+b+c+d)/P^2 \quad \text{(Formula 5)}$$

wherein a, b, c and d in the above formulas respectively represent the length (μm) of the opening 315 on the first straight line 351, on the second straight line 352, on the third straight line 353, and on the fourth straight line 354, and P represents a pixel pitch (μm). Here, the first straight line 351 is a straight line which is orthogonal to the initial alignment azimuth 322 of the liquid crystal molecules 321 and has the longest length that divides the opening 315. The second straight line 352 is a straight line which is parallel to the initial alignment azimuth 322 of the liquid crystal molecules 321 and has the longest length that divides the opening 315. The third straight line 353 is a straight line which is parallel to the first straight line 351 and is 1 μm away from one end portion 350a of the opening 315 on the second straight line 352. The fourth straight line 354 is a straight line which is parallel to the first straight line 351, a distance from the first straight line 351 is 2 μm, and is located between the first straight line 351 and the third straight line 353.

According to the liquid crystal display device 300, it is possible to stabilize the alignment of the liquid crystal molecules 321 even under a high voltage-applied state and achieve higher definition. More specifically, in a case where the definition of the liquid crystal display device 300 is not more than 920 ppi, when the opening 315 satisfies all the conditions of the above (Formula 1) to (Formula 5), it is possible to precisely control the alignment of the liquid crystal molecules 321 without complicating the shape of the opening 315, and the alignment of the liquid crystal molecules 321 located at the center of the opening 315 can be stabilized even in a high voltage-applied state.

The first straight line 351 and the second straight line 352 may intersect in a region of the opening 315. When such an aspect is adopted, in the voltage-applied state, four liquid crystal domains 323 can be easily formed, and the response speed can be easily improved.

An opening portion on the third straight line 353 and an opening portion on the fourth straight line 354 may be included in the region 370 where an opening portion on the first straight line 351 is virtually expanded in a direction parallel to the second straight line 352. When such an aspect is adopted, it is possible to increase the symmetry of the liquid crystal domains 323 generated in the voltage-applied state, and to further improve the response speed.

The planar shape of the opening 315 may further satisfy the following (Formula 6) to (Formula 8):

$$0.267 \leq (a-e)/P \leq 0.417 \quad \text{(Formula 6)}$$

$$0.075 \leq (a-f)/P \leq 0.183 \quad \text{(Formula 7)}$$

$$0.190 \leq (a+b+e+f)/P^2 \quad \text{(Formula 8)}$$

wherein e and f in the above formulas respectively represent the length (μm) of the opening 315 on the fifth straight line 355 and the sixth straight line 356. Here, the fifth straight line 355 is a straight line which is parallel to the first straight line 351 and is 1 μm away from the other end portion 350b of the opening 315 on the second straight line 352. The sixth straight line 356 is a straight line which is parallel to the first straight line 351, a distance from the first straight line 351 is 2 μm, and is located between the first straight line 351 and the fifth straight line 355.

When such an aspect is adopted, it is possible to increase the symmetry of the liquid crystal domains 323 generated in the voltage-applied state, and to further improve the response speed.

The opening 315 may have a shape including the longitudinal-shaped portion 316 and the pair of protrusions 317 protruding to the opposite sides from the longitudinal-shaped portion 316. Since the opening 315 thus configured can form the four liquid crystal domains 323 in the voltage-applied state and does not include a complex shape, it is possible to improve the response speed even in high-definition pixels of not less than 700 ppi, for example.

The pair of protrusions 317 may have a circular-arc outer edge. When such an aspect is adopted, the alignment of the liquid crystal molecules 321 located at the center of the opening 315 can be further stabilized in the voltage-applied state, and the response speed can be further improved.

The protrusions 317 may have a triangular shape or a shape in which at least one corner of a triangle is rounded. When such an aspect is adopted, the alignment of the liquid crystal molecules 321 located at the center of the opening 315 can be further stabilized in the voltage-applied state, and the response speed can be further improved.

The protrusions 317 may have a circular-arc shape whose outer edge has irregularities. When such an aspect is adopted, the alignment of the liquid crystal molecules 321 located at the center of the opening 315 can be further stabilized in the voltage-applied state, and the response speed can be further improved.

In a plan view, the longitudinal direction of the longitudinal-shaped portion 316 may be parallel to the initial alignment azimuth 322 of the liquid crystal molecules 321. When such an aspect is adopted, it is possible to increase the symmetry of the liquid crystal domains 323 generated in the voltage-applied state, so that the response speed can be improved.

At least one of both end portions in the longitudinal direction of the opening 315 may be rounded. When at least one end portion of the longitudinal-shaped portion 316 is rounded, the alignment of the liquid crystal molecules 321 is fixed by the electric field in the oblique direction at this end portion, and the response speed can be further improved.

The planar shape of the opening 315 may be symmetrical with respect to the first straight line 351. When such an aspect is adopted, it is possible to increase the symmetry of the liquid crystal domains 323 generated in the voltage-applied state, so that the response speed can be further improved.

The planar shape of the opening 315 may be symmetrical with respect to the second straight line 352. When such an aspect is adopted, it is possible to increase the symmetry of the liquid crystal domains 323 generated in the voltage-applied state, so that the response speed can be further improved.

In the voltage-applied state where a voltage is applied between the first electrode 312 and the second electrode 314, four liquid crystal domains 323 may be generated in each opening 315. When such an aspect is adopted, the response speed can be improved using distortion of the liquid crystal alignment in the voltage-applied state.

The four liquid crystal domains 323 may be generated in four regions symmetrical with respect to the first straight line 351 and the second straight line 352. When such an aspect is adopted, it is possible to increase the symmetry of the liquid crystal domains 323 generated in the voltage-applied state, so that the response speed can be further improved.

Two openings 315 may be provided in each display unit 303. When such an aspect is adopted, it is possible to rotate the liquid crystal molecules 321 with a smaller pitch and to increase distortion (twisting power) of the alignment of the liquid crystal molecules 321 in the voltage-applied state, and the response speed can be further improved.

The embodiments of the present invention shown above may be combined as appropriate within the spirit of the present invention.

REFERENCE SIGNS LIST 100, 200, 300 Liquid crystal display device
110, 210, 310 First substrate
111, 131, 211, 231, 311, 331 Insulating substrate (e.g., glass substrate)
112, 212, 312, 2112 Pixel electrode (first electrode)
113, 213, 313 Insulating layer (insulating film)
114, 214, 314, 2114, 3114 Counter electrode (second electrode)
115, 215, 316 Longitudinal-shaped portion
116, 216, 317 Protrusion
117, 217, 315, 2117, 3115 Opening
118 Electric field
119a First line segment
119b Second line segment
119c Third line segment
119d Fourth line segment
120, 220, 320 Liquid crystal layer
121, 221, 321, 2121, 3121 Liquid crystal molecule
121A Liquid crystal molecule in initial alignment state
121B Liquid crystal molecule at the time of voltage application
130, 230, 330 Second substrate
132, 232, 332 Color filter
133, 233, 333 Overcoat layer
141, 241, 342 Source signal line
142, 242, 341 Gate signal line
143, 243, 343 TFT
201A Display unit
210A First polarizing plate
218a Upper end portion
218b Lower end portion
218c Left end portion
218d Right end portion
219a First inclined contour
219b Second inclined contour
219c Third inclined contour
219d Fourth inclined contour
222, 322, 2122, 3122 Initial alignment azimuth
223, 323 Liquid crystal domain
230A Second polarizing plate
302, 3102 Pixel
303, 3103 Display unit (sub-pixel)
304, 3104 Opening of black matrix
344 Contact hole
350a, 350b End portion
351 First straight line
352 Second straight line
353 Third straight line
354 Fourth straight line
355 Fifth straight line
356 Sixth straight line
360 Pixel pitch
370 Region where opening portion on first straight line is virtually expanded in direction parallel to second straight line
θ Angle formed by line segment with initial alignment azimuth of liquid crystal molecules
θa Angle formed by first line segment with initial alignment azimuth of liquid crystal molecules
θb Angle formed by second line segment with initial alignment azimuth of liquid crystal molecules
θc Angle formed by third line segment with initial alignment azimuth of liquid crystal molecules
θd Angle formed by fourth line segment with initial alignment azimuth of liquid crystal molecules

The invention claimed is:

1. A liquid crystal display device comprising, in the given order:
a first substrate;
a liquid crystal layer containing liquid crystal molecules; and
a second substrate,
wherein the first substrate includes a first electrode, a second electrode positioned closer to the liquid crystal layer than the first electrode is, and an insulating film between the first electrode and the second electrode,
the second electrode is provided with an opening,
in a no-voltage-applied state, where no voltage is applied between the first electrode and the second electrode, the liquid crystal molecules are aligned parallel to the first substrate,
in a plan view, a contour of the opening includes a first inclined contour along a first line segment extending from an upper end portion of the opening to a right end portion of the opening, a second inclined contour along a second line segment extending from the upper end portion to a left end portion of the opening, a third inclined contour along a third line segment extending from a lower end portion of the opening to the left end portion, and a fourth inclined contour along a fourth line segment extending from the lower end portion to the right end portion,
in a plan view, the first, second, third, and fourth line segments are each inclined with respect to an alignment azimuth of the liquid crystal molecules in the no-voltage-applied state,
the liquid crystal display device includes a plurality of display units arranged in a matrix,
the opening is provided in each of the display units, and
an angle formed by each of the first, second third, and fourth line segments with the alignment azimuth of the liquid crystal molecules in the no-voltage-applied state is not less than 2° and less than 13° in a plan view.

2. The liquid crystal display device according to claim 1, wherein the first and second inclined contours are line-symmetric with respect to the alignment azimuth of the liquid crystal molecules in the no-voltage-applied state.

3. The liquid crystal display device according to claim 1, wherein the third and fourth inclined contours are line-symmetric with respect to the alignment azimuth of the liquid crystal molecules in the no-voltage-applied state.

4. The liquid crystal display device according to claim 1, wherein the first and fourth inclined contours are line-symmetric with respect to an azimuth orthogonal to the alignment azimuth of the liquid crystal molecules in the no-voltage-applied state, and
the second and third inclined contours are line-symmetric with respect to the azimuth orthogonal to the alignment azimuth of the liquid crystal molecules in the no-voltage-applied state.

5. The liquid crystal display device according to claim 1, wherein the opening has a shape including a longitudinal-shaped portion and a pair of protrusions protruding to opposite sides from the longitudinal-shaped portion, and the longitudinal-shaped portion includes the first, second, third and fourth inclined contours.

6. The liquid crystal display device according to claim 1, wherein the opening has a quadrangular shape having the upper end portion, the lower end portion, the left end portion, and the right end portion as apexes, and first to fourth sides of the quadrangular shape include the first, second, third, and fourth inclined contours, respectively.

7. The liquid crystal display device according to claim 1, wherein at least one of the upper end portion and the lower end portion of the opening is rounded.

8. The liquid crystal display device according to claim 1, wherein, in a voltage-applied state, where a voltage is applied between the first electrode and the second electrode, there are four liquid crystal domains in the opening.

9. A liquid crystal display device comprising, in the given order:

a first substrate;

a liquid crystal layer containing liquid crystal molecules; and a second substrate, wherein the liquid crystal display device has a definition of not more than 920 ppi, the liquid crystal molecules have positive anisotropy of dielectric constant, the first substrate includes a first electrode, a second electrode positioned closer to the liquid crystal layer than the first electrode is, and an insulating film between the first electrode and the second electrode, the second electrode is provided with an opening, in a no-voltage-applied state, where no voltage is applied between the first electrode and the second electrode, the liquid crystal molecules are aligned parallel to the first substrate, and a planar shape of the opening satisfies the following (Formula 1) to (Formula 5):

$$0.575 \leq a/P \qquad \text{(Formula 1)}$$

$$0.850 \leq b/P \qquad \text{(Formula 2)}$$

$$0.267 \leq (a-c)/P \leq 0.417 \qquad \text{(Formula 3)}$$

$$0.075 \leq (a-d)/P \leq 0.183 \qquad \text{(Formula 4)}$$

$$0.190 \leq (a+b+c+d)/P^2 \qquad \text{(Formula 5)}$$

wherein a, b, c, and d respectively represent a length (μm) of the opening on a first straight line, on a second straight line, on a third straight line, and on a fourth straight line, P represents a pixel pitch (μm), the first straight line is a straight line which is orthogonal to an initial alignment azimuth of the liquid crystal molecules and has the longest length that divides the opening, the second straight line is a straight line which is parallel to the initial alignment azimuth of the liquid crystal molecules and has the longest length that divides the opening, the third straight line is a straight line which is parallel to the first straight line and is 1 μm away from one end portion of the opening on the second straight line, the fourth straight line is a straight line which is parallel to the first straight line, is 2 μm away from the first straight line, and is located between the first straight line and the third straight line, one of the first electrode and the second electrode is a pixel electrode, the pixel pitch represents a shorter one of the pitches in the row direction and the column direction of a display unit when the pitches in the row direction and the column direction of the display unit are different from each other, or either of the pitches when the pitches in the row direction and the column direction of the display unit are the same, and the display unit means a region corresponding to one pixel electrode.

10. The liquid crystal display device according to claim 9, wherein the first straight line and the second straight line intersect in a region of the opening.

11. The liquid crystal display device according to claim 9, wherein an opening portion on the third straight line and an opening portion on the fourth straight line are included in a region where an opening portion on the first straight line is virtually expanded in a direction parallel to the second straight line.

12. The liquid crystal display device according to claim 9, wherein the planar shape of the opening further satisfies the following (Formula 6) to (Formula 8):

$$0.267 \leq (a-e)/P \leq 0.417 \qquad \text{(Formula 6)}$$

$$0.075 \leq (a-f)/P \leq 0.183 \qquad \text{(Formula 7)}$$

$$0.190 \leq (a+b+e+f)/P^2 \qquad \text{(Formula 8)}$$

wherein e and f respectively represent a length (μm) of the opening on a fifth straight line and on a sixth straight line, the fifth straight line is a straight line which is parallel to the first straight line and is 1 μm away from the other end portion of the opening on the second straight line, and the sixth straight line is a straight line which is parallel to the first straight line, is 2 μm away from the first straight line, and is located between the first straight line and the fifth straight line.

13. The liquid crystal display device according to claim 9, wherein the opening has a shape including a longitudinal-shaped portion and a pair of protrusions protruding to opposite sides from the longitudinal-shaped portion.

14. The liquid crystal display device according to claim 13, wherein the protrusions have a circular-arc outer edge.

15. The liquid crystal display device according to claim 13, wherein the protrusions have a triangular shape or a shape in which at least one corner of a triangle is rounded.

16. The liquid crystal display device according to claim 13, wherein the protrusions have a circular-arc shape whose outer edge has irregularities.

17. The liquid crystal display device according to claim 13, wherein in a plan view, a longitudinal direction of the longitudinal-shaped portion is parallel to the initial alignment azimuth of the liquid crystal molecules.

18. The liquid crystal display device according to claim 13, wherein at least one of the end portions in the longitudinal direction of the opening is rounded.

19. The liquid crystal display device according to claim 9, wherein, in a voltage-applied state where a voltage is applied between the first electrode and the second electrode, four liquid crystal domains are generated in the opening.

20. A liquid crystal display device comprising, in the given order:

a first substrate;

a liquid crystal layer containing liquid crystal molecules; and a second substrate, wherein the first substrate includes a first electrode, a second electrode positioned closer to the liquid crystal layer than the first electrode is, and an insulating film between the first electrode and the second electrode, the second electrode is provided with an opening, in a no-voltage-applied state, where no voltage is applied between the first electrode and the second electrode, the liquid crystal molecules are aligned parallel to the first substrate, in a plan view, a contour of the opening includes a first inclined contour along a first line segment extending from an upper end portion of the opening to a right end portion of the opening, a second inclined contour along a second line segment extending from the upper end portion to a left end portion of the opening, a third inclined contour along a third line segment extending from a lower end portion of the opening to the left end portion, and a fourth inclined contour along a fourth line segment extending from the lower end portion to the right end portion, in a plan view, the first, second, third, and fourth line segments are each inclined with respect to an alignment azimuth of the liquid crystal molecules in the no-voltage-applied state, the liquid crystal display device includes a plurality of display units arranged in a matrix, there are two of the openings in each of the display units, and an angle formed by each of the first, second, third, and fourth line segments with the alignment azimuth of the liquid crystal molecules in the no-voltage-applied state is not less than 2° and less than 45° in a plan view.

21. The liquid crystal display device according to claim 20, wherein the first and second inclined contours are line-symmetric with respect to the alignment azimuth of the liquid crystal molecules in the no-voltage-applied state.

22. The liquid crystal display device according to claim 20, wherein the third and fourth inclined contours are line-symmetric with respect to the alignment azimuth of the liquid crystal molecules in the no-voltage-applied state.

23. The liquid crystal display device according to claim 20, wherein the first and fourth inclined contours are line-symmetric with respect to an azimuth orthogonal to the alignment azimuth of the liquid crystal molecules in the no-voltage-applied state, and the second and third inclined contours are line-symmetric with respect to the azimuth orthogonal to the alignment azimuth of the liquid crystal molecules in the no-voltage-applied state.

24. The liquid crystal display device according to claim 20, wherein the opening has a shape including a longitudinal-shaped portion and a pair of protrusions protruding to opposite sides from the longitudinal-shaped portion, and the longitudinal-shaped portion includes the first, second, third and fourth inclined contours.

25. The liquid crystal display device according to claim 20, wherein the opening has a quadrangular shape having the upper end portion, the lower end portion, the left end portion, and the right end portion as apexes, and first to fourth sides of the quadrangular shape include the first, second, third, and fourth inclined contours, respectively.

26. The liquid crystal display device according to claim 20, wherein at least one of the upper end portion and the lower end portion of the opening is rounded.

27. The liquid crystal display device according to claim 20, wherein, in a voltage-applied state, where a voltage is applied between the first electrode and the second electrode, there are four liquid crystal domains in the opening.

* * * * *